US011865056B2

(12) United States Patent
Roussy et al.

(10) Patent No.: US 11,865,056 B2
(45) Date of Patent: Jan. 9, 2024

(54) PATIENT SUPPORT USABLE WITH BARIATRIC PATIENTS

(71) Applicant: Stryker Corporation, Kalamazoo, MI (US)

(72) Inventors: Richard Brian Roussy, London (CA); Jason John Connell, London (CA); Joseph Steven David Elku, Tillsonburg (CA); Jason James Cerny, London (CA); Christopher Alan George, St. Thomas (CA); Joseph William Roussy, London (CA); Christopher Scott Jacob, London (CA); Aleem Yusuf, Kitchener (CA)

(73) Assignee: Stryker Corporation, Kalamazoo, MI (US)

(*) Notice: Subject to any disclaimer, the term of this patent is extended or adjusted under 35 U.S.C. 154(b) by 0 days.

(21) Appl. No.: 17/890,717

(22) Filed: Aug. 18, 2022

(65) Prior Publication Data

US 2022/0395412 A1 Dec. 15, 2022

Related U.S. Application Data

(63) Continuation of application No. 17/095,958, filed on Nov. 12, 2020, now Pat. No. 11,419,776, which is a (Continued)

(51) Int. Cl.
*A61G 7/00* (2006.01)
*A61G 7/012* (2006.01)
(Continued)

(52) U.S. Cl.
CPC ............. *A61G 7/012* (2013.01); *A61G 7/002* (2013.01); *A61G 7/015* (2013.01); *A61G 7/018* (2013.01);
(Continued)

(58) Field of Classification Search
CPC .......... A61G 7/00; A61G 7/012; A61G 7/002; A61G 7/015; A61G 7/018; A61G 7/0506;
(Continued)

(56) References Cited

U.S. PATENT DOCUMENTS

X668479 2/1901 Beihl
1,096,760 A 5/1914 Rudolph
(Continued)

FOREIGN PATENT DOCUMENTS

CA 2301609 A1 3/1999
CA 2505097 A1 9/2006
(Continued)

OTHER PUBLICATIONS

United Kingdom Intellectual Property Office Office Action for Application No. GB2012284.2, dated Sep. 3, 2020.
(Continued)

*Primary Examiner* — Fredrick C Conley
(74) *Attorney, Agent, or Firm* — Warner Norcross + Judd LLP

(57) ABSTRACT

A patient support includes a height adjustable patient support deck, at least one guard structure mounted for movement relative to the patient support deck, and a latch operable to lock the position of the guard structure in a raised position. The patient support further includes a CPR release operable to lower the head deck section of the patient support deck to place the patient support in an emergency state and further operable to release the latch to allow the guard rail structure to lower or be lowered from the raised position.

20 Claims, 78 Drawing Sheets

Related U.S. Application Data continuation of application No. 16/191,537, filed on Nov. 15, 2018, now Pat. No. 10,842,694, which is a continuation of application No. 14/916,335, filed as application No. PCT/CA2014/050850 on Sep. 8, 2014, now Pat. No. 10,130,536.

(60) Provisional application No. 61/874,959, filed on Sep. 6, 2013.

(51) Int. Cl.

| | |
|---|---|
| ***A61G 7/002*** | (2006.01) |
| ***A61G 7/015*** | (2006.01) |
| ***A61G 7/05*** | (2006.01) |
| ***A61G 7/018*** | (2006.01) |

(52) U.S. Cl.
CPC ......... *A61G 7/0506* (2013.01); *A61G 7/0507* (2013.01); *A61G 7/0509* (2016.11); *A61G 7/0512* (2016.11); *A61G 7/0514* (2016.11); *A61G 7/0516* (2016.11); *A61G 7/0518* (2016.11); *A61G 7/0524* (2016.11); *A61G 7/0528* (2016.11); *A61G 2200/16* (2013.01); *A61G 2203/74* (2013.01)

(58) Field of Classification Search
CPC .. A61G 7/0507; A61G 7/0509; A61G 7/0524; A61G 7/0528
See application file for complete search history.

(56) References Cited

U.S. PATENT DOCUMENTS

| | | | | |
|---|---|---|---|---|
| 1,259,022 | A | 3/1918 | Kean et al. | |
| 2,306,031 | A | 12/1942 | Anderson et al. | |
| 2,528,871 | A | 11/1950 | Basil et al. | |
| 2,821,406 | A | 1/1958 | Hoyer et al. | |
| 2,832,655 | A | 4/1958 | Adolphson | |
| 3,220,022 | A | 11/1965 | Nelson | |
| 3,270,574 | A | 9/1966 | Stewart et al. | |
| 3,290,700 | A | 12/1966 | Barecki et al. | |
| 3,305,876 | A | 2/1967 | Hutt | |
| 4,097,939 | A | 7/1978 | Peck et al. | |
| 4,345,344 | A | 8/1982 | Gadoury et al. | |
| 4,432,353 | A | 2/1984 | Vrzalik | |
| 4,647,130 | A | 3/1987 | Blair et al. | |
| 4,664,456 | A | 5/1987 | Blair et al. | |
| 4,682,376 | A | 7/1987 | Feldt | |
| 4,724,555 | A | 2/1988 | Poehner et al. | |
| 4,812,133 | A | 3/1989 | Fleak et al. | |
| 4,856,127 | A | 8/1989 | Lenger | |
| 4,985,946 | A | 1/1991 | Foster et al. | |
| 5,022,105 | A | 6/1991 | Catoe | |
| 5,077,843 | A | 1/1992 | Foster et al. | |
| 5,148,562 | A | 9/1992 | Borders et al. | |
| 5,179,744 | A | 1/1993 | Foster et al. | |
| 5,181,286 | A | 1/1993 | McNulty | |
| 5,279,010 | A | 1/1994 | Ferrand et al. | |
| 5,317,769 | A | 6/1994 | Weismiller et al. | |
| 5,335,384 | A | 8/1994 | Foster et al. | |
| 5,392,475 | A | 2/1995 | McCall et al. | |
| 5,418,987 | A | 5/1995 | Yoshino | |
| 5,432,966 | A | 7/1995 | Berta et al. | |
| 5,469,588 | A | 11/1995 | DiMatteo et al. | |
| 5,594,961 | A | 1/1997 | Yokoi | |
| 5,613,255 | A | 3/1997 | Bish et al. | |
| 5,713,091 | A | 2/1998 | Houchin | |
| 5,715,548 | A | 2/1998 | Weismiller et al. | |
| 5,745,937 | A | 5/1998 | Weismiller et al. | |
| 5,790,997 | A | 8/1998 | Ruehl | |
| 6,000,076 | A * | 12/1999 | Webster ............... | A61G 7/0524 5/616 |
| 6,021,533 | A | 2/2000 | Ellis et al. | |
| 6,071,579 | A | 6/2000 | Green et al. | |
| 6,161,236 | A | 12/2000 | Carroll | |
| 6,163,903 | A | 12/2000 | Weismiller et al. | |
| 6,212,714 | B1 | 4/2001 | Allen et al. | |
| 6,230,344 | B1 | 5/2001 | Thompson et al. | |
| 6,295,675 | B1 | 10/2001 | Ellis et al. | |
| 6,320,510 | B2 | 11/2001 | Menkedick et al. | |
| 6,351,861 | B1 | 3/2002 | Shows et al. | |
| 6,357,065 | B1 | 3/2002 | Adams | |
| 6,405,393 | B2 | 6/2002 | Megown | |
| 6,427,264 | B1 | 8/2002 | Metz et al. | |
| 6,467,113 | B2 | 10/2002 | Ellis et al. | |
| 6,473,922 | B1 | 11/2002 | Sommerfeld et al. | |
| 6,496,993 | B2 | 12/2002 | Allen et al. | |
| 6,526,609 | B2 | 3/2003 | Wong | |
| 6,578,216 | B1 | 6/2003 | Aarestad | |
| 6,601,251 | B2 | 8/2003 | Paul | |
| 6,611,979 | B2 | 9/2003 | Welling et al. | |
| 6,684,427 | B2 | 2/2004 | Allen | |
| 6,704,954 | B2 | 3/2004 | Metz | |
| 6,760,939 | B2 | 7/2004 | Ellis et al. | |
| 6,822,571 | B2 | 11/2004 | Conway | |
| 6,868,567 | B2 | 3/2005 | Edgerton | |
| 6,880,189 | B2 | 4/2005 | Welling et al. | |
| D505,365 | S | 5/2005 | Thompson et al. | |
| 6,910,236 | B2 | 6/2005 | Rene | |
| 6,920,656 | B2 | 7/2005 | Roussy | |
| 6,938,289 | B2 | 9/2005 | Morin | |
| 6,941,600 | B2 | 9/2005 | Freeborn et al. | |
| 7,000,272 | B2 | 2/2006 | Allen et al. | |
| 7,003,828 | B2 | 2/2006 | Roussy | |
| 7,013,510 | B1 | 3/2006 | Johnson | |
| 7,028,358 | B2 | 4/2006 | Liu | |
| 7,082,630 | B2 | 8/2006 | Castonguay et al. | |
| 7,107,637 | B2 | 9/2006 | Keuk et al. | |
| 7,111,348 | B2 | 9/2006 | Ellis et al. | |
| 7,134,155 | B2 | 11/2006 | Freeborn et al. | |
| 7,150,056 | B2 | 12/2006 | Lemire | |
| 7,171,708 | B2 | 2/2007 | Osborne et al. | |
| 7,185,377 | B2 | 3/2007 | Roussy | |
| 7,210,180 | B2 | 5/2007 | Malcolm | |
| 7,213,279 | B2 | 5/2007 | Weismiller et al. | |
| 7,237,288 | B2 | 7/2007 | Lemire et al. | |
| 7,260,860 | B2 | 8/2007 | Chambers et al. | |
| 7,296,312 | B2 | 11/2007 | Menkedick et al. | |
| 7,334,277 | B2 | 2/2008 | Johnson | |
| 7,353,556 | B2 | 4/2008 | Ellis et al. | |
| 7,363,663 | B2 | 4/2008 | Chambers et al. | |
| 7,386,900 | B2 | 6/2008 | Lemire | |
| 7,398,573 | B2 | 7/2008 | Ellis et al. | |
| 7,406,729 | B2 | 8/2008 | Hornbach et al. | |
| 7,406,731 | B2 | 8/2008 | Menkedick et al. | |
| 7,412,734 | B2 | 8/2008 | Stryker et al. | |
| 7,412,739 | B2 | 8/2008 | Derenne et al. | |
| 7,421,748 | B1 | 9/2008 | Edgerton | |
| 7,454,805 | B2 | 11/2008 | Osborne et al. | |
| 7,461,425 | B2 | 12/2008 | Chambers et al. | |
| 7,464,425 | B2 | 12/2008 | Chambers et al. | |
| 7,509,697 | B2 | 3/2009 | Dorenbeck | |
| 7,520,006 | B2 | 4/2009 | Menkedick et al. | |
| 7,520,008 | B2 | 4/2009 | Wong et al. | |
| 7,523,515 | B2 | 4/2009 | Allen et al. | |
| 7,533,429 | B2 | 5/2009 | Menkedick et al. | |
| 7,559,102 | B1 | 7/2009 | Benzo et al. | |
| 7,565,710 | B2 | 7/2009 | Chambers et al. | |
| 7,610,637 | B2 | 11/2009 | Menkedick et al. | |
| 7,631,379 | B2 | 12/2009 | Lindner | |
| 7,637,550 | B2 | 12/2009 | Menna | |
| 7,653,954 | B2 | 2/2010 | Hornbach et al. | |
| 7,669,263 | B2 | 3/2010 | Menkedick et al. | |
| 7,690,059 | B2 | 4/2010 | Lemire et al. | |
| 7,698,765 | B2 | 4/2010 | Bobey et al. | |
| 7,703,157 | B2 | 4/2010 | Dorenbeck | |
| 7,730,562 | B2 | 6/2010 | Hornbach et al. | |
| 7,743,441 | B2 | 6/2010 | Poulos et al. | |
| 7,757,318 | B2 | 7/2010 | Poulos et al. | |
| 7,784,125 | B2 | 8/2010 | Morin et al. | |
| 7,784,128 | B2 | 8/2010 | Kramer | |
| 7,805,782 | B2 | 10/2010 | Hakamiun et al. | |
| 7,810,188 | B2 | 10/2010 | Barthelt | |

(56) References Cited

U.S. PATENT DOCUMENTS

| | | | | |
|---|---|---|---|---|
| 7,832,039 | B2 | 11/2010 | Chambers et al. | |
| 7,834,768 | B2 | 11/2010 | Dixon et al. | |
| 7,845,032 | B2 | 12/2010 | Chambers et al. | |
| 7,849,538 | B1 | 12/2010 | Edgerton | |
| 7,913,335 | B2 | 3/2011 | Carr | |
| 7,926,131 | B2 | 4/2011 | Menkedick et al. | |
| 7,941,881 | B2 | 5/2011 | Hayes et al. | |
| 7,986,242 | B2 | 7/2011 | Dixon et al. | |
| 8,051,513 | B2 | 11/2011 | Reed et al. | |
| 8,056,163 | B2 | 11/2011 | Lemire et al. | |
| 8,065,764 | B2 | 11/2011 | Kramer | |
| 8,069,514 | B2 | 12/2011 | Poulos et al. | |
| 8,074,309 | B2 | 12/2011 | Hutchison et al. | |
| 8,104,117 | B2 | 1/2012 | Heimbrock et al. | |
| 8,104,120 | B2 | 1/2012 | Hornbach et al. | |
| 8,104,122 | B2 | 1/2012 | Richards et al. | |
| 8,104,123 | B2 | 1/2012 | Paz et al. | |
| 8,104,188 | B1 | 1/2012 | Aguilar | |
| RE43,155 | E | 2/2012 | Allen et al. | |
| RE43,193 | E | 2/2012 | Osbourne et al. | |
| 8,117,696 | B2 | 2/2012 | Wernqvist et al. | |
| 8,122,546 | B2 | 2/2012 | Chambers et al. | |
| 8,134,473 | B2 | 3/2012 | Roussy | |
| 8,151,387 | B2 | 4/2012 | Osborne et al. | |
| 8,176,584 | B2 | 5/2012 | Hornbach et al. | |
| RE43,532 | E | 7/2012 | Menkedick et al. | |
| 8,234,729 | B2 | 8/2012 | Yvernault et al. | |
| 8,256,048 | B2 | 9/2012 | Bly et al. | |
| 8,256,050 | B2 | 9/2012 | Wong et al. | |
| 8,258,944 | B2 | 9/2012 | Riley et al. | |
| 8,266,742 | B2 | 9/2012 | Andrienko | |
| 8,291,532 | B2 | 10/2012 | Hornbach et al. | |
| 8,321,976 | B1 | 12/2012 | Edgerton | |
| 8,341,779 | B2 | 1/2013 | Hornbach et al. | |
| 8,353,071 | B2 | 1/2013 | Turner et al. | |
| 8,381,330 | B2 | 2/2013 | Roussy et al. | |
| 8,393,026 | B2 | 3/2013 | Dionne et al. | |
| 8,413,274 | B2 | 4/2013 | Weismiller et al. | |
| 8,418,291 | B2 | 4/2013 | Hornbach et al. | |
| 8,474,076 | B2 | 7/2013 | Hornbach | |
| 8,516,634 | B2 | 8/2013 | Turner et al. | |
| 8,533,877 | B2 | 9/2013 | Weiler | |
| 8,539,625 | B2 | 9/2013 | Poulos et al. | |
| 8,601,618 | B2 | 12/2013 | Benzo et al. | |
| 8,607,384 | B2 | 12/2013 | Hornbach | |
| 8,621,690 | B2 | 1/2014 | Hornbach et al. | |
| 8,650,686 | B2 | 2/2014 | Biggie et al. | |
| 8,959,681 | B2 | 2/2015 | Richards | |
| 8,984,685 | B2 | 3/2015 | Robertson et al. | |
| 9,149,400 | B2 | 10/2015 | Serhan | |
| 9,220,651 | B2 | 12/2015 | Hyde et al. | |
| 9,320,663 | B2 | 4/2016 | Poulos et al. | |
| 9,381,125 | B2 | 7/2016 | Herbst et al. | |
| 2002/0029423 | A1 | 3/2002 | Ellis et al. | |
| 2002/0148044 | A1 | 10/2002 | Hayes et al. | |
| 2003/0019042 | A1 | 1/2003 | Ellis et al. | |
| 2003/0079289 | A1 | 5/2003 | Vrzalik | |
| 2003/0093862 | A1 | 5/2003 | Hanson et al. | |
| 2004/0261185 | A1 | 12/2004 | Ellis et al. | |
| 2005/0125899 | A1 | 6/2005 | Hanson et al. | |
| 2005/0160527 | A1 | 7/2005 | Morin | |
| 2005/0166324 | A1 | 8/2005 | Dixon et al. | |
| 2005/0172405 | A1* | 8/2005 | Menkedick ........... | A61B 5/1115 5/713 |
| 2006/0026767 | A1 | 2/2006 | Chambers et al. | |
| 2006/0085913 | A1 | 4/2006 | Kawakami et al. | |
| 2006/0117479 | A1 | 6/2006 | Kawakami et al. | |
| 2006/0225203 | A1 | 10/2006 | Hosoya et al. | |
| 2007/0011817 | A1 | 1/2007 | Tlis et al. | |
| 2007/0017032 | A1 | 1/2007 | Tlis et al. | |
| 2007/0083992 | A1 | 4/2007 | Lindner et al. | |
| 2007/0089238 | A1 | 4/2007 | Kramer et al. | |
| 2007/0136949 | A1 | 6/2007 | Richards et al. | |
| 2007/0157385 | A1* | 7/2007 | Lemire ............... | A61M 5/1415 5/618 |
| 2007/0174964 | A1 | 8/2007 | Lemire et al. | |
| 2008/0005847 | A1 | 1/2008 | Chambers et al. | |
| 2008/0005848 | A1 | 1/2008 | Chambers et al. | |
| 2008/0010752 | A1 | 1/2008 | Chambers et al. | |
| 2008/0147442 | A1 | 6/2008 | Warner et al. | |
| 2009/0070942 | A1 | 3/2009 | Chambers et al. | |
| 2009/0249552 | A1 | 10/2009 | Chambers et al. | |
| 2009/0293197 | A1 | 12/2009 | Larson et al. | |
| 2010/0064441 | A1 | 3/2010 | Barthelt | |
| 2010/0074681 | A1 | 3/2010 | Jamalzadeh | |
| 2010/0257672 | A1 | 10/2010 | Poulos et al. | |
| 2010/0325797 | A1 | 12/2010 | Horne | |
| 2011/0047709 | A1 | 3/2011 | Tarsaud et al. | |
| 2011/0099723 | A1 | 5/2011 | Chambers et al. | |
| 2011/0232001 | A1 | 9/2011 | Poulos et al. | |
| 2012/0060291 | A1 | 3/2012 | Gamman | |
| 2012/0096644 | A1 | 4/2012 | Heimbrock | |
| 2013/0036550 | A1 | 2/2013 | Bly et al. | |
| 2013/0055502 | A1 | 3/2013 | Kay et al. | |
| 2013/0145550 | A1* | 6/2013 | Roussy .................. | A61G 7/012 74/25 |
| 2013/0174341 | A1 | 7/2013 | Shang | |
| 2013/0180051 | A1 | 7/2013 | Roussy et al. | |
| 2013/0219382 | A1 | 8/2013 | Parsons et al. | |
| 2013/0219622 | A1 | 8/2013 | Hornbach et al. | |
| 2013/0227787 | A1 | 9/2013 | Herbst et al. | |
| 2013/0232690 | A1 | 9/2013 | Hornbach et al. | |
| 2013/0298331 | A1 | 11/2013 | Bossingham et al. | |
| 2013/0318720 | A1* | 12/2013 | Connell ............... | A61G 7/0506 5/658 |
| 2014/0026325 | A1 | 1/2014 | Guthrie | |
| 2014/0033435 | A1 | 2/2014 | Jutras | |
| 2014/0047641 | A1 | 2/2014 | Thodupunuri et al. | |
| 2014/0215117 | A1 | 7/2014 | Chen et al. | |
| 2014/0215717 | A1 | 8/2014 | Rigsby et al. | |
| 2014/0310876 | A1 | 10/2014 | Roussy et al. | |
| 2015/0128347 | A1 | 5/2015 | Hutchinson et al. | |
| 2015/0164722 | A1* | 6/2015 | Roussy .................. | A61G 7/052 5/430 |
| 2016/0089283 | A1 | 3/2016 | DeLuca et al. | |
| 2016/0193095 | A1 | 7/2016 | Roussy et al. | |
| 2016/0213538 | A1 | 7/2016 | Salus | |
| 2018/0104126 | A1 | 4/2018 | Paul et al. | |
| 2018/0214326 | A1 | 8/2018 | Lacasse et al. | |

FOREIGN PATENT DOCUMENTS

| | | | |
|---|---|---|---|
| CA | 2505101 | A1 | 9/2006 |
| CA | 2565836 | C | 1/2012 |
| DE | 20107784 | U1 | 10/2001 |
| DE | 69808941 | T2 | 2/2003 |
| EP | 1234565 | A2 | 8/2002 |
| EP | 1234565 | A3 | 12/2002 |
| EP | 1234565 | B1 | 4/2010 |
| EP | 2698137 | A1 | 2/2014 |
| EP | 2289477 | B1 | 9/2014 |
| EP | 1916926 | | 11/2015 |
| EP | 2954884 | A1 | 12/2015 |
| EP | 3058923 | A1 | 8/2016 |
| JP | 2016028675 | A | 3/2016 |
| TW | 279228 | B | 6/1996 |
| WO | 9909865 | A1 | 3/1999 |
| WO | 9941537 | A1 | 8/1999 |
| WO | 2004021952 | A2 | 3/2004 |
| WO | 2007019692 | | 2/2007 |
| WO | 2013/152438 | | 10/2013 |
| WO | 2013170371 | A1 | 11/2013 |
| WO | 2014018758 | A1 | 1/2014 |
| WO | 2014201379 | A2 | 12/2014 |
| WO | 2014201379 | A3 | 2/2015 |

OTHER PUBLICATIONS

International Search Report for Application No. PCT/CA2014/050850 dated Dec. 3, 2014; 9 pages.

(56) References Cited

OTHER PUBLICATIONS

International Search Report for Application No. PCT/CA2013/000495 dated Aug. 13, 2013; 4 pages.

* cited by examiner

Fig. 31C
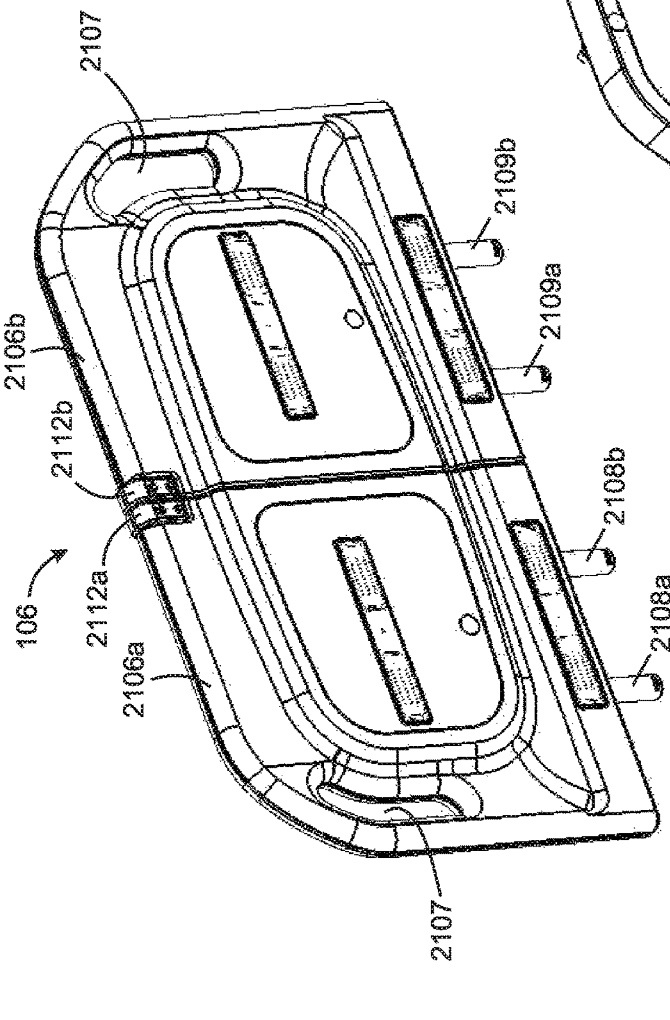
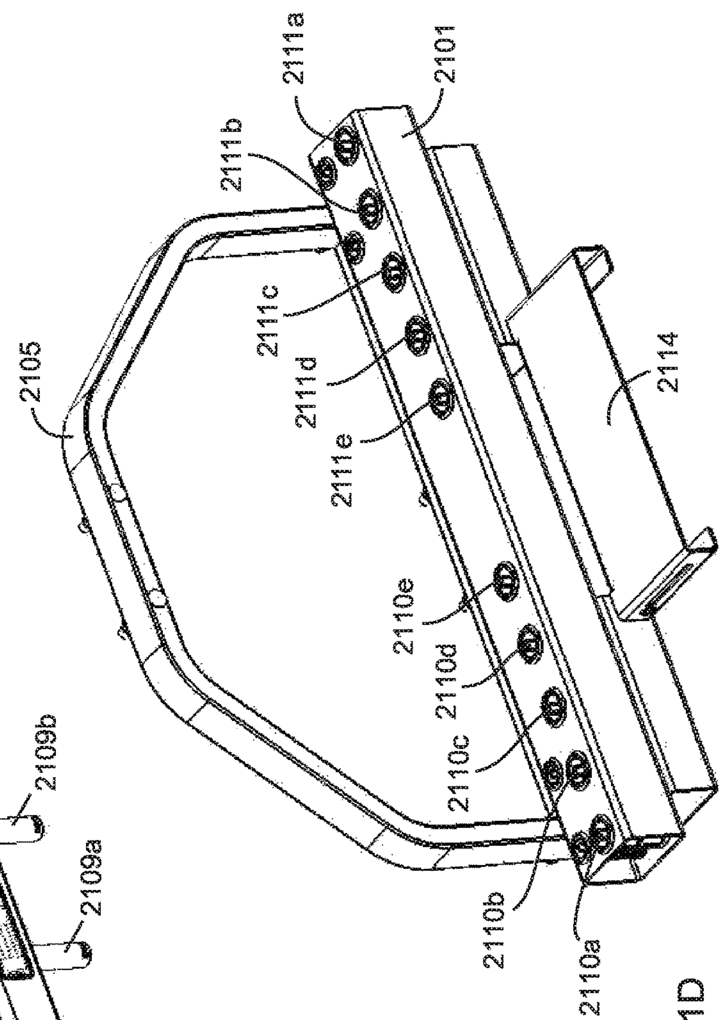
Fig. 31D

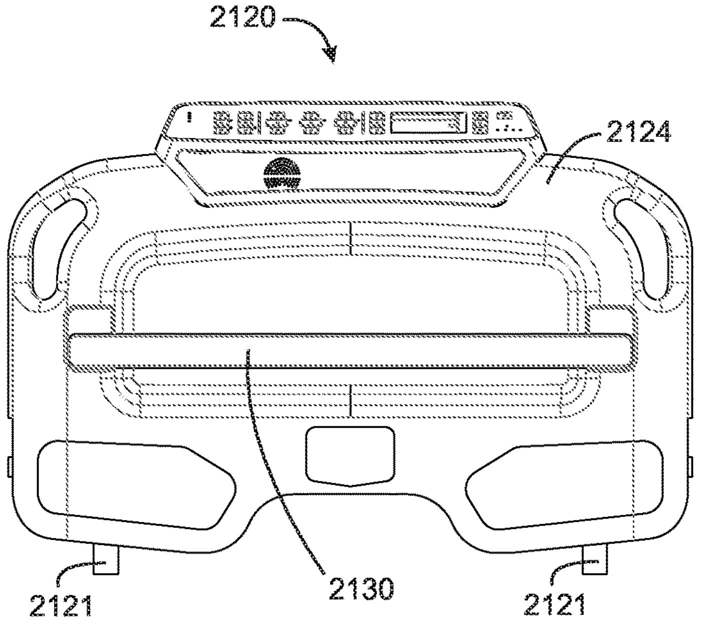
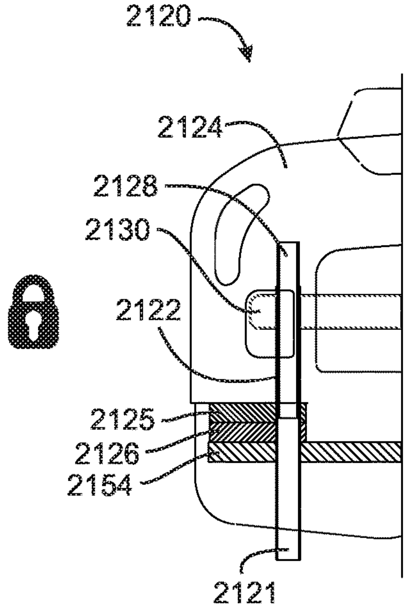
Fig. 37A
Fig. 37B
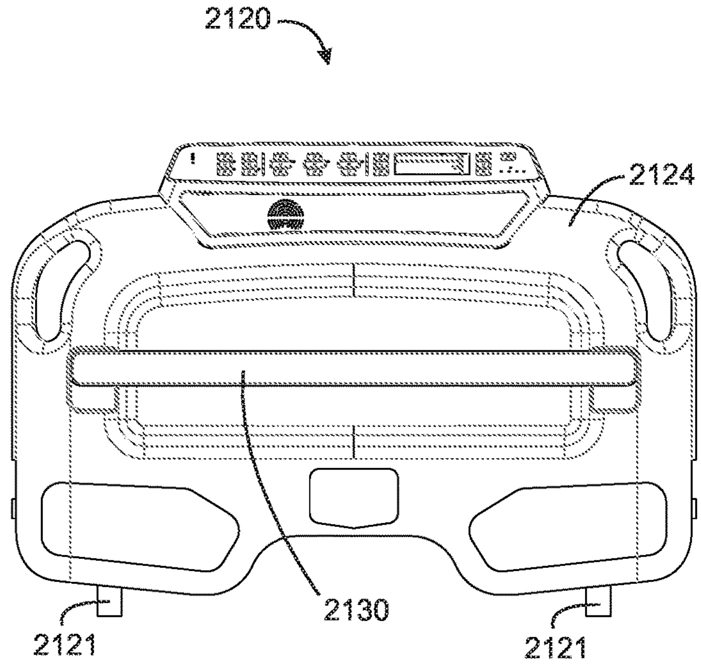
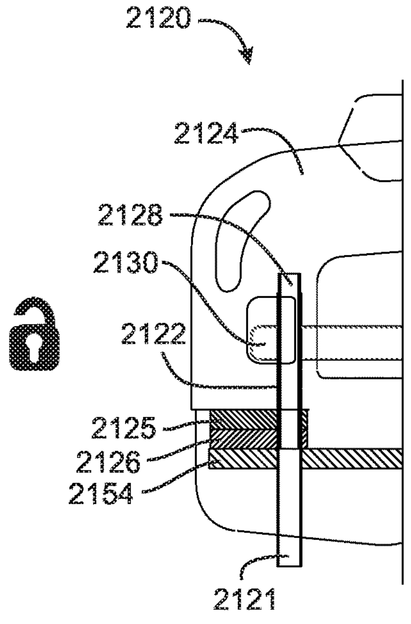
Fig. 37C
Fig. 37D

Fig. 58A
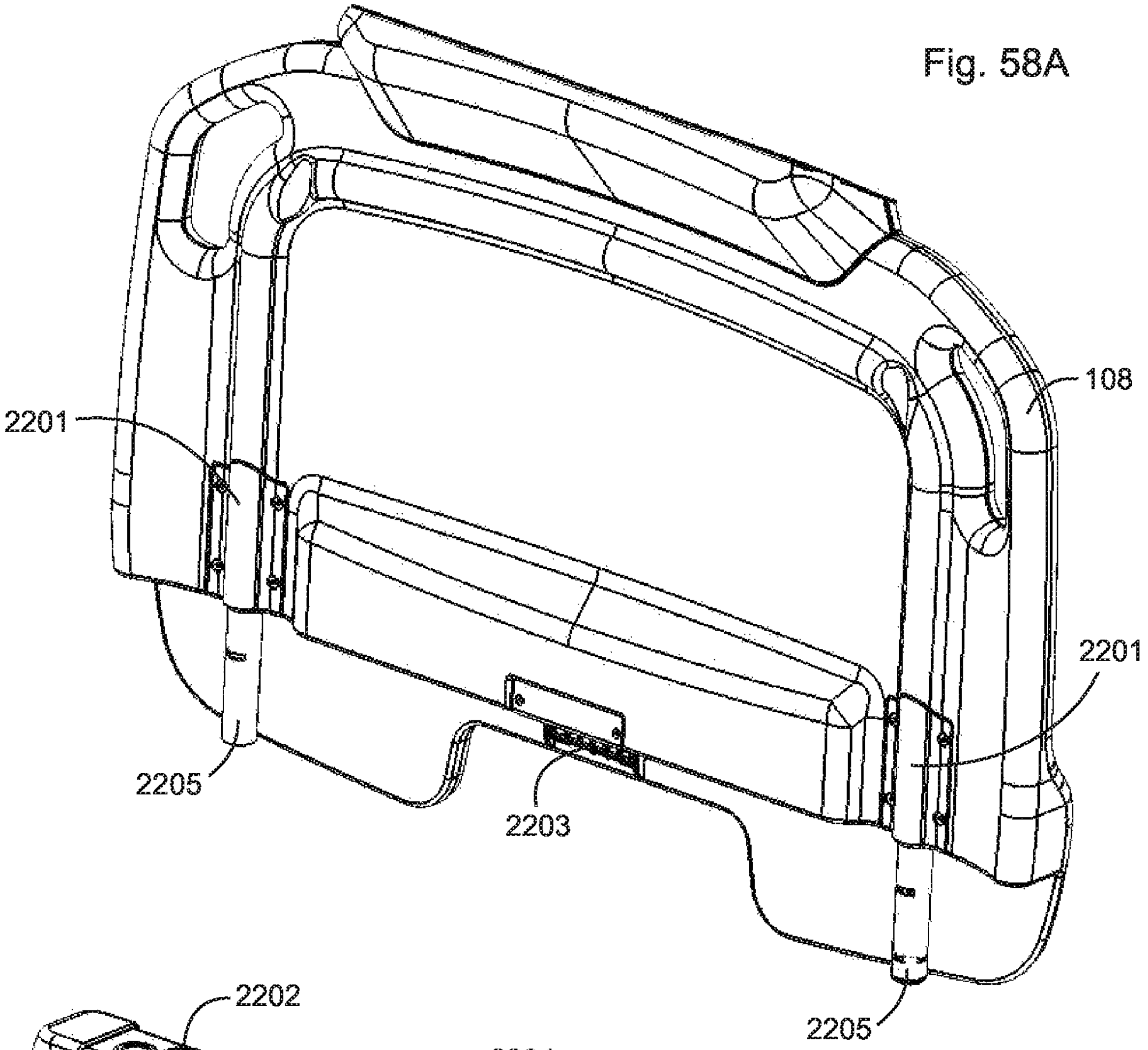
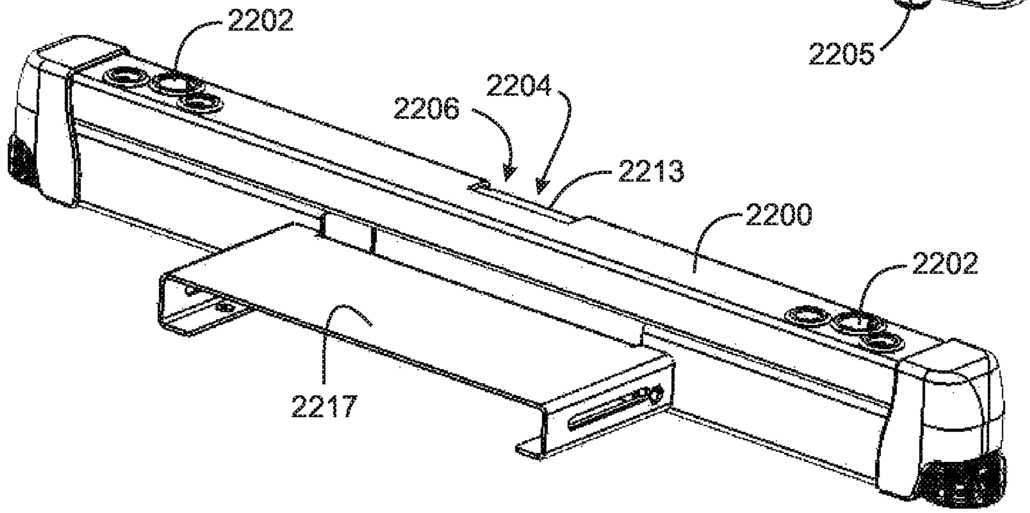
Fig. 58B

PATIENT SUPPORT USABLE WITH BARIATRIC PATIENTS

CROSS-REFERENCE TO RELATED APPLICATIONS

This application is a continuation of U.S. application Ser. No. 17/095,958 (P462E) filed on Nov. 12, 2020, entitled PATIENT SUPPORT USABLE WITH BARIATRIC PATIENTS, which is a continuation of U.S. application Ser. No. 16/191,537 (P462B) filed Nov. 15, 2018, now U.S. Pat. No. 10,842,694, entitled PATIENT SUPPORT USABLE WITH BARIATRIC PATIENTS, which is a continuation of U.S. application Ser. No. 14/916,335 (P462A), filed Mar. 3, 2016, now U.S. Pat. No. 10,130,536, entitled PATIENT SUPPORT USABLE WITH BARIATRIC PATIENTS, which is a national stage application of PCT/CA2014/050850, filed on Sep. 8, 2014, by Richard Brian Roussy et al., and entitled PATIENT SUPPORT USABLE WITH BARIATRIC PATIENTS, which claims the benefit of U.S. Provisional Pat. Application Ser. No. 61/874,959, filed Sep. 6, 2013, by Richard Brian Roussy et al., and entitled PATIENT SUPPORT USABLE WITH BARIATRIC PATIENTS, which are incorporated herein by reference in their entireties and are commonly owned by Stryker Corporation of Kalamazoo, Michigan.

TECHNICAL FIELD

This disclosure relates to patient supports, such as hospital beds, and more specifically, patient supports for bariatric patients. More particularly, this disclosure relates to patient supports with features for use with morbidly overweight patients.

BACKGROUND

Typical hospital beds are designed with numerous functionalities to facilitate patient comfort and safety and to facilitate the ability of caregivers to provide efficient and effective care. However, most hospital beds are designed to accommodate patients of average size and weight. For bariatric patients, i.e. morbidly obese patients having extremely large sizes and whose weights can be as high as 1000 pounds or greater, normal hospital beds are generally too small and lack sufficient structural strength to withstand the load of a bariatric patient. Special bariatric beds have been designed to accommodate bariatric patients, but these beds generally lack the functionalities of regular hospital bed. Further, bariatric beds are generally specialized only for bariatric patients, limiting their use for general patient care, which ultimately increases hospital costs to have such bariatric beds in stock without seeing regular usage.

There is a need in the art for a hospital bed that possesses the same functionalities as regular hospital beds but can be converted between a regularly sized hospital bed and one that can accommodate bariatric patients.

SUMMARY OF THE DESCRIPTION

There is provided a patient support that may be adjustable in height, width, length or a combination thereof. The patient support may be useable with normal sized patients or with bariatric patients.

A height adjustable patient support may comprise one or more frames and a patient support deck supported on at least one of the one or more frames by at least one height adjustable leg assembly. The height adjustable patient support may comprise two or more frames, for example three frames. The patient support deck may be supported on one of the one or more frames. The height adjustable patient support may comprise at least two height adjustable leg assemblies, for example two height adjustable leg assemblies. At least one of the frames may comprise one or more casters, for example four casters, for supporting the patient support on a surface.

A height adjustable patient support may comprise a patient support deck supported on a first frame, the first frame supported on a second frame by at least two linearly extendible leg assemblies, the linearly extendible leg assemblies configured to adjust a height of the first frame relative to the second frame.

A patient support may comprise a patient support deck supported on a first frame, the first frame supported on a caster frame, one or both of the patient support deck and caster frame having an adjustable width.

A height adjustable patient support may comprise a patient support deck supported on a first frame, the first frame supported on a second frame by at least one leg assembly configured to raise and lower the first frame, wherein a touch sensitive obstruction sensor is provided on the patient support under the first frame, the touch sensitive obstruction sensor configured to detect an obstruction under the patient support and to stop lowering of the first frame when an obstruction is detected.

A height adjustable patient support may comprise: a patient support deck supported on a frame by one or more leg assemblies configured to raise and lower the patient support deck, the patient support deck having an adjustable width, the patient support deck configured to articulate into a plurality of positions; sensors configured to detect deck height and deck width and/or position; and, a controller in electrical communication with the sensors and patient support functions, the controller configured to enable and/or disable actions of the patient support in response to sensed combinations of the deck height and deck width and/or position.

In one aspect, leg assemblies of a patient support may be telescoping. Each leg assembly may comprise lower and upper legs in a telescoping arrangement. The lower leg may be pivotally mounted on the second frame. The lower leg may be longitudinally immoveable on the second frame. The upper leg may be pivotally mounted on the first frame. The upper leg may be longitudinally immoveable on the first frame. A lift actuator may be pivotally connected to the upper leg and the first frame. The lift actuator may be configured to rotate the upper leg causing the leg assembly to telescope. Each leg assembly may comprise a variable speed control mechanism configured to vary the speed at which the upper leg moves. Varying the speed at which the upper leg moves may compensate for a non-linear relationship between the speed at which the upper leg moves and a rotational speed of the lift actuator at the pivotal connection between the lift actuator and the upper leg. The variable speed control mechanism may comprise a leg actuator connecting the lower leg to the upper leg. The leg actuator may comprise cam arm. The cam arm may comprise a cam configured to ride in a cam track mounted on the lower leg. The cam arm and cam track may be configured to vary the speed at which the upper leg moves as the lift actuator raises and lowers the upper leg.

In one aspect, at least a patient support deck of a patient support may have an adjustable width. The width of the patient support deck may be adjustable manually. The width may be adjustable from either side of the patient support. Manually adjusting the width may be accomplished by pulling or pushing the patient support deck in a direction lateral to a longitudinal axis of the patient support, the longitudinal axis extending between a head end and a foot end of the patient support. The patient support deck may comprise a rack and pinion mechanism configured to permit manually adjusting the width of the patient support deck. The patient support deck may comprise at least two deck extension pans. The rack and pinion mechanism may connect the at least two deck extension pans. The rack and pinion mechanism may comprise a latch releasable from either side of the patient support. Releasing the latch may permit manually adjusting the width of the patient support deck. Manually adjusting the width of the patient support deck may be accomplished by simultaneously sliding the at least two deck extension pans by pulling or pushing one of the deck extension pans.

In one aspect, a patient support may comprise a guard structure positioned at a side of the patient support. The guard structure may be moveable between a guard position above a plane of a patient support deck and an ultralow position fully below a plane of the patient support deck. The guard structure may be configured to swing longitudinally but not laterally while the guard structure is moved between the guard position and the ultralow position. The guard structure may comprise at least one pivotal arm configured to be pivotally mounted on the patient support. Pivoting of the at least one pivotal arm on the patient support may cause the guard structure to raise and lower. The at least one pivotal arm may have a pinion gear mounted thereon. The pinion gear may be meshed with a toothed rack of the guard structure. The toothed rack may be configured to translate longitudinally as the at least one pivotal arm pivots and the guard structure is raised and lowered. The at least one pivotal arm may be two pivotal arms. The guard structure may be configured to translate laterally in the ultralow position to be tuckable under the patient support deck. The guard structure may be lockable in the guard position. The guard structure may be electronically unlockable and releasable to permit unassisted lowering of the guard structure. The guard structure may be in electronic communication with a cardiopulmonary resuscitation feature, and actuation of the cardiopulmonary resuscitation feature may cause the guard structure to unlock and release.

In one aspect, a patient support may comprise a touch sensitive obstruction sensor provided on one or more surfaces of the patient support, for example on the extendible leg assemblies and/or one or more frames. The touch sensitive obstruction sensor may be configured to detect an obstruction under the patient support and to stop lowering of a moveable frame when an obstruction is detected. The touch sensitive obstruction sensor may be configured to at least partially raise the frame when the touch sensitive obstruction sensor detects the obstruction. A touch sensitive obstruction sensor may be provided on all of the leg assemblies.

In one aspect, a patient support may comprise an electrical connection assembly for mounting an endboard on the patient support. The electrical connection assembly may comprise first and second electrical mating halves. The first electrical mating half may comprise at least one electrically conducting leaf spring. The second electrical mating half may comprise at least one electrically conducting tab. The at least one leaf spring and at least one tab may be in electrical contact when the mating halves are mated. The at least one electrically conducting leaf spring may be longer and/or wider than the at least one electrically conducting tab. One of the mating halves may be on the endboard. The other of the mating halves may be in a mounting bracket on the patient support. The mounting bracket may comprise a retractable cover over the mating half in the mounting bracket. The retractable cover may be configured to be retracted as the endboard is being mounted on the mounting bracket and the mating half on the endboard contacts the retractable cover.

In one aspect, sensors for a patient support may be configured to detect position of a guard structure. A controller may be configured to enable and/or disable actions of the patient support in response to sensed combinations of patient support deck height, patient support deck width and/or position and guard structure position. The sensors may be configured to detect both patient support deck width and patient support deck position. Enabling and/or disabling actions of the patient support in response to the sensed combinations may involve raising or lowering the patient support deck, preferably enabling and/or disabling raising and/or lowering the patient support deck beyond pre-determined set points.

A width adjustable headboard for a patient support may comprise a first headboard section and a second headboard section, the first headboard section having at least one mount configured for removable installation on a headboard supporting base, the first headboard section moveable between at least two different positions on the headboard supporting base, the first and second headboard sections configured to leave no gap therebetween when the first headboard section is at any of the at least two different positions. The width adjustable headboard may comprise downwardly extending mounting posts. The mounting posts may be configured to remove ably and selectively engage different post sockets in a headboard supporting base at different positions along the headboard supporting base.

In one aspect, a width adjustable headboard for a patient support may comprise a first headboard section and a second headboard section linked by a length extendible actuator, extension of the actuator driving the first and second headboard sections laterally in opposite directions, the first headboard section comprising a first side laterally off-set to the second headboard section, and the first headboard section comprising a second side substantially laterally aligned with the second headboard section when the actuator is fully retracted.

In one aspect, there is provided a method of operating a hospital bed comprising a height adjustable patient support deck, the method comprising: determining a weight applied to the bed; and, adjusting an allowable minimum height, an allowable maximum height or a combination thereof in response to the weight applied to the bed.

In one aspect, there is provided a method of operating a hospital bed comprising a height adjustable patient support deck and a frame having a pair of caster wheels mounted thereto at each end thereof, a width between each pair of caster wheels being adjustable, the method comprising: determining the width between at least one pair of caster wheels; and, adjusting an allowable minimum height, an allowable maximum height or a combination thereof in response to the width between the pair of caster wheels.

In one aspect, there is provided a method of operating a hospital bed comprising a frame having a pair of caster wheels mounted thereto at each end thereof, a width between each pair of caster wheels being adjustable, the method comprising: determining a weight applied to the bed; determining the width between at least one pair of caster wheels;

and, indicating that an increase or decrease in width between the pair of caster wheels is desirable based upon the weight applied to the bed. The method may further comprise increasing or decreasing the width based upon the weight applied to the bed.

In one aspect, there is provided a method of operating a hospital bed comprising a variable width patient support deck and a frame having a pair of caster wheels mounted thereto at each end thereof, a width between each pair of caster wheels being adjustable, the method comprising: determining the width of the patient support deck; determining the width between at least one pair of caster wheels; and, indicating that an increase or decrease in width between the pair of caster wheels is desirable based upon the width of the patient support deck. The method may further comprise increasing or decreasing the width based upon the width of the patient support deck. The method may further comprise determining a weight applied to the bed; and, indicating that an increase or decrease in width between the pair of caster wheels is desirable based upon both the width of the patient support deck and the weight applied to the bed. In this case, the method may yet further comprise increasing or decreasing the width based upon both the width of the patient support deck and the weight applied to the bed.

In one aspect, there is provided a method of operating a hospital bed comprising a height adjustable patient support deck that is optionally variable in width mounted to an upper frame of the bed and comprising at least one guard structure mounted to either the patient support deck or the upper frame along a side of the bed, the guard structure movable both vertically and laterally along a width of the bed, the guard structure locatable beneath at least the patient support deck, the method comprising: determining whether the guard structure is located beneath the patient support deck; and, adjusting an allowable minimum height of the bed in response to the guard structure being located beneath the patient support deck. In a particular embodiment, the patient support deck is variable in width and the guard structure is mounted to the patient support deck.

In one aspect, there is provided a method of operating a hospital bed comprising a height adjustable patient support deck that is variable in width mounted to an upper frame of the bed and comprising at least one guard structure mounted to the patient support deck along a side of the bed, the guard structure movable both vertically and laterally along a width of the bed, the guard structure locatable beneath at least the patient support deck, the method comprising: determining whether a width of the patient support deck is too wide to fit through a doorway of the hospital; decreasing the width of the patient support deck to fit through the doorway; and, moving the guard structure to a position located beneath the patient support deck.

In one aspect, there is provided a method of operating a hospital bed comprising a plurality of vertically movable guard structures each comprising a locking structure that is an electronically actuatable between a locked and unlocked state, the method comprising: electronically actuating the locking structure of each guard structure simultaneously to the unlocked state; and, allowing each guard structure to move vertically downwardly under the influence of gravity when in the unlocked state. The locking structure may be electronically actuated using a single electronic signal provided to all guard structures simultaneously. The single electronic signal may be transmitted when the CPR release is activated.

In one aspect, there is provided a method of operating a hospital bed having a bed condition monitoring system comprising: monitoring a plurality of signals associated with a plurality of bed conditions; automatically obtaining setpoints for the conditions based on a current configuration of the bed after a first pre-determined time period has elapsed; and, generating an alarm in the event that the monitored signals indicate that the conditions have varied from the setpoints. The method may further comprise providing a visual indication of the alarm that is able to be switched off, irrespective of ongoing monitoring of the plurality of signals. In this case, the method may still further comprise switching off the visual indication for a second pre-determined time period followed by automatically obtaining new setpoints for the conditions based on a new current configuration of the bed. It is therefore possible to change a configuration of the bed within the second pre-determined time period.

In another embodiment, a height adjustable patient support includes a patient support deck, a first frame, a second frame, and at least two linearly extendible leg assemblies. The extendible leg assemblies are configured to adjust a height of the first frame relative to the second frame wherein each leg assembly comprises lower and upper legs in a telescoping arrangement. The lower leg is pivotally mounted and longitudinally immoveable on the second frame. The upper leg is pivotally mounted and longitudinally immoveable on the first frame. The patient support also includes a lift actuator pivotally connected to the upper leg and the first frame, with the lift actuator configured to raise and lower the upper leg relative to the lower leg.

In yet another embodiment, a height adjustable patient support includes a patient support deck, with at least two deck extension pans, and a rack and pinion mechanism connecting the at least two deck extension pans, and wherein the rack and pinion mechanism comprises a latch releasable from either side of the patient support, whereby releasing the latch permits manually adjusting the width of the patient support deck by simultaneously sliding the at least two deck extension pans by pulling or pushing one of the deck extension pans.

According to yet another embodiment, a height adjustable patient support includes a patient support deck and a guard structure positioned at a side of the patient support deck. The guard structure is moveable between a guard position above a plane of the patient support deck and an ultralow position fully below the plane of the patient support deck, and wherein the guard structure is lockable in the guard position and is electronically unlockable and releasable to permit unassisted lowering of the guard structure.

Further features will be described or will become apparent in the course of the following detailed description. It should be understood that each feature described herein may be utilized in any combination with any one or more of the other described features, and that each feature does not necessarily rely on the presence of another feature except where evident to one of skill in the art.

BRIEF DESCRIPTION OF THE DRAWINGS

In order that the invention may be more clearly understood, embodiments thereof will now be described in detail by way of example, with reference to the accompanying drawings, in which:

FIG. 31C is a perspective views the headboard depicted in FIG. 31A separated from the headboard mounting bracket.

FIG. 31D is a perspective view of the headboard mounting bracket depicted in FIG. 31A with the headboard separated from the headboard mounting bracket.

FIG. 37A, FIG. 37B, FIG. 37C and FIG. 37D are front and back views of the extendible footboard shown in FIG. 36A and FIG. 37B illustrating a locking feature.

FIG. 58A is a perspective view of a footboard at a foot end of a patient support.

FIG. 58B is a perspective view of a footboard mounting bracket with mating components for mating with the footboard of FIG. 58A.

FIG. 59A is a perspective view of electrical mating contacts in the footboard mounting bracket, FIG. 59B is a foot end view of electrical mating contacts in the footboard mounting bracket, FIG. 59C is a perspective view of electrical mating contacts in the footboard, FIG. 59D is a head end view of electrical mating contacts in the footboard and FIG. 59E is a perspective view of the electrical connection components mated together.

FIG. 60A is a perspective view of the electrical mating contacts in the footboard mounting bracket covered by the cover, FIG. 60B is a perspective cross-sectional view showing more detail of how the cover covers the electrical contacts, and FIG. 60C is a side view of the cross-section in FIG. 60B.

FIG. 65B depicts a magnified view of the multi-angle reading light of FIG. 64 showing a light ray directed forward (toward the foot of the patient support) and inward at a fixed angle between about 30° and 40° in relation to an axis parallel to the length of the patient support.

FIG. 65C depicts a magnified view of the multi-angle reading light of FIG. 64 showing a light ray directed forward (toward the foot of the patient support) and inward at a fixed angle between about 45° and 60° in relation to an axis parallel to the length of the patient support.

FIG. 65D depicts a magnified view of the multi-angle reading light of FIG. 64 showing three light rays directed forward (toward the foot of the patient support) and inward at different angles.

FIG. 66A is a perspective view of a patient support showing location of obstruction sensors on caster assembly covers.

FIG. 66B is the same view as FIG. 66A with a base frame assembly cover removed to show location of an obstruction sensor on a base frame assembly.

FIG. 66C is a bottom view of a patient support showing location of obstruction sensors on leg assemblies.

FIG. 66D is a bottom perspective view of the patient support depicted in FIG. 66C.

FIG. 67A is an exploded perspective view of a leg assembly including an obstruction sensor and a cover.

FIG. 67B is an exploded perspective view of a skid plate including an obstruction sensor and a cover.

FIG. 68 depicts a block diagram of an embodiment of a control system for a patient support whereby data communication occurs through a port interconnected with a controller via an I/O interface of the controller.

FIG. 69 depicts a block diagram of an embodiment of a control system for a patient support whereby a port is used to provide required information for encryption and/or authentication, but data communication occurs through a separate communication interface.

FIG. 70 depicts a flow chart depicting how a program of a patient support may synchronize time stored at the patient support with the time at an external device.

Figure 68:
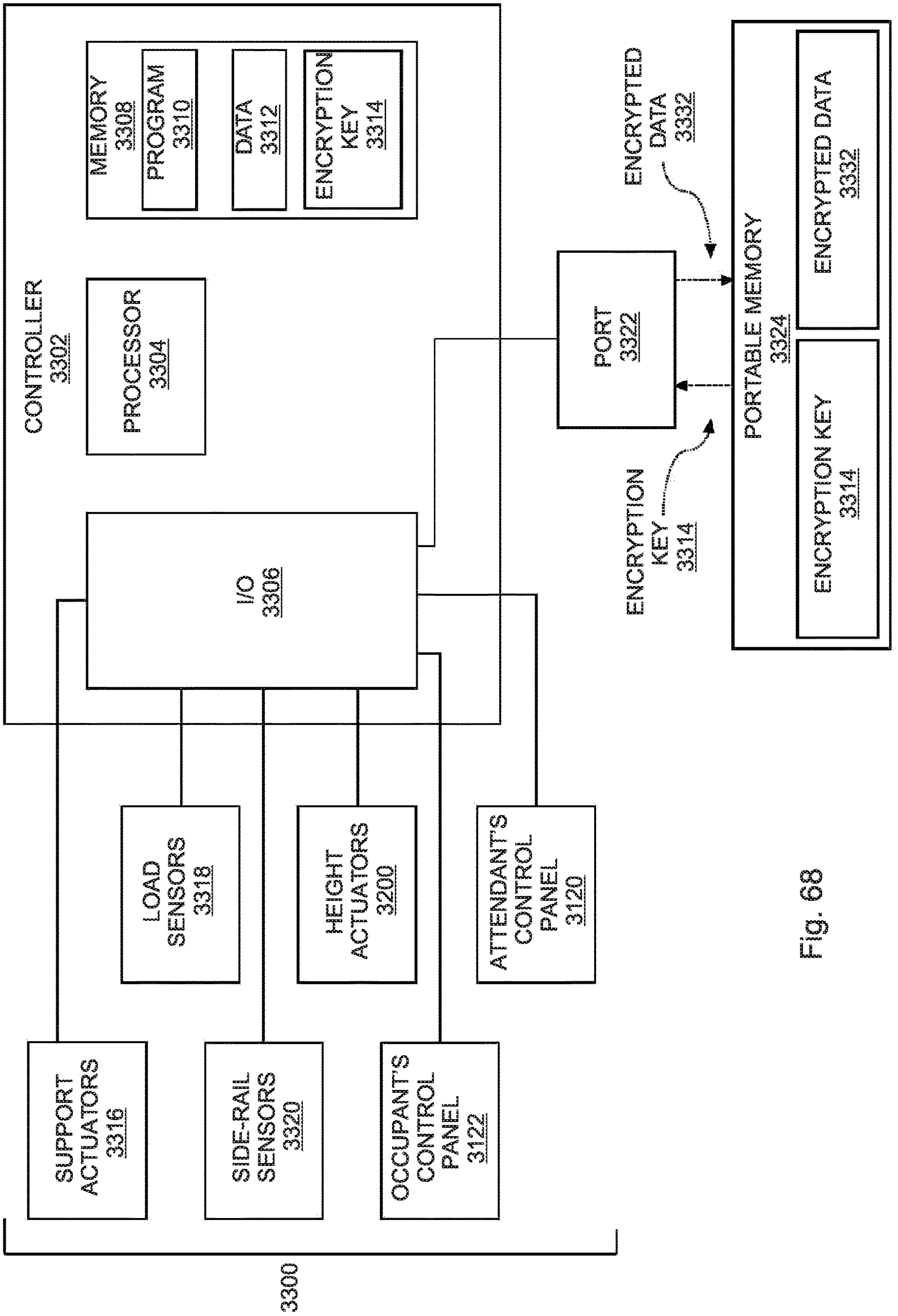
Figure 71:
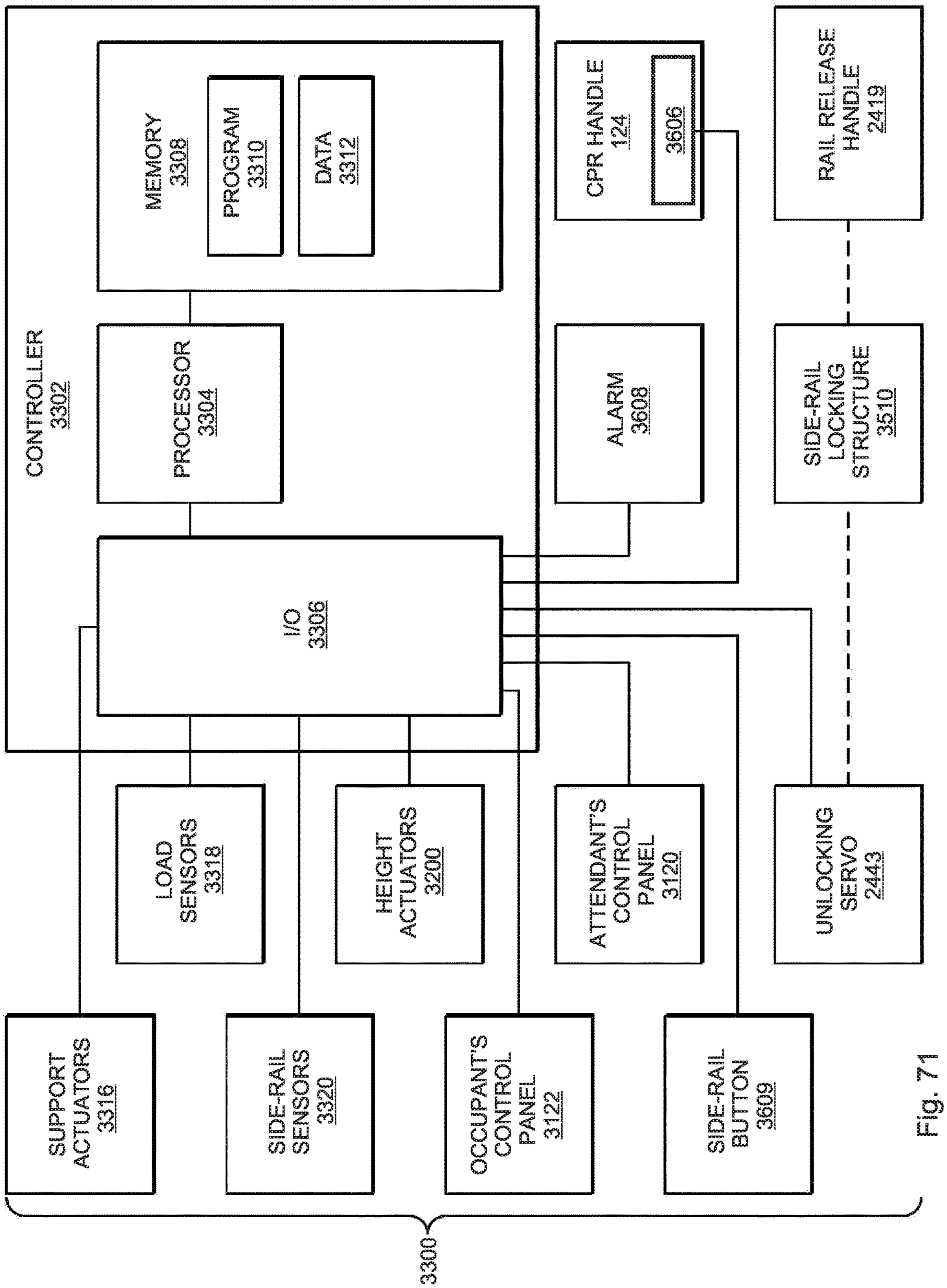

FIG. 71 depicts another block diagram of the control system of FIG. 68 for controlling the patient support.

DETAILED DESCRIPTION

As used herein, the term "patient support" refers to an apparatus for supporting a patient in an elevated position relative to a support surface for the apparatus, such as a floor. One embodiment of a patient support includes beds, for example hospital beds for use in supporting patients in a hospital environment. Other embodiments may be conceived by those skilled in the art. The exemplary term "hospital bed" or simply "bed" may be used interchangeably with "patient support" herein without limiting the generality of the disclosure.

As used herein, the term "guard structure" refers to an apparatus mountable to or integral with a patient support that prevents or interferes with egress of an occupant of the patient support from the patient support, particularly egress in an unintended manner. Guard structures are often movable to selectively permit egress of an occupant of the patient support and are usually located about the periphery of the patient support, for example on a side of the patient support. One embodiment of a guard structure includes side rails, mountable to a side of a patient support, such as a hospital bed. Other embodiments may be conceived by those skilled in the art. The exemplary terms "guard rail", "side rail", or "rail structure" may be used interchangeably with "guard structure" herein without limiting the generality of the disclosure.

As used herein, the term "longitudinal" refers to a direction parallel to an axis between a head end of the patient support and a foot end of the patient support, where a head-to-foot distance is parallel to a longitudinal axis and is referred to as the length of the patient support. The terms "transverse" or "lateral" refer to a direction perpendicular to the longitudinal direction and parallel to a surface on which the patient support rests, where a side-to-side distance is parallel to a transverse or lateral axis and is referred to as the width of the patient support.

As used herein, the term "control circuit" refers to an analog or digital electronic circuit with inputs corresponding to a patient support status or sensed condition and outputs effective to cause changes in the patient support status or a patient support condition. For example, a control circuit may comprise an input comprising an actuator position sensor and an output effective to change actuator position. One embodiment of a control circuit may comprise a programmable digital controller, optionally comprising or interfaced with an electronic memory module and an input/output (I/O) interface. Other embodiments may be conceived by those skilled in the art. The exemplary terms 68, "control system", "control structure" and the like may be used interchangeably with "control circuit" herein without limiting the generality of the disclosure.

As used herein, the term "actuator" refers to a device for moving or controlling a mechanism or system and may be frequently used to introduce motion, or to clamp an object so as to prevent motion. Actuators include, for example, motors, hydraulic actuators, pneumatic actuators, electric actuators (e.g. linear actuators), mechanical actuators and electromechanical actuators.

Figure 1A:
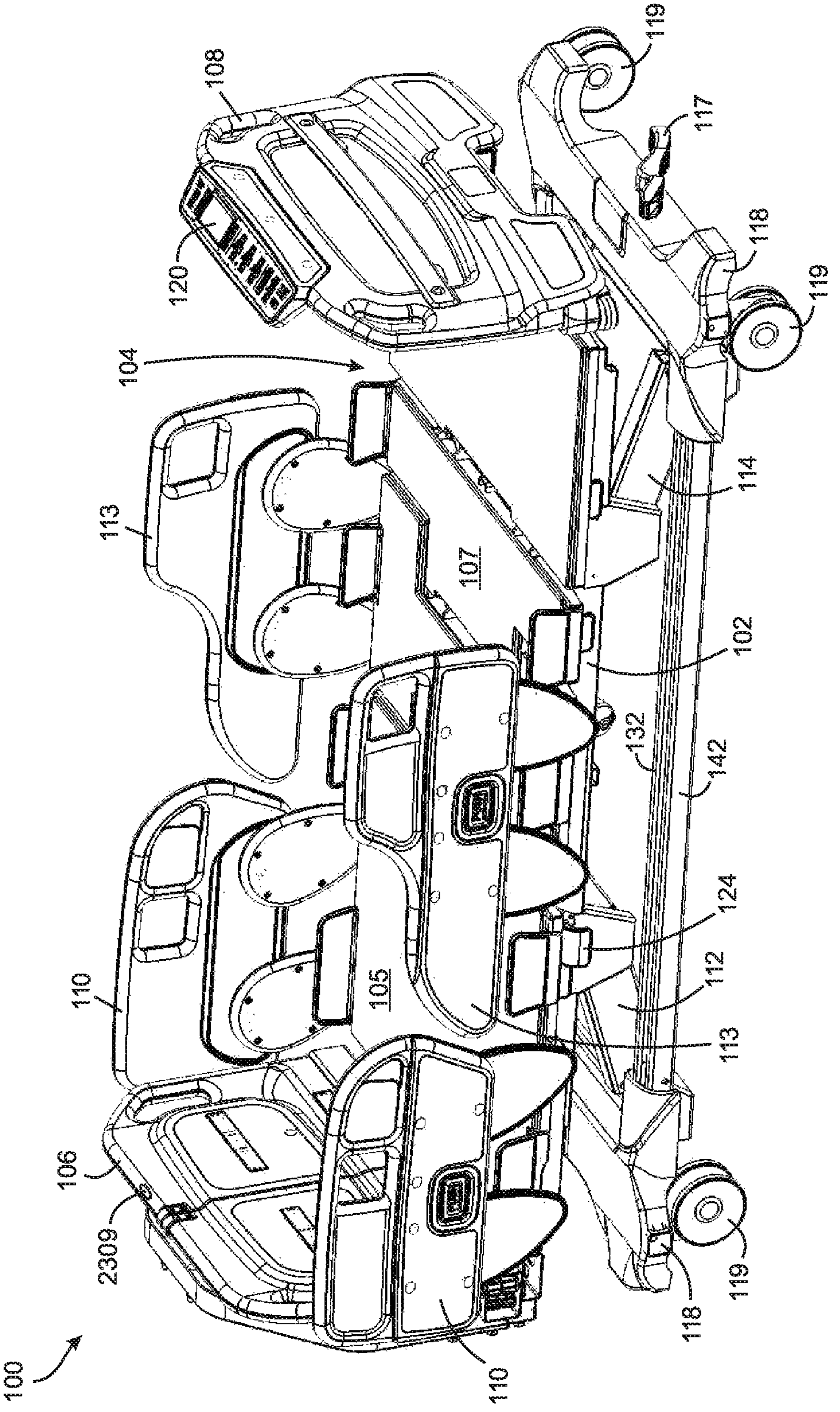
FIG. 1A is a perspective view of a patient support.
Figure 1B:
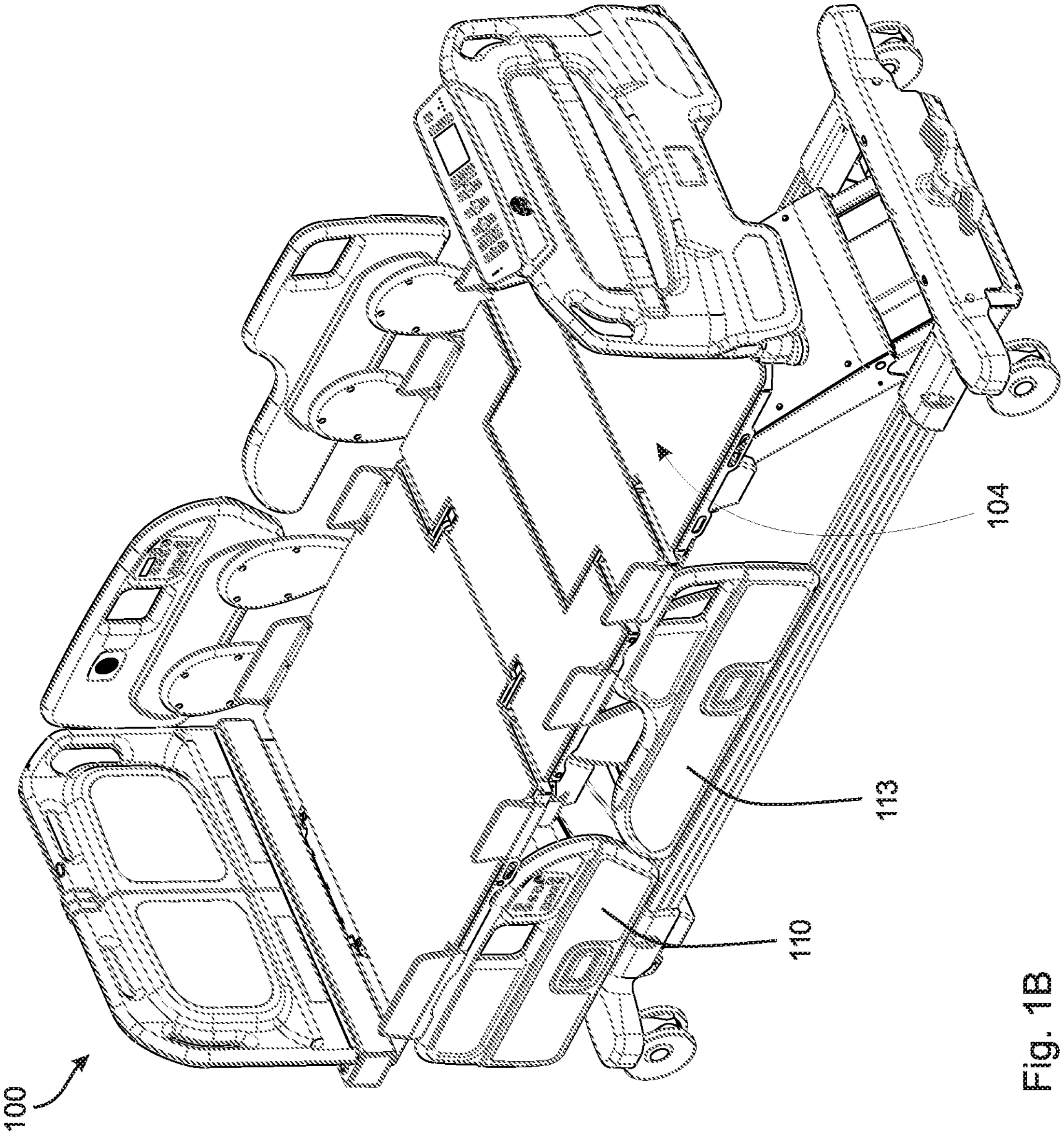
FIG. 1B is a perspective view of the patient support of 1A with side rails on one side of the patient support tucked under the patient support deck.

FIG. 1A and FIG. 1B illustrate an embodiment of a height-adjustable patient support 100 capable of supporting overweight patients. The patient support 100 may include a substantially horizontal upper frame 102 that may support an adjustable patient support deck 104 (or simply "deck") positioned thereon to receive a patient support surface (or "mattress") for supporting a patient thereon. For clarity, the mattress is not illustrated. The patient support deck 104 may have a head deck 105 capable of tilting up to form a backrest and tilting down to a prone position (prone position shown). At a head end of the patient support 100 may be a headboard 106, while a footboard 108 may be attached to the upper frame 102 at a foot end of the patient support 100. The headboard 106 and footboard 108 may be collectively known as endboards. Guard structures may comprise side rails including head rails 110 and foot rails 113 and may be positioned on each side of the patient support 100. Such side rails 110, 113 may be moveable so as to facilitate entry and exit of a patient. In FIG. 1A, the side rails 110, 113 are all in the raised or guard position, while in FIG. 1B, the side rails 110, 113 on the patient right side of the patient support are in the tucked position whereby the rails 110, 113 are in ultra-low positions and tucked under the patient support deck 104. In this embodiment, the patient support 100 is a bed. The term "patient" is intended to refer to any person, such as a hospital patient, long-term care facility resident, or any other occupant of the patient support 100.

The patient support 100 may include a lift mechanism comprising two leg assemblies 112, 114. The head end leg assembly 112 may be connected at the head end of the patient support 100 and the foot end leg assembly 114 may be connected at the foot end of the patient support 100. The leg assemblies 112, 114 may be connected to one or more actuators in a manner whereby the actuators may raise and lower the upper frame 102. Articulation of the patient support deck 104 may be controlled by actuators (not shown) that adjust the tilt of the head deck 105 of the patient support deck 104 as well as the height of a knee deck 107 of the patient support deck 104.

The lower ends of the leg assemblies 112, 114 may be connected to a lower frame 132. The lower frame 132 may be large enough so that when the upper frame 102 is at its lowest position, the upper frame 102 may be nested within the lower frame 132. The lower frame 132 may be nested within and suspended by a caster frame 142, the lower frame comprising four load cells (not shown) resting on the caster frame 142. Connected to the caster frame 142 at the foot end and head end may be two caster assemblies 118 each assembly comprising two casters 119 that allow the patient support 100 to be moved to different locations. Brake pedals 117 at the head end and foot end (the head end one not shown) may permit locking the foot end, head end or both the foot end and head end casters in full stop or tracking straight positions, in addition to permitting the casters to rotate and travel freely when needed.

A manual cardiopulmonary resuscitation (CPR) quick release handle 124 may be provided on each side of the patient support 100 to rapidly lower the head deck 105 of the patient support deck 104 and place the patient support into an emergency state wherein the patient support deck 104 is flat and optionally the side rails are unlocked, the side rails permitted to fall under the influence of gravity to a low position.

The patient support 100 may further include control circuitry and an attendant's control panel 120 located, for example, at the footboard 108. The attendant's control panel 120 may, among other things, control the height of the upper frame 102, as well as the articulation of the patient support deck 104. To allow for similar adjustment, an occupant's control panel may be provided, for example, on a side rail.

Control panels may include user interfaces, for example buttons. The buttons may be keypad style buttons that operate as momentary contact switches (also known as "hold-to-run" switches). Buttons may be provided to raise and lower the upper frame 102, articulate the patient support deck 104, set/pause/reset an exit alarm, zero an occupant weight reading, lockout controls, and to enable other functions. The control panels may have different sets of buttons for different sets of functions, with the attendant's control panel 120 typically having a wider array of functions available than any occupant's control panel that may be provided on the patient support. Other styles of user interface and buttons, such as touch-screen buttons, are also suitable. The user interface of the control panels may include indicators, such as printed graphics or graphics on a display, for describing the functions of the buttons or other interface and as well as indicating data related to the patient support 100. A pico-projector 2309 may be mounted in any suitable location on the patient support 100, for example the headboard 106, and electronically connected to the control circuitry for projecting images on a surface.

A lift mechanism for a height adjustable patient support should be sufficiently robust to raise and lower the patient support deck with a patient supported thereon. Lift mechanisms typically raise and lower the patient support between at least two pre-defined positions, an uppermost position and a lowermost position, although there are many examples in the prior art where the patient support can be raised and lowered to intermediate positions. In many height adjustable patient supports, the deck may be raised and lowered to three distinct positions, each position having a different purpose in patient care. These positions are the high (or raised) position, the low position and the ultralow position. A fourth position, called the tuck position, is also often noted, but in terms of the height of the deck off the ground or floor, the tuck position is usually the same as the low position, except that guard structures are tucked under the deck instead of being beside the deck.

In the context of hospitals, it has become increasingly desirable to be able to lower the patient support deck to as low a height as possible (i.e. the ultralow position) off the surface on which the patient support rests (e.g. a floor). This has been difficult to achieve because the frames on which the patient support deck are supported often limit the extent of downward travel of the deck. Further, to lift the deck from a very low height requires an extremely strong and robust lift mechanism, which is exacerbated in the context of a bariatric patient support where loads on the patient support are even more extreme.

Lift mechanisms may comprise legs at the head end and foot end of the patient support. The legs are generally attached at one end to the deck or a frame on which the deck is supported and at the other end to a frame supported on the ground. In order to raise and lower the deck, the legs must either change length or one or both of the ends of the legs must travel longitudinally on the patient support. Variations in the prior art include articulating legs, legs connected by pivoting linkages and legs having upper ends that travel longitudinally along the deck or frame on which the deck is supported. Movement of the legs is generally driven by actuators attached to the legs and one or more frames. However, prior art lift mechanisms experience many of the difficulties previously described.

In the present patient support, to overcome one or more of these difficulties while maintaining the ability to achieve various height positions, a lift mechanism may be provided having extendible length legs, particularly legs that extend linearly. In one embodiment, the extendible legs may comprise telescoping legs. Linearly extending legs, particularly telescoping legs, provide a mechanical advantage for lifting heavy weights. Further, extending legs, particularly telescoping legs, provide the opportunity for a more compact leg design in lower positions ultimately permitting the deck to achieve lower height positions. One or the combination of these features may be advantageous for bariatric patient supports.

Figure 2A:
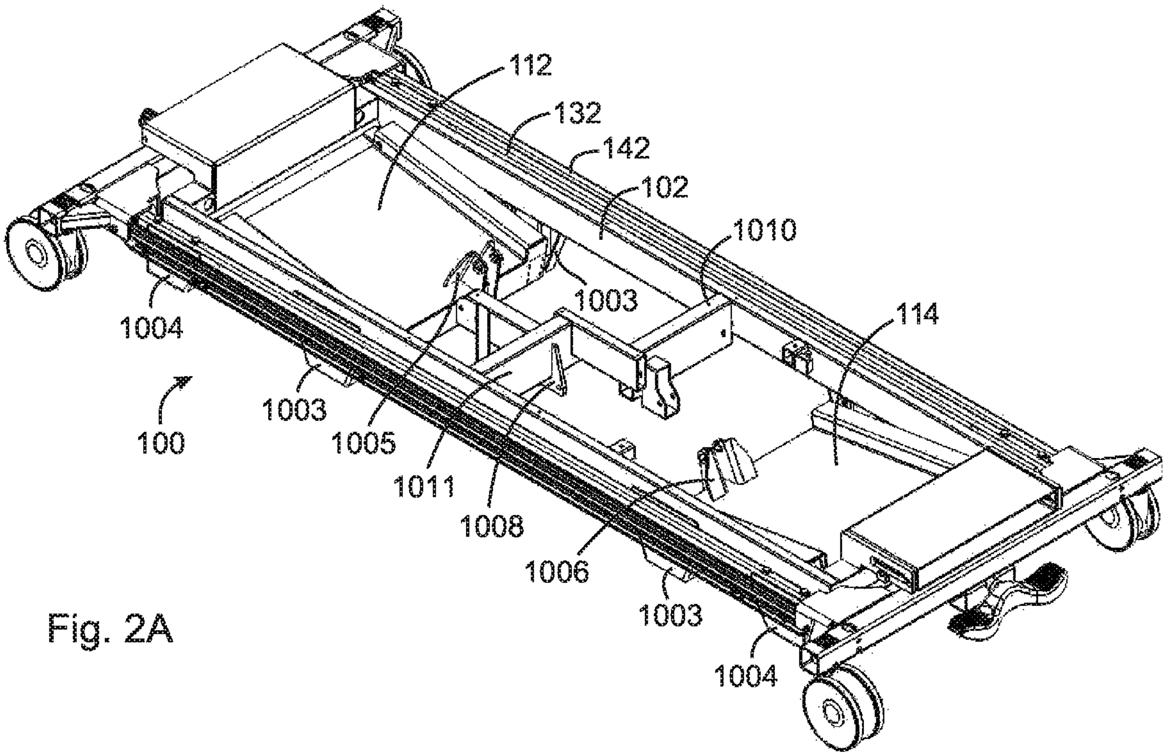
FIG. 2A is a perspective view of one embodiment of a lift mechanism of an adjustable patient support in an ultralow position shown in context with an upper frame, lower frame and caster frame of the patient support.
Figure 2B:
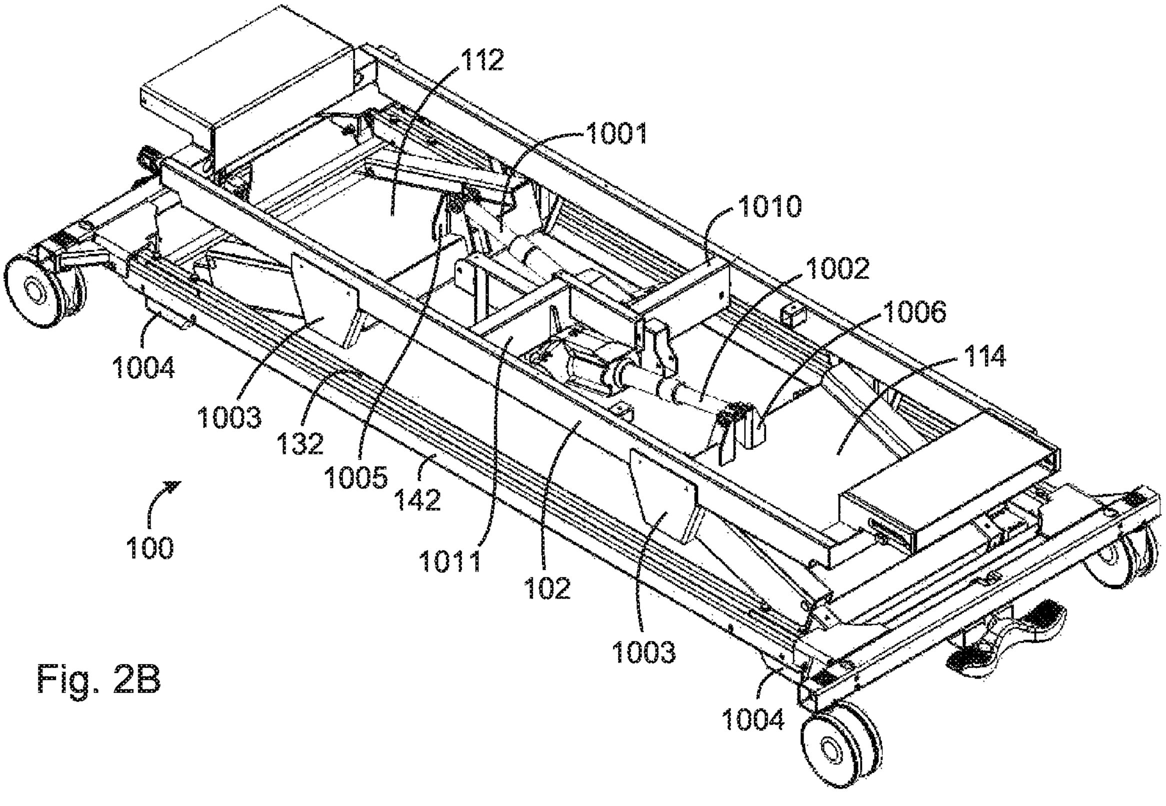
FIG. 2B the adjustable patient support of FIG. 2A in a low position including upper leg lift actuators.

Referring to FIG. 2A and FIG. 2B, one embodiment of a lift mechanism is shown in context with the upper frame 102, the lower frame 132 and the caster frame 142 of the patient support 100. Upper ends of the head end leg assembly 112 and foot end leg assembly 114 may be pivotally mounted to the upper fame 102 at upper frame leg hangers 1003. Lower ends of the head end leg assembly 112 and foot end leg assembly 114 may be pivotally mounted to the lower frame 132 at lower frame leg hangers 1004. The leg hangers 1003, 1004 are fixed positions on the frames 102, 132, respectively. The upper and lower ends of the leg assemblies 112, 114 do not translate along the frames 102, 132. The leg assemblies 112, 114 may comprise no intermediate pivot points between the pivot points on the fixed leg hangers 1003, 1004 of the upper and lower frames 102, 132, respectively.

Head end upper leg lift actuator 1001 may be pivotally mounted at a rod end of the actuator 1001 on a mounting bracket 1005 at the upper end of the head end leg assembly 112 and pivotally mounted at a base end of the actuator 1001 on another mounting bracket (not shown) on a cross-member 1010 of the upper frame 102. The pivoting mounting points at each end of the actuator 1001 may be longitudinally off-set from each other. Likewise, foot end upper leg lift actuator 1002 may be pivotally mounted at a rod end of the actuator 1002 on a mounting bracket 1006 at the upper end of the foot end leg assembly 114 and pivotally mounted at a base end of the actuator 1002 on another mounting bracket 1008 on a cross-member 1011 of the upper frame 102. The leg assemblies 112, 114 may be arranged as mirror images of each other through a vertical plane laterally bisecting the patient support so that the upper frame 102 moves vertically and not laterally. Otherwise the two leg assemblies 112, 114 may be the same, functioning in the same manner.

Figure 3B:
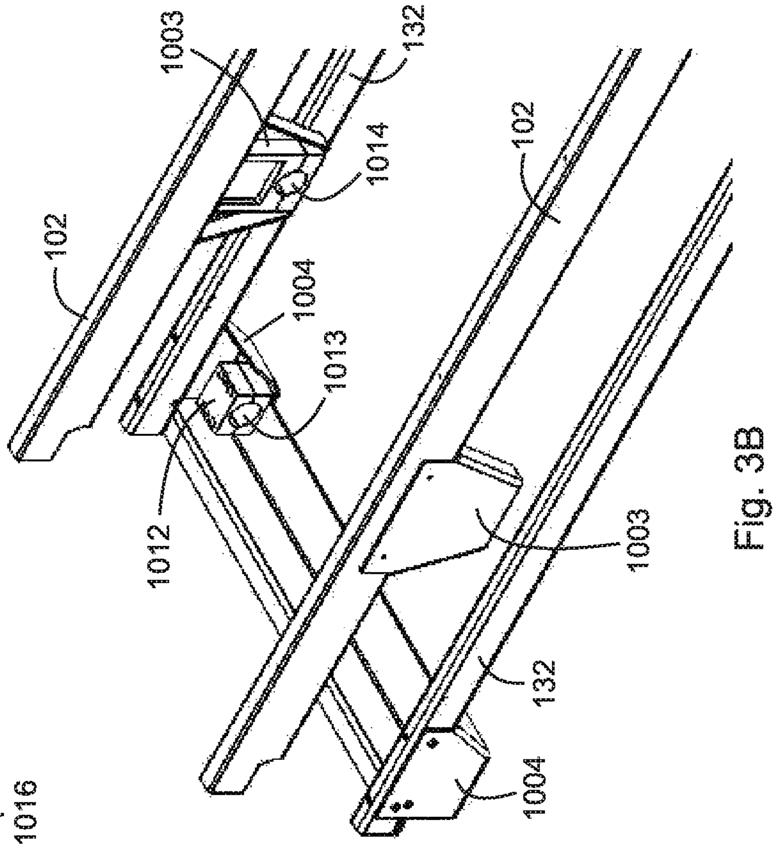
FIG. 3B is a perspective view of frames of the adjustable patient support of FIG. 2A showing mounting features for the leg assembly of FIG. 3A.
Figure 3A:
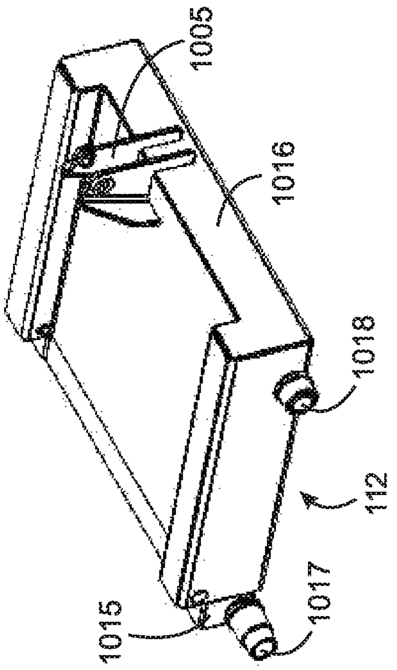
FIG. 3A is a perspective view of a leg assembly of the adjustable patient support of FIG. 2A.

FIG. 3A illustrates the head end leg assembly 112 and FIG. 3B illustrates the upper frame 102 and the lower frame 132 showing upper frame leg hangers 1003 and lower frame leg hangers 1004. The head end leg assembly 112 may comprise a lower leg 1015 housed inside an upper leg 1016 in telescoping cooperation in a tube-in-tube manner. The lower leg 1015 may comprise leg support pins 1017 (only one shown) that may be pivotally mounted on the lower frame 132. The upper leg 1016 may comprise leg support pins 1018 (only one shown) that may be pivotally mounted on the upper frame 102. As previously mention, mounting bracket 1005 at the upper end of the head end leg assembly 112 may be provided for pivotally mounting the rod end of the head end upper leg lift actuator 1001. The lower frame leg hangers 1004 may be fixed to the lower frame 132 proximate the corners of the lower frame 132. The lower frame leg hangers 1004 may be fixed to prevent longitudinal translation of the head end leg assembly 112 along the lower frame 132. Supported in each lower frame leg hanger 1004 may be a leg bearing block 1012 having a cylindrical bore 1013 in which the leg support pin 1017 may be received. The leg support pin 1017 may pivot within the cylindrical bore 1013. The upper frame leg hangers 1003 may be fixed to the upper frame 102 to prevent longitudinal translation of the head end leg assembly 112 along the upper frame 102. The upper frame leg hangers 1003 may comprise cylindrical bore 1014 (only one shown) that receive the leg support pins 1018 of the upper leg 1016. The leg support pins 1018 may pivot within the cylindrical bores 1014 of the upper frame leg hangers 1003. Thus, the head end leg assembly 112 may be pivotally mounted between the upper frame 102 and the lower frame 132 by seating the leg support pins 1017 of the lower leg 1015 in the cylindrical bore 1013 of the leg bearing blocks 1012 of the lower frame 132 and seating the leg support pins 1018 of the upper leg 1016 in the cylindrical bore 1014 of the upper frame leg hangers 1003 of the upper frame 102. The preceding description is equally applicable to the foot end leg assembly 114.

When the upper frame 102 is in the ultralow position (FIG. 2A), the head end upper leg lift actuator 1001 and foot end upper leg lift actuator 1002 may be fully retracted. To raise the upper frame 102 (and the deck supported thereon) from the ultralow position (FIG. 2A) to the low position (FIG. 2B), the head end upper leg lift actuator 1001 and foot end upper leg lift actuator 1002 may be actuated to extend by a signal from the control circuit. Simultaneous extension of the two actuators 1001, 1002 may apply a vertical force at the upper ends of the head end and foot end leg assemblies 112, 114. Because the leg hangers 1003, 1004 are immovable on the upper and lower frames 102, 132, respectively, the leg assemblies 112, 114 may be prevented from moving longitudinally along the frames. This may force the leg assemblies 112, 114 to extend. With reference to FIG. 3A, the lower leg 1015 and upper leg 1016 must slide with respect to each other. Because the lower leg 1015 is mounted on the lower frame 132, and the lower frame 132 is mounted on the caster frame 142, and the caster frame 142 rests on immovable ground, the upper leg 1016 must slide upward in relation to the lower leg 1015. Since the upper leg 1016 is connected to the head end upper leg lift actuator 1001 and the head end upper leg lift actuator 1001 is also mounted on the upper frame 102, extension of the head end upper leg lift actuator 1001 must then force the upper frame 102 upward, thereby raising the deck supported on the upper frame 102. As the head end upper leg lift actuator 1001 extends, the lower leg 1015 of the head end leg assembly 112 may pivot on the leg support pins 1017 and the upper leg 1016 of the head end leg assembly 112 may pivot on the leg support pins 1018, thereby permitting the upper frame 102 to rise as the upper leg 1016 slides on the lower leg 1015 contained therein. The operation of the foot end leg assembly 114 is similar.

The upper frame 102 may be similarly raised to the high or raised position from the low position, and retracting the lift actuators 1001, 1002 may lower the upper frame 102.

While the telescoping arrangement of the leg assemblies 112, 114 together with leg assembly fixed pivot points on the upper and lower frames 102, 132 and the pivoting lift actuators 1001, 1002 coupling the upper frame 102 to the upper legs of the leg assemblies permits raising the upper frame 102 in relation to the lower frame 132, there may be two issues to overcome.

First, the arrangement of the telescoping leg assemblies should be sufficiently rigid to permit only (or primarily) linear relative motion of the upper leg on the lower leg and of sufficiently low friction, both of which may be useful to mitigate against binding of the lower leg in the upper leg during relative motion. It may be noted here that instead of the lower leg being contained in the upper leg, the upper leg could be contained in the lower leg.

Second, uneven loading between the head end and foot end of the patient support results in uneven lift requirements at the head end and foot end of the patient support. Thus, even though both lift actuators still extend, the leg assembly under greater load may have a tendency not to extend while the leg assembly under lesser load does extend but more quickly than it should. This arises because the legs are free to telescope, the leg assembles are allowed to pivot at both the upper and lower legs, the lift actuators are allowed to pivot at both ends, and as long as the angle between the leg assemblies 112, 114 remains the same, one end may be raised while the other end does not, resulting in the upper frame tilting away from horizontal. When the end with the greater load reaches maximum height, the end with the lighter load then rises and rises extremely quickly to maintain the angle between the leg assemblies. However, it is desirable for the upper frame to remain parallel to the lower frame while the upper frame is being raised. This so-called "teeter-totter" effect may be accommodated in several ways.

Rotational speed of the pivot point where the upper leg lift actuator connects to the upper leg of a given leg assembly is related non-linearly to extension speed of the leg assembly. To avoid the "teeter-totter" effect, the upper leg of the leg assembly may be fixed to the lower leg of the leg assembly by an extension control mechanism that accounts for the non-linearity between the rotation and extension of the leg assembly. This may be accomplished by: (a) having a constant rotational speed at the pivot point (e.g. a constant speed actuator) and a non-linear (variable) speed control mechanism in the leg assembly; (b) having a variable rotational speed at the pivot point (e.g. a variable speed actuator) and a constant speed control mechanism in the leg assembly; or, (c) having variable rotational speed at the pivot point (e.g. a variable speed actuator) and a non-linear (variable) speed control mechanism in the leg assembly. Non-linear (variable) speed control mechanisms in the leg assemblies may comprise any suitable device or combinations of devices, for example variable speed actuators and/or cam in track devices.

Figure 4:
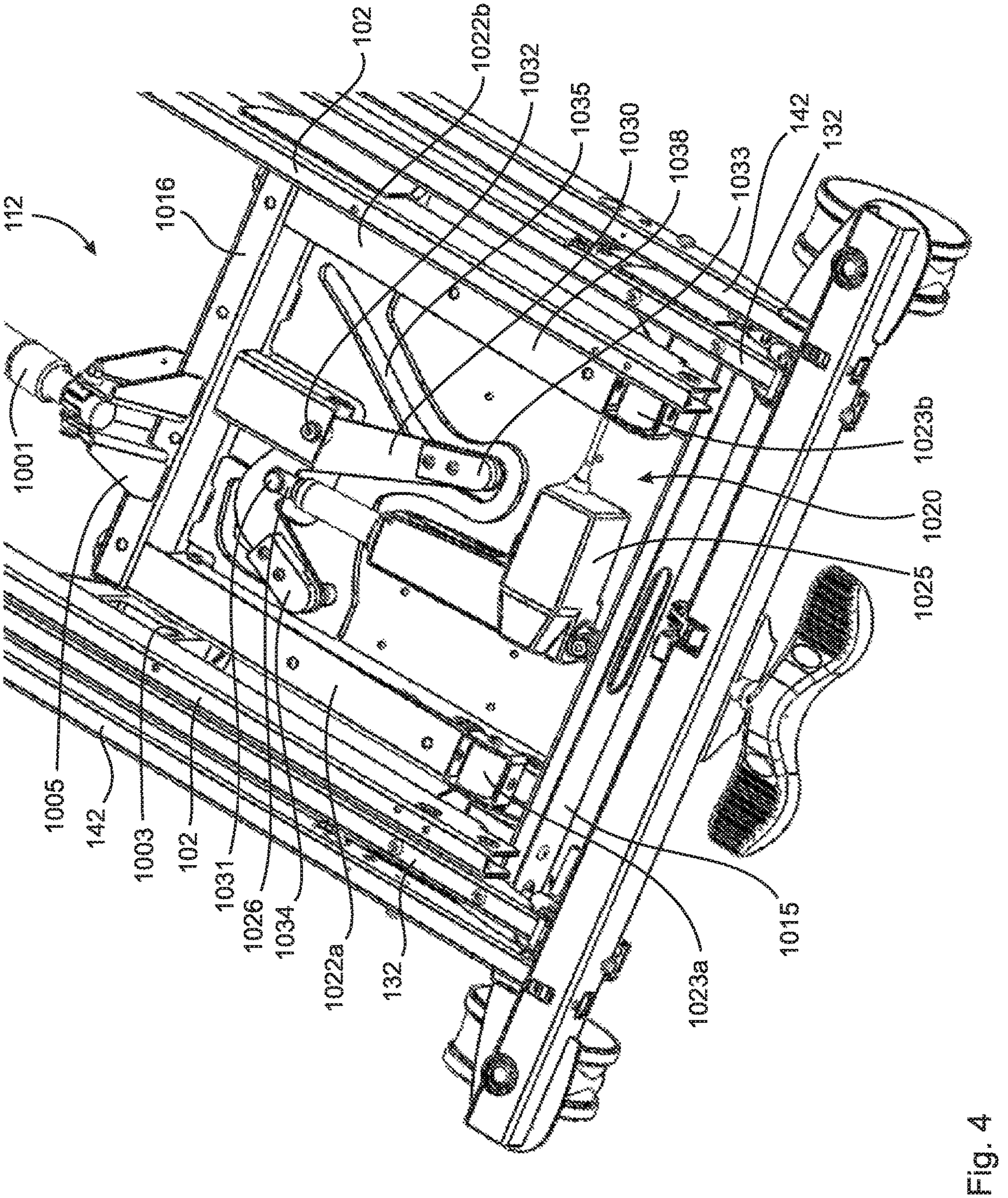
FIG. 4 depicts a magnified view of a leg assembly mounted in the frames with the leg assembly in the ultralow position.
Figure 5:
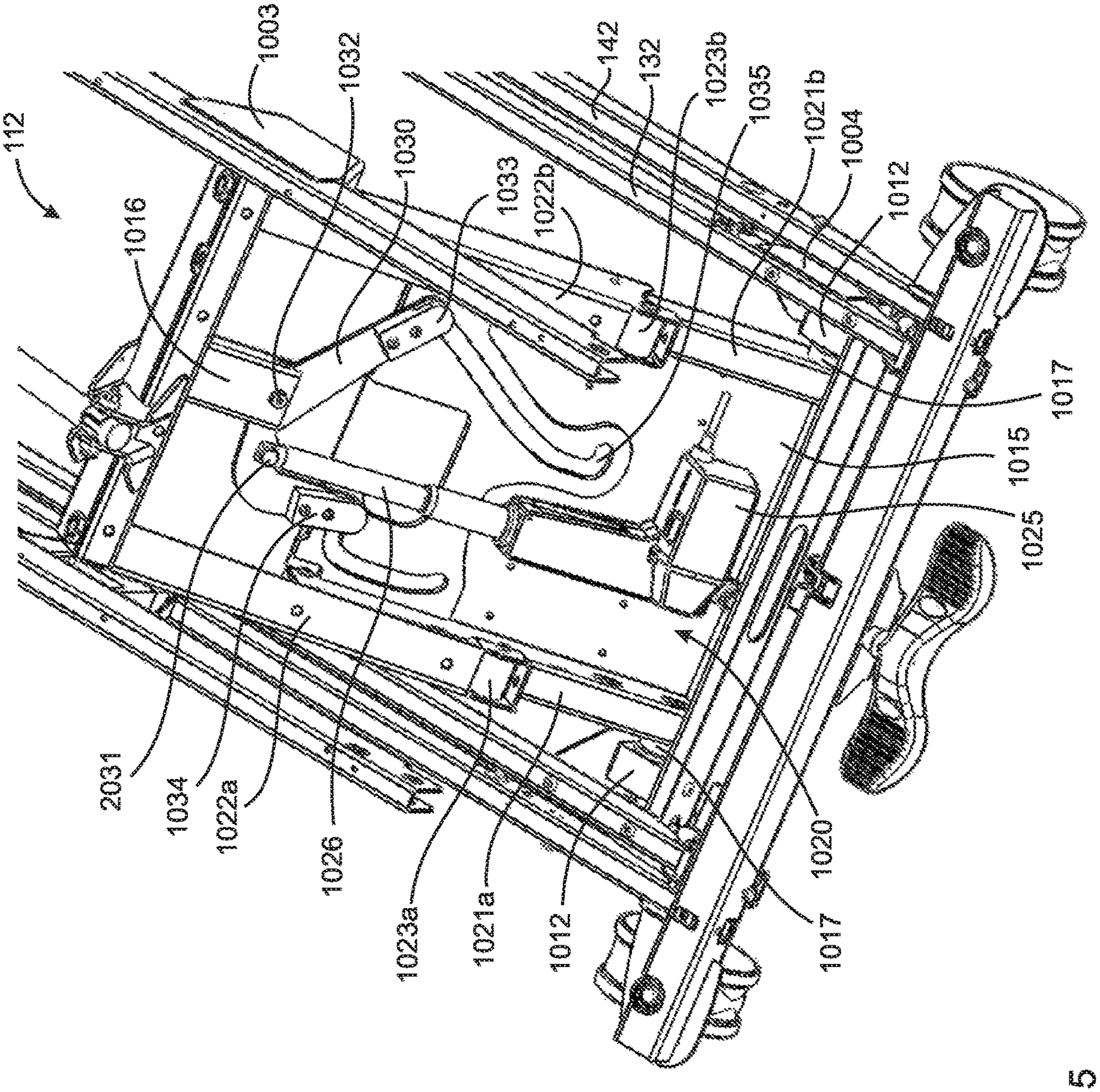
FIG. 5 depicts a magnified view of the leg assembly of FIG. 4 in the high position.

Referring to FIG. 4 and FIG. 5, one embodiment of a telescoping leg arrangement is a tube-in-tube arrangement shown in relation to the head end leg assembly 112 of the patient support of FIG. 2A,B. The same description may apply to the foot end leg assembly 114. The lower leg 1015 may comprise parallel rectangular inner tubes 1021*a*, 1021*b* that are free to slide in corresponding rectangular outer tubes 1022*a*, 1022*b* of the upper leg 1016. To reduce friction between the tubes 1021*a*, 1021*b* and 1022*a*, 1022*b*, and to reduce the possibility of the tubes binding while sliding, the inner tubes 1021*a*, 1021*b* may comprise low friction side pads that both take up side-to-side tolerance and reduce friction between the inner tubes 1021*a*, 1021*b* and outer tubes 1022*a*, 1022*b*. Further, rollers 1023*a*, 1023*b* on the outer tubes 1022*a*, 1022*b* may engage an upper outer surface of the inner tubes 1021*a*, 1021*b*, while similar rollers (not shown) on the inner tubes 1021*a*, 1021*b* may engage a lower inside surface of the outer tubes 1022*a*, 1022*b* to permit rolling engagement between the upper leg 1016 and lower leg 1015. In another embodiment, low friction slide blocks could replace one or more of the rollers. Furthermore, outer surfaces of the lower leg may be plated to lower friction between the upper leg 1016 and the lower leg 1015. Since the inner tubes 1021*a*, 1021*b* are constrained in two dimensions in the outer tubes 1022*a*, 1022*b*, the legs 1015 and 1016 may be only free to extend or retract in one direction in relation to each other.

The head end leg assembly 112 may further comprise a leg extension control mechanism 1020 comprising a lower leg actuator 1025 having a base mounted to the lower leg 1015 at a lower end of the lower leg 1015 and a rod 1026 mounted at pivot point 1031 to an arcuate cam arm 1030. The arcuate cam arm 1030 may be pivotally mounted to the upper leg 1016 at pivot point 1032. The arcuate cam arm 1030 may comprise a cam roller (not visible) next to a spacer 1033, the cam roller riding in a cam track 1035 fixed to the lower leg 1015. As seen in FIG. 4, when the upper leg lift actuator 1001 pivotally connected to the upper leg 1016 on the mounting bracket 1005 is fully retracted, the inner tubes 1021*a*, 1021*b* of the lower leg 1015 may be fully inserted in the outer tubes 1022*a*, 1022*b* of the upper leg 1016. Further, the lower leg actuator 1025 may be fully retracted and the cam roller may be located at a lower portion of the cam track 1035. When the upper leg lift actuator 1001 is activated to extend, the lower leg actuator 1025 may be activated to extend simultaneously.

In this embodiment, the two actuators 1001 and 1025 are variable speed actuators. As previously described, extension of the upper leg lift actuator 1001 may cause the upper leg 1016 to telescope away from the lower leg 1015. However, the speed of rotation of the pivot point where the upper leg lift actuator 1001 is connected to the mounting bracket 1005 varies in comparison to the speed of extension of the leg assembly 112. If the lower leg actuator 1025 was connected directly to the upper leg 1016 the variable difference in the speed of rotation and the speed of leg extension would damage the mechanism and cause the leg assembly 112 to fail. However, the lower leg actuator 1025 is indirectly connected to the upper leg 1016 through the arcuate cam arm 1030. As the lower leg actuator 1025 extends, the arcuate cam arm 1030 pivotally connected to the upper leg at pivot point 1032 may also be pushed along with the extending actuator rod 1026 thereby pushing the upper leg 1016 along the lower leg 1015. In addition, the arcuate cam arm 1030 also pivots at pivot point 1032, which may be laterally off-set from the pivot point 1031. Pivoting of the arcuate cam arm 1030 may permit the cam roller to travel within the cam track 1035. The shape and length of the cam track 1035 is designed to make the arcuate cam arm 1030 pivot about pivot point 1032 and to vary the longitudinal position of the pivot point 1032 with respect to the lower leg 1015 non-linearly in relation to the speed of the actuators 1001, 1025. This variation in position of pivot point 1032 correspondingly varies the speed of extension of the upper leg 1016 on which the pivot point 1032 exists. Since the pivot point 1032 always travels in a straight line when the legs 1015, 1016 telescope, the shape of the cam track 1035 only varies the speed at which the pivot point 1032 moves in the direction of motion of the upper leg 1016. The speed at which the pivot point 1032 moves, and therefore the speed at which the upper leg 1016 moves, is generally slower in the beginning and faster by the end. This arrangement ensures that the upper leg 1016 actually moves under load. Since both the head end leg assembly 112 and foot end leg assembly 114 may comprise such a leg extension control mechanism, both ends are forced to move under load and the "teeter totter" effect is eliminated.

With reference to FIG. 5, once the lower leg actuator rod 1026 (and the upper leg lift actuator 1001 (not seen in FIG. 5) is fully extended, cam roller on the arcuate cam arm 1030 has traveled to the other end of the cam track 1035 and the upper leg 1016 has traveled its full course along the lower leg 1015. The leg assembly 112 may now be fully extended. Reversing the actuators 1001, 1025 may reverse the motions of the arcuate cam arm 1030 and the upper leg 1016 to bring the upper frame 102 back to a lower position.

The arcuate cam arm 1030 may comprise a second cam roller 1034 on the other side of the pivot point 1032 and the other side of the pivot point 1031, the second cam roller 1034 riding in a second cam track (not shown) on the lower leg 1015. While a second cam roller 1034 in a second cam track may be unnecessary to control the speed of extension of the upper leg 1016, the second cam roller 1034 in the second cam track does help stabilize the motion of the upper leg 1016.

Thus, with the variable speed two actuators 1001, 1025 working in unison, the pivoting arcuate cam arm 1030 linking the lower leg actuator 1025 to the upper leg 1016 works together with the cam roller in the cam track 1035 to slow down or speed up the extension of the upper leg 1016 to compensate for the non-linear difference in speed between the leg extension and the rotation of the upper leg lift actuator 1001 in the mounting bracket 1005. It should be noted that the primary work involved in raising and lowering the upper frame 102 is done by the upper leg lift actuators 1001, 1002, while the lower leg actuators 1025 are responsible, in part, for eliminating the "teeter totter" effect.

While the embodiment described in detail herein involves the use of two variable speed actuators and a cam in track mechanism, there are other ways of synching the rotational speed of the upper leg lift actuator at the upper leg linkage point to the extension speed of the upper leg and eliminating the "teeter totter" effect. In another embodiment, constant speed actuators are used with a cam in track mechanism that alone synchronizes the rotational speed of the upper leg lift actuator at the upper leg linkage point to the extension speed of the upper leg. In another embodiment, no track may be used and the upper leg lift actuator and lower leg actuator may be configured to obtain a greater variable speed, where the lower leg actuator is run at a speed to match the extension speed of the upper leg. This would permit direct connection of the lower leg to the upper leg through the lower leg actuator. In another embodiment, no track is used and the upper leg lift actuator may be a constant speed actuator while the lower leg actuator may be a variable speed actuator to match the leg extension speed of the upper leg. The cam in track mechanism permits the use of less powerful and smaller lower leg actuators.

Figure 6:
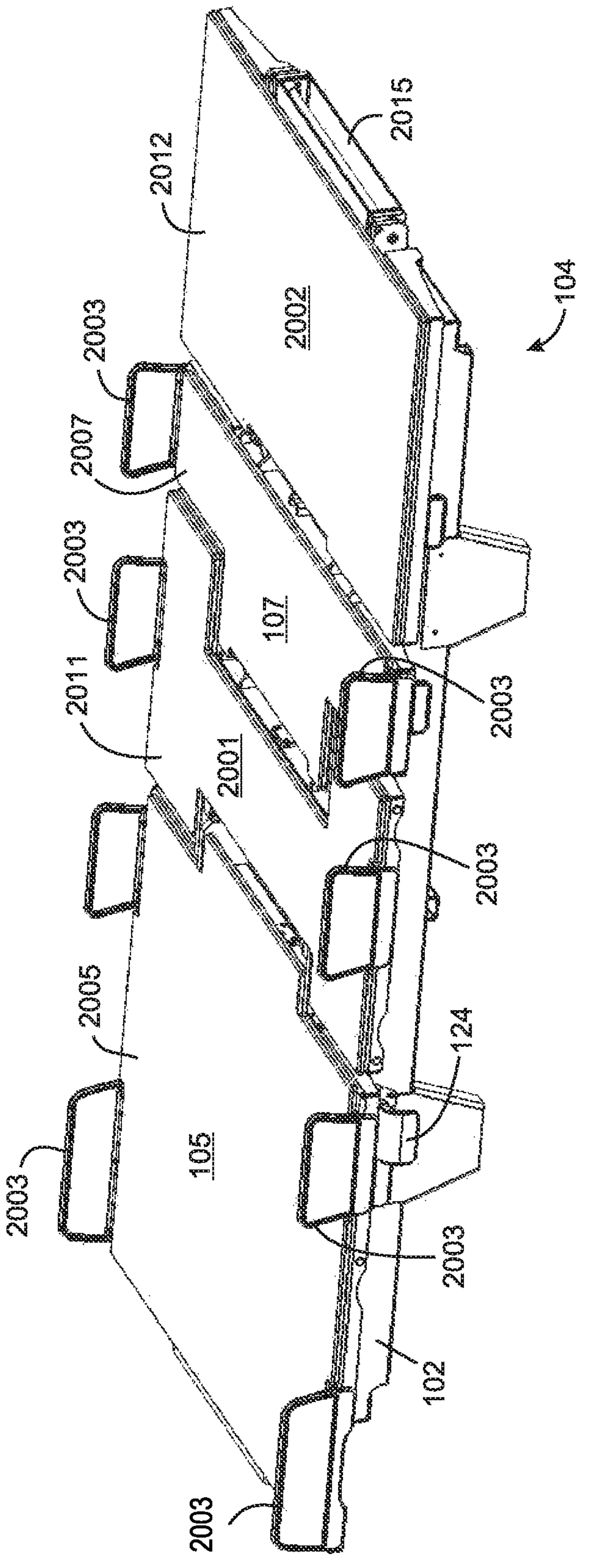
FIG. 6 is a perspective view of an adjustable patient support deck of the patient support of FIG. 1A shown in a horizontal prone position.
Figure 7:
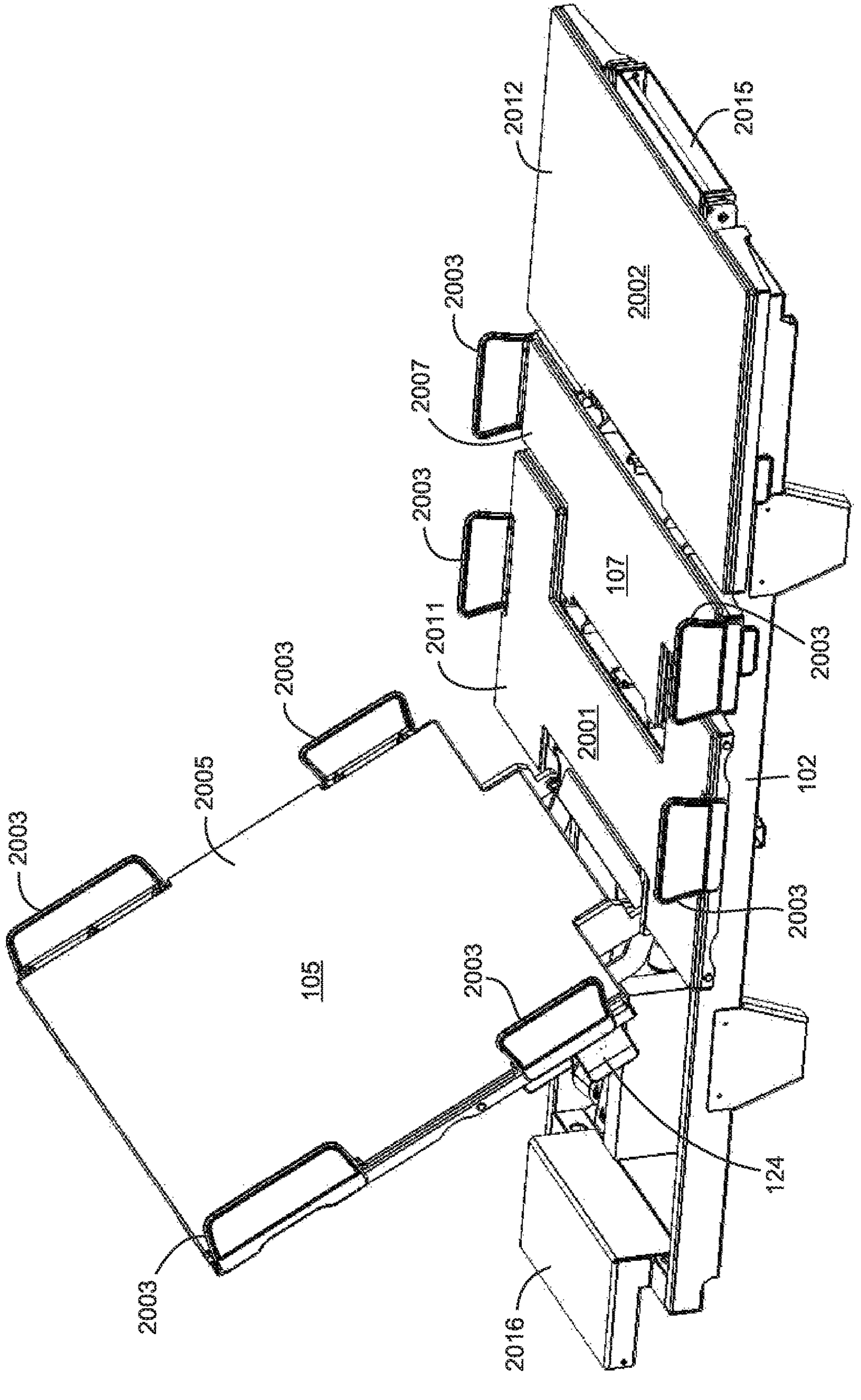
FIG. 7 is a perspective view of an adjustable patient support deck of the patient support of FIG. 1A shown in an articulating position with a head deck tilted up to form a backrest.
Figure 8:
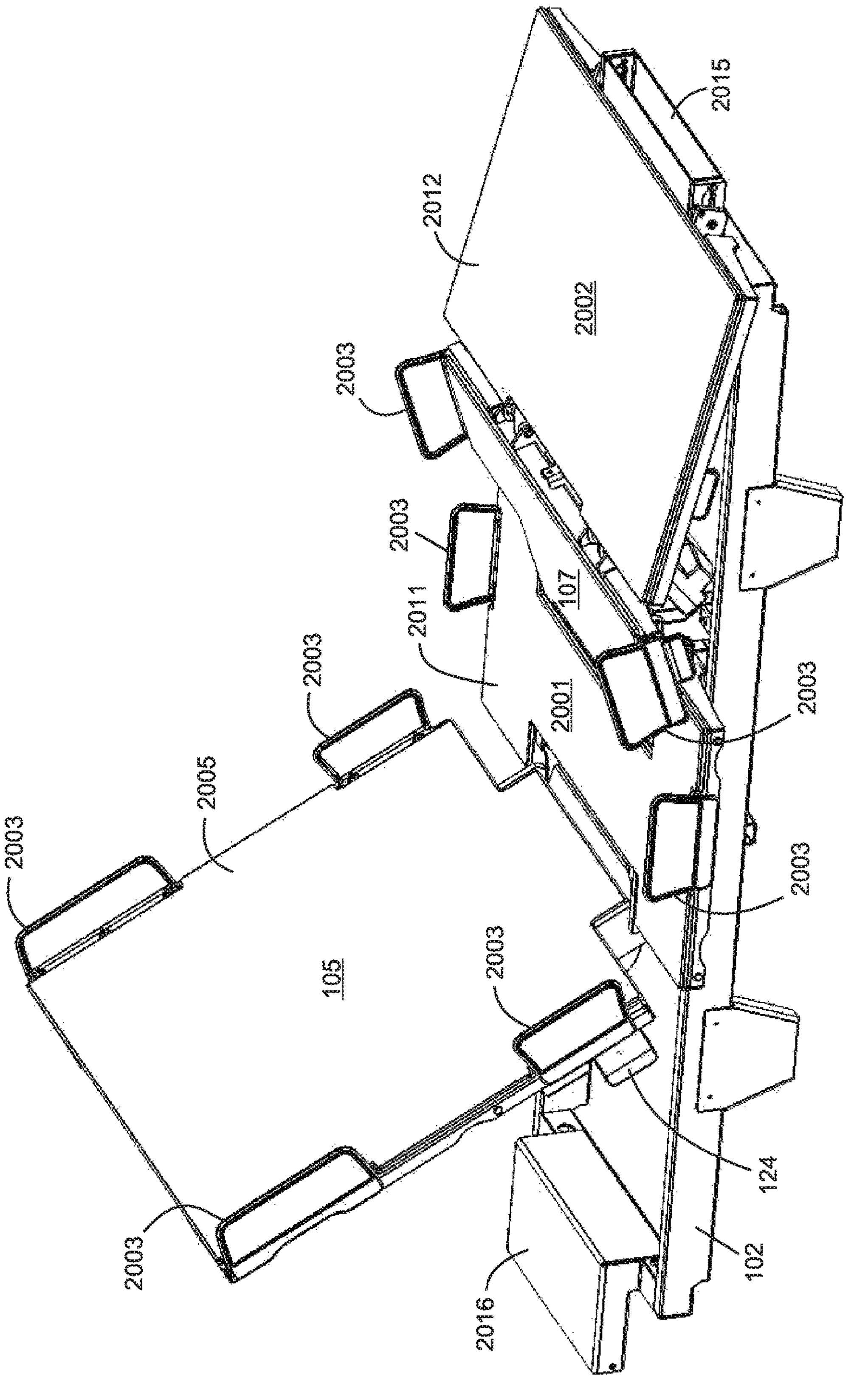
FIG. 8 is a perspective view of an adjustable patient support deck of the patient support of FIG. 1A shown in a position with a head deck tilted up to form a backrest and a knee deck raised to form a knee support.
Figure 9:
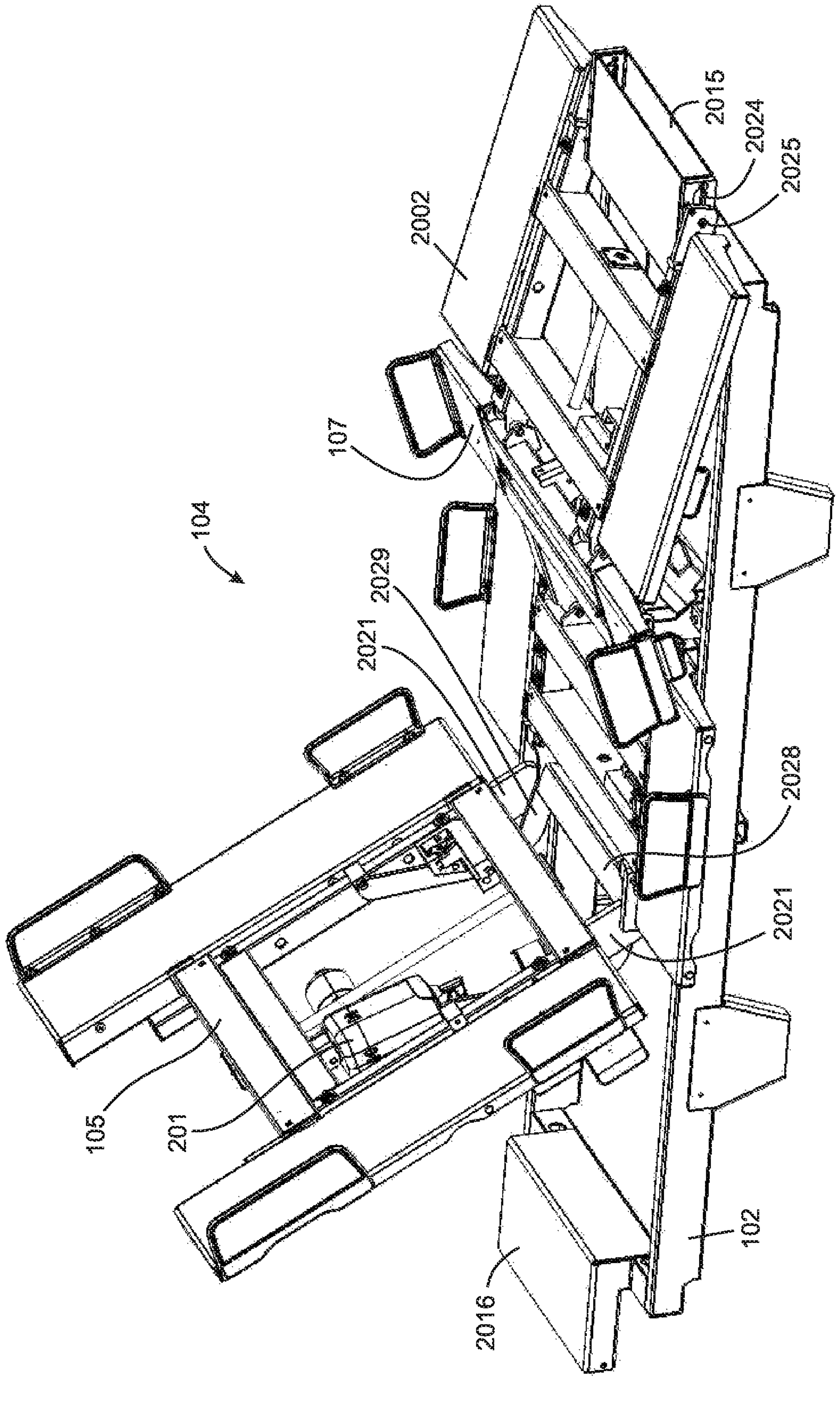
FIG. 9 is a view of the adjustable patient support deck of FIG. 8 without deck panels.
Figure 10:
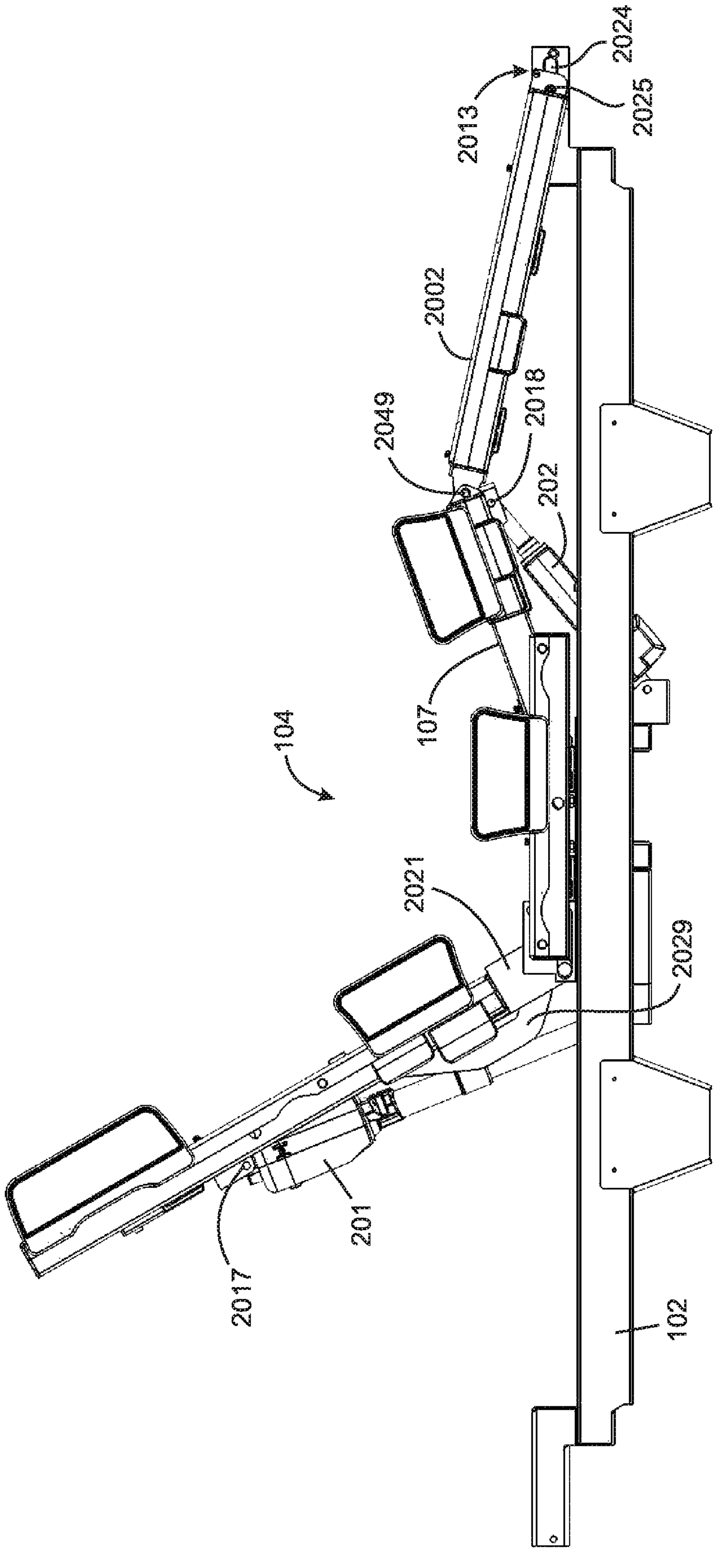
FIG. 10 is a side view of FIG. 9.
Figure 11:
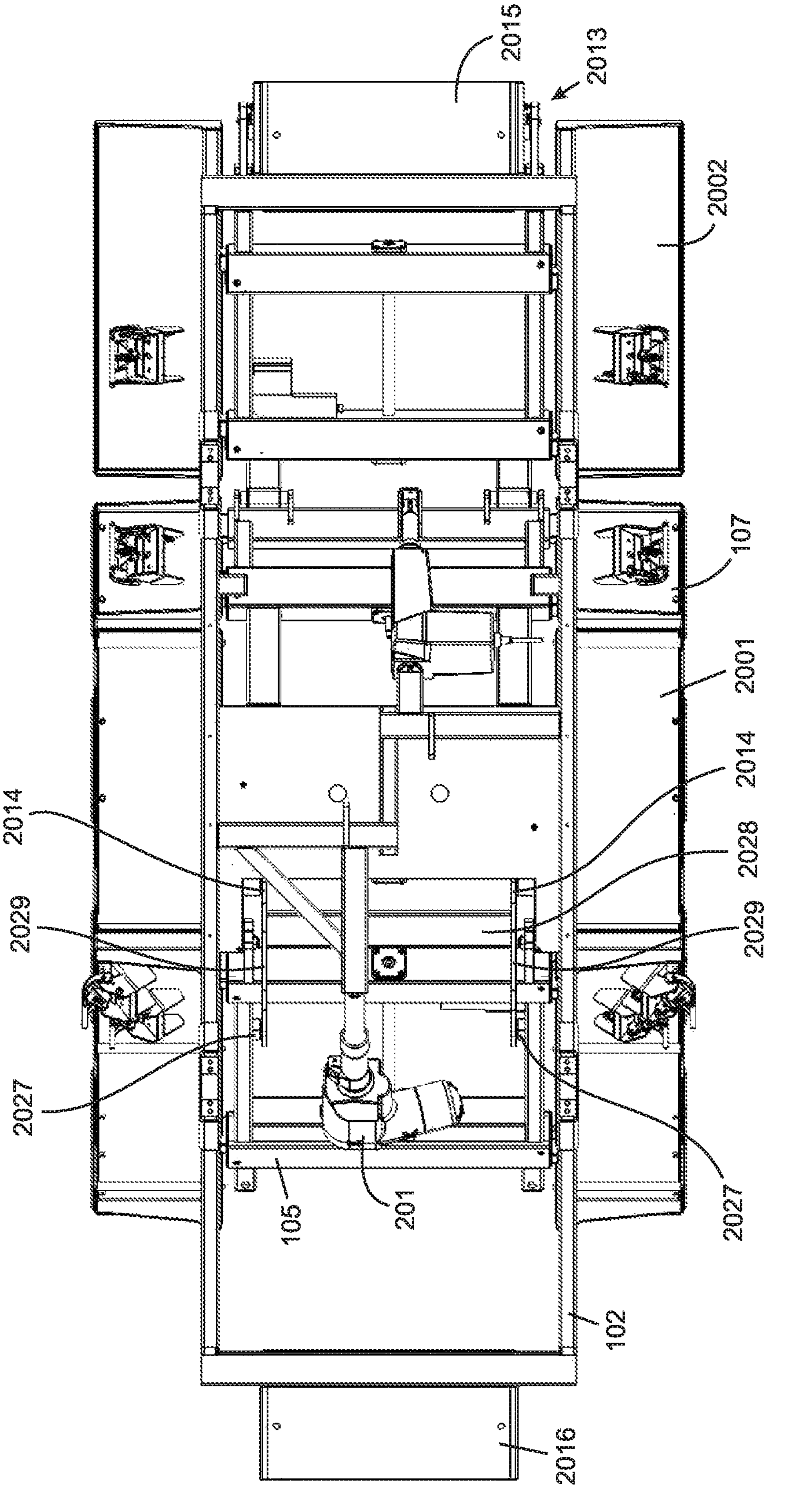
FIG. 11 is a bottom view of FIG. 9.
Figure 12:
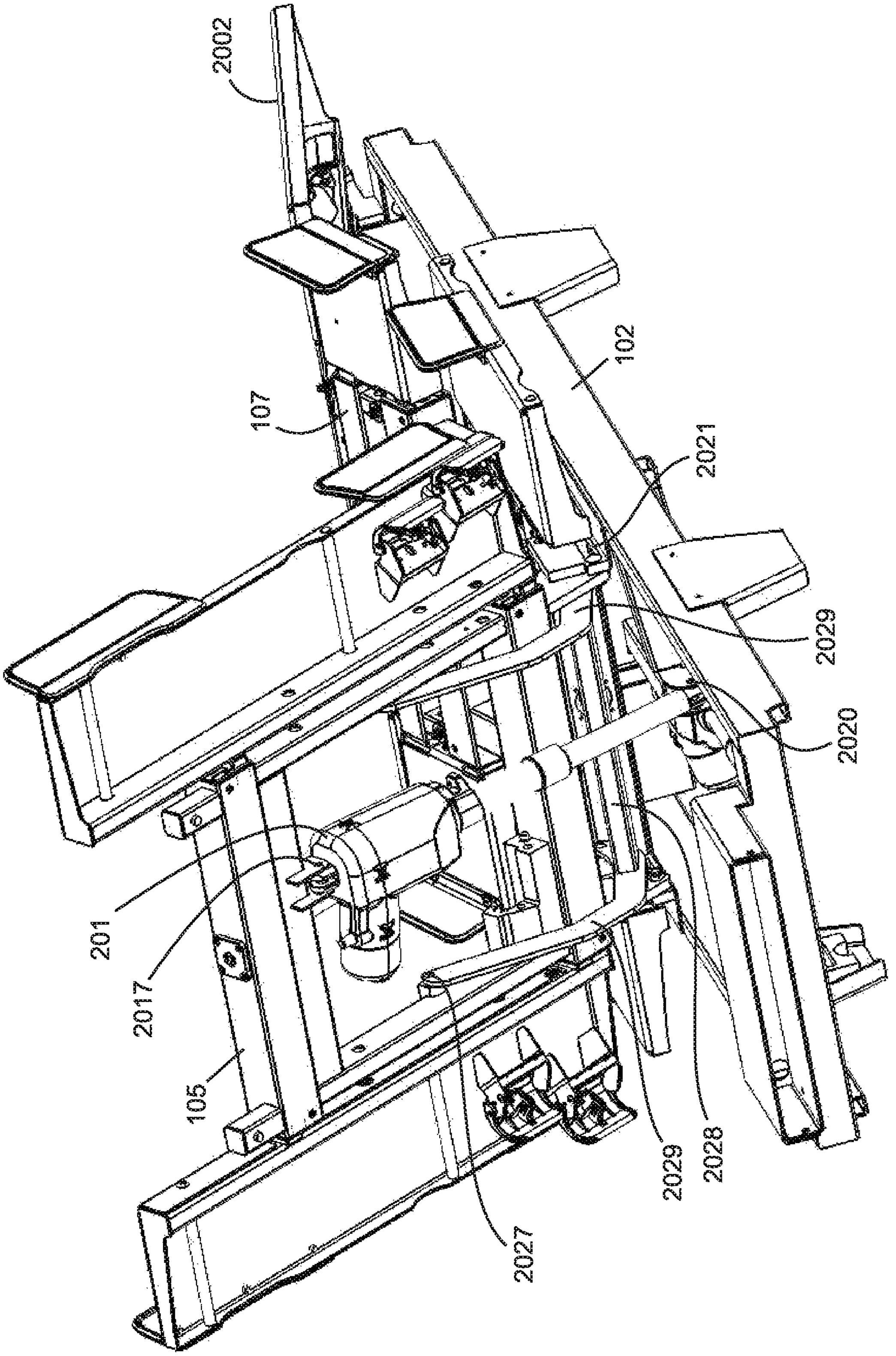
FIG. 12 is a head end perspective view of FIG. 9.
Figure 14:
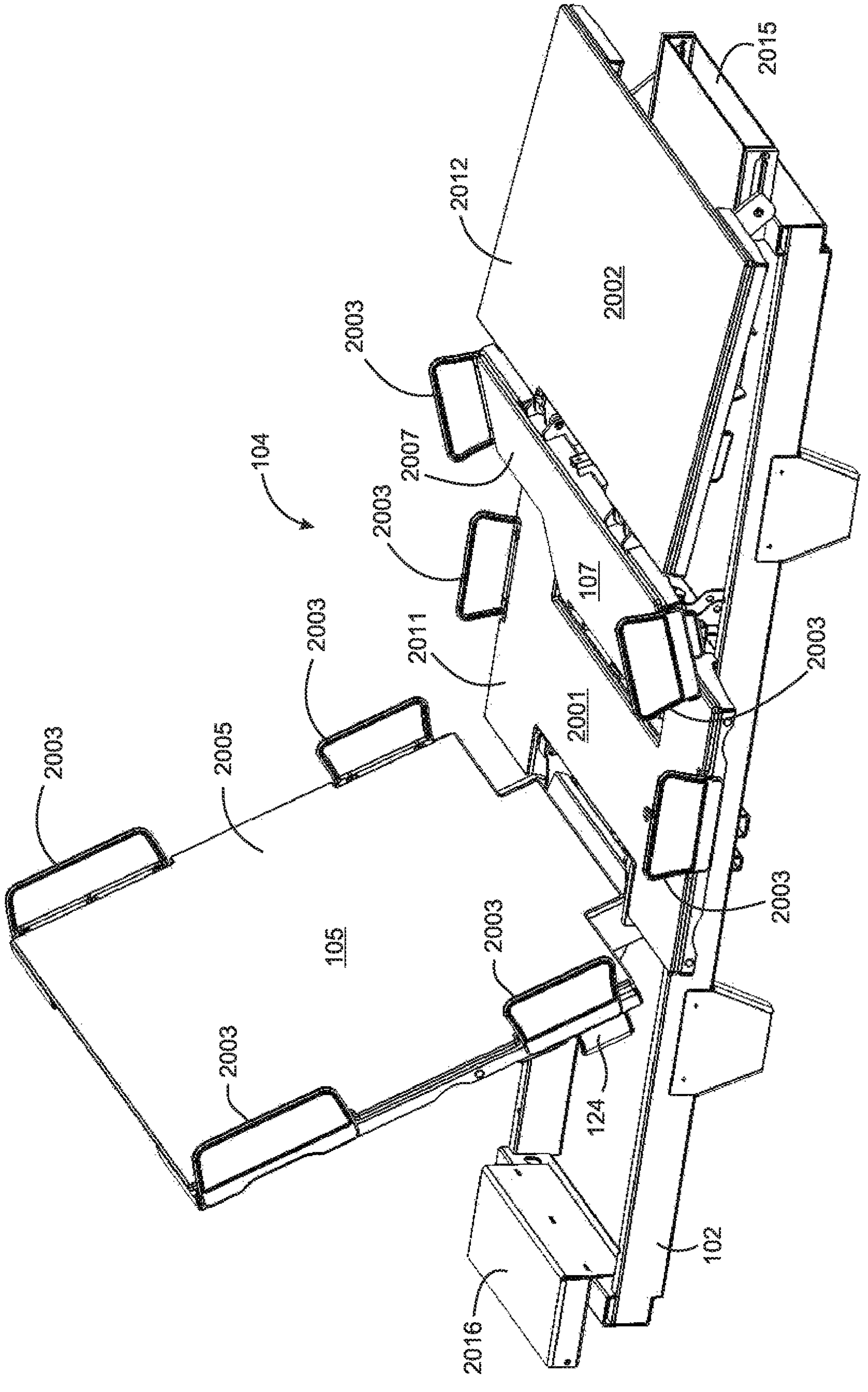
FIG. 14 is a perspective view of an adjustable patient support deck of the patient support of FIG. 1A shown in a vascular or bail position.

To provide flexibility in patient care and comfort, patient supports should be able to support patients in a number of different positions. The patient support described herein has such capability. Referring to FIG. 6, the patient support deck 104 may be in a horizontal prone position. Referring to FIG. 7, the patient support deck 104 may be in an articulating position with the head deck 105 tilted up relative to the upper frame 102 to form a backrest and the other portions remaining horizontal. Referring to FIG. 8, the patient support deck 104 may be in a head-up, knees-up position with the head deck 105 tilted up relative to the upper frame 102 to form a backrest and the knee deck 107 and the foot deck 2002 tilted up relative to the upper frame 102 to form an inverted "V". Referring to FIG. 14 the patient support deck 104 may be in a vascular position with the head deck 105 tilted up relative to the upper frame 102 to form a backrest, the knee deck 107 tilted up relative to the upper frame 102 at the foot end to raise the knees the and foot deck 2002 raised but horizontal. In all of the aforementioned positions, a seat deck 2001 remains horizontal. The deck 104 may also be moved to the Trendelenburg position (head lower than foot) or the reverse Trendelenburg position (head higher than foot).

Each of the deck pans 105, 2001, 107 and 2002 of the deck 104 may comprise a deck panel for supporting a portion of a patient's body. The head deck 105 may comprise a head deck panel 2005. The seat deck 2001 may comprise a seat deck panel 2011. The knee deck 107 may comprise a knee deck panel 2007. The foot deck 2002 may comprise a foot deck panel 2012. The deck 104 may be supported on the upper frame 102. The deck 104 may further comprise mattress keepers 2003 for keeping a mattress (not shown) from sliding sideways off the deck and the manual cardiopulmonary resuscitation (CPR) quick release handle 124. The upper frame 102 may further support an upper frame footboard mount 2015 and an upper frame headboard mount 2016.

Further possible features of the deck 104 supported on the upper frame 102 are shown in FIG. 9, FIG. 10, FIG. 11 and FIG. 12 in which the deck panels are removed.

To move the head deck 105 between the horizontal and raised positions, a head deck actuator 201 may be employed whereby one end of the head deck actuator 201 may be pivotally linked to the head deck 105 at pivot 2017 proximate a head end of the head deck 105, and the other end of the actuator 201 may be pivotally linked at pivot 2020 to the upper frame 102 at a position proximate a foot end of the head deck 105. The head deck 105 comprises support struts 2021, which may be pivotally linked to the upper frame 102. Linear movement of the actuator 201 may cause the support struts 2021 to pivot thereby raising or lowering the head deck 105.

The head deck 105 may also comprise a mechanism whereby movement of a patient longitudinally toward the foot end of the patient support is reduced or eliminated while the head deck is being raised. This movement occurs because while the head deck is being raised, the upper part of the head deck moves longitudinally toward the foot end of the patient support. An auto-regression mechanism to reduce or eliminate this movement may be accomplished by permitting the lower end of the head deck 105 to move toward the head end of the patient support while the head deck is being raised. This compensates for the movement of the upper part of the head deck toward the foot end of the patient support.

With reference to FIG. 9, FIG. 10, FIG. 11, FIG. 12 and FIG. 13A-13B, an autoregression mechanism may comprise upwardly depending arcuately-shaped auto-regression linkages 2029 pivotally linked to the head deck 105 at pivots 2027 proximate upper ends of the linkages 2029 and toward the upper part of the head deck 105. The auto-regression linkages 2029 may further comprise track rollers 2026 proximate the lower end of the auto-regression linkages 2029, the track rollers 2026 riding in auto-regression cam tracks 2023 situated in mounting plates 2009. The mounting plates 2009 may be mounted (e.g. bolted, welded, etc.) on the upper frame 102, for example on to the longitudinal main rails of the upper frame 102. The auto-regression linkages 2029 may also be pivotally linked to the mounting plates 2009 at pivots 2022.

Figure 13A:
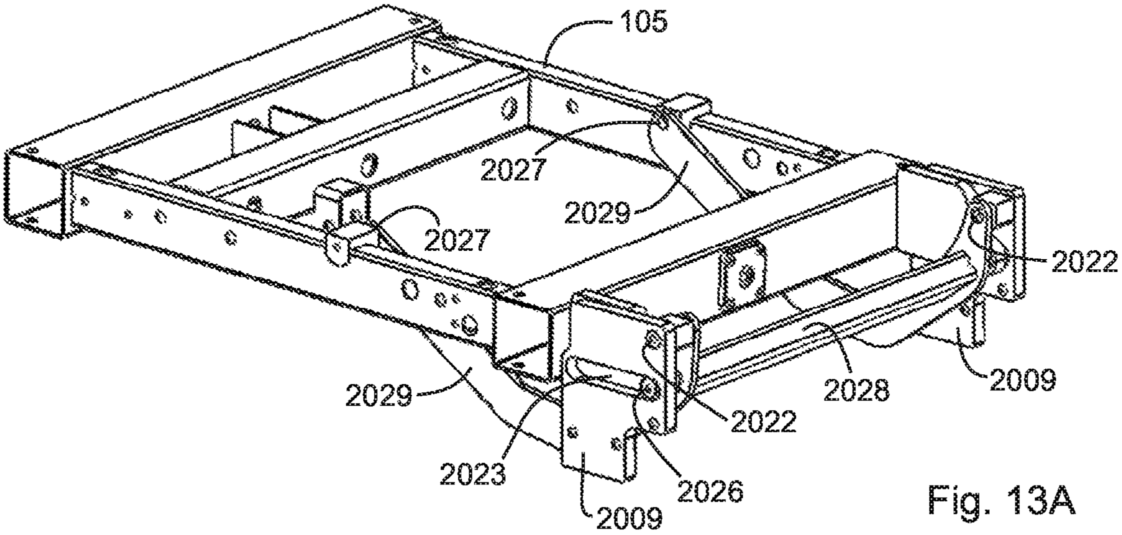
FIG. 13A is a perspective view of an auto-regression mechanism with a head deck in a flat position.
Figure 13B:
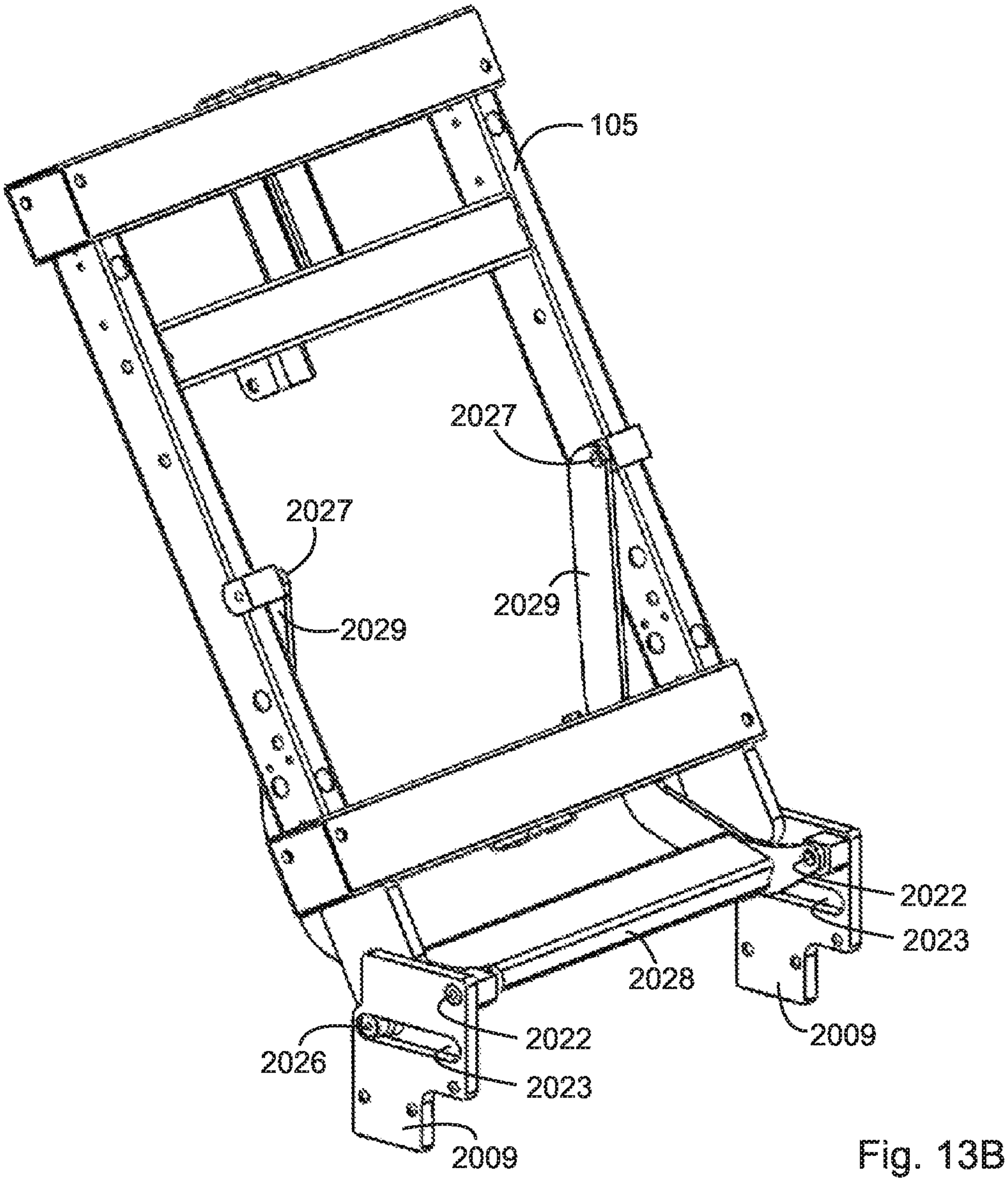
FIG. 13B is a perspective view of an auto-regression mechanism with a head deck in a raised position.

With specific reference to FIG. 13A-13B, as the head deck 105 is raised and the upper part of the head deck moves toward the foot end of the patient support, the lower part of the head deck may move towards the head end of the patient support as the track rollers 2026 move longitudinally in and ride within the cam tracks 2023 towards the head end of the patient support. The ability of the lower part of the head deck 105 to move in such a manner is a result of the presence of the auto-regression linkages 2029. Thus, the longitudinal position of the head deck 105 may not be as far toward the foot end of the patient support as the position that the head deck 105 would have taken had there been only a pivoting linkage at the lower part of the head deck 105. When the head deck moves from the raised position to the lowered position, the track rollers 2026 may move longitudinally in and ride within the cam tracks 2023 towards the foot end of the patient support. The auto-regression linkages 2029 may be further connected by an auto-regression cross-member 2028 attached to and extending between the linkages 2029 below the arc of the auto-regression linkages 2029 to reduce torsional distortions and to force the auto-regression linkages 2029 to act in concert without binding the motion of the head deck 105. In this manner, patient movement toward the foot end may be reduced or eliminated without the aid of an additional actuator.

To move the knee deck 107 and foot deck 2002 between the horizontal and raised positions, a knee deck actuator 202 may be employed whereby one end of the knee deck actuator 202 may be pivotally linked to the knee deck 107 at pivot 2018 proximate a foot end of the knee deck, and the other end of the knee deck actuator 202 may be pivotally linked to the upper frame 102 at pivot 2014 proximate a head end of the knee deck 107. The foot end of the knee deck 107 may be pivotally linked at pivot 2019 to a head end of the foot deck 2002 so that movement upward or downward of the foot end of the knee deck 107 may also cause movement upward or downward of the head end of the foot deck 2002.

Adjustment of the angle of the foot deck 2002 may be accomplished without the use of a variable length actuator. The head end of the foot deck 2002 may be pivotally linked to the foot end of the knee deck 107. Actuation of the knee deck actuator 202 raises and lowers the foot end of the knee deck 107 and consequently raises and lowers the head end of the foot deck 2002. To accommodate the resulting requirement for the foot end of the foot deck 2002 to move longitudinally in response to the raising and lowering of the head end of the foot deck 2002, the foot end of the foot deck 2002 may be configured with an engagement structure that slidingly engages a corresponding structure on the upper frame 102 that permits the foot end of the foot deck 2002 to translate longitudinally while retaining the foot end of the foot deck 2002 in the same horizontal plane. Thus, raising the foot end of the knee deck 107 using an actuator would also raise the head end of the foot deck 2002 while keeping the foot end of the foot deck 2002 down, all without using a variable length actuator mounted directly to the foot deck 2002.

In one embodiment, the foot end of the foot deck 2002 may comprise a bail assembly 2013 comprising a bail cross-member 2025 extending from one side to the other of the foot deck 2002. The bail cross-member 2025 may be slidably engaged in bail cam tracks 2024 in the upper frame footboard mount 2015 supported on the upper frame 102. Movement up or down of the head end of the foot deck 2002 may cause the bail cross-member 2025 to slide longitudinally within the bail cam tracks 2024. The bail cross-member 2025 may be longitudinally closest to the foot end of the deck 104 when the foot deck 2002 is in the horizontal position, for example in the articulating position shown in FIG. 6 or FIG. 7. Moving the head end of the foot deck up to the knees up (comfort) position may cause the bail cross-member 2025 to slide in the bail cam tracks 2024 toward the head end of the deck 104 as shown in FIG. 8. This mechanism of adjusting the foot deck does not require a variable-length mechanism, such as a variable-length actuator, between the knee deck 107 and the foot deck 2002. The bail cross-member 2025 in the bail cam tracks 2024 may pivot and slide but does not change in length, and is therefore not a variable length actuator.

Figure 15B:
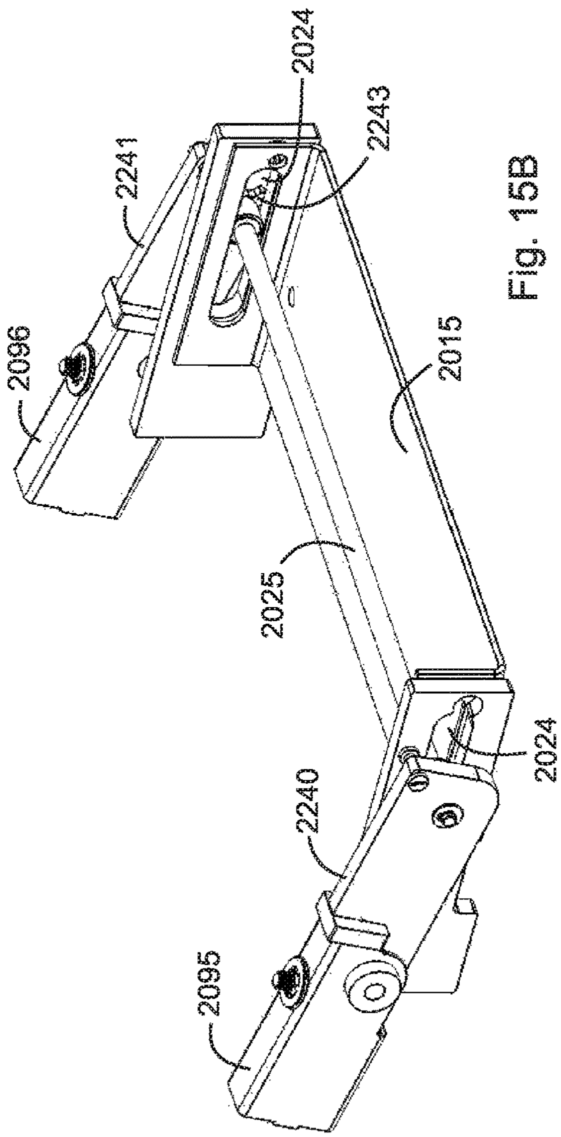
FIG. 15B is a perspective view showing the foot deck depicted in FIG. 15A mounted on a footboard mounting bracket mount.
Figure 15A:
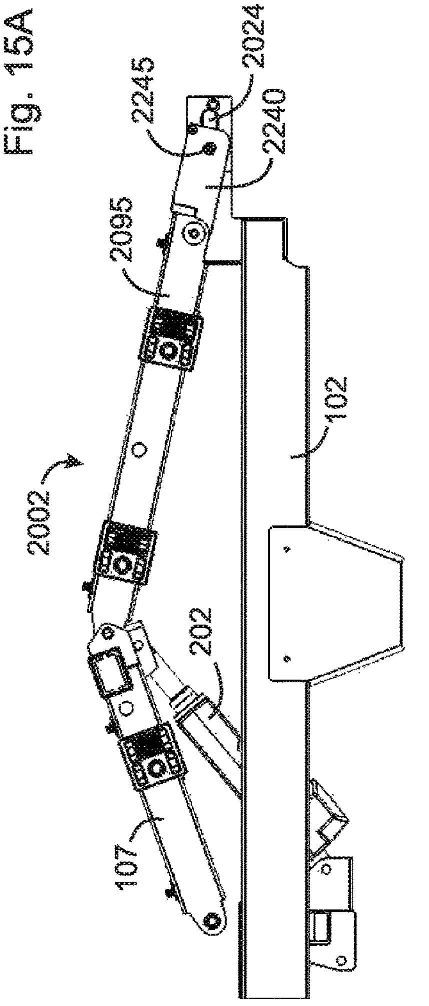
FIG. 15A is a side view of knee- and foot decks of the adjustable patient support shown in FIG. 8.
Figure 16A:
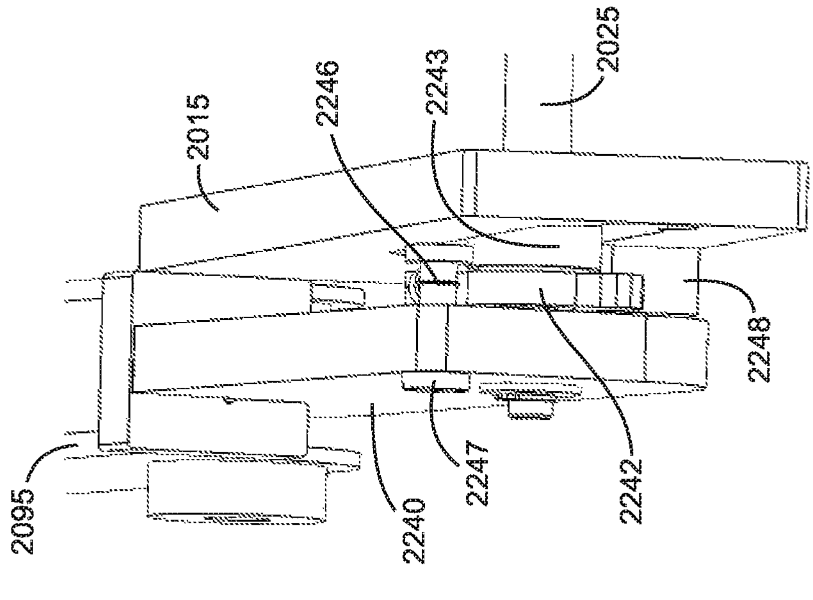
FIG. 16A is a foot end perspective view of details of how the foot deck depicted in FIG. 15B is mounted on the footboard mounting bracket mount with a bail assembly for placing the foot deck in a vascular position.
Figure 16B:
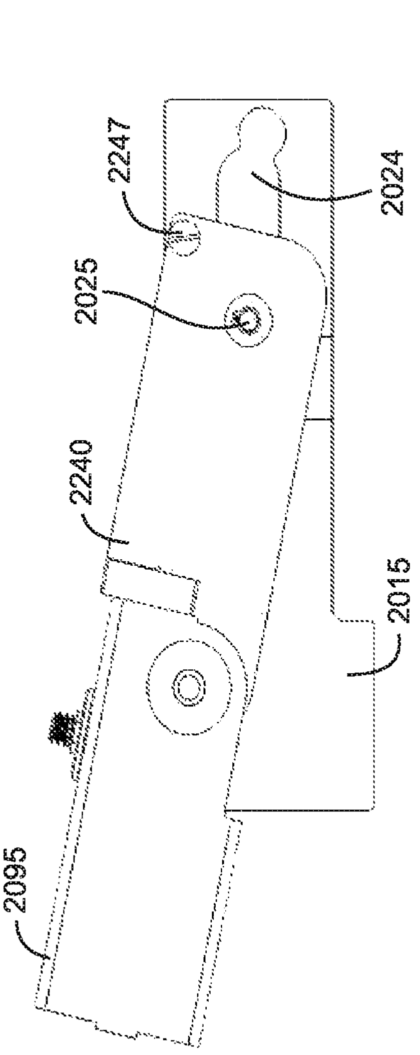
FIG. 16B is a side view of details of how the foot deck depicted in FIG. 15B is mounted on the footboard mounting bracket mount a bail assembly for placing the foot deck in a vascular position.
Figure 16C:
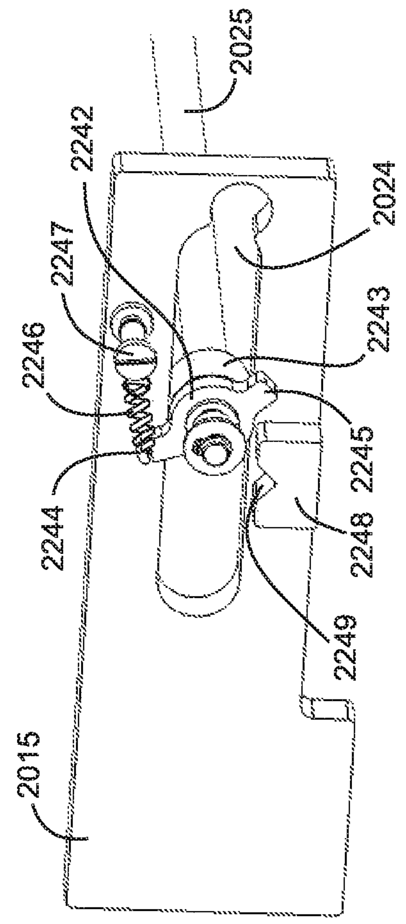
FIG. 16C is a side perspective view of details of how the foot deck depicted in FIG. 15B is mounted on the footboard mounting bracket mount a bail assembly for placing the foot deck in a vascular position.
Figure 17:
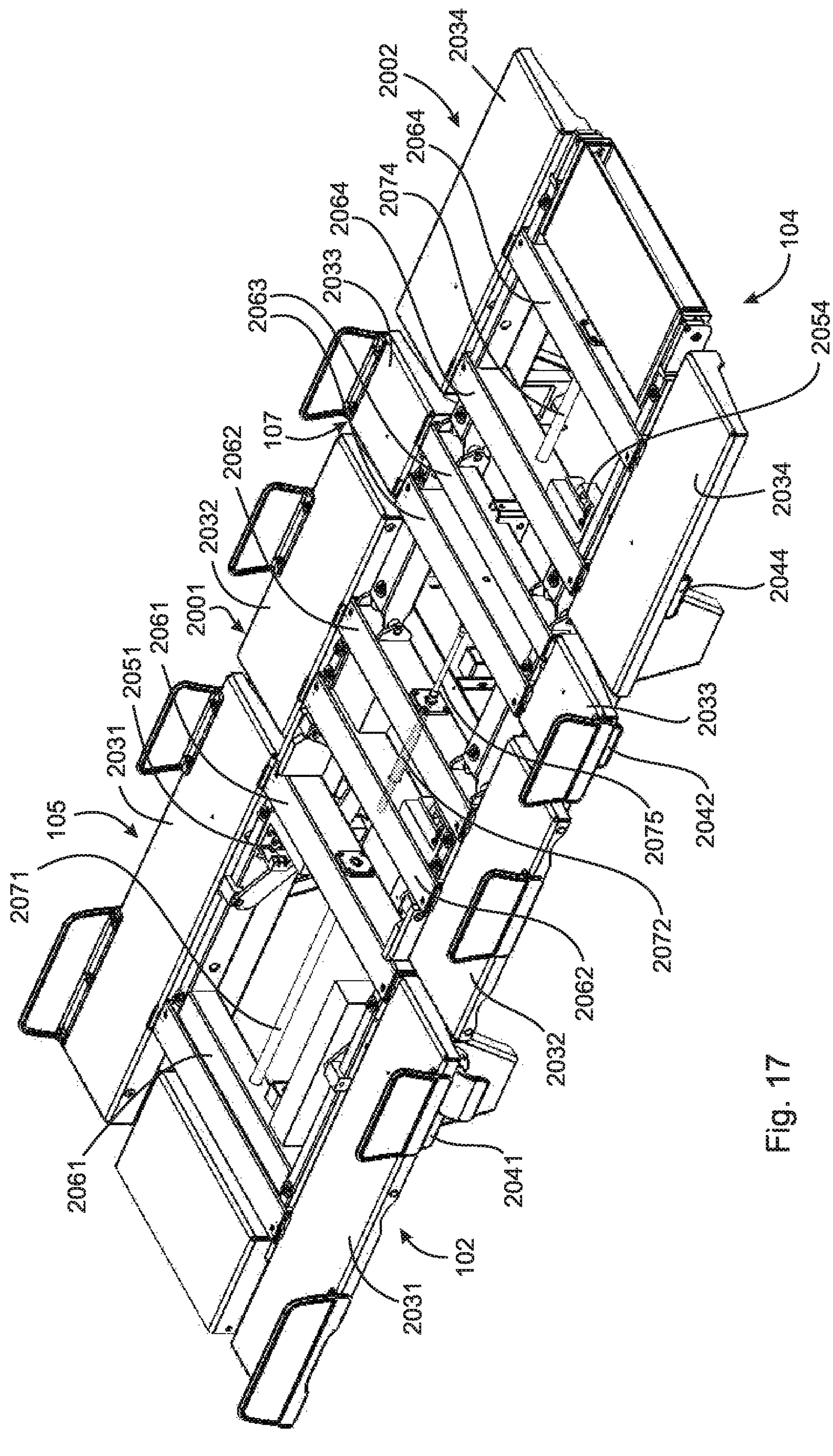
FIG. 17 is a perspective view of an adjustable patient support deck of the patient support of FIG. 1A shown in a horizontal prone position without deck panels at a standard first width.

To achieve the vascular position (to FIG. 14), the angle of the foot deck 2002 may be changed independently of the angle of the knee deck 107. Further, an actuator is not required to change the angle of the foot deck 2002. With reference to FIG. 15A, B and FIG. 16A-C, a mechanism for changing the angle of the foot deck 2002 of the deck on the upper frame 102 to achieve the vascular position is shown. The foot deck 2002 may comprise longitudinal supporting struts 2095, 2096 from which bail linkages 2240, 2241 extend longitudinally. The upper frame footboard mount 2015 may comprise the two bail cam tracks 2024 within which two track rollers 2243 mounted proximate opposite ends of the bail cross-member 2025 may roll. The upper frame footboard mount 2015 may be mounted on the bail linkages 2240, 2241 by virtue of the track rollers 2243 in the bail cross-member 2025. As the head end of the footboard portion 2002 moves up and down, the track rollers 2243 may roll in the bail cam tracks 2024 causing the bail cross-member 2025 to slide longitudinally.

Lobed cams 2242 (only one shown) may also be pivotally mounted on the bail cross-member 2025 between the upper frame footboard mount 2015 containing the bail cam tracks 2024 and the bail linkages 2240, 2241. With reference to the lobed cam 2242 between the upper frame footboard mount 2015 and the bail linkage 2240, the lobed cam 2242 may comprise a spring holder 2244 and a catch 2245. One end of a coiled spring 2246 may be attached to the spring holder 2244 and another end of the coiled spring 2246 may be attached to a spring holding pin 2247 mounted on the bail linkage 2240. A catch stop 2248 may be mounted on the upper frame footboard mount 2015, an upper surface of the catch stop 2248 comprising a groove 2249 in which the catch 2245 of the lobed cam may be retained. There may be a similar arrangement on the other side of the upper frame footboard mount 2015.

To achieve the vascular position (FIG. 14) from the normal knees-up position FIG. 8), the longitudinal supporting struts 2095, 2096 may be physically lifted by lifting on the foot end of the foot deck 2002, which causes the bail cross-member 2025 to move toward the head end. When the catch 2245 of the lobed cam 2242 contacts the foot end of the catch stop 2248 the lobed cam 2242 rotates in a first direction to bring the catch 2245 up and over the foot end of the catch stop 2248 until the catch 2245 is over the groove 2249 whereupon the spring 2246 rotates the lobed cam 2242 in a second direction to engage the catch 2245 in the groove 2249 of the catch stop 2248. With the catch 2245 retained in the groove 2249 of the catch stop 2248, the bail cross-member 2025 may be prevented from moving longitudinally foot-ward, thereby locking the foot end of the foot deck 2002. With the foot deck 2002 thus locked, lowering the knee-supporting section 107 with the knee deck actuator 202 may cause the head end of the foot deck 2002 to lower without also moving the foot end of the foot deck 2002. At some point, the knee deck 107 will reach a position where the knees are up but the foot deck 2002 is horizontal or almost horizontal with the head end of the foot deck down slightly, i.e. the vascular position (FIG. 14).

To unlock the foot deck 2002, the longitudinal supporting struts 2095, 2096 may be physically lifted again by lifting on the foot end of the foot deck 2002, which lifts the catch 2245 over the head end side of the catch stop 2248. Lowering the longitudinal struts 2095, 2096 causes the bail cross-member 2025 to move longitudinally toward the foot end. When the catch 2245 contacts the head end side of the catch stop 2248, the spring 2246 bends allowing the lobed cam 2242 to rotate in the second direction which lifts the catch 2245 above the catch stop 2248. Because of the shape of the catch 2245, the catch 2245 does not engage in the groove 2249 of the catch stop 2248 as the bail cross-member 2025 moves toward the foot end. With the catch 2245 now foot-ward of the catch stop 2248, the bail cross-member 2025 is free to move longitudinally foot-ward in the bail cam track 2024 to return to the foot deck 2002 to non-vascular position.

Thus, the patient support described herein is able to achieve vascular and non-vascular positions without a variable length mechanism, for example without the use of another actuator on the foot deck of the deck.

Most patient supports are designed to accommodate patients of average size and weight. For bariatric patients, normal patient supports are generally too small and lack sufficient structural strength to withstand the load of the patient. The patient support disclosed herein is structurally strong enough to accommodate greatly overweight patients and comprises features for extending the length and/or width of the caster frame, deck, headboard and footboard to accommodate average-sized patients on the one hand and bariatric patients on the other hand. The width may be adjusted sideways in any increments, for example between a first width such as for a standard patient support, a second intermediate width and a third more expanded width for large bariatric patients. Notionally, the first standard width may be considered a 36 inch width, the second intermediate width may be considered a 42 inch width and the third more expanded width may be considered a 48 inch width, although these numerical widths are not actual widths but are descriptors that may be used in the art.

Referring to FIG. 17, FIG. 18, FIG. 19 and FIG. 20, a patient support deck 104 is shown in a horizontal prone position without deck panels at a standard first width, an intermediate second width and a more expanded third width.

The head deck 105 may comprise two head deck extension pans 2031 on either side of the deck 104, which are normally under the head deck panel when the deck 104 is at standard width. The seat deck 2001 may comprise two seat deck extension pans 2032 on either side of the deck 104, which are normally under the seat deck panel when the deck 104 is at standard width. The knee deck 107 may comprise two knee deck extension pans 2033 on either side of the deck 104, which are normally under the knee deck panel when the deck 104 is at standard width. The foot deck 2002 may comprise two foot deck extension pans 2034 on either side of the deck 104, which are normally under the foot deck panel when the deck 104 is at standard width. The deck extension pans may be made as thin as possible to provide more space under the deck extension pans to tuck the guard structures.

Figure 18:
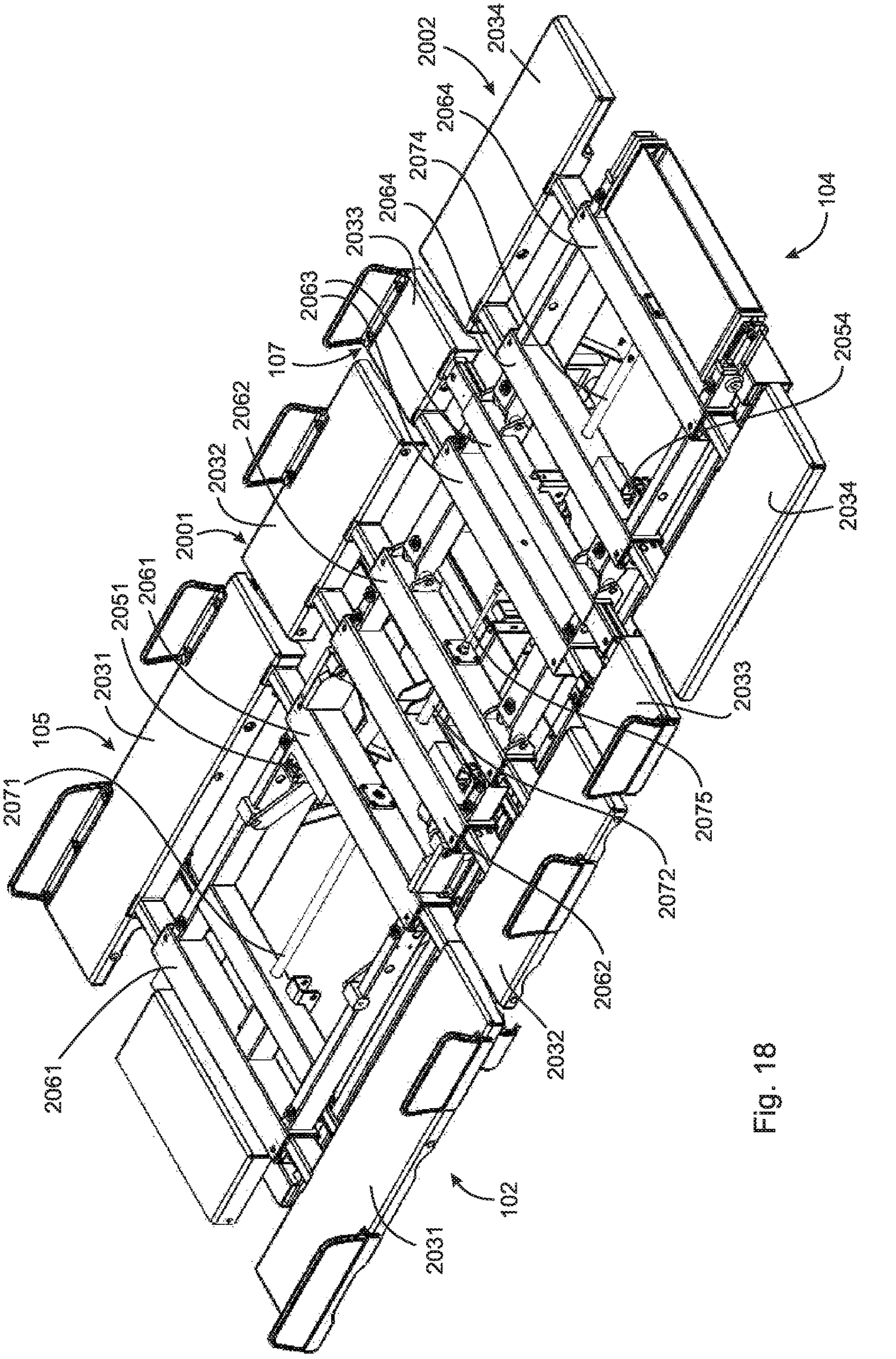
FIG. 18 shows the patient support deck of FIG. 17 expanded to a second intermediate width.
Figure 19:
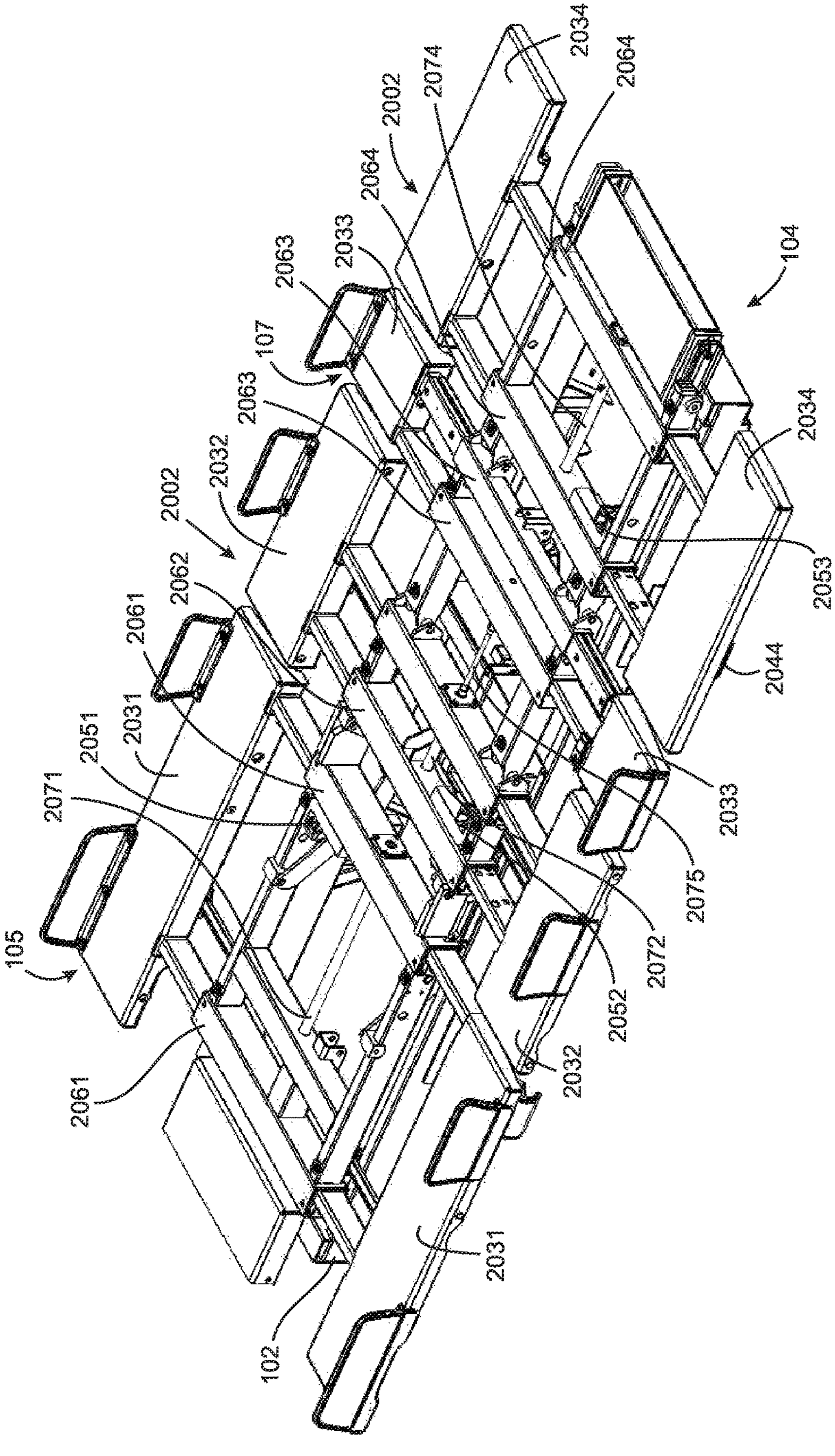
FIG. 19 shows the patient support deck of FIG. 17 expanded to a more expanded third width.
Figure 20:
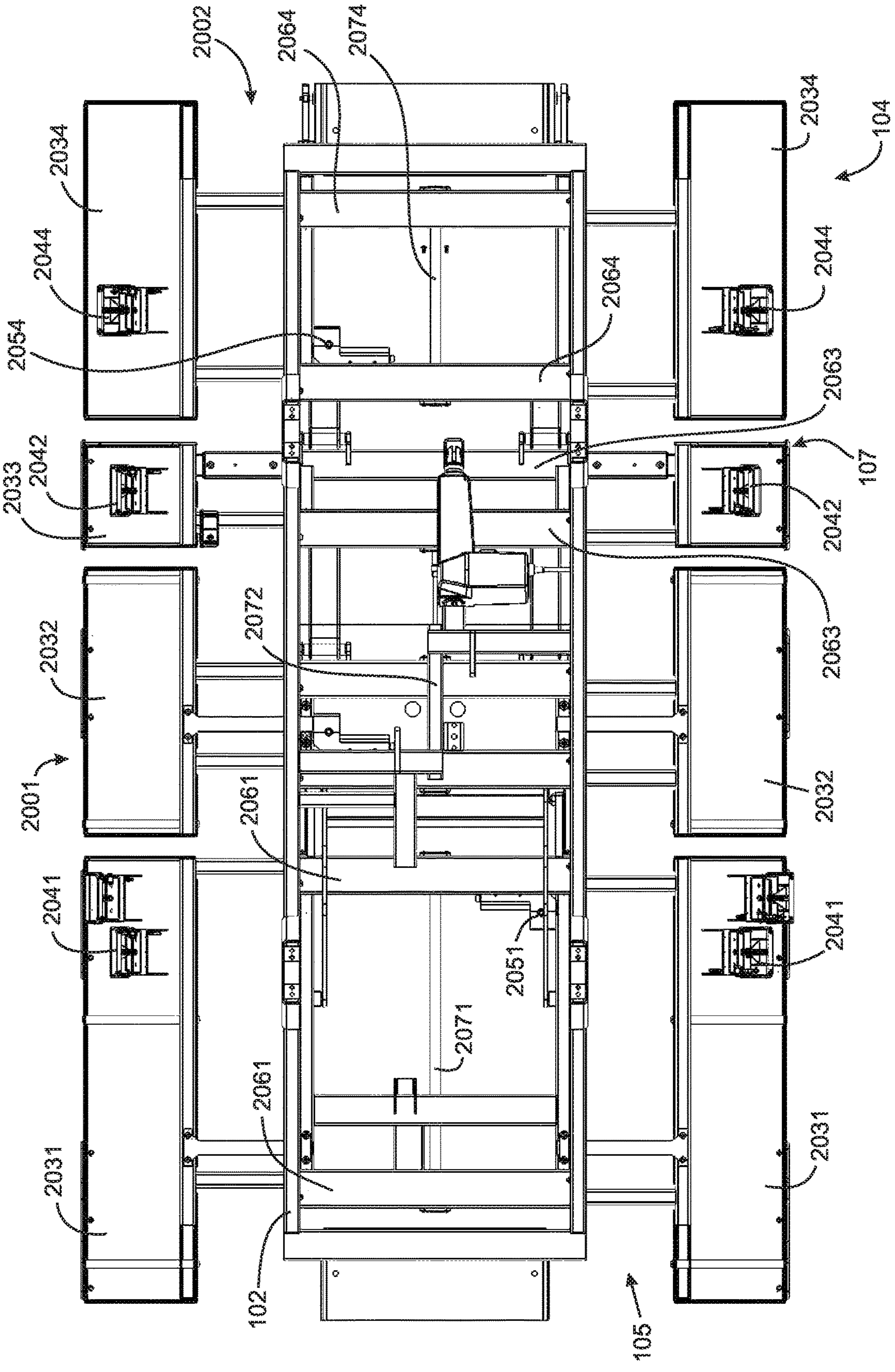
FIG. 20 shows a bottom view of the expanded patient support deck of FIG. 19.

As seen in FIG. 18 and FIG. 19, when the deck 104 is expanded, the deck extension pans 2031, 2032, 2033, 2034 supported on deck extension pan cross-members may be pulled laterally away to provide a wider surface. The deck extension pans that are normally under the deck panels may now be exposed to provide an extended surface on which a larger mattress may rest. The upper frame 102, which supports the deck 104, may not expand with the deck.

The width of head deck 105 and foot deck 2002 may be adjusted (expanded or contracted) independently. The seat deck 2001 and knee deck 107 may be adjusted together. The deck extension pans may be moved manually or movement may be powered. In a manual embodiment, on each side of the deck 104 may be head deck extension handles 2041, seat/knee deck extension handles 2042 and foot deck extension handles 2044. With these handles, the deck extension pans may be unlatched and then moved laterally by pulling or pushing. The head deck extension handles, seat/knee deck extension handles and foot deck extension handles may be operationally connected to head deck extension latch mechanism 2051, seat/knee deck extension latch mechanism 2052 and foot deck extension latch mechanism 2054, respectively. The handles may be configured with a structure, for example a lever, for leasing the latch mechanisms. The latch mechanisms may immobilize the deck extension pans with a pin-in-hole structure.

To expand each portion, at least two rack and pinion mechanisms in each portion may be employed. The head deck 105 may have two head rack and pinion mechanisms housed in head deck rack and pinion mechanism housing tubes 2061. The two head rack and pinion mechanisms may be linked by pinion gear shaft 2071 so that the two head rack and pinion mechanisms operate in unison to expand the head deck 105. The seat deck 2001 and knee deck 107 may have two rack and pinion mechanisms each housed in seat and knee deck rack and pinion mechanism housing tubes 2062, 2063, respectively. The seat and knee deck rack and pinion mechanisms may be linked by pinion gear shafts 2072, 2073, respectively. The rack and pinion mechanisms of seat deck may be linked by pinion gear shaft 2075 to the rack and pinion mechanisms of the knee deck so that the four rack and pinion mechanisms operate in unison to expand the seat-supporting and knee decks together. In an alternative embodiment, one of the rack and pinion mechanisms in the knee deck may be replaced by a simple slide mechanism, for example a tube-in-tube arrangement. The foot deck 2002 may have two foot deck rack and pinion mechanisms housed in foot deck rack and pinion mechanism housing tubes 2064. The two foot deck rack and pinion mechanisms may be linked by pinion gear shaft 2074 so that the two foot deck rack and pinion mechanisms operate in unison to expand the foot deck 2002.

To illustrate more clearly the operation of the rack and pinion mechanisms and the deck extension latch mechanisms, reference is made to FIG. 21, FIG. 22, FIG. 23, FIG. 24 and FIG. 25, which illustrate a rack and pinion mechanism 2065 and the deck extension latch mechanism 2051 of the head deck 105. The rack and pinion mechanisms and the deck extension latch mechanisms of the other deck portions may be similar.

As discussed above, the head deck 105 may comprise two head deck extension pans 2031, one on each side of the head deck, on which may be mounted mattress keepers 2003. Head deck extension handles 2041 and manual cardiopulmonary resuscitation (CPR) quick release handles 124 may be mounted on the under-surface of the head deck extension pans 2031. The CPR handles 124 may be cabled to the decks articulating features so that pulling on the handle releases the deck to return automatically to the prone position under the force of gravity more quickly than is achieved by driving the actuator normally. The head deck extension handles 2041 may be cabled or electronically connected to the head deck extension latch mechanism 2051 so that pulling on the handle disengages the head deck extension latch mechanism 2051 so that the head deck 105 may be expanded.

Each rack and pinion mechanism 2065 may comprise two extension cross-members for a total of four extension cross-members 2081, 2082, 2083, 2084. Extension cross-members 2081 and 2083 may be fixed to and support the head deck extension pan on one side of the head deck and extension cross-members 2082 and 2084 may be fixed to and support the head deck extension pan on the other side of the head deck. The extension cross-members may be configured so that the extension cross-members supporting one deck extension pan may be directly adjacent corresponding extension cross-members supporting the other deck extension pan. Thus, extension cross-member 2083 may be adjacent to and to the inside of extension cross-member 2084, while extension cross-member 2081, which supports the same deck extension pan as extension cross-member 2083, may be beside and to the outside of extension cross-member 2082. The extension cross-members may be slidably supported in head deck rack and pinion mechanism housing tube 2061 attached to the head deck 105, the head deck rack and pinion mechanism housing tube 2061 comprising tube cap 2070.

The extension cross-members 2081, 2082, 2083, 2084 may comprise toothed racks 2076, 2077, 2080, 2089, respectively. The extension cross-members 2081, 2082, 2083, 2084 may comprise a toothed profile as shown, which serves as the toothed racks, or toothed racks may be machined and attached to the extensions cross-members 2081, 2082, 2083, 2084. The elongated through-apertures and toothed racks on neighboring extension cross-members may be aligned in the same horizontal plane so that pinion gear 2068 can mesh with and rest on toothed tracks 2076 and 2077 simultaneously and pinion gear 2069 can mesh with and rest on toothed tracks 2086 and 2089 simultaneously. Each of the pinion gears 2068 and 2069 may alternatively be two separate gears for a total of four pinion gears each associate with one of the four toothed tracks. The pinion gears 2068, 2069 may be mounted on and fixedly connected to pinion gear shaft 2071, the pinion gear shaft 2071 capable of rotating with the pinion gears. The pinion gears 2068, 2069 and pinion gear shaft 2071 may be secured by pinion retainers 2078, 2079. The pinion retainers 2078 and 2079 may be fixedly mounted on the deck (mount not shown) to prevent longitudinal and lateral motion of the pinion gear shaft 2071, thereby keeping the pinion gears 2068, 2069 captured in their respective toothed tracks and on the same longitudinal axis while the gears and pinion gear shaft rotate.

In operation, activating the latch release structure of one of the head deck extension handles 2041 may disengage the head deck extension latch mechanism 2051, which permits lateral movement of the extension cross-members 2081, 2082, 2083, 2084 and hence the head deck extension pans 2031. If the head deck extension handle 2041 on the head deck extension pan 2031 supported on extension cross-members 2082 and 2084 is pulled, the extension cross-members 2082 and 2084 will be pulled laterally. The lateral motion of the extension cross-members 2082 and 2084 may cause the pinion gears 2068, 2069 to rotate due to the action of the teeth in toothed tracks 2077, 2089 with which the pinion gears 2068, 2069 are meshed. Because the pinion gears 2068, 2069 are restricted from moving laterally, rotation of the pinion gears 2068, 2069 also may cause the extension cross-members 2081, 2083 to begin lateral movement since the two pinion gears 2068, 2069 may be also meshed with the toothed tracks 2076, 2080 in extension cross-members 2083, 2081, respectively. The extension cross-members 2081 and 2083 will move on the opposite direction of the extension cross-members 2082 and 2084 because they are on opposite sides of the head deck 105. Because the two pinion gears 2068, 2069 may be fixedly connected to the pinion gear shaft 2071, the rotational speeds of both gears may be the same, which prevents the extension cross-members at one end of the head deck 105 from getting ahead of or behind the extension cross-members at the other end of the head deck. In this way, the head deck 105 may expand uniformly without jamming of the extension cross-members. Further, because the extension cross-members supporting the head deck extension pan on one side may be linked through the pinion gears 2068, 2069 to the extension cross-members supporting the head deck extension pan on the other side, it is only necessary for one operator to operate the expanding feature from one side of the patient support. Once the head deck extension pans 2031 and the extension cross-members 2081, 2082, 2083, 2084 have moved laterally to the desired position (e.g. second width or third width), the head deck extension latch mechanism 2051 re-engages. To return the head deck 105 to a narrower width, the latch release structure of one of the head deck extension handles 2041 may be activated again and the extension cross-members together with the head deck extension pan 2031 on one side pushed laterally back toward the middle.

Alternatively or additionally, rotation of the pinion gears 2068, 2069 may be motorized by connecting the pinion gear shaft 2071 to an actuator. The actuator should be bi-directional. The actuator may be a multi-speed actuator.

Wheels 2085, 2086, 2087, 2088 protruding from upper surfaces of the extension cross-members 2081, 2082, 2083, 2084, respectively, may be provided to reduce friction between the extension cross-members and the tubes 2061 housing the extension cross-members. Corresponding wheels 2085', 2086', 2087', 2088' protruding from the bottom surfaces of the extension cross-members may provide the same function below the extension cross-members.

Figure 21:
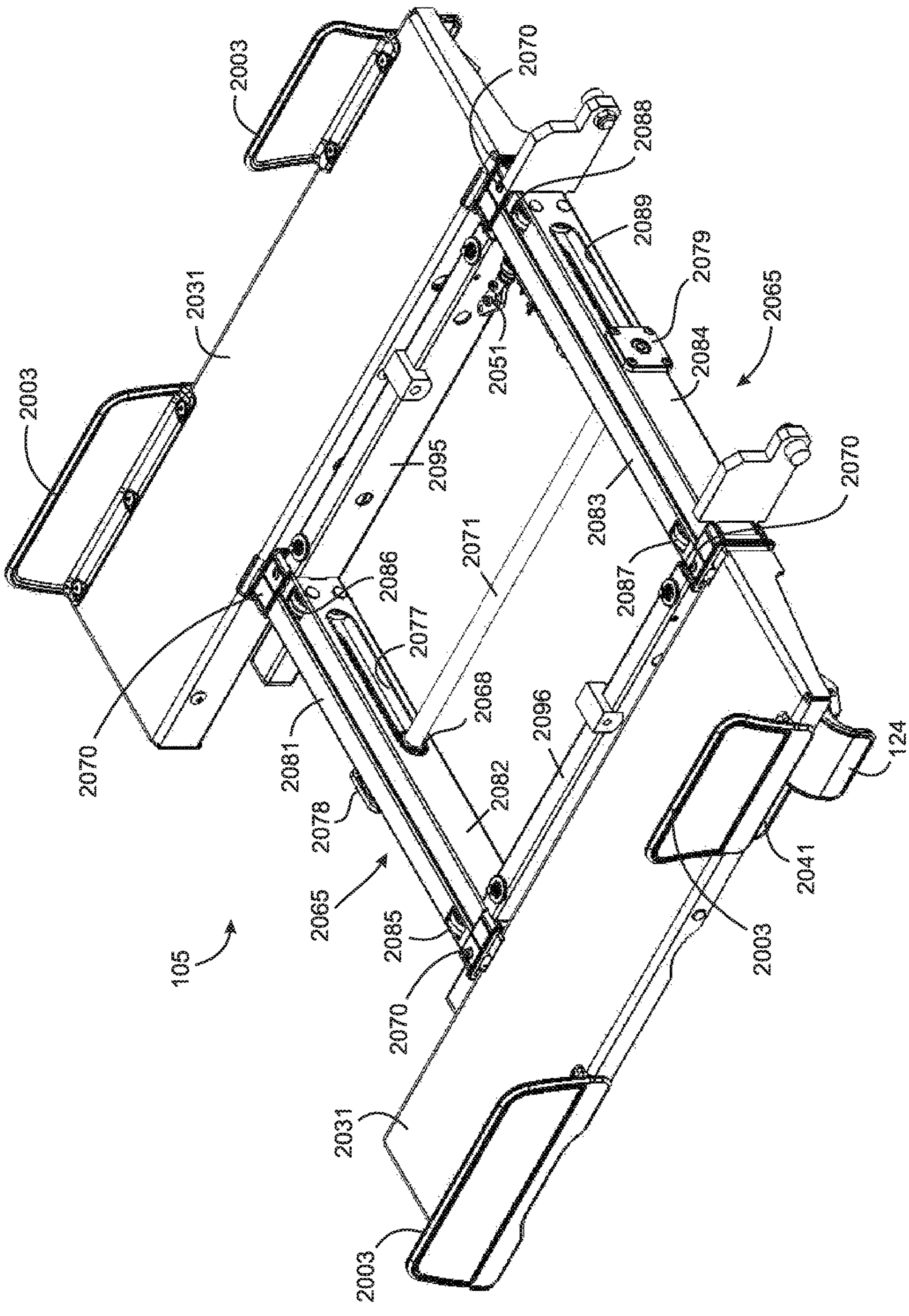
FIG. 21 is a plan perspective view of a head deck of the patient support deck of FIG. 17 showing elements for expanding and latching the head deck of the adjustable deck.
Figure 22:
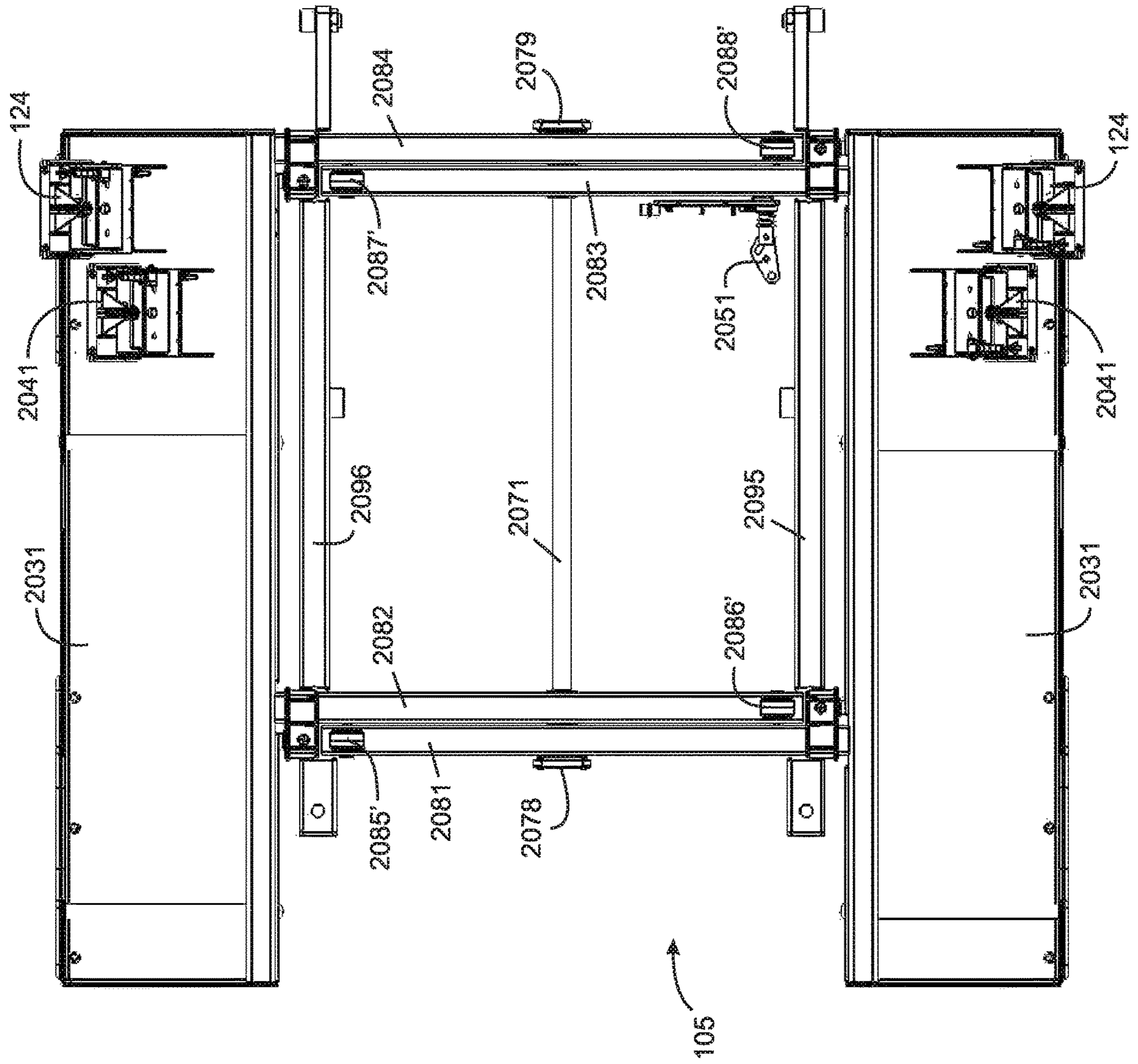
FIG. 22 is a bottom view of the FIG. 21.
Figure 23:
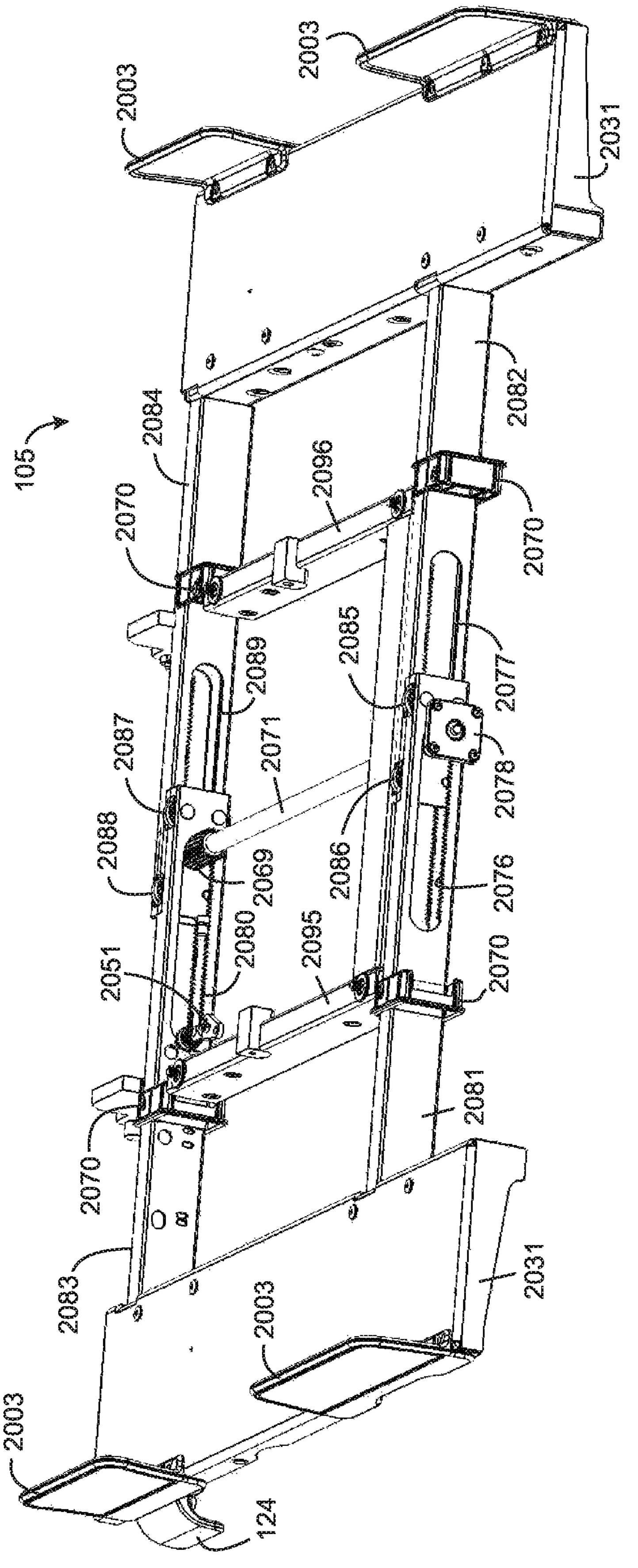
FIG. 23 shows the head deck of FIG. 21 expanded to a more expanded third width.

Comparison of FIG. 21 to FIG. 23 illustrates the difference in configuration of the extension cross-members 2081, 2082, 2083, 2084 between the standard first width and the expanded third width of the head deck 105. At the standard first width (FIG. 21), the through-apertures of adjacent extension cross-members may be nearly aligned laterally, whereas at the expanded third width (FIG. 23) the through-apertures may be substantially less aligned than at the standard first width.

Figure 24:
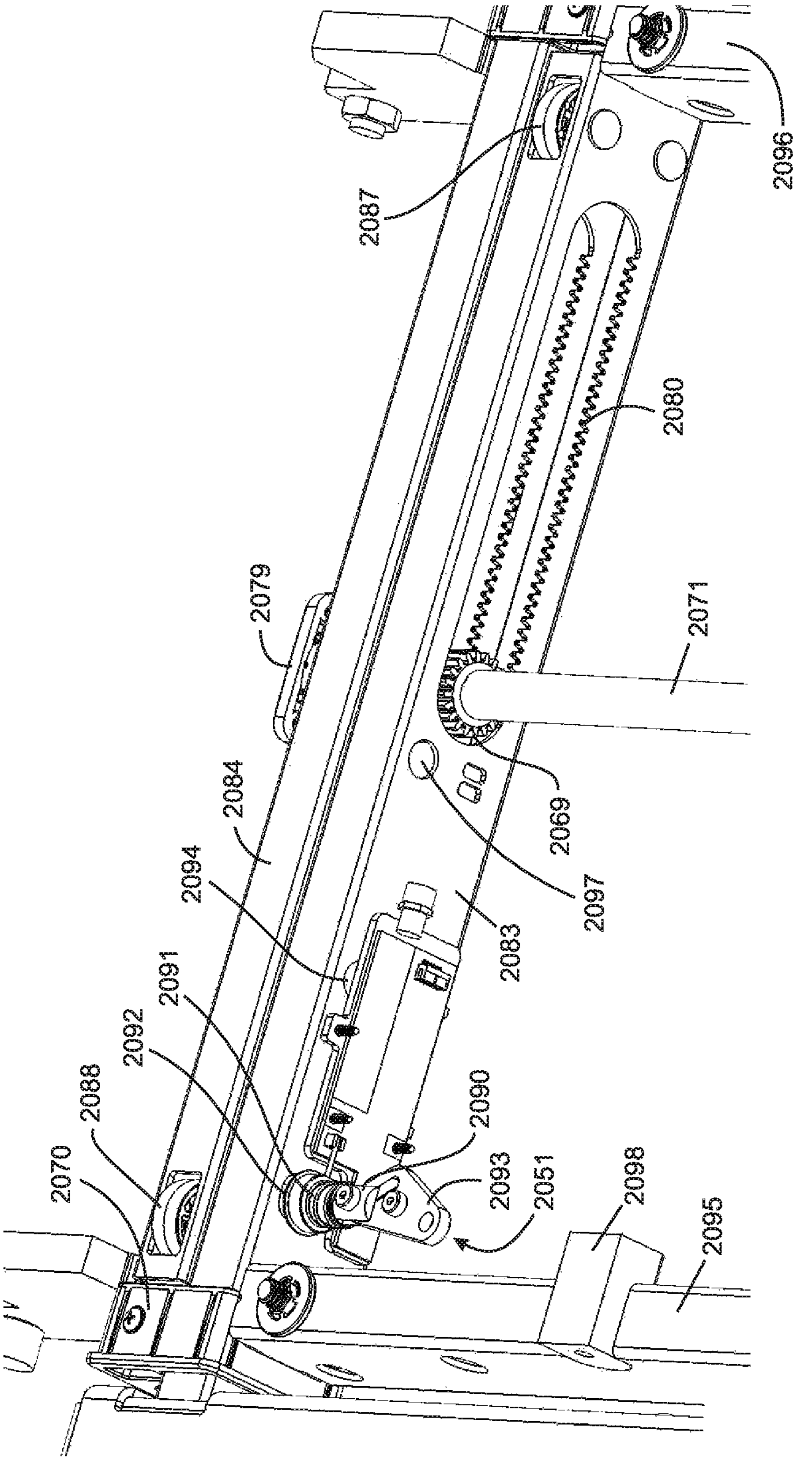
FIG. 24 is a magnified view of a rack and pinion mechanism and latching mechanism for expanding the head deck shown in FIG. 21.
Figure 25:
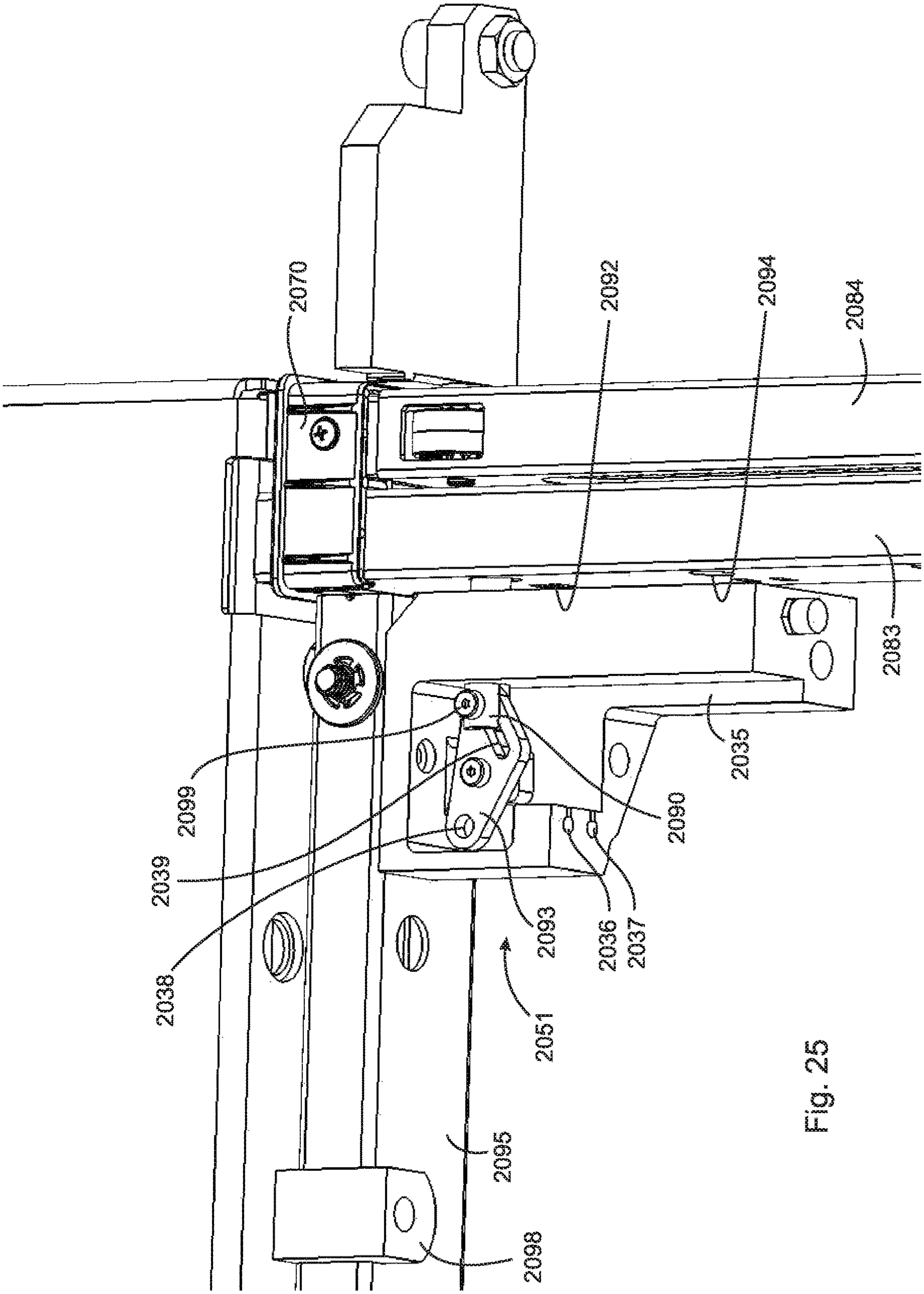
FIG. 25 is a magnified view of the latching mechanism shown in FIG. 24 illustrating a latch mount for the latching mechanism.

FIG. 24 and FIG. 25 provide more detail of the head deck extension latch mechanism 2051. The head deck extension latch mechanism 2051 may comprise a spring-loaded pin 2090 loaded in a wrap spring 2091 housed in extension latch housing 2035, the pin 2090 biased by the spring 2091 toward the extension cross-member 2083 through an aperture (not shown) in the latch housing 2035. When the spring-loaded pin 2090 is aligned with an aperture 2092 in the extension cross-member 2083, the pin 2090 is forced into the aperture 2092 by the spring 2091. Because the latch housing 2035 may be fixedly mounted to longitudinal supporting strut 2095 and the housing tube 2061 (not shown in FIG. 24 and FIG. 25), which do not move with the extension cross-member 2083, the extension cross-member 2083 may be prevented from moving when the pin 2090 is engaged in the aperture 2092. The head deck extension latch mechanism 2051 may further comprise a lever 2093 connected to the pin 2090 by a linking pin 2099 through an arcuate slot 2039 in the lever 2093. A cable (not shown) attached to aperture 2038 of the lever 2093 and threaded through cable groove 2036 and cable guide 2098 may be attached at the other end to the head deck extension handle 2041. Another cable (not shown) also attached to the aperture 2038 of the lever 2093 may be threaded through cable groove 2037 and another cable guide on longitudinal supporting strut 2096 terminating at the head deck extension handle on the other side of the head deck. Activating the latch release structure on the head deck extension handle 2041 pulls the cable causing the lever 2093 to pivot in turn pulling the spring-loaded pin 2090 out of the aperture 2092. The extension cross-member 2083 may now be permitted to move and lateral movement of the extension cross-member 2083 brings the spring-loaded pin 2090 into alignment first with aperture 2094 in the extension cross-member 2083. Releasing the pin 2090 into the aperture 2094 locks the extension cross-member 2083 into place at the second width position. If the extension cross-member 2083 was allowed to move until the spring-loaded pin 2090 aligned with aperture 2097, releasing the pin 2090 into the aperture 2097 locks the extension cross-member 2083 into place at the expanded third width position. Holding the deck extension handle 2041 keeps the spring-loaded pin 2090 retracted, while releasing the deck extension handle 2041 allows the spring 2091 to bias the pin 2090 toward the cross-member apertures 2092, 2094 or 2097.

Figure 26:
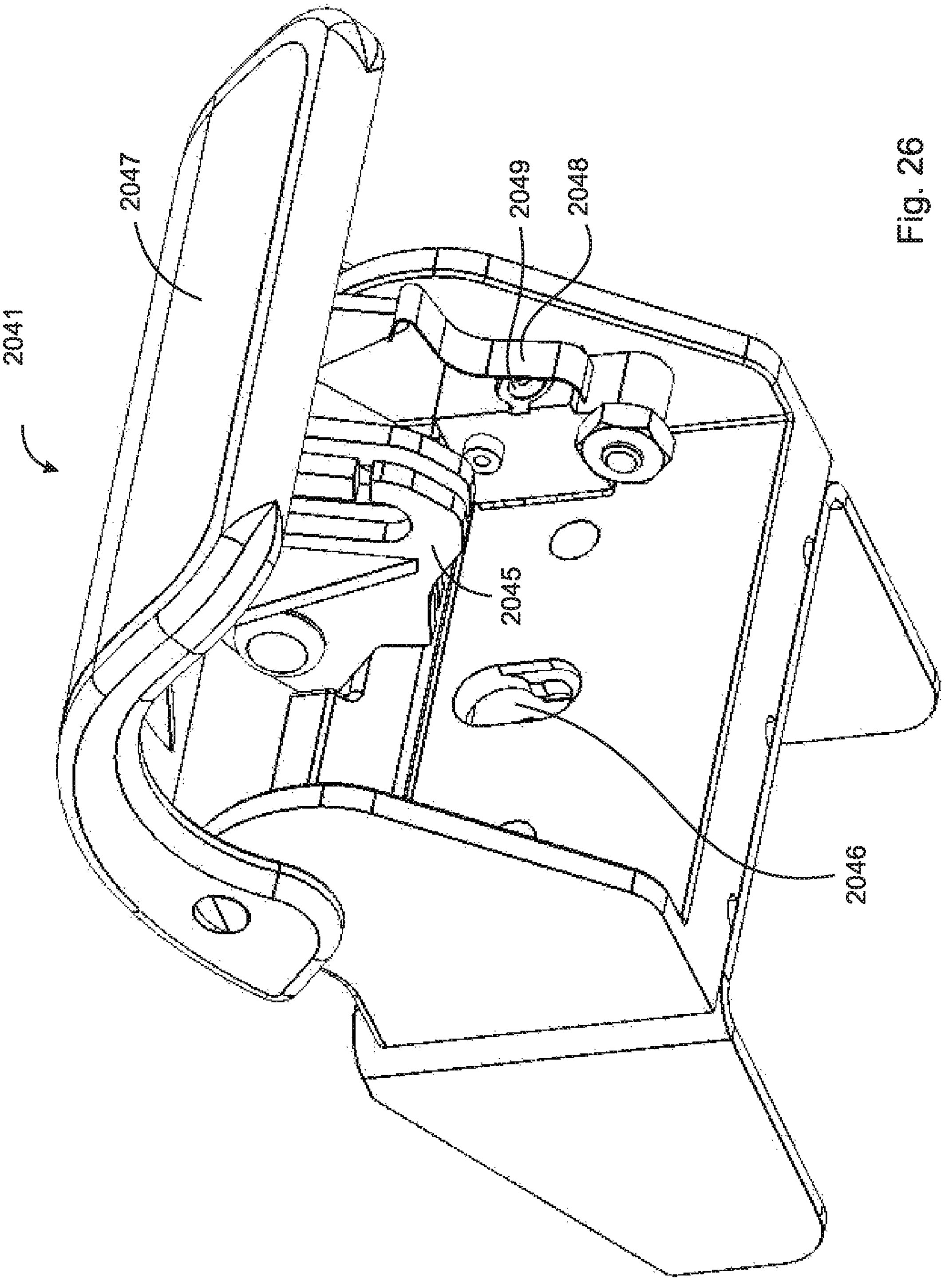
FIG. 26 is perspective view of a deck extension handle for releasing the latching mechanism shown in FIG. 25.

With reference to FIG. 26, the head deck extension handle 2041 is shown comprising manual latch release structure 2045 having an aperture to which the cable (not shown) is connected, the cable being fed through aperture 2046 in the deck extension handle 2041. Pulling up on handle portion 2047 pulls the cable and releases the head deck extension latch mechanism by pulling the spring-loaded pin out of the aperture in the extension cross-member. Alternatively or additionally, the head deck extension handle 2041 may provide an electric switch for electrically locking/unlocking the extension latch mechanism. The electric switch may comprise a spring-leaf electrical contact 2048 and a button electrical contact 2049. Pushing down on handle portion 2047 brings the spring-leaf electrical contact 2048 into electrical contact with the button electrical contact 2049, which completes a circuit and sends a signal to a solenoid associated with the spring-loaded pin to pull the pin out of the aperture in the extension cross-member. The signal may be sent through wires or wirelessly.

To facilitate access to under-components of the patient support, easily removable and remountable deck panels are desirable. Such access may be required for servicing under-components of the patient support or to retrieve debris or other items that have become lodged under the deck panels. Further, in combination with the extending deck features described above, it may be desirable to use a larger deck panel when the width of the deck is adjusted to wider positions. Therefore, deck panels that may be readily interchanged are desirable.

Figure 27A:
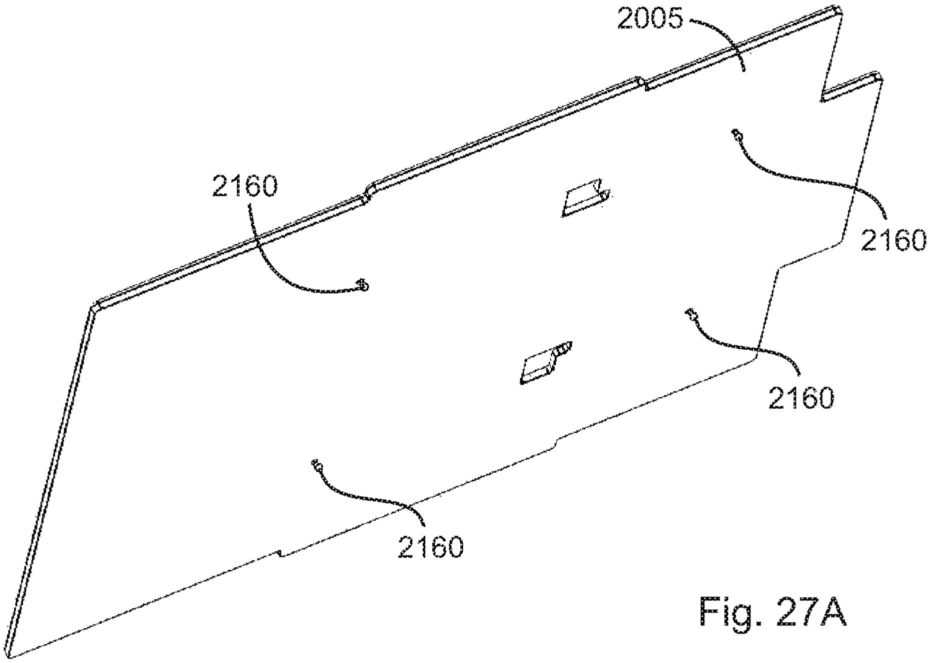
FIG. 27A is a perspective view of an underside of a head deck panel showing protruding ball studs.
Figure 27B:
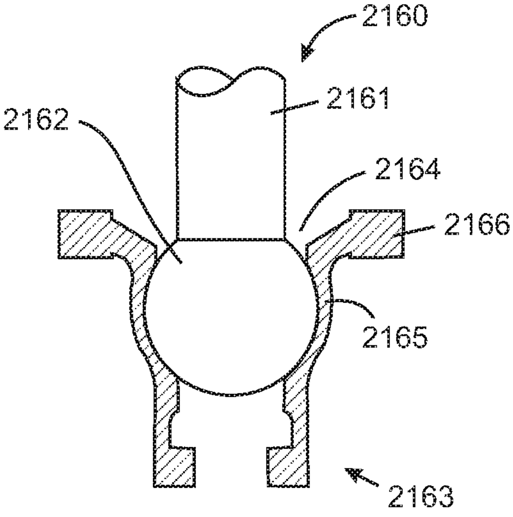
FIG. 27B is a sectional view of a ball and socket connection for connecting deck panels to a deck.

With reference to FIG. 27A and FIG. 27B, easily removable and remountable deck panels may be achieved with the use of ball and socket connectors. An underside of the head deck panel 2005 as shown in FIG. 27A may comprise protruding ball studs 2160 secured in the deck panel 2005. Securing the ball stud may be accomplished, for example, by gluing a stud 2161 of the ball stud 2160 in an aperture in the underside of the deck panel 2005 or by threadably engaging a threaded stud with mating threads in an aperture in the deck panel 2005. A similar arrangement may be employed with the other deck panels of the patient support. Corresponding sockets 2163 for receiving balls 2162 of the ball studs 2160 may be mounted on or in apertures on longitudinal or transverse supporting struts of the deck. The sockets 2163 may be mounted in such a way that the deck panel can only be secured in place when it is in the correct orientation on the deck.

With specific reference to FIG. 27B, when mounting the deck panel on the deck, the ball 2162 of the ball stud 2160 may be aligned with an aperture 2164 in the corresponding socket 2163 and then pressed into an annular ball receiver 2165. The annular ball receiver 2165 may be arcuately-shaped to conform to the shape of the ball 2162. The diameter of the ball 2162 may be slightly larger than the diameter of the aperture 2164 and deformation of the ball 2162, the annular ball receiver 2165 or both permits ingress of the ball 2162 into the annular ball receiver 2165. Engagement of the ball 2162 within the arcuately-shaped annular ball receiver 2165 frictionally secures the ball 2162 in the ball receiver 2165. The lower part of the socket 2163 including the ball receiver 2165 may be disposed on one side of an aperture in a supporting strut of the deck, while an upper lip 2166 engages with the surface of the supporting strut on the other side of the aperture to prevent the socket 2163 from sliding completely through the aperture in the supporting strut. An outer bulge in the ball receiver 2165 together with the upper lip 2166 may secure the socket 2163 in the aperture in the supporting strut. To remove the deck panel from the deck, sufficient upward force may be applied to the deck panel to force the ball 2162 out of the ball receiver 2165, which is permitted by deformation of the ball 2162, the annular ball receiver 2165 or both. One or both of the ball 2162 or ball receiver 2165 may be made of resilient material (e.g. an elastomer) that permits some deformation. Preferably, the entire socket 2163 is made of a resilient material.

Figure 28A:
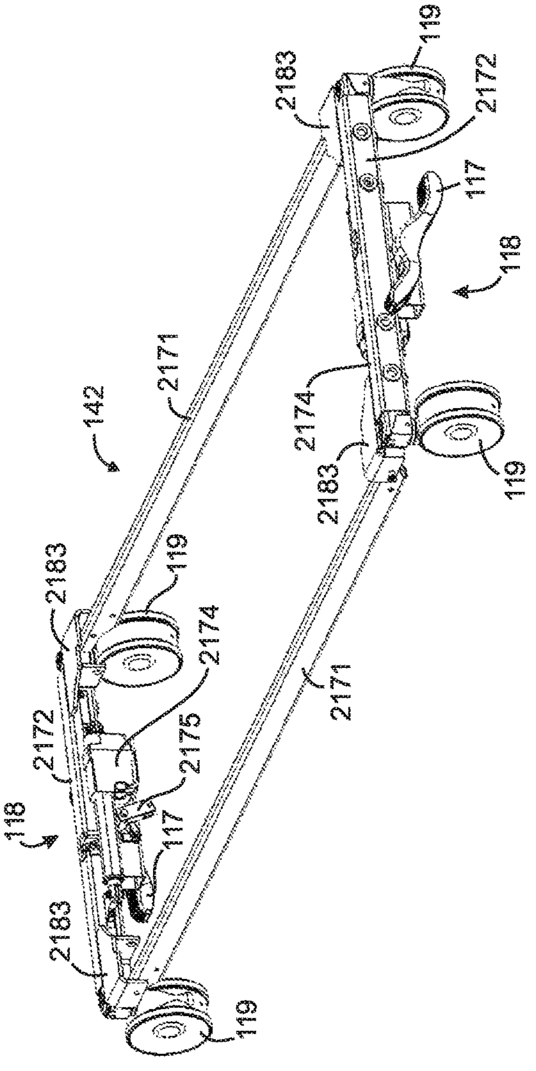
FIG. 28A is a perspective view of a caster frame in a fully retracted position for a standard first width deck.
Figure 28B:
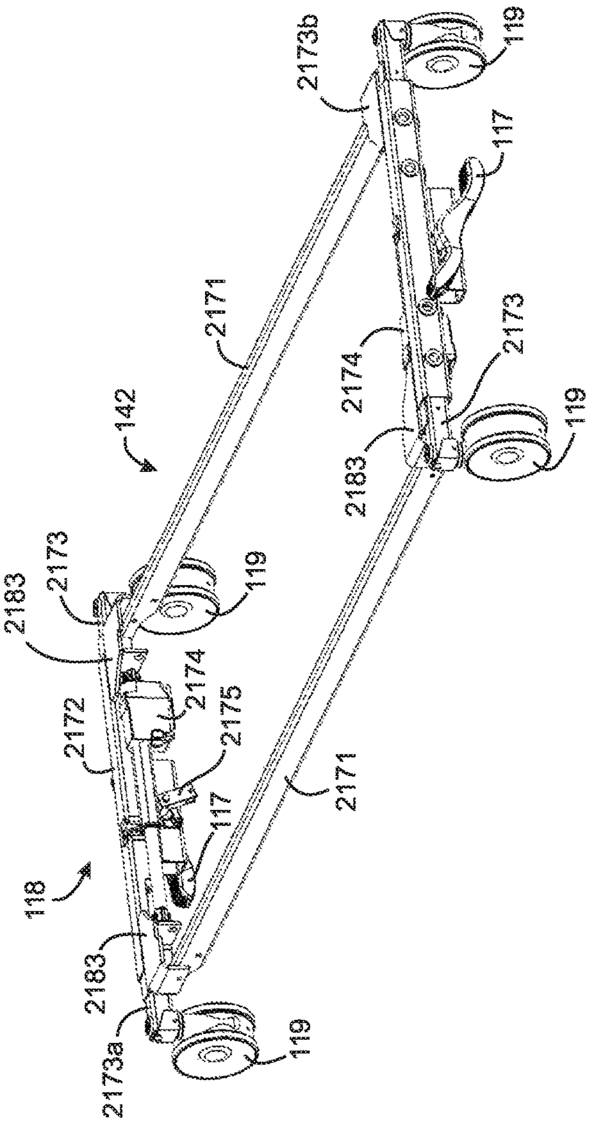
FIG. 28B is a perspective view of the caster frame of FIG. 28A in an expanded position.
Figure 30A:
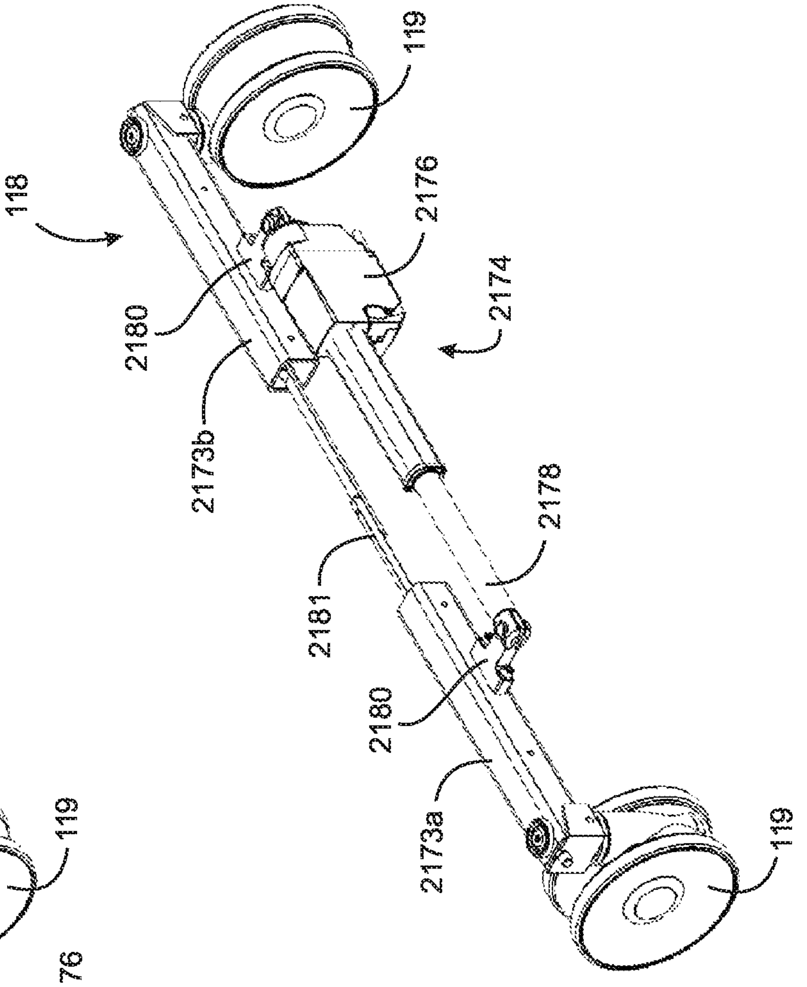
FIG. 30A and FIG. 30B are close-up views of one end of the caster frames of FIG. 28A and FIG. 28B, respectively, specifically showing how inner caster extension slide tubes are disposed in relation to an actuator that drives the inner caster extension slide tubes.
Figure 30B:
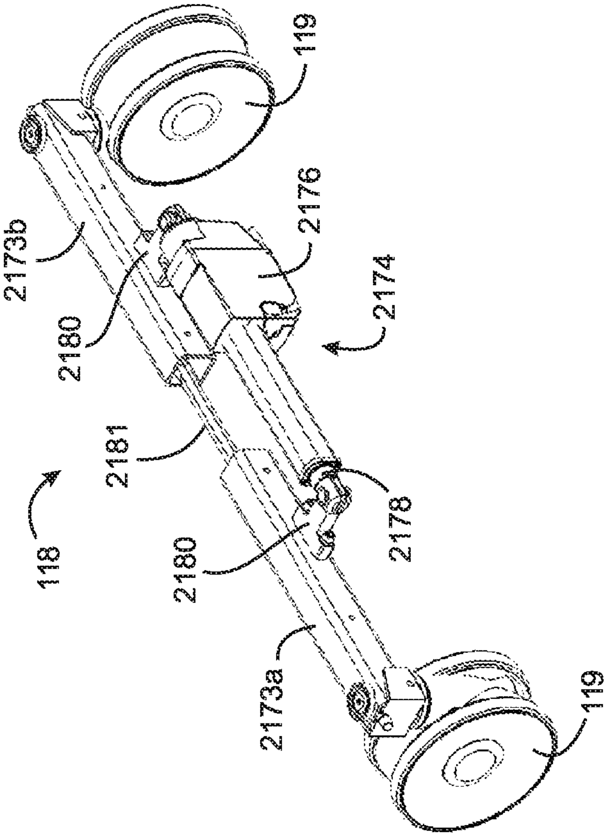

In order to accommodate the extending deck features and to distribute the patient load more evenly over the casters when the deck is in a wider position, it would be desirable to have the casters farther apart laterally when the deck is in wider positions. Referring to FIG. 28A and FIG. 28B, perspective views of the caster frame 142 in a fully retracted position for a standard first width deck (FIG. 28A) and in an expanded position (FIG. 28B) are shown. The caster frame 142 may comprise caster frame main rails 2171 extending longitudinally between and linking two caster assemblies 118. The caster assemblies 118 may comprise caster frame cross-members 2172, which may be rectangular tubes that house caster extension slide tubes 2173*a,b*, which are best seen in FIG. 28B. Near the four intersections of the caster frame main rails 2171 and caster frame cross members 2172 are four lower frame support brackets 2183 that support the lower frame (not shown) on the caster frame 142. Each caster frame cross-member 2172 may house left and right caster extension slide tubes 2173*a,b*, the slide tubes 2173*a,b* slidable laterally within the caster frame cross-member 2172. Connecting the left and right caster extension slide tubes 2173*a,b* of each caster assembly 118 may be caster extension actuators 2174. The caster assemblies 118 may be equipped with brake pedals 117 that may be connected to brake lever mechanisms 2175 that may actuate brake control rods 2181 connecting the brake lever mechanisms 2175 to the casters 119. The brake control rods 2181 may extend between the casters 119, the brake control rods 2181 comprising two separate portions to permit expansion with the caster frame as shown in FIG. 30A and FIG. 30B, inside the caster extension slide tubes 2173*a,b*. The caster frame 142 may be mounted on the casters 119 proximate each corner of the caster frame 142.

Figure 29A:
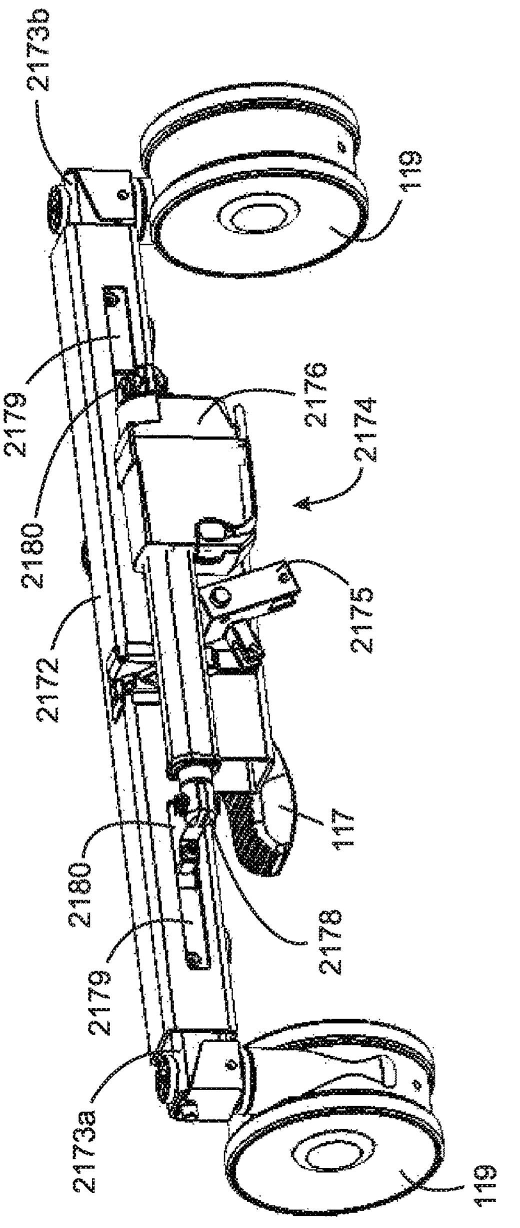
FIG. 29A and FIG. 29B are close-up views of one end of the caster frames of FIG. 28A and FIG. 28B, respectively.
Figure 29B:
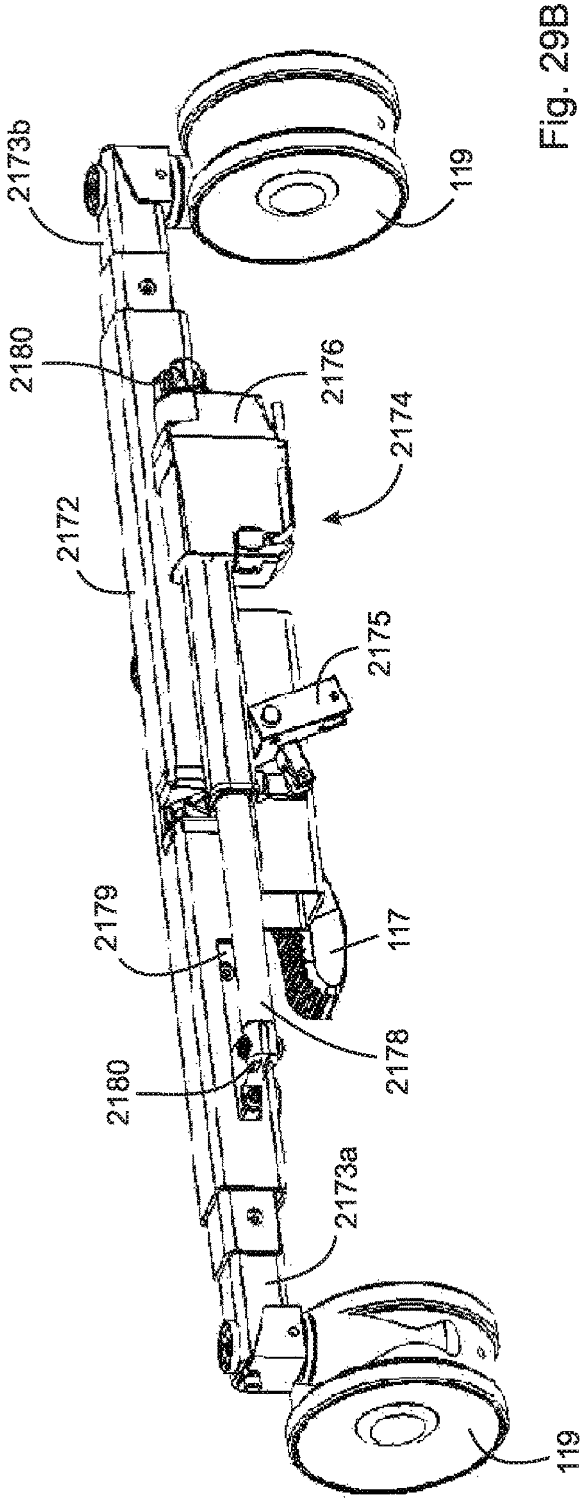

FIG. 29A and FIG. 29B show close-up views of the caster assembly 118 at one end of the caster frame 142 depicted in FIG. 28A and FIG. 28B, respectively. Lateral extension of the casters 119 of a caster assembly 118 may be controlled by the caster extension actuator 2174, which may be an actuator comprising a housing 2176 and a rod 2178. The rod 2178 may be attached to first caster extension slide tube 2173*a*, while the housing 2176 may be attached to second caster extension slide tube 2173*b*. The ends of the caster extension actuator 2174 are attached to the caster extension slide tubes 2173*a,b* through slots 2179 in a side of the caster frame cross-member 2172. The casters 119 are mounted on the caster extension slide tubes 2173*a,b* proximate the ends of the slide tubes 2173*a,b*.

FIG. 30A and FIG. 30B show close-up views of the caster assembly 118 of FIG. 29A and FIG. 29B, respectively, with the caster frame cross-member removed to more clearly show how the caster extension slide tubes 2173*a,b* may be disposed in relation to caster extension actuator 2174 that drives the caster extension slide tubes 2173*a,b*. It can be seen that the end of rod 2178 may be secured to the first caster extension slide tube 2173*a* and the end of the housing 2176 may be secured to the second caster extension slide tube 2173*b* through linkages 2180. It would be evident that the caster extension actuator 2174 may have the reverse orientation whereby the rod 2178 may be secured to the second caster extension slide tube 2173*b* and the end of the housing 2176 may be secured to the first caster extension slide tube 2173*a*.

Starting in the retracted position (FIG. 29A), when the rod 2178 of the caster extension actuator 2174 starts extending one or both of the caster extension slide tubes 2173*a,b* may start to move laterally outwardly because the two caster extension slide tubes 2173*a,b* may be attached to the caster extension actuator 2174, the caster extension slide tubes 2173*a,b* may be slidable within the caster frame cross-member 2172, and the caster extension slide tubes 2173*a,b* may not be attached to each other. It may not be necessary, and may often not be the situation due to unbalanced load, that both caster extension slide tubes 2173*a* and 2173*b* slide in tandem. If the frictional forces on one of the slide tubes are greater than the other, then the slide tube experiencing less frictional first would move laterally before the other slide tube. The other slide tube may move laterally once the first slide tube reached its stop position. The linkages 2180 between the caster extension actuator 2174 and the caster extension slide tubes 2173*a,b* may move within the slots 2179 of the caster frame cross-member 2172 as the caster extension slide tubes 2173*a,b* slide within the caster frame cross-member 2172. The position of the casters 119 in the expanded position is shown in FIG. 29B. As may be seen by the above description, only the caster extension slide tubes 2173*a,b* carrying the casters 119 and the ends of the caster extension actuator 2174 may move when the caster frame is extended laterally. Reversing the direction of the caster extension actuator 2174 reduces the lateral distance between the caster wheels 119. To reduce the chance of binding the mechanism, the casters 119 may be unlocked during width adjustment so that the casters 119 may pivot in order to align the direction of roll in the lateral direction. Software associated with the control circuitry may be used to ensure that the casters 119 are unlocked during movement of the caster extension actuator 2174 when the caster frame is extending or retracting.

Width extension of the deck of the patient support, for example from the first to the second and third widths, creates the potential for entrapment zones between the headboard and the head rails of the patient support. It is therefore desirable to fill-in entrapment zone spaces created when the deck is extended to larger widths, preferably in an easy to use and adjust manner. An indexable, two-piece, split headboard may be provided that can be manually adjusted and/or positioned as required depending on the width of the deck. Each headboard may have two sections, each section having at least one mount that installs on a headboard supporting base. Each section can be removed, adjusted, and replaced as required to suit selected deck width and to maintain required entrapment spacing. Thus, in one embodiment, the width of the extending headboard may be adjusted manually by utilizing two moveable pieces having downwardly extending mounting posts that may be selectively engaged in different post sockets at different positions along a headboard supporting base. No extra gap filler and no sliding parts may be required, making the extendible headboard simpler, safer and/or more robust. In another embodiment, the headboard may be driven by an actuator in which the two-pieces do slide.

Figure 31A:
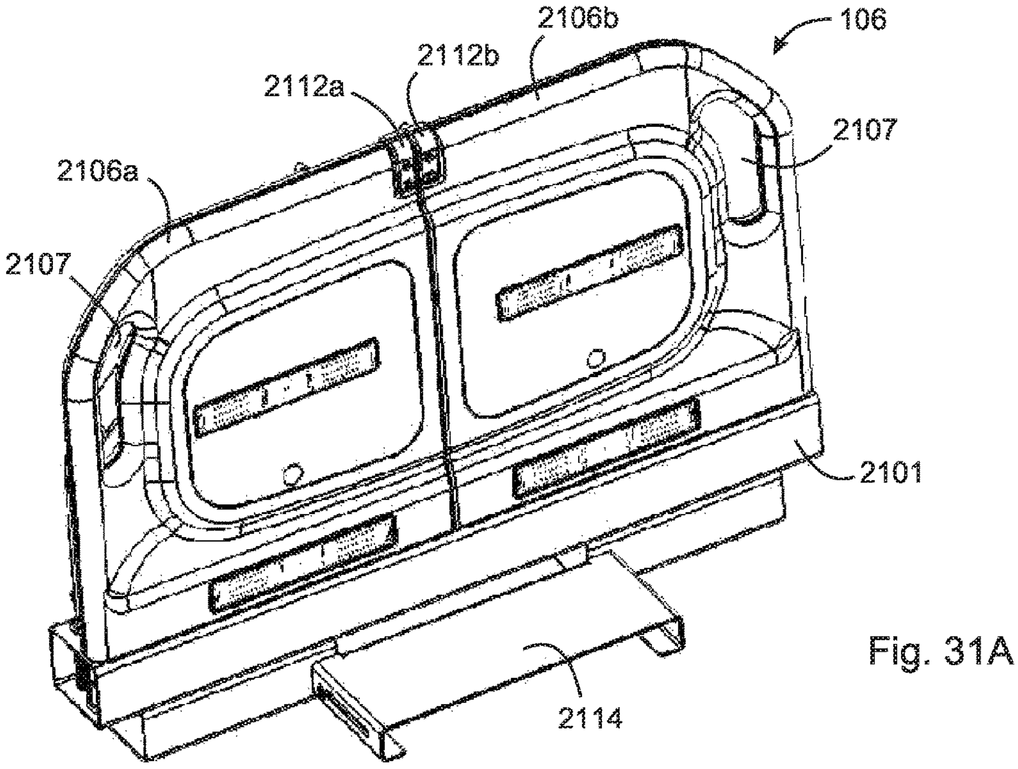
FIG. 31A is a foot end perspective view of an extendible headboard at a standard first width supported on a headboard mounting bracket.
Figure 31B:
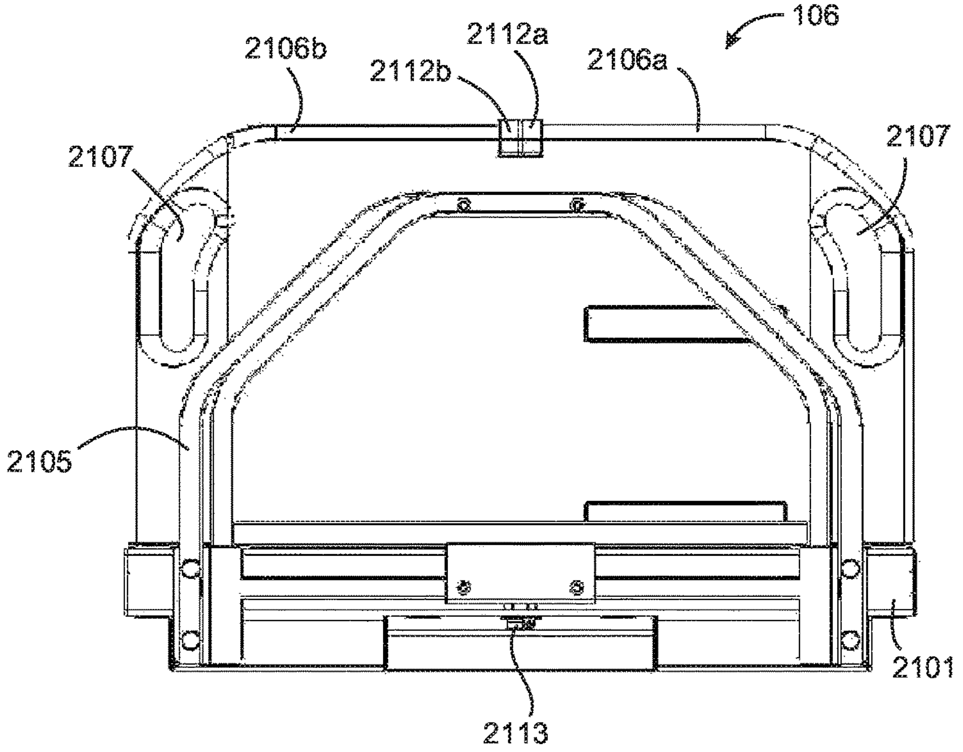
FIG. 31B is a head end view of an extendible headboard at a standard first width supported on a headboard mounting bracket.

FIG. 31A and FIG. 31B depict an extendible headboard 106 at a standard first width supported on a headboard mounting bracket 2101. The headboard mounting bracket 2101 may be supported on headboard insert 2114, which may be supported in the upper frame headboard mount on the upper frame (not shown) at the head end of the patient support. The headboard 106 may have two sections, a first headboard section 2106*a* and a second headboard section 2106*b*, the headboard sections comprising headboard openings 2107, which may be used as handgrips for handling the headboard 106. First and second headboard support clips 2112*a*, 2112*b* may be employed to help secure the sections together at the top and a headboard lock knob 2113 at the bottom may be used to lock the headboard sections 2106*a*, 2106*b* in place.

As shown in FIG. 31C, the headboard 106 may further comprise downwardly depending mounting posts. Any suitable number of mounting posts may be utilized. For example, there may be two laterally spaced-apart mounting posts 2108*a*, 2108*b* depending downwardly from the first headboard section 2106*a* and two laterally spaced-apart mounting posts 2109*a*, 2109*b* depending downwardly from the second headboard section 2106*b*. Referring to FIG. 31D, a trapeze 2105 may be mounted on the headboard mounting bracket 2101 to provide a mount for accessories such as oxygen tanks, IV bags and others.

Still referring to FIG. 31D, the headboard mounting bracket 2101 may also comprise two or more post sockets for receiving the mounting posts. As shown in FIG. 31D, the headboard mounting bracket 2101 may comprise ten post sockets 2110*a-e*, 2111*a-e*, five posts sockets 2110*a-e* on one side of the headboard mounting bracket for receiving mounting posts 2108*a*, 2108*b* and five posts sockets 2110*a-e* on the other side of the headboard mounting bracket for receiving mounting posts 2109*a*, 2109*b*. On a given side of the headboard mounting bracket 2101, the post sockets may be spaced apart so that the distance from one post socket to the post socket two over may be substantially the same as the distance between the mounting posts. For example, the distance between posts sockets 2111*e* and 2111*c* may be substantially the same as the distance between the mounting posts 2109*a*, 2109*b*. The headboard 106 may be mounted on the headboard mounting bracket 2101 by aligning the mounting posts with the post sockets and sliding the mounting posts into the post sockets. The headboard 106 may be removed from the headboard mounting bracket 2101 by pulling headboard 106 up so that the mounting posts slide out of the post sockets.

Figure 32:
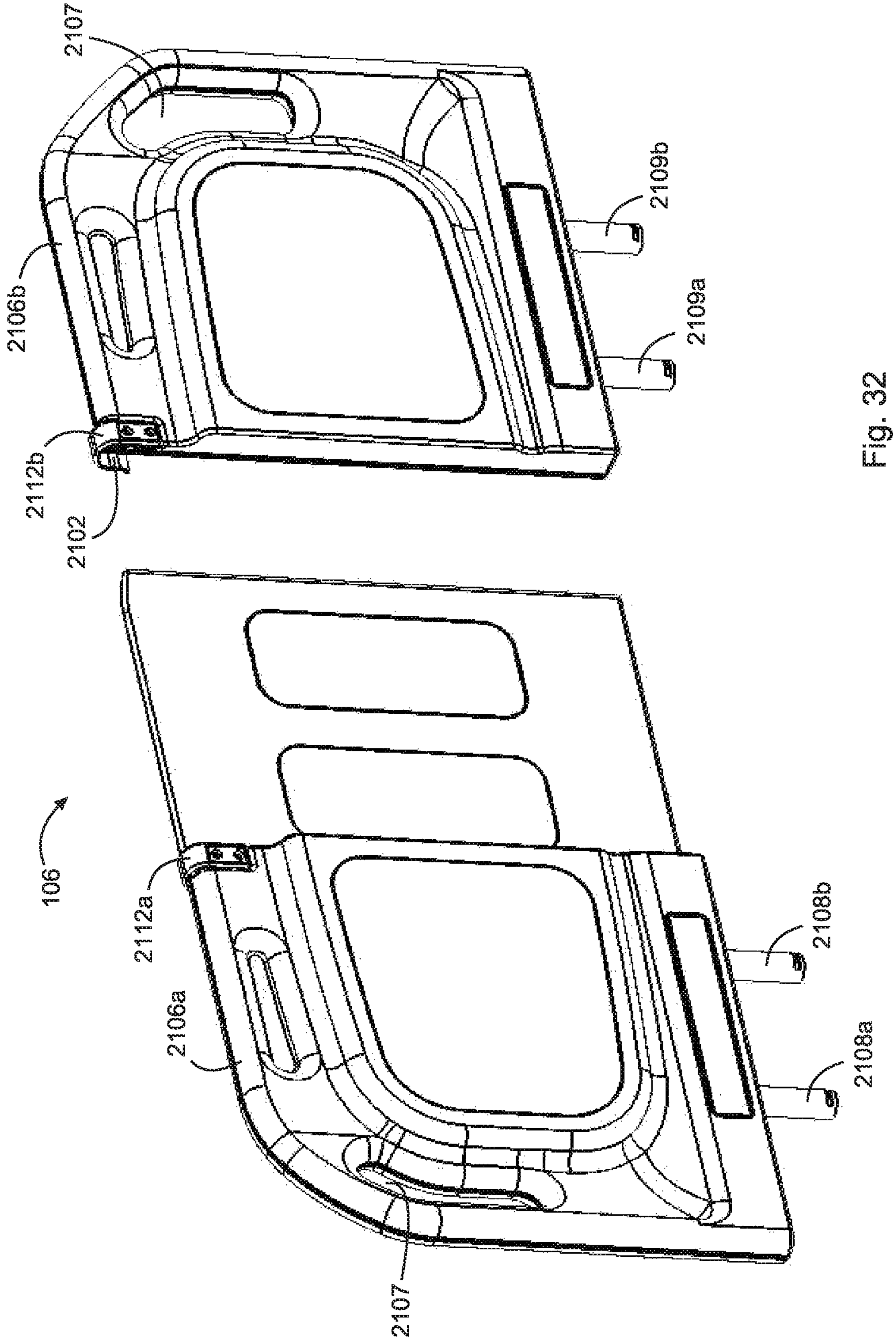
FIG. 32 is a perspective view of the extendible headboard shown in FIG. 31 split apart into two headboard sections.

As further illustrated in FIG. 32, the headboard 106 may be physically separated into two parts, the first headboard section 2106*a* and the second headboard section 2106*b*. The first headboard section 2106*a* may be monolithic having first and second sides where the second side may be of smaller dimensions than the first side. The second headboard section 2106*b* may be monolithic having first and second sides both of which are of smaller dimension that the first side of the first headboard section 2106*a*, where the second side of the second headboard section 2106*b* may comprise the second headboard support clip 2112*b* having an opening 2102 in which the second side of the first headboard section 2106*a* may be retained. The dimensions of the second side of the first headboard section 2106*a* may permit the second side of the first headboard section 2106*a* to fit through the opening in 2102 to thereby engage with the second headboard support clip 2112*b*. The second side of the first headboard section 2106*a* may be thus retained within the second headboard support clip 2112*b* at any lateral position along the second side of the first headboard section 2106*a*, thereby effectively permitting adjustment of the width of the entire headboard 106 depending on the lateral distance between the edge of the second side of the second headboard section 2106*b* and the edge of the first side of the first headboard section 2106*a*. Alternatively, the features of the first and second headboard sections 2106*a*, 2106*b* may be reversed. One or both of the headboard sections 2106*a*, 2106*b* may be hollow.

Figure 33A:
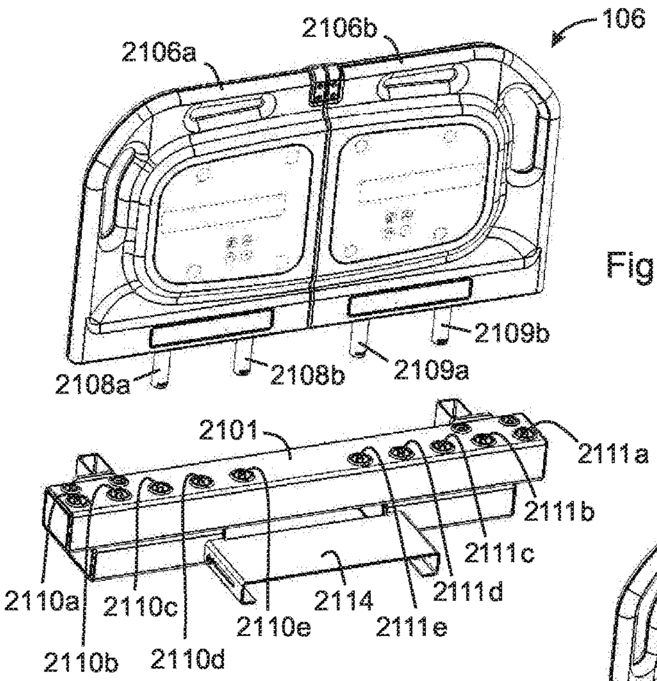
FIG. 33A is a perspective view showing an extendible headboard separate from a headboard mounting bracket at a standard first width.
Figure 33B:
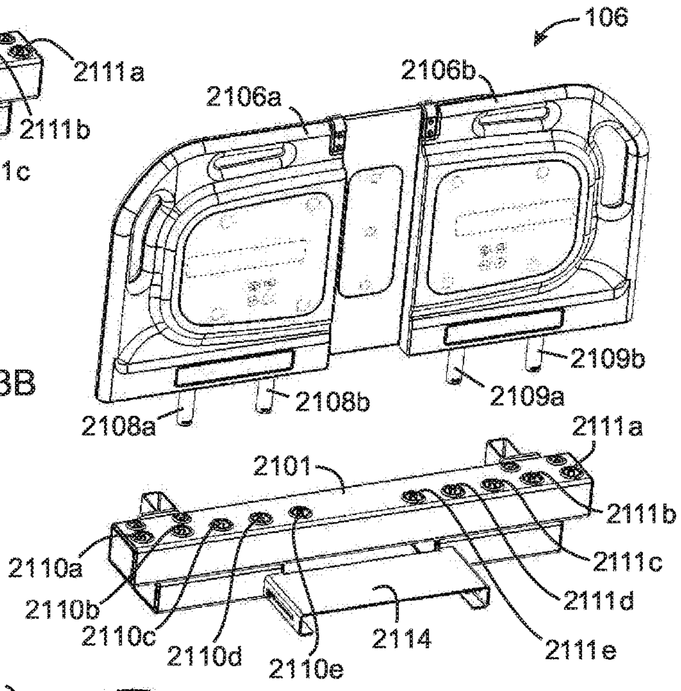
FIG. 33B is a perspective views showing an extendible headboard separate from a headboard mounting bracket at an intermediate second width.
Figure 33C:
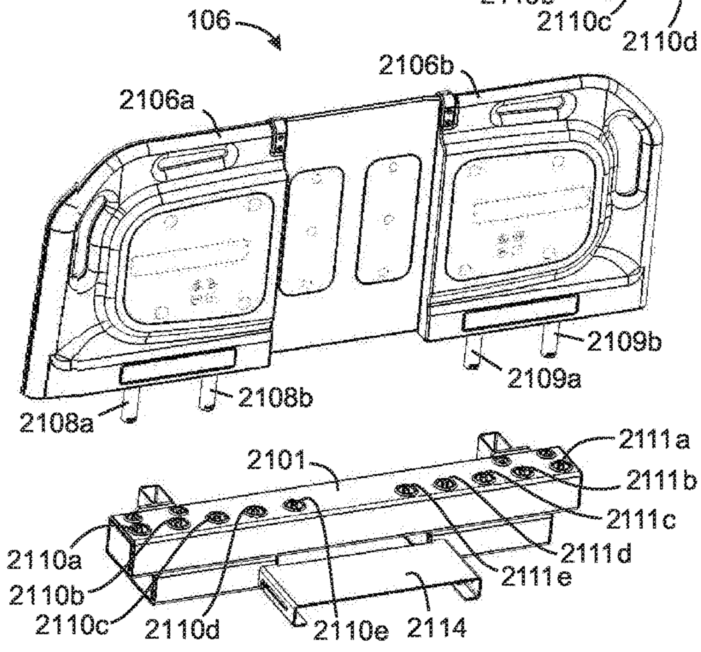
FIG. 33C is a perspective view showing an extendible headboard separate from a headboard mounting bracket at a third more expanded width.
Figure 34A:
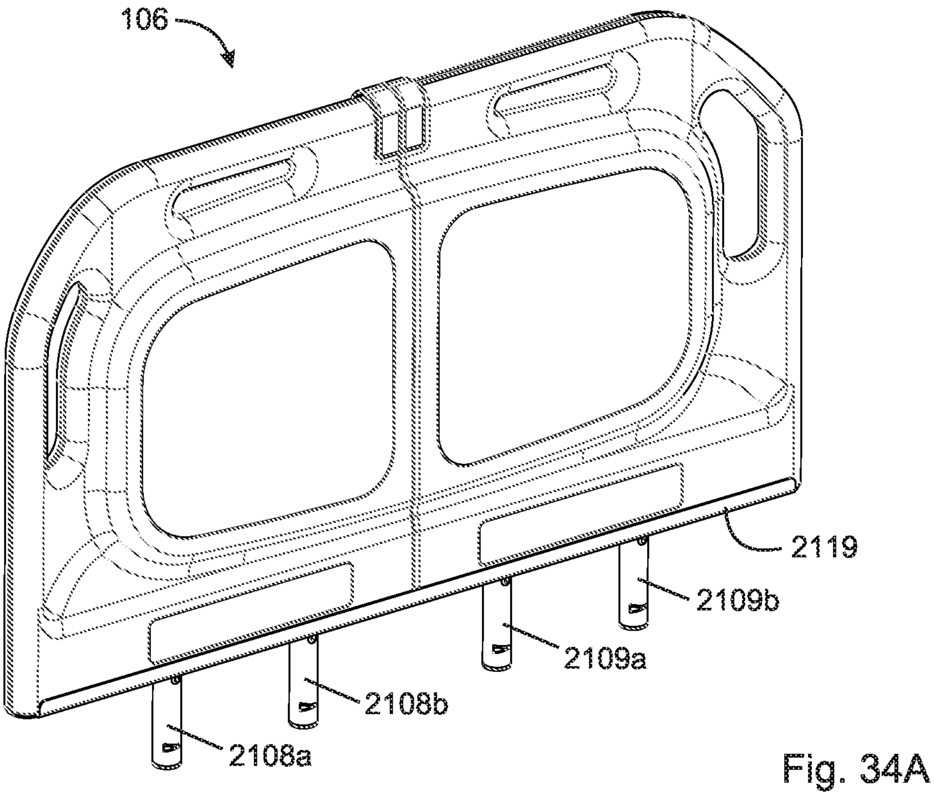
FIG. 34A is a perspective view of an alternate embodiment of an extendible headboard in which the headboard sections sit in a headboard tray, the headboard being shown at a narrowest width.
Figure 34B:
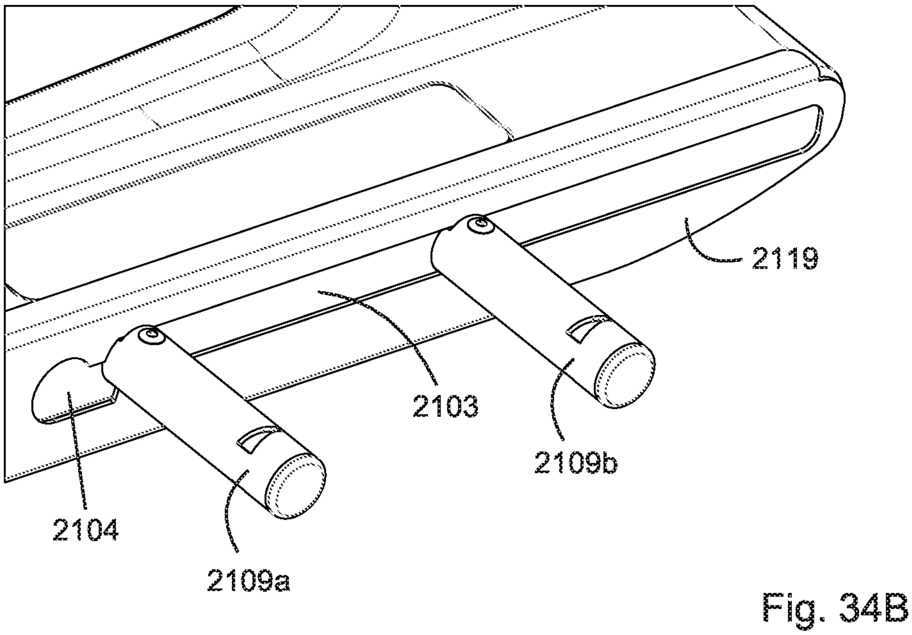
FIG. 34B is a magnified view of 34A showing detail of the tray.
Figure 34C:
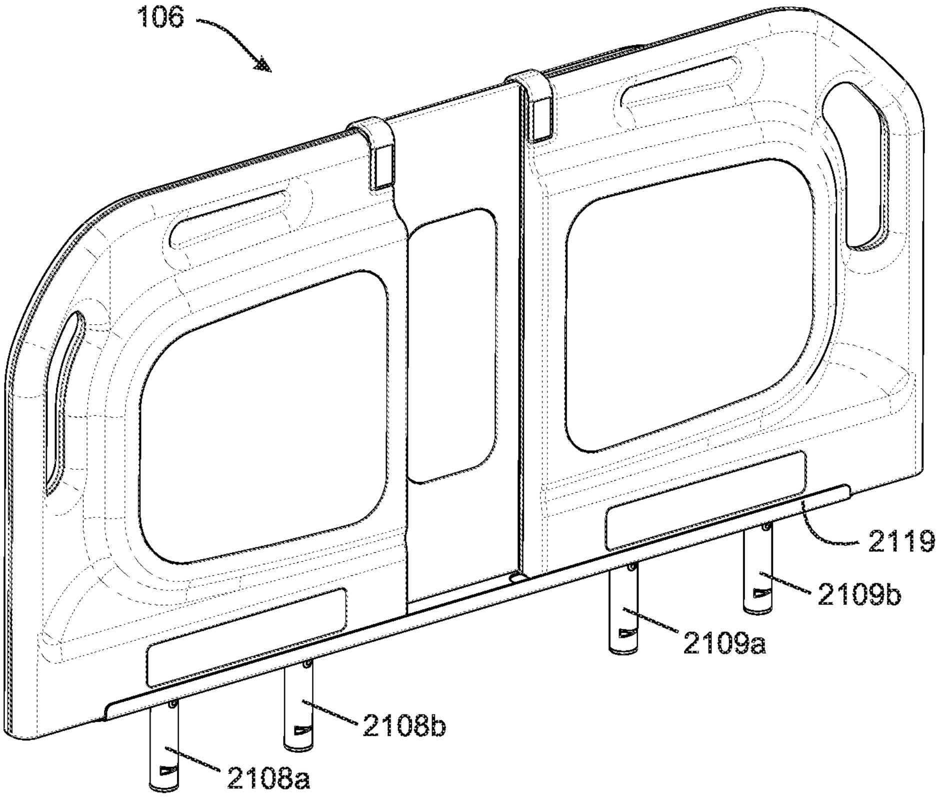
FIG. 34C is a perspective view of the extendible headboard of FIG. 34A at an intermediate width.
Figure 34D:
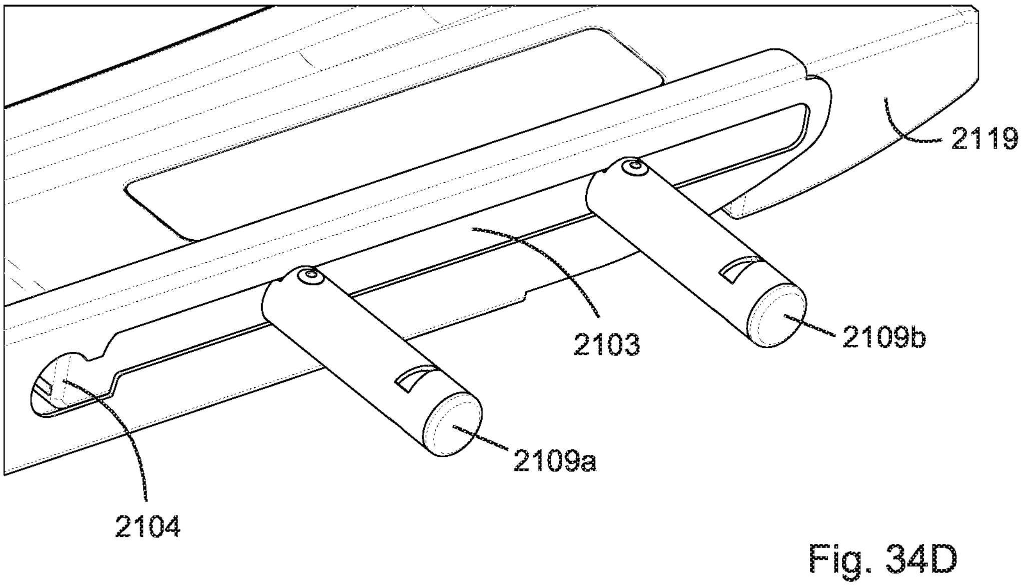
FIG. 34D is a magnified view of 34C showing detail of the tray.
Figure 34E:
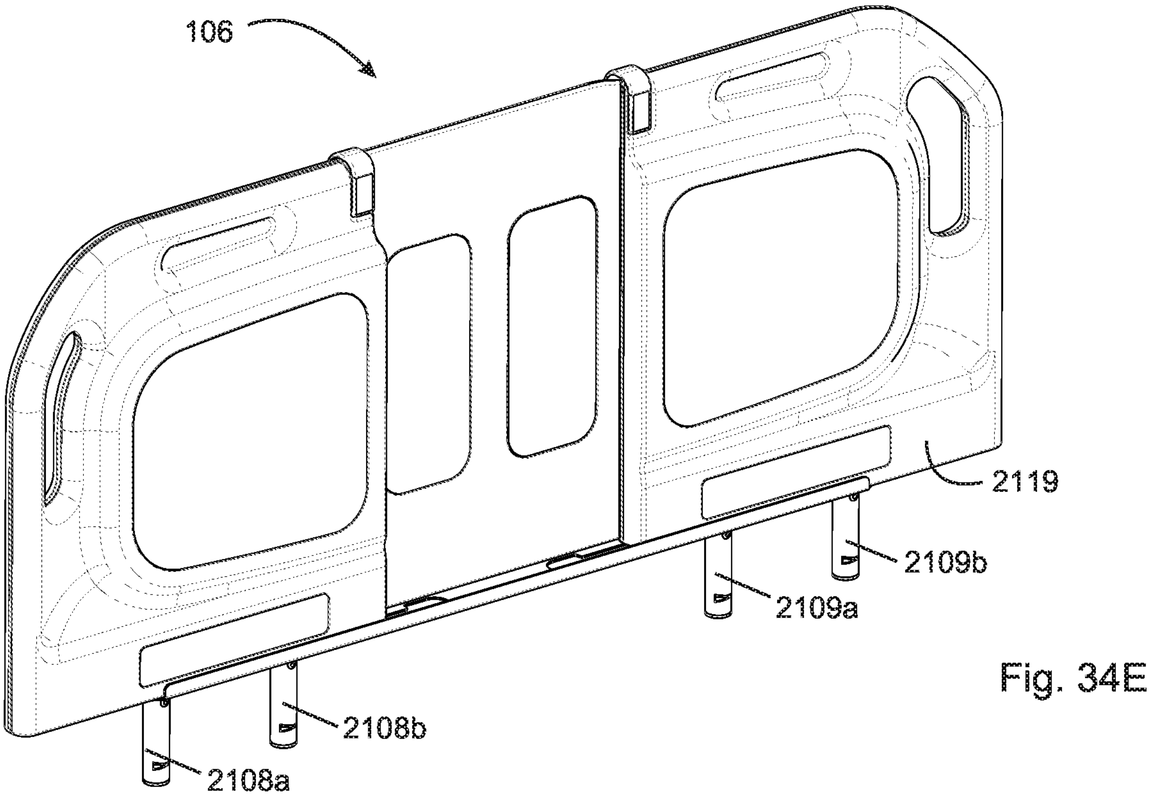
FIG. 34E is a perspective view of the extendible headboard of FIG. 34A at a widest width.
Figure 34F:
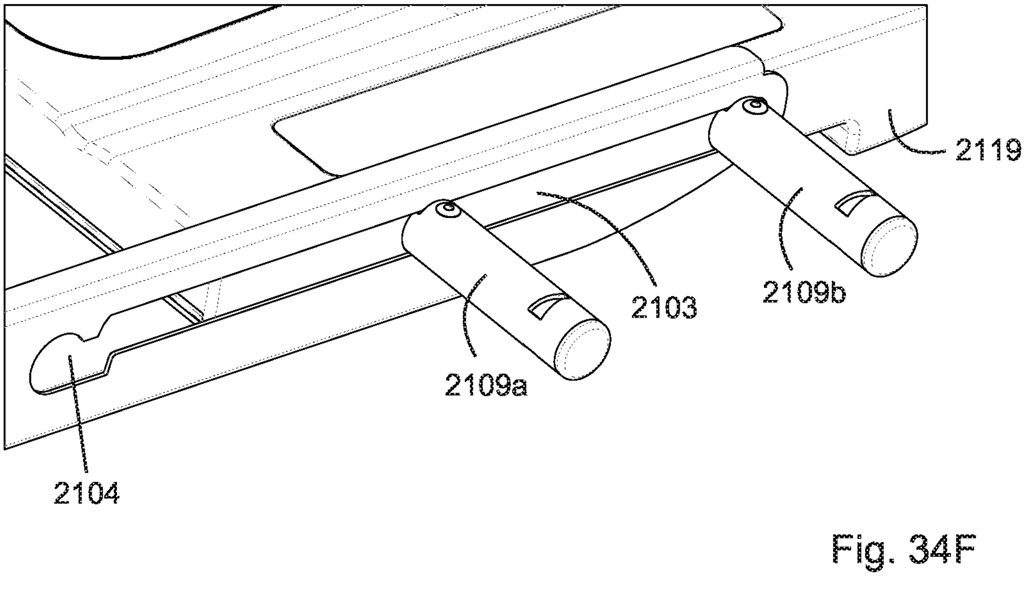
FIG. 34F is a magnified view of 34E showing detail of the tray.

FIG. 33 illustrates the headboard 106 at three different widths: the first standard width (FIG. 33A); the second intermediate width (FIG. 33B); and, the third more expanded width (FIG. 33C). At the first width, the mounting posts 2108*a* and 2108*b* of the first headboard section 2106*a* may be aligned with, slid into and retained in post sockets 2110*c* and 2110*e* toward the middle of the headboard mounting bracket 2101, while the mounting posts 2109*a* and 2109*b* of the second headboard section 2106*b* may be aligned with, slid into and retained in post sockets 2111*e* and 2111*c* toward the middle of the headboard mounting bracket 2101. At the first width, the second side of the first headboard section 2106*a* may not be visible from the foot end. To adjust the headboard 106 to the second or third widths, the two sections 2106*a*, 2106*b* of the headboard may be lifted out of the sockets and the mounting posts 2108*a,b* and 2109*a,b* may be slid into sockets towards the outer sides of the headboard mounting bracket 2101. Thus, at the second position (FIG. 33B), the mounting posts 2108*a* and 2108*b* of the first headboard section 2106*a* may be aligned with, slid into and retained in post sockets 2110*b* and 2110*d*, respectively, while the mounting posts 2109*a* and 2109*b* of the second headboard section 2106*b* may be aligned with, slid into and retained in post sockets 2111*d* and 2111*b*, respectively. At the third position (FIG. 33B), the mounting posts 2108*a* and 2108*b* of the first headboard section 2106*a* may be aligned with, slid into and retained in post sockets 2110*a* and 2110*c*, respectively, while the mounting posts 2109*a* and 2109*b* of the second headboard section 2106*b* may be aligned with, slid into and retained in post sockets 2111*c* and 2111*a*, respectively. The second side of the first headboard section 2106*a* becomes visible from the foot end of the patient support at the second and third widths. The two headboard sections 2106*a*, 2106*b* therefore always provide an effective block at every width effectively eliminating any entrapment zone. The two headboard sections 2106*a*, 2106*b* provide a blocking structure which is as effective as a similar single-piece blocking structure of the same dimension. Because the horizontal channel 2102 in the second headboard section 2106*b* covers and retains the upper edge of the second side of the first headboard section 2106*a*, it may be more effective to remove the second headboard section 2106*b* first and replace it last when adjusting the width of the headboard 106.

With reference to FIG. 34A, FIG. 34B, FIG. 34C, FIG. 34D, FIG. 34E and FIG. 34F, in an alternate embodiment of an extendible headboard 106, a headboard tray 2119 is provided in which the headboard 106 sits and that spans both headboard sections. The downwardly depending mounting posts 2108*a*, 2108*b*, 2109*a* and 2109*b* protrude through a slot 2103 in the tray 2119. Each downwardly depending mounting post 2108*a*, 2108*b*, 2109*a* and 2109*b* are provided with slots in which an inner edge of the tray 2119 may engage. The slot 2103 comprises an enlarged opening 2104 that provides a post-install position at which the mounting posts 2108*a*, 2108*b*, 2109*a* and 2109*b* may be inserted through the tray 2119. Expanding the headboard 106 from the narrowest width (FIG. 34A-B) to the widest width (FIG. 34E-F) is accomplished by simply sliding the headboard sections apart while the sections are in the tray 2119. The tray serves to keep the headboard sections together during width adjustment to facilitate handling the headboard 106. Otherwise, the operation of the headboard 106 is as described in the previous embodiment.

Figure 35A:
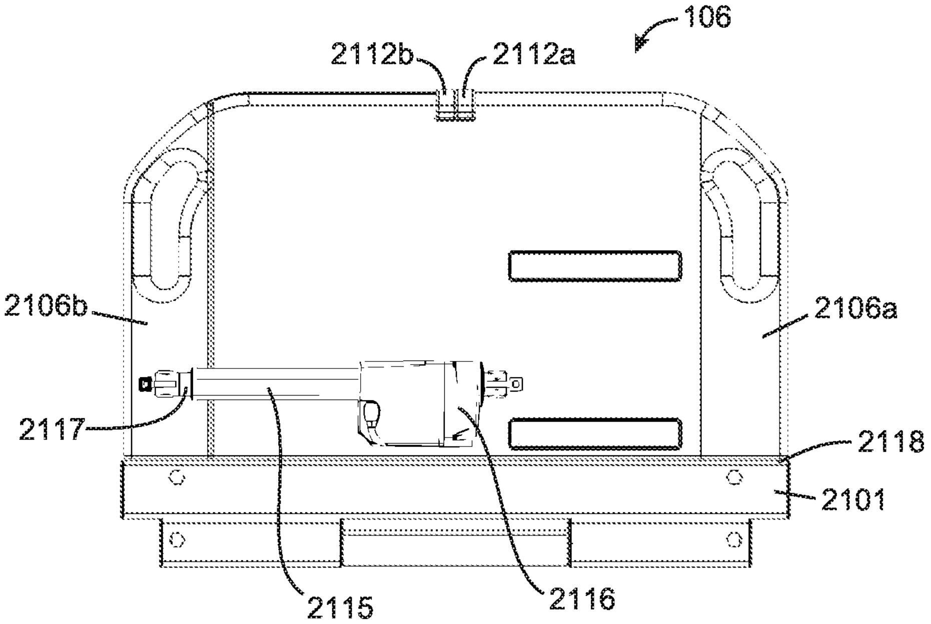
FIG. 35A is an end view of an alternate embodiment of an extendible headboard in which headboard extension is driven by an actuator, where the headboard at a standard first width.
Figure 35B:
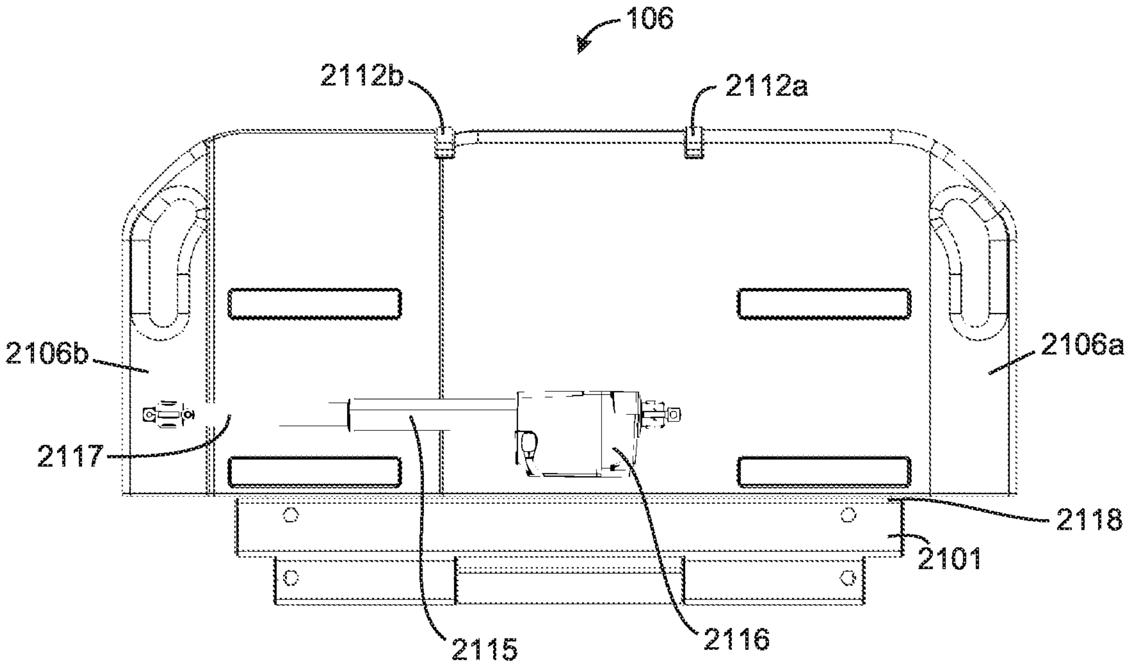
FIG. 35B is an end view of an alternate embodiment of an extendible headboard in which headboard extension is driven by an actuator, where the headboard at a more expanded width.

With reference to FIG. 35A and FIG. 35B, in an alternate embodiment of an extendible headboard 106, the first headboard section 2106*a* and the second headboard section 2106*b* may be driven apart or together by a length extendible headboard actuator 2115. A base 2116 of the headboard actuator 2115 may be secured to a head end side of the first headboard section 2106*a* and a rod 2117 of the headboard actuator 2115 may be secured to a head end side of the second headboard section 2106*b*. It is evident that the base 2116 and rod 2117 of the headboard actuator 2115 may be secured to the other headboard sections if desired. Extension and retraction of the headboard actuator 2115 may cause the headboard sections 2106*a*, 2106*b* to move laterally in opposite directions with respect to each other in a headboard track 2118 in a top surface of the headboard mounting bracket 2101. First and second headboard support clips 2112*a*, 2112*b* may still be employed to help secure the sections together at the top.

Many patient supports have a mattress length of about 84 inches (7 feet), the mattress extending from the headboard to the footboard. Sometimes it is desirable to extend the length of the patient support to accommodate extra tall patients. Prior art methods of extending patient support length generally involve extending the length of the deck, particularly the foot deck. Extending the length of the deck can involve complicated mechanical arrangements, often requiring actuator driven features. Less complicated and less mechanically intensive arrangements for extending the length of the patient support are therefore desirable.

Rather than extending the length of the patient support by changing the length of the deck platform, the length of the patient support from headboard to footboard may be integrated into a removable footboard. By extending the length of the patient support without having to extend the deck, no installation of accessory pieces may be required. Extending the length of the patient support with features associated with a removable footboard permit extending the length by any desired increment. For example, the removable footboard may be indexable into two or more length positions. In practice, it is often sufficient to be able to accommodate the standard 84 inch length and additional lengths of 88 inches and 92 inches.

Length extension of the patient support may involve moving the footboard longitudinally further away from the headboard. The footboard may be mounted on the patient support through pivoting linkage arms, whereby pivoting of the linkage arms may result in longitudinal movement of the footboard either toward or away from the foot end of the patient support. The pivoting linkage arms may or may not be indexed to certain positions. The pivoting linkage arms may or may not be lockable into place at certain positions. The pivoting linkage arms permit folding allowing for compact design.

FIG. 36A, FIG. 36B, FIG. 37A, FIG. 37B, FIG. 37C and FIG. 37D depict perspective views of a first embodiment of an extendible footboard. Extendible footboard 2120 may comprise mounting posts 2121 mounted on a footboard mounting bracket 2123 of the patient support. Each mounting post 2121 may comprise a lower half, which may be mounted on the patient support, and an upper half 2122, which may be secured to footboard panel 2124. The upper and lower halves of the mounting posts may be separate pieces linked together by linkage arms 2125, 2126. The lower halves of the mounting posts 2121 may be supported by a transverse support plate 2154 in order to keep the mounting posts 2121 aligned with receiving apertures 2155 in the footboard mounting bracket 2123. First linkage arms 2125 may be pivotally mounted on the upper halves 2122 of the mounting posts. Second linkage arms 2126 may be pivotally mounted on the lower halves of the mounting posts 2121. Pivotal mounting of the linkage arms to the mounting posts may be accomplished by having the mounting posts journaled in apertures in the linkage arms with sufficient tolerance between the mounting posts and an edge of the apertures to permit rotation of the linkage arms around the mounting posts. The first and second linkage arms may be pivotally connected to each other by linking pins at pivot points 2127.

Figure 36A:
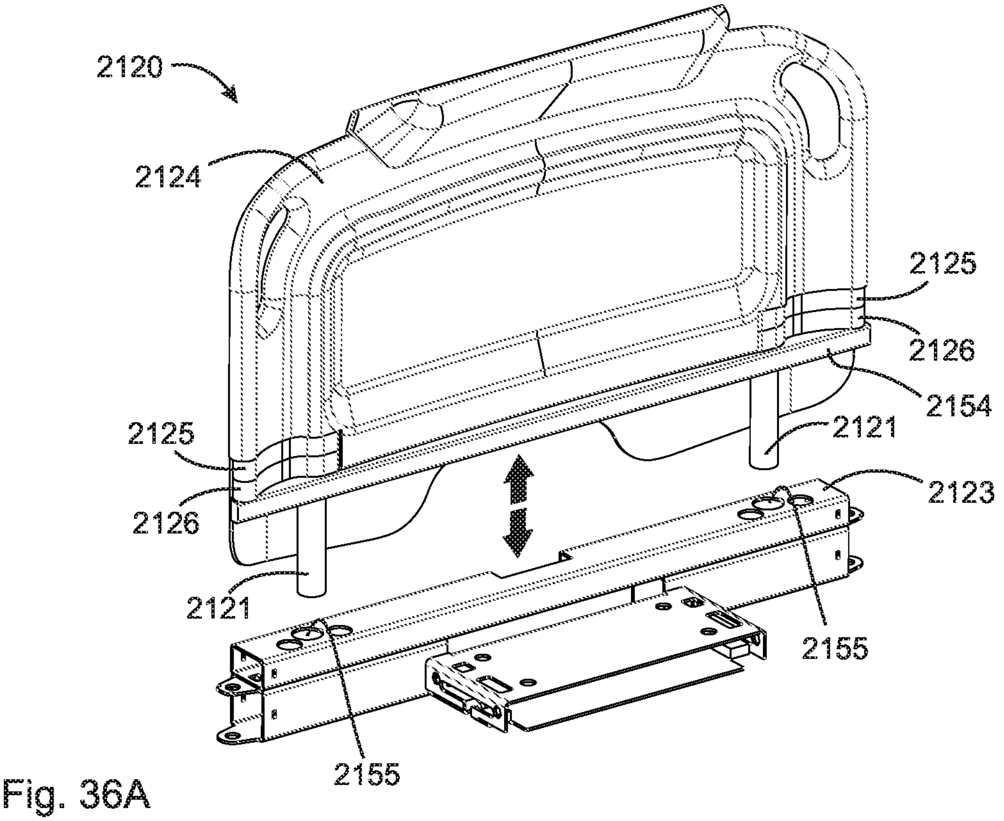
FIG. 36A is a perspective view of a first embodiment of an extendible footboard mountable on a patient support in a retracted position.
Figure 36B:
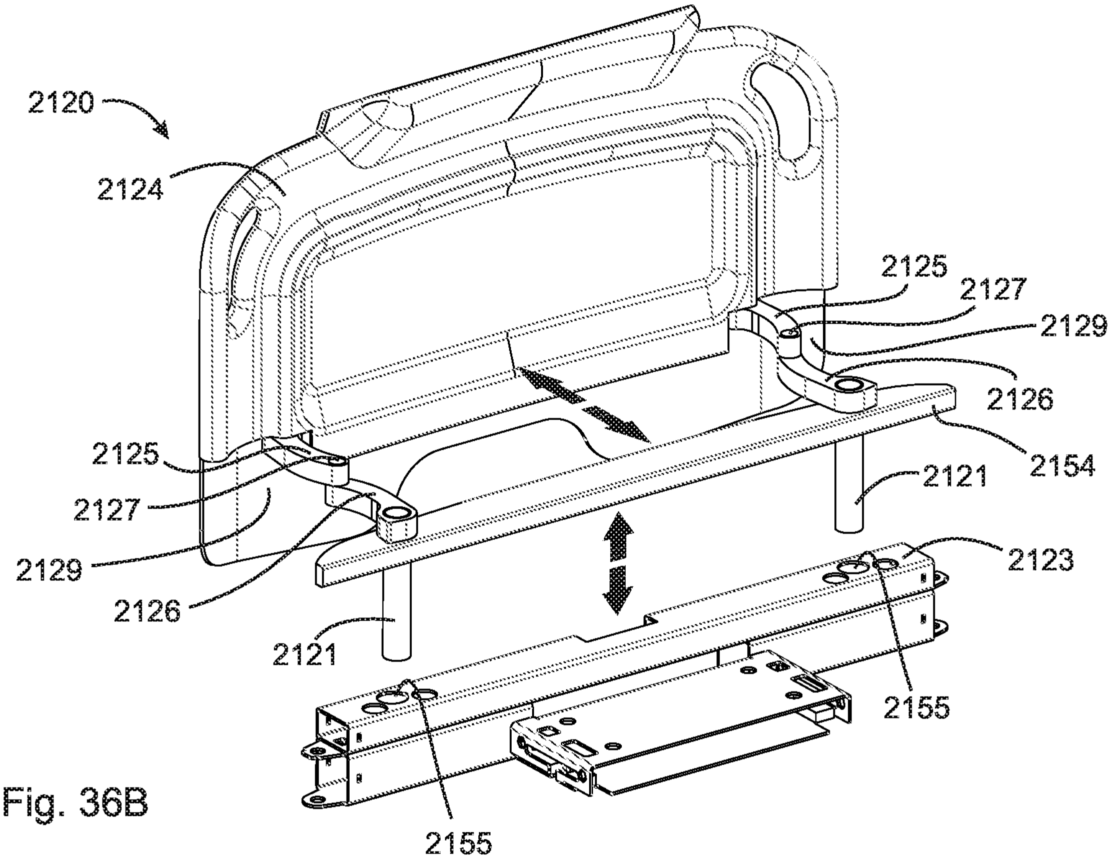
FIG. 36B is a perspective view of a first embodiment of an extendible footboard mountable on a patient support in an extended position.

When the footboard 2120 is in the standard length fully retracted position as seen in FIG. 36A, the linkage arms 2125, 2126 may point substantially laterally and may be folded together and occupy compartments 2129 in the footboard panel 2124 in such a configuration that the upper halves 2122 and lower halves of the mounting posts 2121 are vertically aligned. Spring-loaded locking pins 2128 housed inside the upper halves 2122 of the mounting posts may be biased into hollow portions of the lower halves of the mounting posts 2121 as best seen in FIG. 37B and FIG. 37D. The locking pins 2128 may prevent the footboard 2120 from moving when the footboard is in the fully retracted position. The locking pins 2128 may be connected to a lift bar 2130, for example a mattress pump hanger bracket, such that lifting the lift bar 2130 may lift the locking pins 2128 out of the lower halves of the mounting posts 2121 thereby permitting the footboard panel 2124 to move away from the patient support to a fully extended position as seen in 36B. As the footboard panel 2124 moves, the first and second linkage arms 2125, 2126 unfold pivoting around the upper and lower halves of the mounting posts 2121 and around the linking pins at pivot points 2127 until the linkage arms 2125 and 2126 both point substantially longitudinally. FIG. 37A (back view) and FIG. 37B (front view) show the footboard 2120 with the lift bar 2130 and the locking pin 2128 attached thereto both in a down position, therefore the footboard 2120 in the fully retracted position is locked. FIG. 37C (back view) and FIG. 37D (front view) show the footboard 2120 with the lift bar 2130 and the locking pin 2128 attached thereto both in an up position, therefore the footboard 2120 is unlocked and free to extend.

A locking mechanism, for example a lock bolt at the pivot point 2127, may be employed to prevent the linkage arms 2125, 2126 from pivoting when it is desired to keep the footboard 2120 in the fully extended position, or in any other position intermediate between the standard fully retracted position and the fully extended position. Moving the footboard panel 2124 back toward the foot end of the deck of the patient support may return the linkage arms 2125, 2126 to compartment 2129, thereby aligning the upper and lower halves of the mounting posts 2121 permitting the locking pin 2128 to once again secure the footboard 2120 in the fully retracted position.

FIG. 38A, FIG. 38B, FIG. 38C, FIG. 39A, FIG. 39B and FIG. 39C depict a second embodiment of an extendible footboard. Extendible footboard 2140 may comprise footboard mounting bracket 2143 and footboard panel 2144. The footboard mounting bracket 2143 may be mounted on a footboard insert (not shown) of the patient support. The footboard panel 2144 may be linked to the footboard mounting bracket 2143 by pivoting linkage arms 2145, 2146, 2147. First linkage arms 2145 may be pivotally connected to panel mounting posts 2142 secured to the footboard panel 2144 and to central mounting posts 2148 external to and between the footboard mounting bracket 2143 and footboard panel 2144. Second linkage arms 2146 may be pivotally connected to the footboard mounting posts 2141 secured inside the footboard mounting bracket 2143 and to the central mounting posts 2148. Third linkage arms 2147 may be pivotally connected to indexable mounting posts 2149 inside the footboard mounting bracket 2143 and to the central mounting posts 2148. Pivotal mounting of the linkage arms to all of the mounting posts may be accomplished by having the mounting posts journaled in through channels in the linkage arms with sufficient tolerance between the mounting posts and an edge of the through channels to permit rotation of the linkage arms around the mounting posts. Linkage arms 2146 and 2147 may extend from the central mounting posts 2148 to the footboard mounting posts 2141 and the indexable mounting posts 2149, respectively, through an aperture 2150 in a foot end face of the footboard mounting bracket 2143, because both the footboard mounting posts 2141 and the indexable mounting posts 2149 may be inside the footboard mounting bracket 2143.

Figure 38A:
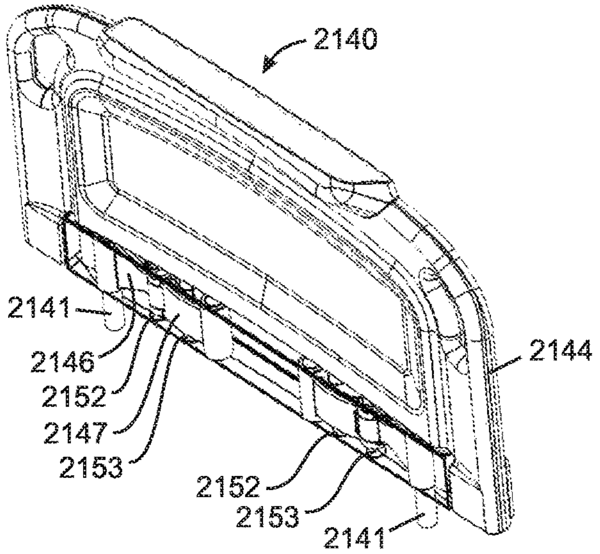
FIG. 38A, FIG. 38B and FIG. 38C are perspective views of a second embodiment of an extendible footboard in a standard 84 inch position (FIG. 38A), an 88 inch position (FIG. 38B) and a 92 inch position (FIG. 38C).
Figure 38B:
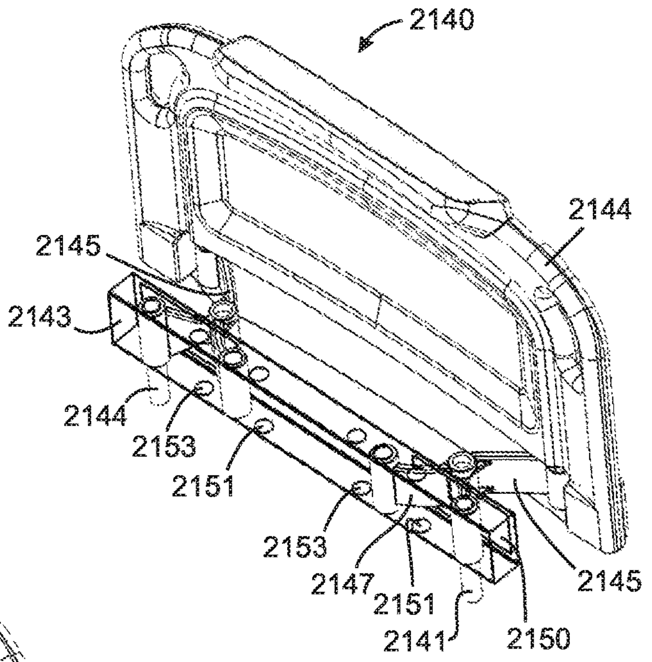
Figure 38C:
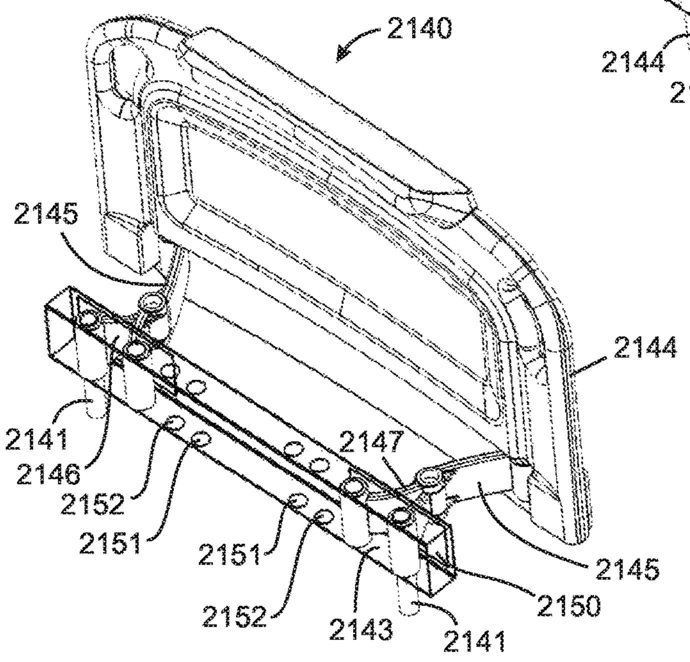
Figure 39A:
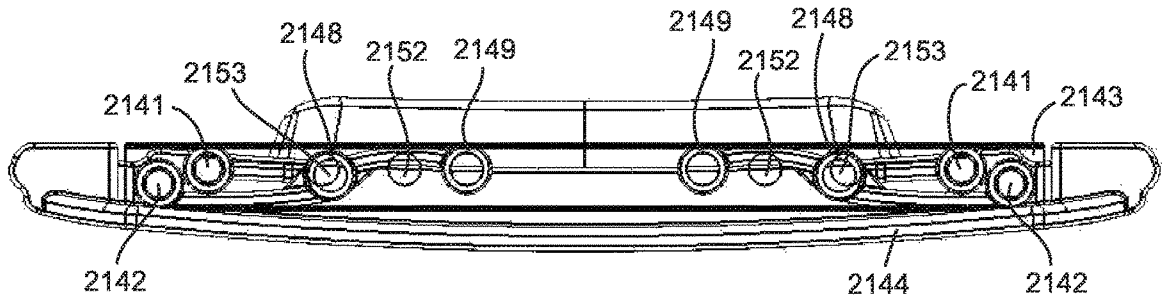
FIG. 39A, FIG. 39B and FIG. 39C are bottom views of the three perspective views shown in FIG. 38.
Figure 39B:
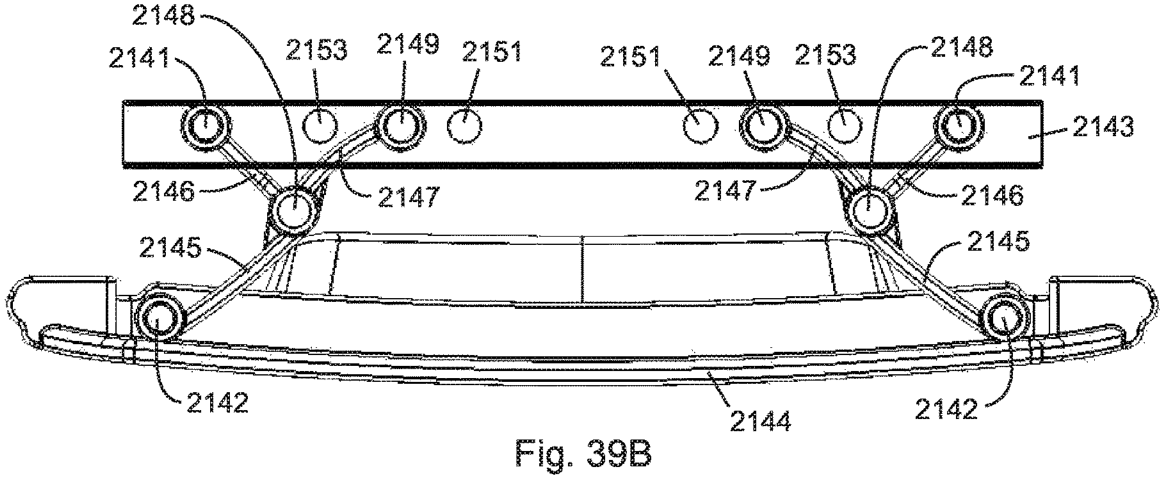
Figure 39C:
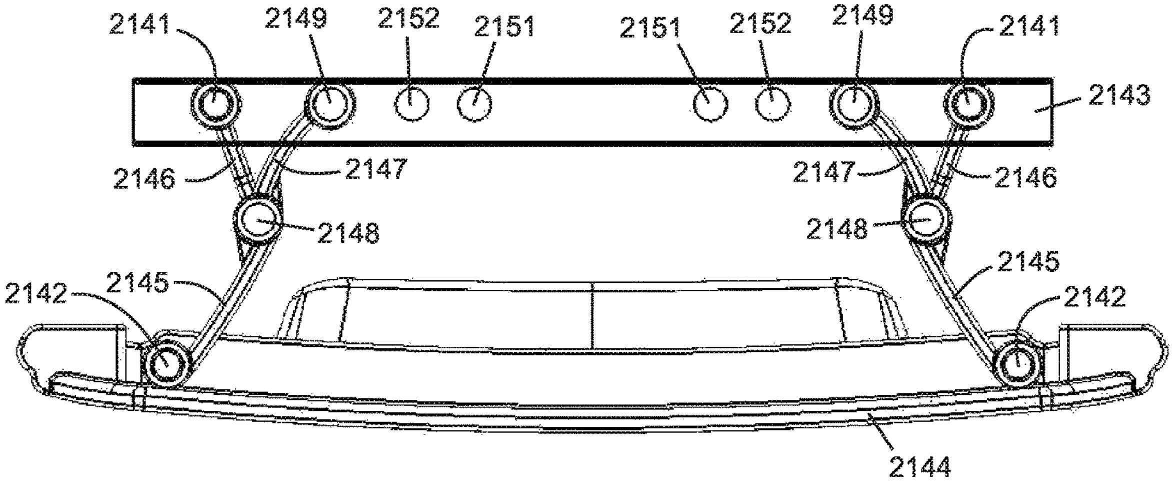

Indexable mounting posts 2149 may be movable laterally inside the footboard mounting bracket 2143. The footboard mounting bracket 2143 may comprise two or more index apertures in upper and/or lower surfaces of the footboard mounting bracket 2143, which are configured to receive index pins to lock the indexable mounting posts 2149 in position. In this embodiment, there are three sets of index apertures 2151, 2152, 2153, each set of index apertures comprising vertically aligned apertures in the upper and lower surfaces of the footboard mounting bracket 2143. Each set of index apertures corresponds to a position of the footboard, where index apertures 2151 correspond to the standard 84 inch fully retracted position as shown in FIG. 38A and FIG. 39A, index apertures 2152 correspond to the 88 inch position as shown in FIG. 38B and FIG. 39B, and index apertures 2153 correspond to the 92 inch position as shown in FIG. 38C and FIG. 39C. To secure the footboard

2140 in a position, the indexable mounting posts 2149 may be aligned with one of the sets of index apertures by moving the footboard panel 2144 longitudinally toward or away from the patient support, and then locking pins may be inserted through the index apertures in the upper surface of the footboard mounting bracket 2143, through a hollow interior of the indexable mounting posts 2149 and out through the index apertures in the lower surface of the footboard mounting bracket 2143. Removing the locking pins may permit adjustment of the footboard panel 2144 to achieve a different position for the footboard.

Endboards (headboard and footboard) often need to be removed to facilitate greater access to a patient. Further, with the extending headboard and/or footboard features, endboards may need to be removed to permit expansion or contraction of endboard width when the patient support deck is expanded or contracted. However, it is also desirable to be able to prevent removal of the endboards when removal is undesired. Since the endboards, especially the headboard, are often used by care givers to guide the patient support when the patient support is being moved on its casters, it may be especially important to have a mechanism for locking the endboards in place. It is therefore desirable to have a simple mechanism for locking and unlocking the endboards in order to facilitate endboard removal and replacement, while preventing removal of the endboard when removal is undesired.

Figure 40B:
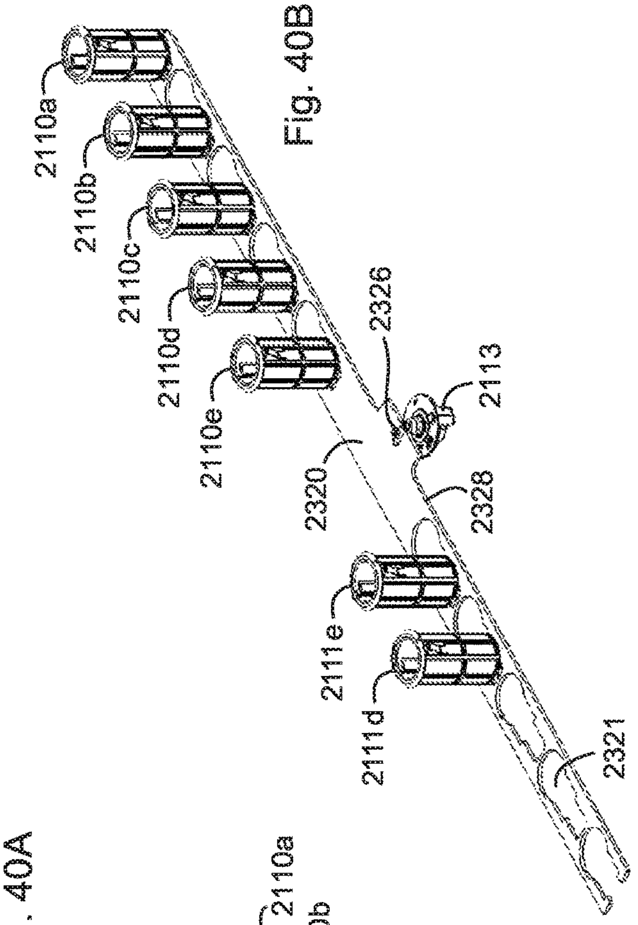
FIG. 40B depicts FIG. 40A with the mounting posts and some of the post sockets removed.
Figure 40C:
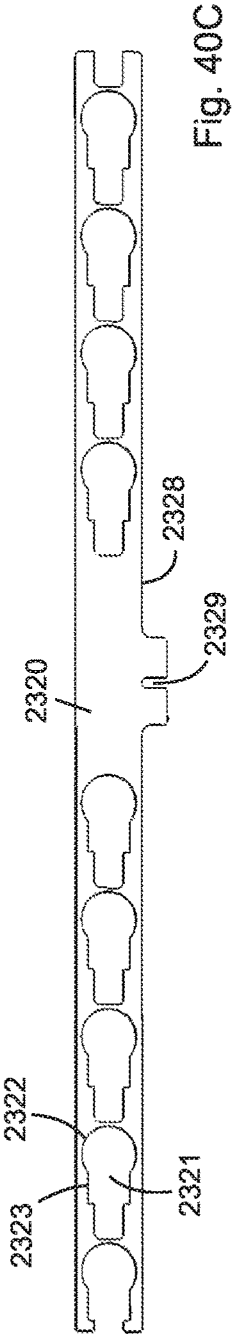
FIG. 40C is a top view of a locking plate for the endboard locking mechanism of FIG. 40A.
Figure 40A:
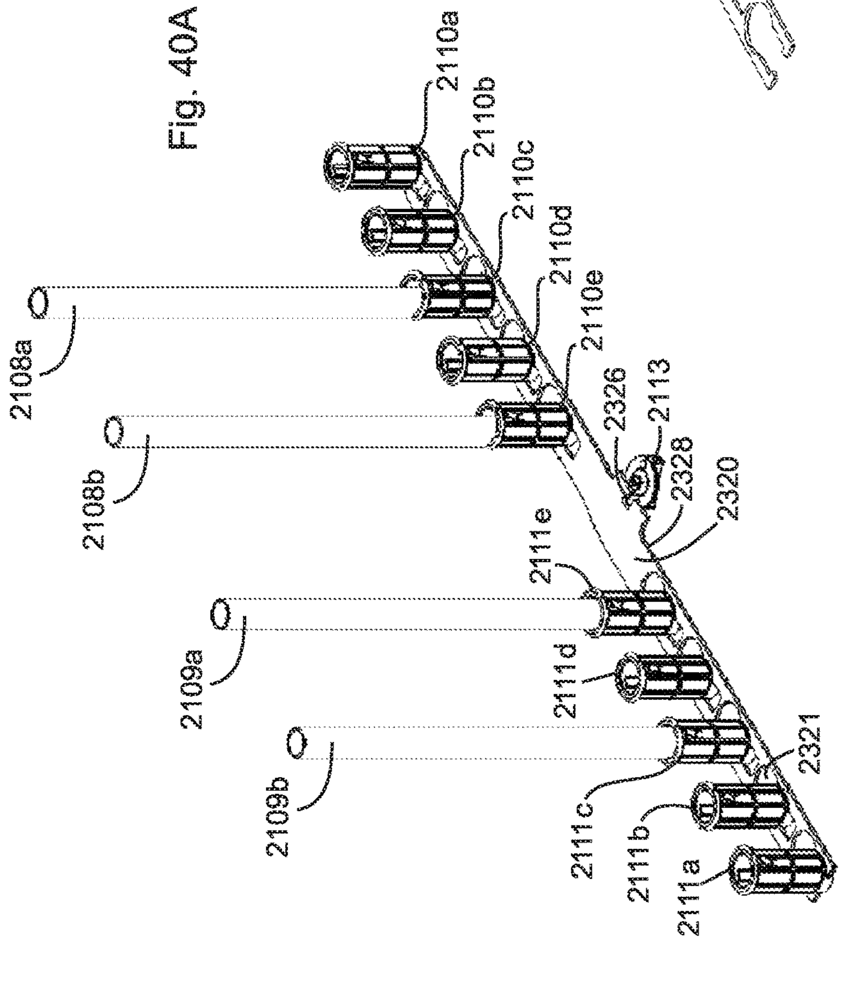
FIG. 40A is a perspective view of a locking mechanism for an endboard shown with mounting posts and post sockets.
Figure 40D:
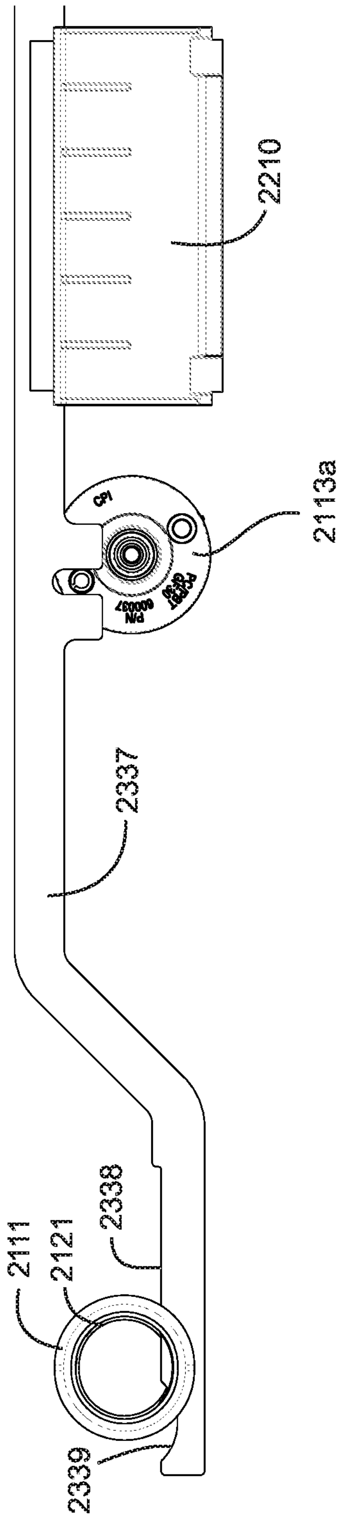
FIG. 40D is a top view of a second embodiment of a locking plate in a locked configuration for an endboard locking mechanism.
Figure 40E:
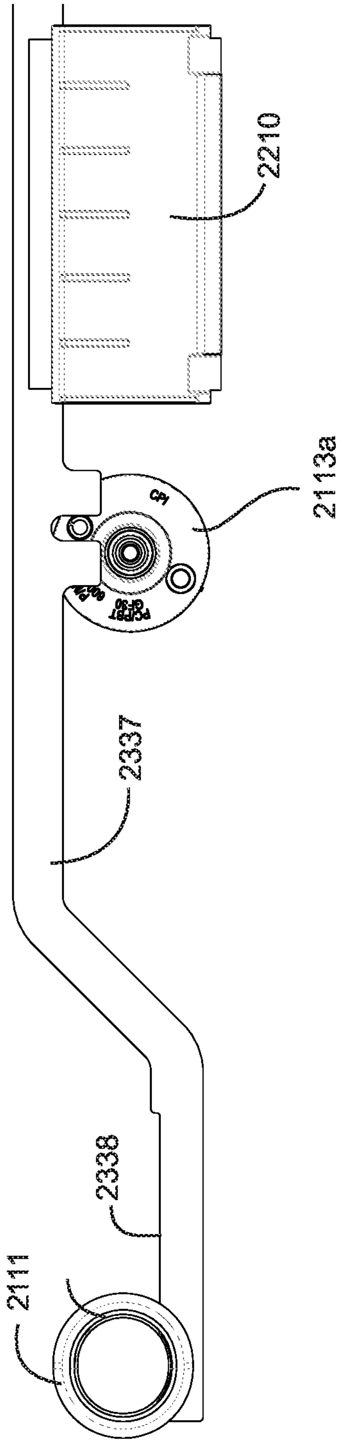
FIG. 40E is a top view of the locking plate depicted in 40D in an unlocked configuration.
Figure 41A:
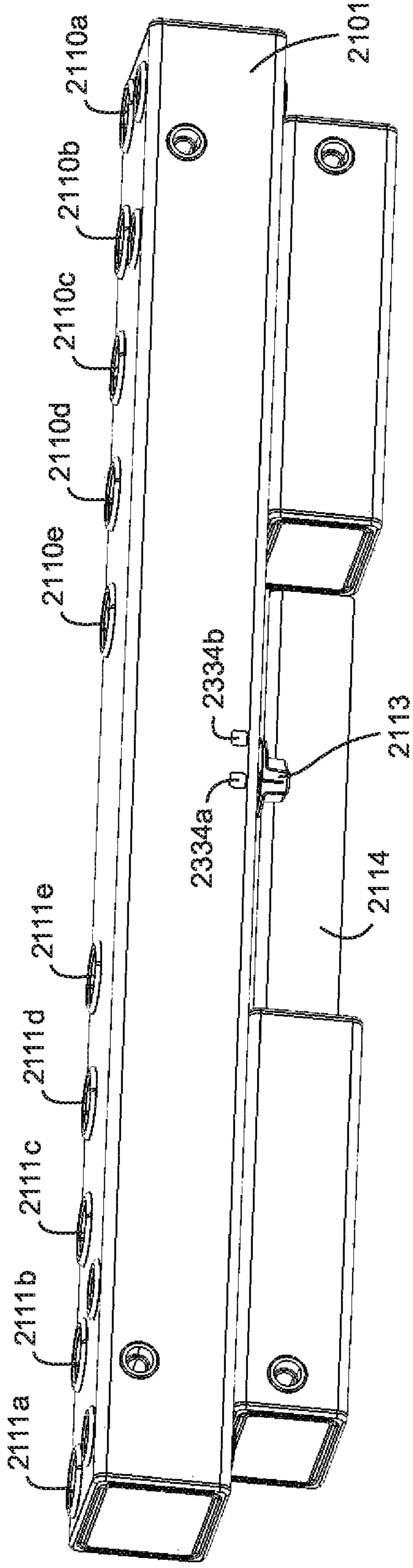
FIG. 41A is a perspective view of an endboard mounting bracket within showing a lock knob associated with the locking mechanism of FIG. 40A.
Figure 41B:
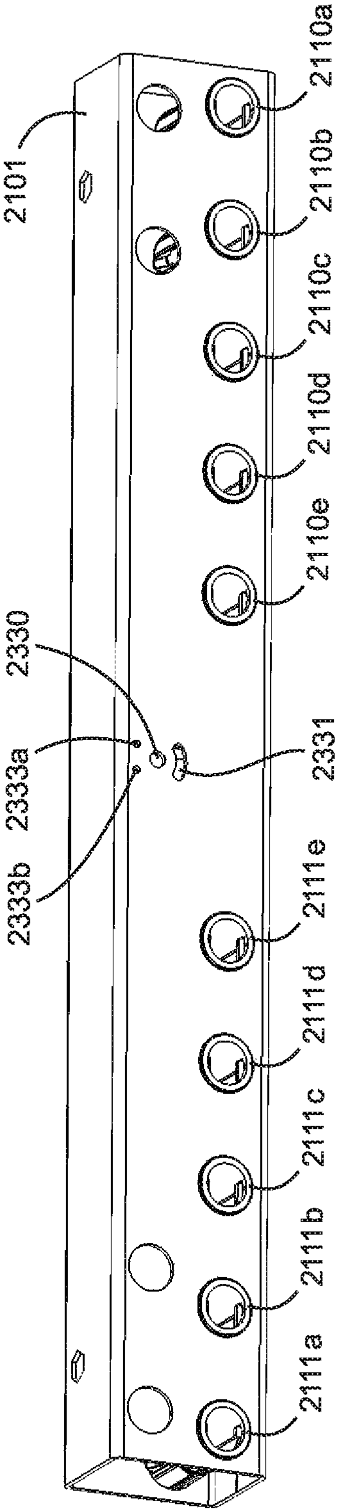
FIG. 41B is a perspective view depicting a bottom surface of the endboard mounting bracket shown in FIG. 41A with the lock knob removed.

With reference to FIG. 40A, FIG. 40B, FIG. 40C, FIG. 41A, FIG. 41B, FIG. 42A, FIG. 42B, FIG. 42C and FIG. 42D, a mechanism for locking and unlocking a headboard is described. FIG. 40A and FIG. 40B show the locking and unlocking mechanism in a locked position. The description herein may be equally applicable to footboards.

Figure 42A:
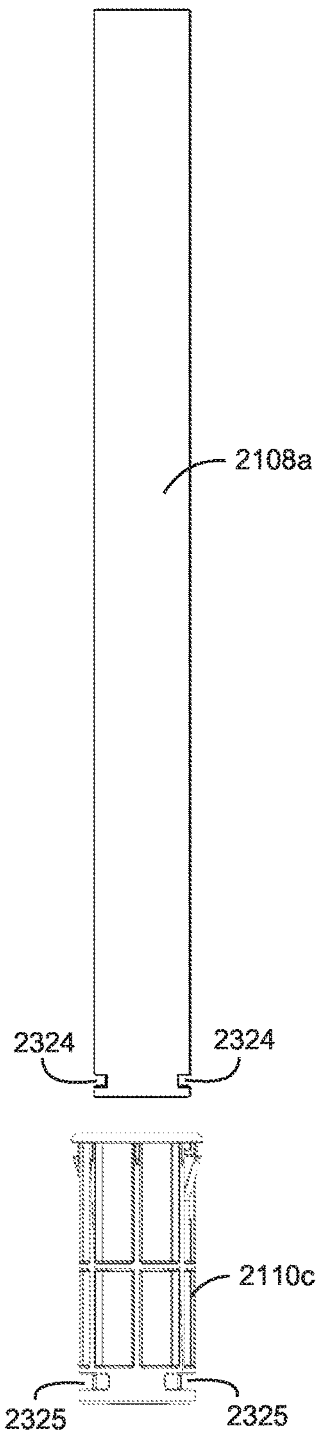
FIG. 42A is a side view of an endboard mounting post above a post socket showing slots for receiving a post engaging portion of the locking plate of FIG. 40C.
Figure 42B:
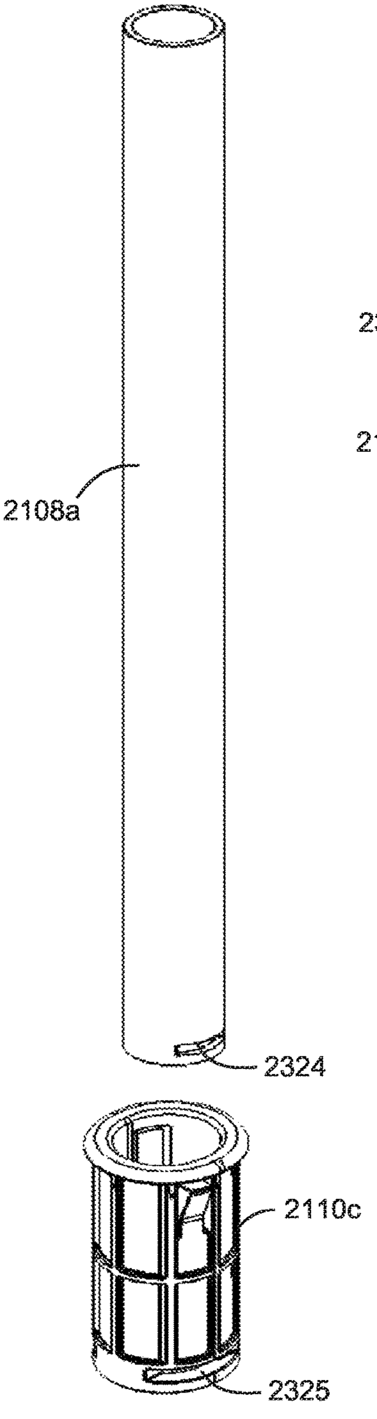
FIG. 42B is a perspective view of an endboard mounting post above a post socket showing slots for receiving a post engaging portion of the locking plate of FIG. 40C.
Figure 42C:
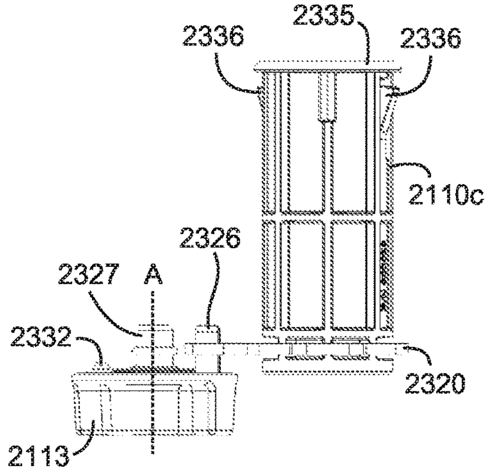
FIG. 42C is a side view of a lock knob engaged with a locking plate for the endboard locking mechanism of FIG. 40A.
Figure 42D:
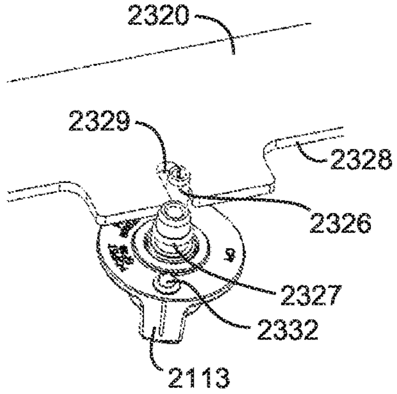
FIG. 42D is a magnified perspective view of the lock knob engaged with the locking plate depicted in FIG. 42C.

The locking and unlocking mechanism may comprise a locking plate 2320 extending laterally from proximate one side of the headboard mounting bracket 2101 to proximate the other side. The locking plate 2320 may be mounted within the headboard mounting bracket 2101, the headboard mounting bracket being mounted on the headboard insert 2114 as described above. The headboard mounting bracket 2101 may be a rectangular tube having socket apertures through upper and lower surfaces thereof through which post sockets 2110*a-e*, 2111*a-e* may be inserted. The post sockets 2110*a-e*, 2111*a-e* may be retained within the headboard mounting bracket 2101 by capturing an inner edge of the socket apertures between an upper lip 2335 and outwardly flaring retainer tabs 2336 of the post sockets as best seen in FIG. 42C. More or less than the ten post sockets shown in the figures may be used. The downwardly depending mounting posts 2108*a,b*, 2109*a,b* of the headboard may be inserted into four post sockets, in this case 2110*c*, 2110*e*, 2111*e* and 2111*c* representing the headboard being in the standard width has described above. More or less than the four mounting posts shown in the figures may be used.

The locking plate 2320 may comprise a series of locking plate through apertures 2321 (only one labeled) that align with the post sockets 2110*a-e*, 2111*a-e*. The locking plate through apertures 2321 may be bounded by inner edges of the locking plate 2320. The inner edges of the locking plate 2320 that define the boundaries of the locking plate through apertures 2321 may comprise post disengaging portions 2322 and post engaging portions 2323 (only one each labeled). The post disengaging portions 2322 may be shaped and sized such that when the post disengaging portions 2322 are aligned with the post sockets 2110*c*, 2110*e*, 2111*e*, 2111*c* and the downwardly depending mounting posts 2108*a,b*, 2109*a,b* therein, the downwardly depending mounting posts 2108*a,b*, 2109*a,b* may be removed from the post sockets 2110*c*, 2110*e*, 2111*e*, 2111*c*. The post engaging portions 2323 may be shaped and sized such that when the post engaging portions 2323 are aligned with the post sockets 2110*c*, 2110*e*, 2111*e*, 2111*c* and the downwardly depending mounting posts 2108*a,b*, 2109*a,b* therein, the downwardly depending mounting posts 2108*a,b*, 2109*a,b* may not be removed from the post sockets 2110*c*, 2110*e*, 2111*e*, 2111*c* because the post engaging portions 2323 of the locking plate 2320 may be engaged within locking slots 2324 proximate a bottom of the downwardly depending mounting posts 2108*a,b*, 2109*a,b* and within corresponding slots 2325 proximate a bottom of the post sockets 2110*c*, 2110*e*, 2111*e*, 2111*c*. Lateral movement of the locking plate 2320 in one direction may cause alignment of the post disengaging portions 2322 with the post sockets 2110*c*, 2110*e*, 2111*e*, 2111*c* and the downwardly depending mounting posts 2108*a,b*, 2109*a,b* therein, while lateral movement of the locking plate 2320 in the other direction may cause the post engaging portions 2322 to engage within the locking slots 2324 in the downwardly depending mounting posts 2108*a,b*, 2109*a,b* and within the corresponding slots 2325 in the post sockets 2110*c*, 2110*e*, 2111*e*, 2111*c*. Each downwardly depending mounting post 2108*a,b*, 2109*a,b* and each post socket 2110*a-e*, 2111*a-e* has two slots, one for engagement with each inner edge of the post engaging portion 2323 of the locking plate 2320. While the post engaging portions 2322 are engaged within the locking slots 2324, the downwardly depending mounting posts 2108*a,b*, 2109*a,b* may not be removed from the post sockets 2110*c*, 2110*e*, 2111*e*, 2111*c* thereby locking the headboard in place. When the post disengaging portions 2322 are aligned with the downwardly depending mounting posts 2108*a,b*, 2109*a,b* and the post sockets 2110*c*, 2110*e*, 2111*e*, 2111*c*, the headboard is unlocked.

Lateral movement of the locking plate 2320 may be effected by a single lock knob 2113. The lock knob 2113 may comprise a rotation hub 2327 mountable in a lock knob mounting aperture 2330 through the lower surface of the headboard mounting bracket 2101. The lock knob 2113 may be rotatable about a vertical rotation axis A through the rotation hub 2327. The lock knob 2113 may also comprise a plate engagement pin 2326 depending vertically the lock knob 2113, the plate engagement pin 2326 configured to engage within pin engagement slot 2329 in an outer edge 2328 of the locking plate 2320. The plate engagement pin 2326 is located off the vertical rotation axis A so that rotation of the lock knob 2113 will cause the plate engagement pin 2326 to describe an arcuate path. Rotation of the lock knob 2113 in one direction may cause the plate engagement pin 2326 to describe an arcuate path in one direction, this arcuate motion being translated into a lateral motion of the locking plate 2320 in one lateral direction since the plate engagement pin 2326 of the lock knob 2113 is engaged within the pin engagement slot 2329 in the outer edge 2328 of the locking plate 2320. Rotation of the lock knob 2113 in the opposite direction may cause the plate engagement pin 2326 to describe an arcuate path in the opposite direction, this arcuate motion being translated into a lateral motion of the locking plate 2320 in the other lateral direction. Thus, rotation of the lock knob 2113 may cause the post engaging portions 2323 of the locking plate 2320 to slide in or out of the locking slots 2324 of the downwardly depending mounting posts 2108*a,b*, 2109*a,b* resulting in locking or unlocking of the downwardly depending mounting posts 2108*a,b*, 2109*a*, and *b*.

When the lock knob 2113 is in a locked position and the downwardly depending mounting posts 2108*a,b*, 2109*a,b* are not in the post sockets, it is not possible to fully insert the downwardly depending mounting posts 2108*a,b*, 2109*a,b* into the post sockets because the post engaging portions 2323 of the locking plate 2320 block the post sockets. The lock knob 2113 should be in an unlocked position before inserting the downwardly depending mounting posts 2108*a,b*, 2109*a,b* into the post sockets so that the post engaging portions 2323 of the locking plate 2320 may then be engaged within the locking slots 2324 of the downwardly depending mounting posts 2108*a,b*, 2109*a,b* by turning the lock knob 2113 to the locked position.

Because the locking plate 2320 is inside the headboard mounting bracket 2101 and the lock knob 2113 is outside the headboard mounting bracket 2101, an arcuate slot 2331 is provided in the lower surface of the headboard mounting bracket 2101 so that the plate engagement pin 2326 may be allowed to travel through its arcuate path when the lock knob 2113 is rotated. The arcuate slot 2331 also provides some support against play in the lock knob 2113 by forcing the plate engagement pin 2326 to follow a particular path. Additionally, index protrusion 2332 on lock knob 2113 may be engaged in one of two index depressions 2333*a*, 2333*b* in the lower surface of the headboard mounting bracket 2101 when the lock knob 2113 is in the locked or unlocked positions. Engagement of the index protrusion 2332 in the index depressions 2333*a*, 2333*b* ensures that some minimum force is required to be able rotate the lock knob 2113 between the locked (index depression 2333*a*) and unlocked (index depression 2333*b*) positions so that the lock knob 2113 cannot rotate without user intervention once in the locked or unlocked position. Furthermore, decals 2334*a*, 2334*b* may be fixed to the headboard mounting bracket 2101 in appropriate locations to provide an indication of whether the headboard is locked (decal 2334*a*) or unlocked (decal 2334*b*). It would be apparent to one skilled in the art that by reversing the directionality of the through apertures 2321 in the locking plate 2320, the directionality of locking and unlocking would be reversed.

With reference to FIG. 40A and FIG. 40B, a second embodiment of a locking plate 2337 for an endboard locking mechanism is illustrated. This embodiment is particularly suited for footboards and a first connection housing 2210 of a blind mate connector is shown for context. The second embodiment operates in a similar fashion as the locking plate 2320 described above, however the locking plate 2337 utilizes only a single exterior edge 2338 to engage a slot in post socket 2111, and a slot in a mounting post 2121 in the post socket 2111. The exterior edge 2338 of the locking plate 2337 has an arcuate indentation 2339 that matches the circumference of an inner circular (or elliptical) wall of the post socket 2111. When the arcuate indentation 2339 is aligned with the inner wall of the post socket 2111, the footboard is unlocked as shown in FIG. 40B. Rotating lock knob 2113*b* shifts the locking plate 2337 so that the arcuate indentation 2339 is misaligned with the inner wall of the post socket 2111 and the exterior edge 2338 of the locking plate 2337 partially occludes the post socket as shown in FIG. 40A. With the post 2121 in the post socket 2111, the exterior edge 2338 would also engage within a corresponding slot in the post 2121, thereby locking the post in place.

As described above, a patient support may comprise a caster frame, a lower frame and an upper frame. The upper frame may support the patient support deck, which may support the patient, and the upper frame may also support the footboard and headboard. The upper frame may in turn be supported on the lift mechanism, which may be supported entirely by the lower frame. Thus, the entire load of the patient and the upper frame may be supported by the lower frame through the lift mechanism. The lower frame may be supported by the caster frame on four load cells proximate the corners of the lower frame.

Figure 43:
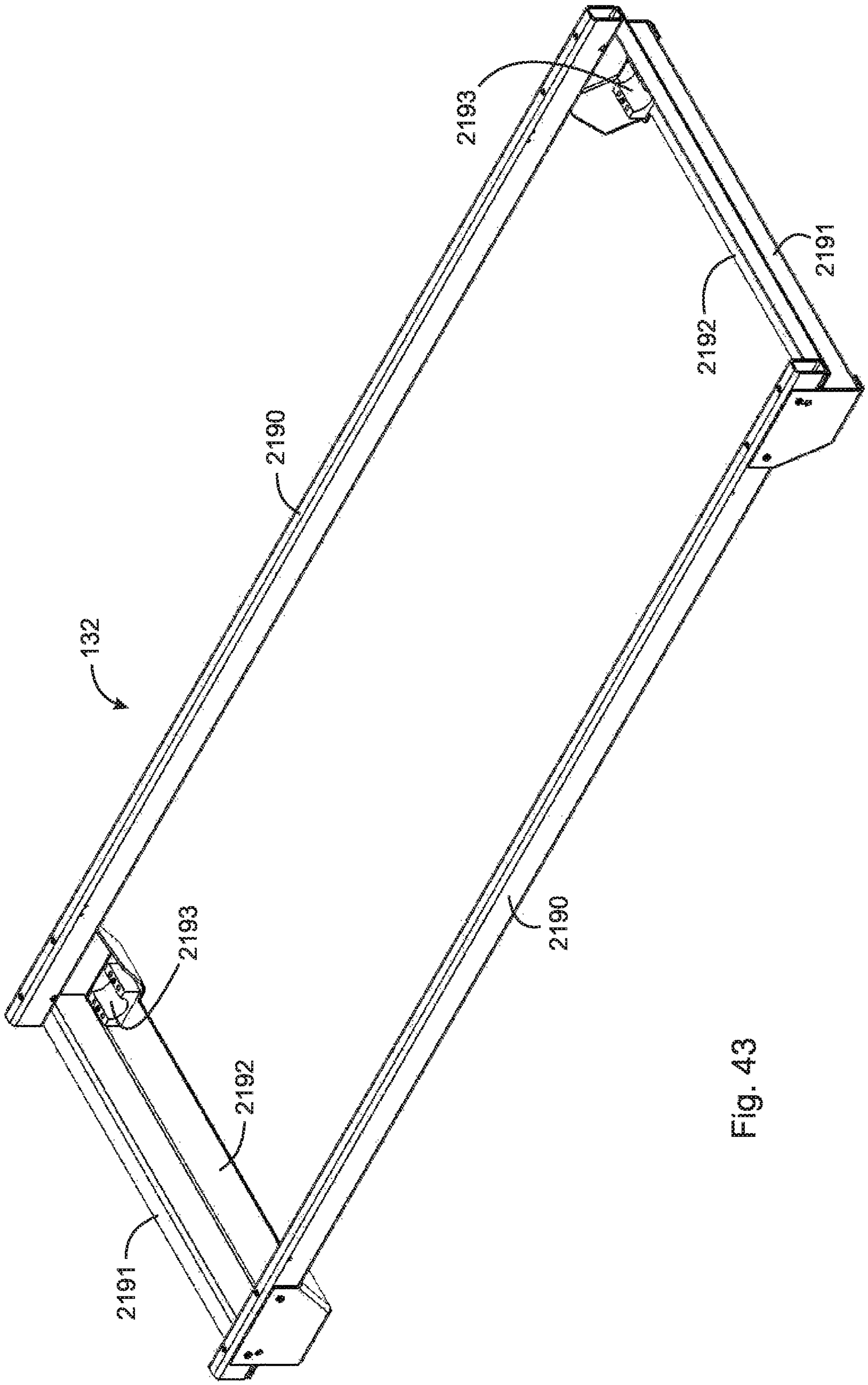
FIG. 43 is a perspective view of a lower frame of a patient support.

Referring to FIG. 43, the lower frame 132 of a patient support may comprise lower frame main rails 2190 connected proximate the ends of the main rails 2190 by lower frame cross-members 2191 to form a rectangular frame. The lower frame cross-members 2191 may comprise lower frame hangers 2192 on which may be supported four lower frame bearing blocks 2193 (only a bottom half shown), one proximate each corner of the lower frame 132. The lower frame bearing blocks 2193 may support the legs of the lift mechanism of the patient support.

Figure 44:
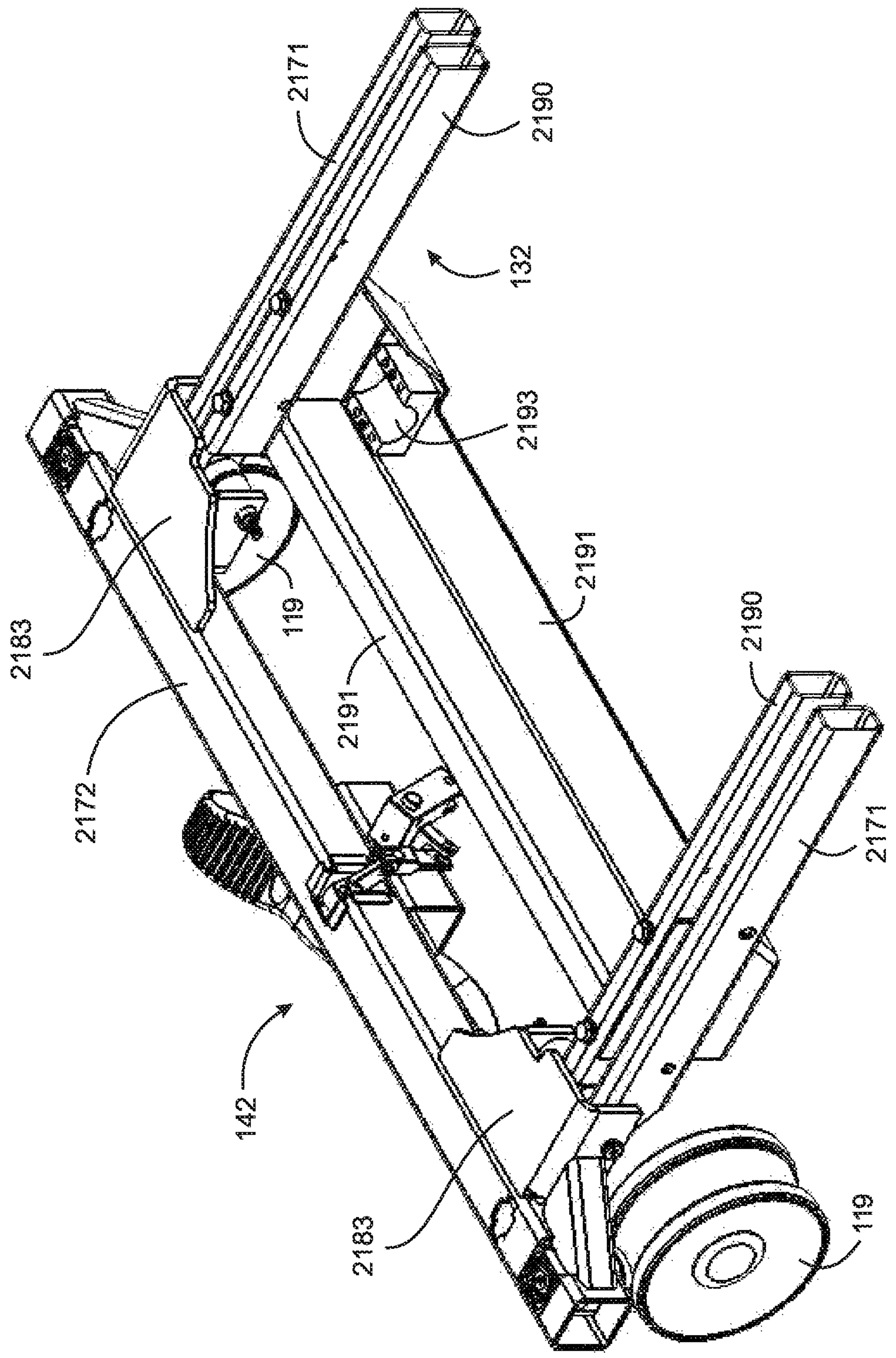
FIG. 44 is a magnified perspective view of one end of the lower frame of FIG. 43 together with caster frame elements.

The lower frame 132 may be supported by the caster frame as shown in FIG. 44. As described above, the caster frame 142 may comprise generally longitudinally oriented parallel caster frame main rails 2171 connected at one end by the generally transversely oriented caster frame cross-member 2172. The lower frame support brackets 2183 may be located proximate the intersections of the caster frame main rails 2171 and the caster frame cross-member 2172. The lower frame 132 may be positioned underneath the lower frame support brackets 2183 and within the caster frame main rails 2171 and the caster frame cross-member 2172, whereby the lower frame main rails 2190 may be generally parallel to the caster frame main rails 2171 and the lower frame cross-member 2191 may be generally parallel to the caster frame cross-member 2172. The lower frame 132 and the caster frame 142 may generally occupy the same transversely oriented plane parallel to the surface on which the casters 119 travel. This feature contributes to permitting the entire patient support structure to be as close to the travelling surface as possible when the patient support is in a low position.

The lower frame 132 may be supported by the caster frame 142 by suspending the lower frame 132 from the caster frame 142 beneath the lower frame support brackets 2183. As can be seen in FIG. 45A, FIG. 45B, FIG. 45C, FIG. 45D, FIG. 45E and FIG. 45F, the lower frame support brackets 2183 may comprise downwardly extending flanges 2184, 2185 having apertures through which a bolt 2194 may be passed. The bolt 2194 may pass through annular bushings 2195 positioned within an aperture 2196 of a load cell 2197 extending longitudinally out a hollow interior of the lower frame main rail 2190. The load cell 2197 may be housed in the lower frame main rail 2190 and held in position by a screw 2198 through a top of the lower frame main rail 2190 and the load cell 2197. The load cell 2197 may be electronically connected to the control circuitry through electrical contact 2199.

Figure 45D:
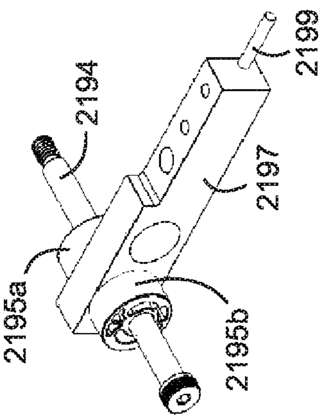
FIG. 45D is a perspective view of a load cell with annular bushings and bolt.
Figure 45E:
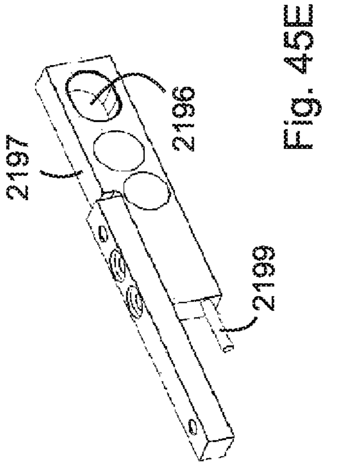
FIG. 45E is a perspective view of a load cell.
Figure 45C:
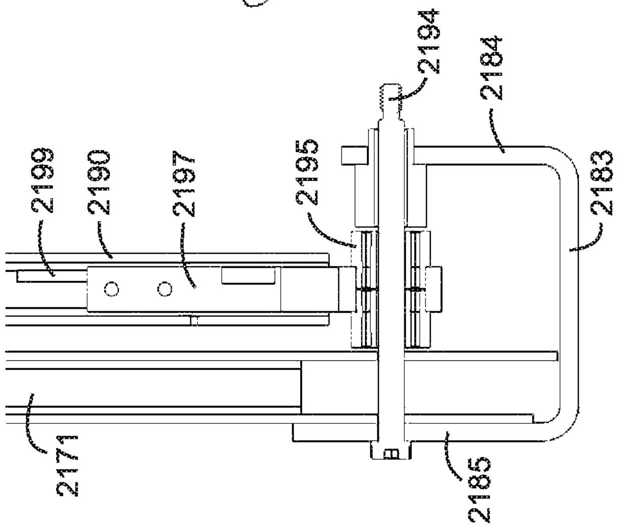
FIG. 45C is a bottom view of FIG. 45B through a cross-section taken at B-B.
Figure 45F:
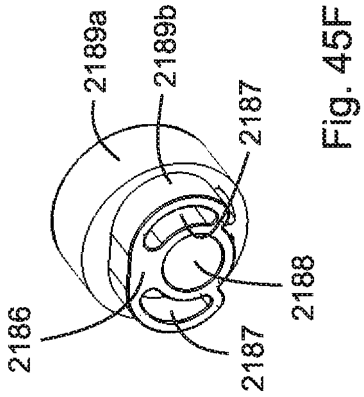
FIG. 45F is a perspective view of one bushing in the load cell depicted in FIG. 45D.
Figure 45A:
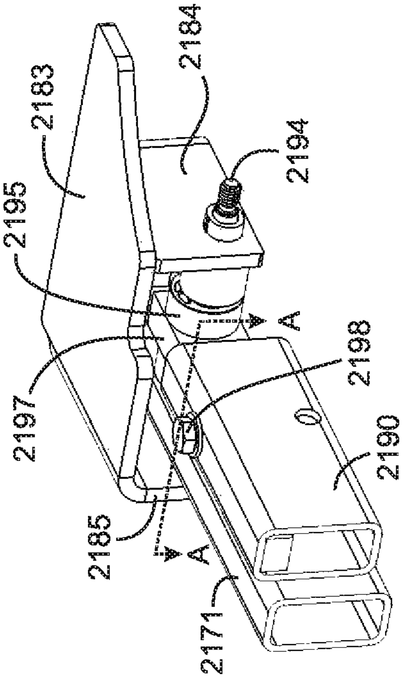
FIG. 45A is a magnified perspective view of one corner of the end of the lower frame of FIG. 43.
Figure 45B:
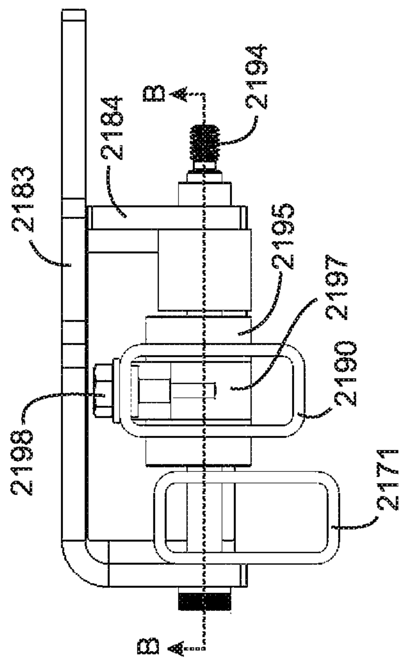
FIG. 45B is a foot end view of FIG. 45A through a cross-section taken at A-A.

Within the aperture 2196 of the load cell 2197 may be annular bushings 2195, one labeled as 2195*a* and the other labeled as 2195*b* in FIG. 45D. As shown in FIG. 45F, each annular bushings 2195*a*, 2195*b* may comprise a larger outer portion 2189*a* that is positioned outside of the aperture 2196 of the load cell 2197 and a smaller diameter inner portion 2189*b* that rests inside the aperture 2196 of the load cell 2197. The faces of the inner portions 2189*b* of the two annular bushing 2195*a*, 2195*b* may touch each other or very nearly touch each other inside the aperture 2196. The annular bushings 2195*a*, 2195*b* may comprise a central through aperture 2188 through which the bolt 2194 is inserted. The annular bushings 2195*a*, 2195*b* may be designed to compensate for non-axial loading. To this end, the inner portions 2189*b* of the annular bushings 2195*a*, 2195*b* may comprise hollows 2187, which are off a vertical axis, while comprising a thicker region 2186 directly on the vertical axis. The vertical axis is perpendicular to a central lateral axis through the annular bushings 2195*a*, 2195*b*. The thicker region 2186 provides rigid support for axial loads. When a non-axial loading is experienced, the hollows 2187 may deform thereby compensating for the non-axial loading so that the entire load remains vertically axial.

A similar configuration may be used at each corner of the lower frame 132; therefore, the lower frame 132, the lift mechanism, the upper frame, the patient support deck, the headboard, the footboard, the mattress and the patient may be all supported only on four load cells. The only connection between the lower frame 132 and the caster frame 142 may be through the four load cells. By measuring the load on the four load cells, an accurate measurement of the load on the patient support may be obtained at any given time. By knowing the mass of the components of the patient support, or by taring the scale before the patient enters the patient support, a measurement of the mass of the patient may be obtained from the load cells.

Referring to FIG. 46A, FIG. 46B, FIG. 46C and FIG. 46D, an alternative load cell and an alternative load cell mount are depicted in which a load cell 2340 is bushing-less. Instead, the load cell 2340 may comprise a cylindrical stud 2341 having a flattened or slightly convex (spherical) face 2342 that rests on a horizontal surface 2345 of a lower frame mounting flange 2346 fixedly mounted on the caster frame cross-member 2172 and/or the caster frame main rails 2171 of the caster frame 142. The lower frame mounting flange 2346 may be U-shaped to prevent the stud 2341 from slipping off the horizontal surface 2345, and may comprise a cross-bolt 2347 to prevent the lower frame 132 from being lifted off the caster frame 142 when the lower frame 132 is resting on the caster frame 142. The bolt 2347 does not normally touch the lower frame 132. The stud 2341 may comprise a mounting post 2344, the mounting post 2344 rigidly mounted on the load cell 2340. In one embodiment, the mounting post 2344 may be a bolt threadingly engaged with mating threads machined into the load cell 2340. The load cells 2340 may be mounted within the lower frame main rails 2190 of the lower frame 132. The studs 2341 mounted thereon depend downward and the entire lower frame 132 and everything else supported on the lower frame 132 may be supported by the studs 2341 resting on the horizontal surfaces 2345 of the lower frame mounting flanges 2346 proximate the four corners of the caster frame 142. The only contact between the lower frame 132 and the caster frame 142 is between the face 2342 of the stud 2341 and the horizontal surface 2345 of the mounting flange 2346.

Figures 46A, 46B, 46C, 46D:
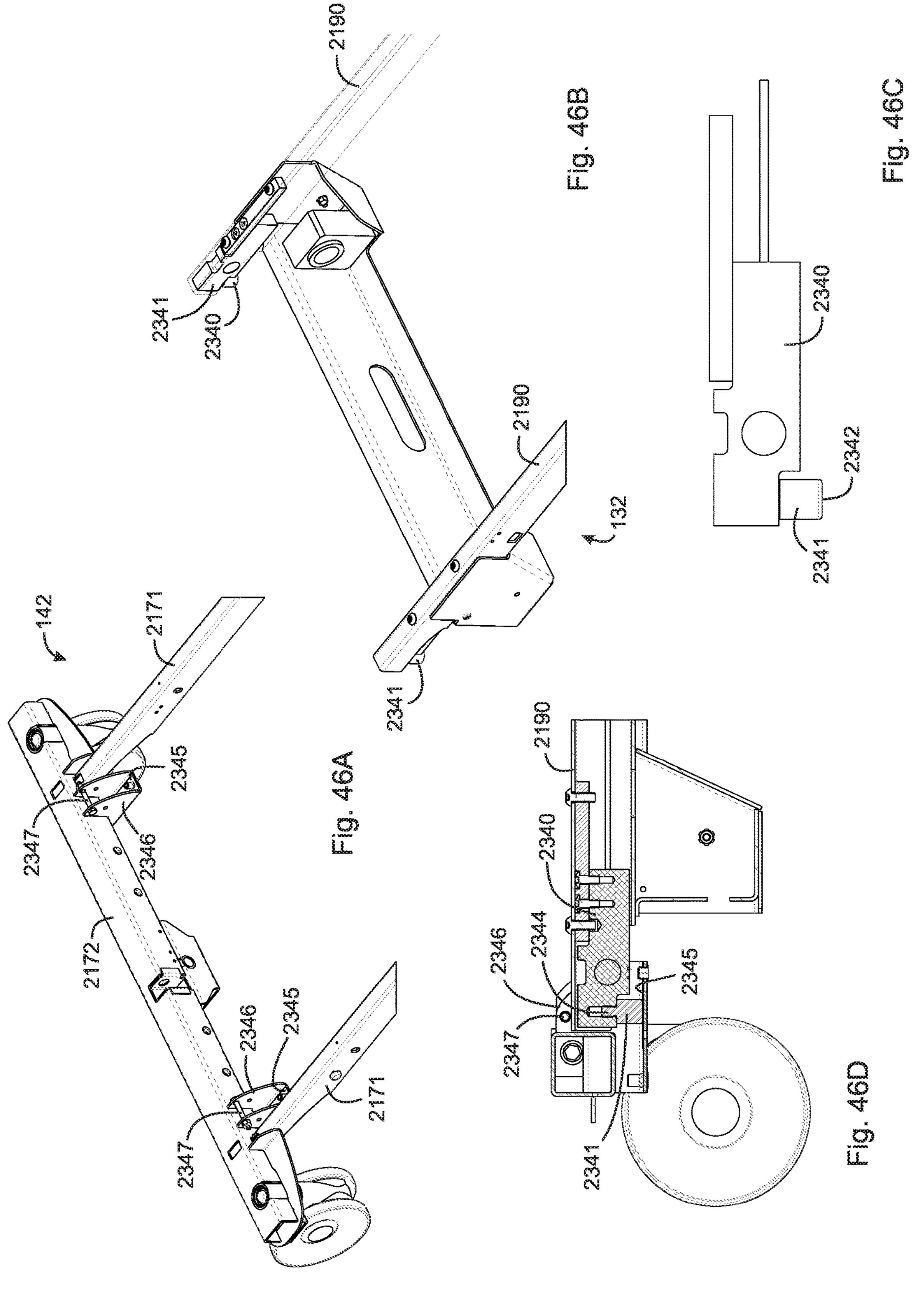
FIG. 46A is a perspective view of an alternative caster frame.
FIG. 46B is a perspective view of an alternative lower frame with load cell for cooperation with the alternative caster frame of FIG. 46A.
FIG. 46C is a perspective view of a bushing-less load cell for use with the alternative lower frame and caster frame.
FIG. 46D is a side cross-sectional view of the bushing-less load cell of FIG. 46C resting on a mounting flange of the caster frame.
Figure 46E:
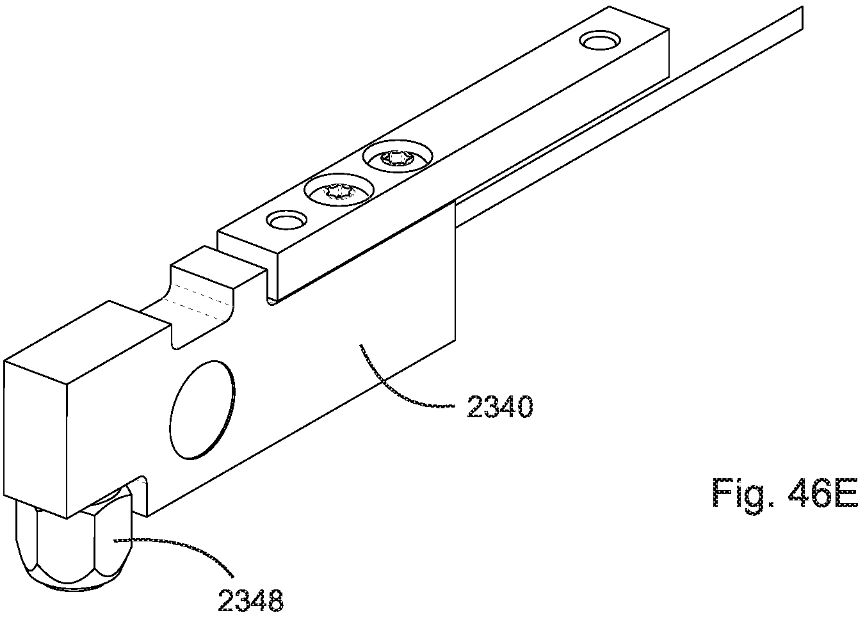
FIG. 46E is a perspective view of a bushing-less load cell for use with the alternative lower frame and caster frame, where the load cell has a swivel instead of a stud.
Figure 46F:
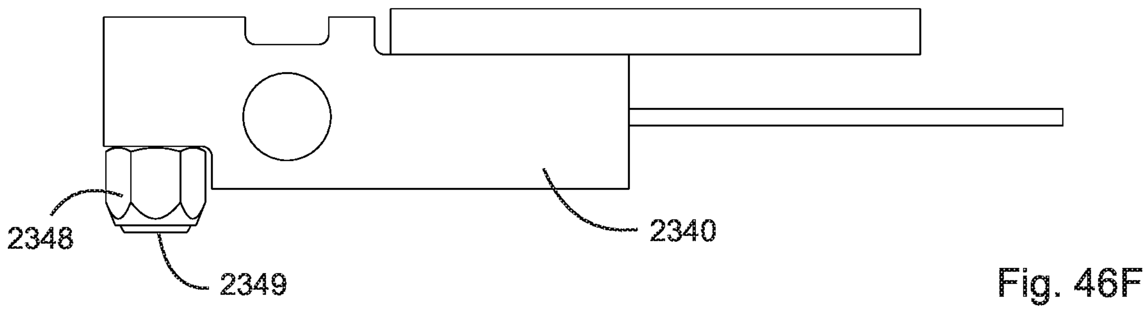
FIG. 46F is a side view of the bushing-less load cell of FIG. 46D.
Figure 46G:
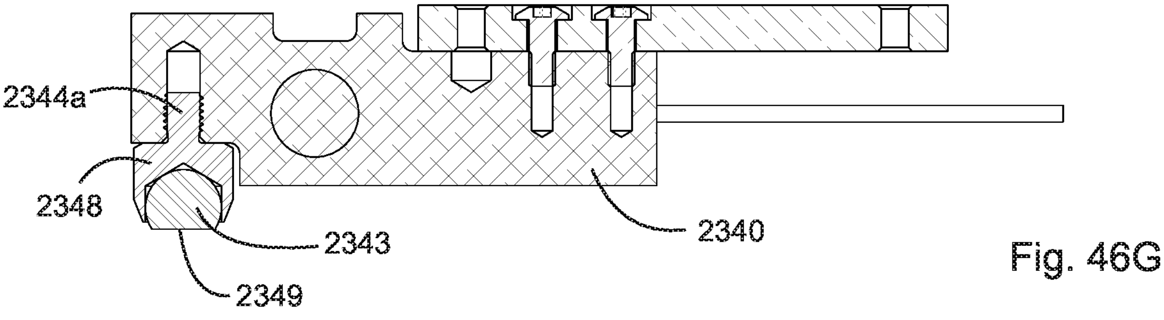
FIG. 46G is a longitudinal cross-sectional view of the side view depicted in FIG. 46F.

Referring additionally to FIG. 46E, FIG. 46F and FIG. 46G, the load cell 2340 may comprise a swivel 2348 instead of a stud. The swivel 2348 comprises a flat face 2349 that contacts the horizontal surface 2345 of the mounting flange 2346. The swivel 2348 may comprise a swivel ball 2343 engaged in a socket of a mounting post 2344*a*, the mounting post 2344*a* rigidly mounted on the load cell 2340 in a manner as described above. Under load, the flat face 2349 of the swivel 2348 may always be flat against the horizontal surface 2345 because the swivel ball 2343 will swivel in the socket of the mounting post 2344*a* when the lower frame 132 experiences off-axis loading. In this manner, compensating for off-axis loading may be accomplished without the use of bushings, while gaining the simplicity and robustness of the stud design described above.

In order to transport a patient support from one location to another, it may be useful to equip the patient support with casters or other types of wheels to permit moving the patient support on surfaces. Casters may be mounted on a caster frame, typically having one caster proximate each corner of the caster frame. Further, it may be useful to be able to lock casters in one of several conditions including a locked condition, a neutral condition and/or a steer condition.

In the locked condition, the caster is unable to either rotate or swivel. The locked condition may be useful when the patient support is to remain stationary in a fixed position and no movement of the patient support is desired. In the neutral condition, the caster is free to rotate and swivel. The neutral condition may be useful when the patient support is to be moved from one location to another since freedom to rotate permits translation of the patient support across a surface and swiveling of the caster permits turning the patient support as the patient support is being translated. In the steer condition, the caster is able to rotate but swiveling is only permitted until the caster is in a position where the caster must rotate in a plane parallel to the longitudinal axis of the patient support, at which the time the caster becomes locked in this plane. This may be useful during translation of the bed to help with proper tracking of the patient support as it is being moved across the surface. For example, moving the patient support typically involves pushing the patient support from either the head end or the foot end, usually the head end. When pushing the patient support from one end, the casters at the end being pushed may be in the neutral condition while the casters at the other end may be in the steer condition. The casters in the neutral condition permits an operator to freely move the one end in any direction, for example when turning a corner, while the casters at the other end in the steer condition help keep the patient support tracking straight. If all of the casters were in the neutral condition during movement of the patient support, the patient support would be difficult to steer as the other end of the bed would have a tendency to wander. In the case when the patient support is moved by pushing from the head end, the casters at the foot end may be settable to the locked, neutral and steer conditions, while the casters at the head end may be settable only in the locked and neutral conditions. Casters having functionality to be set in locked, neutral and steer conditions are known in the art and are commercially available. Such casters may be useful at the foot end of the patient support. Casters that are settable in three conditions where one of the conditions is the locked condition and the other two are the neutral condition are also known in the art and are commercially available. Such casters may be useful at the head end of the patient support.

While casters with the requisite functionality for locking and steering are known in the art, it would be time consuming and inconvenient to have to set each of the casters each time the patient support is to be moved or locked in place. For this reason, it is generally desirable to have a central lock and steer arrangement whereby one operator can set all of the casters in the desired configuration with one control action. Therefore, it is useful to be able to coordinate the head end and foot end casters so that the two sets of casters are always coordinated to be in the proper condition. In one embodiment, the central lock and steer arrangement may be electronic, whereby electronic casters are utilized and the casters are in electronic communication with the control circuit. Electronically controllable casters are also available commercially.

Figure 47:
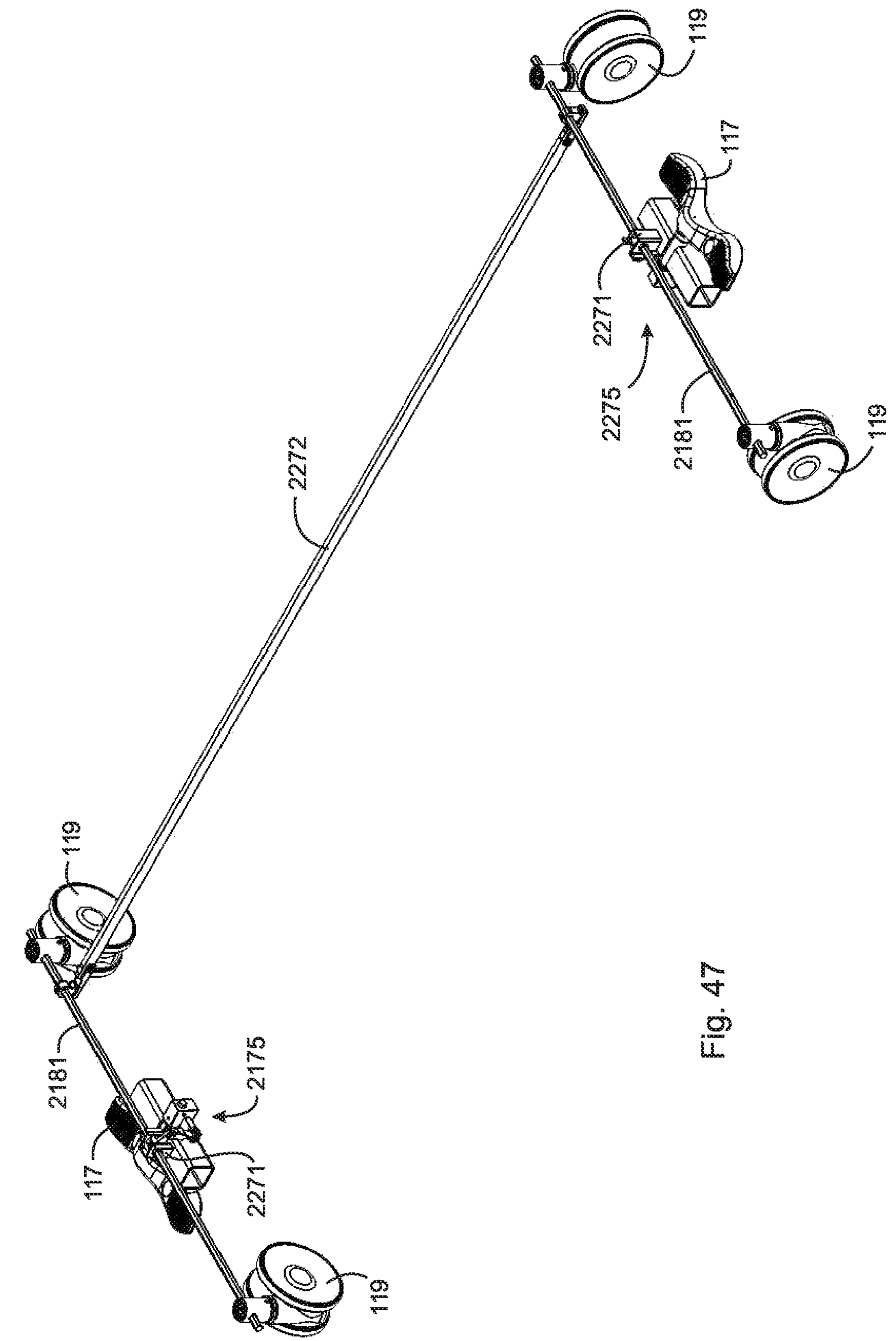
FIG. 47 is a perspective view of head end and a foot end caster assemblies depicting central lock and steer.

In another embodiment, and with reference to FIG. 28A, FIG. 47, FIG. 48A, FIG. 48B, FIG. 49 and FIG. 50, the patient support may be provided with a mechanical central lock and steer arrangement. The casters and the central lock and steer mechanism therefor may be associated with the caster frame 142 as shown in FIG. 28A. The casters 119 may be mounted on the caster frame cross-members 2172 and the caster frame cross-members 2172 connected with caster frame main rails 2171 to form the caster frame 142 with the casters 119 proximate the corners of the caster frame 142. As seen in FIG. 47, the central lock and steer mechanism may comprise brake pedals 117 mounted at each end of the caster frame and mechanically linked through pedal pins 2273 to brake lever mechanisms 2175. The brake lever mechanisms 2175 may be mechanically linked to brake control rods 2181. The brake control rods 2181 may be mechanically linked to the casters 119. As shown in FIG. 30B, each brake control rod 2181 may be two separate portions to permit width expansion and contraction of the brake control rods 2181 when the caster frame 142 expands and contracts in width. Alternatively or additionally, the brake control rods 2181 may comprise a core portion and two end extension portions to accommodate width change. As seen in FIG. 47, FIG. 48A, FIG. 48B and FIG. 49, brake control rod brackets 2271 may support the brake control rods 2181 keeping the two portions of each brake control rod 2181 mated together throughout expansion and contraction of the caster frame. The brake control rods 2181, brake control rod brackets 2271 and at least some portions of the brake lever mechanisms 2175 may be housed in the caster frame cross-members 2172, the caster frame cross-members 2172 being hollow tubes. The central lock and steer arrangement may further comprise a control rod connector 2272 to mechanically link the brake control rods 2181 at each end of the patient support. The control rod connector 2272 may comprise an elongated rack as shown, which may be housed within one of the caster frame main rails 2171. Alternatively or additionally, the control rod connector may comprise a cable (not shown) linking the brake lever mechanisms 2175 at each end of the patient support.

Figure 48B:
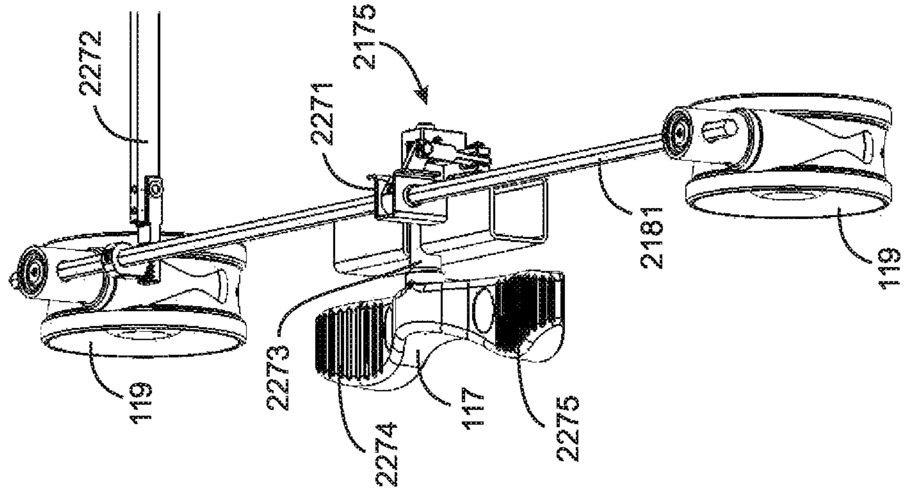
FIG. 48B is a back side perspective view of FIG. 48A.
Figure 48A:
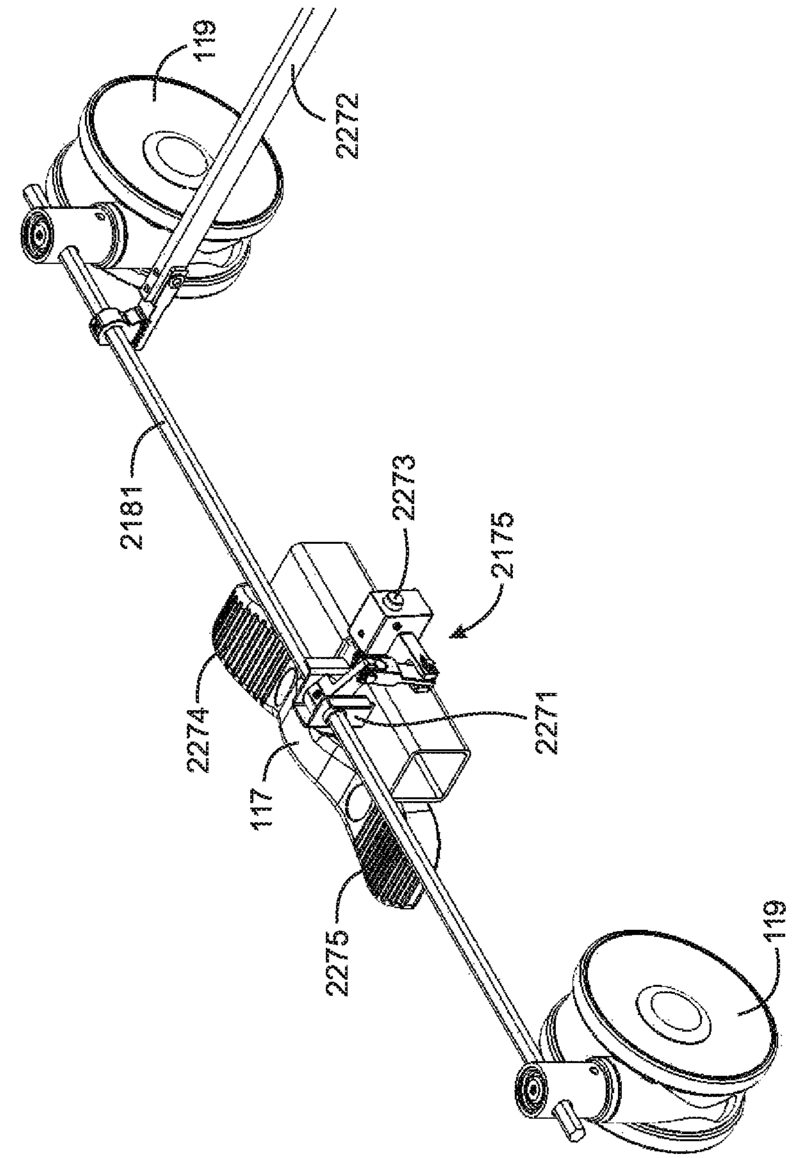
FIG. 48A is a magnified perspective view of the head end caster assembly shown in FIG. 47 as viewed from the foot end.
Figure 49:
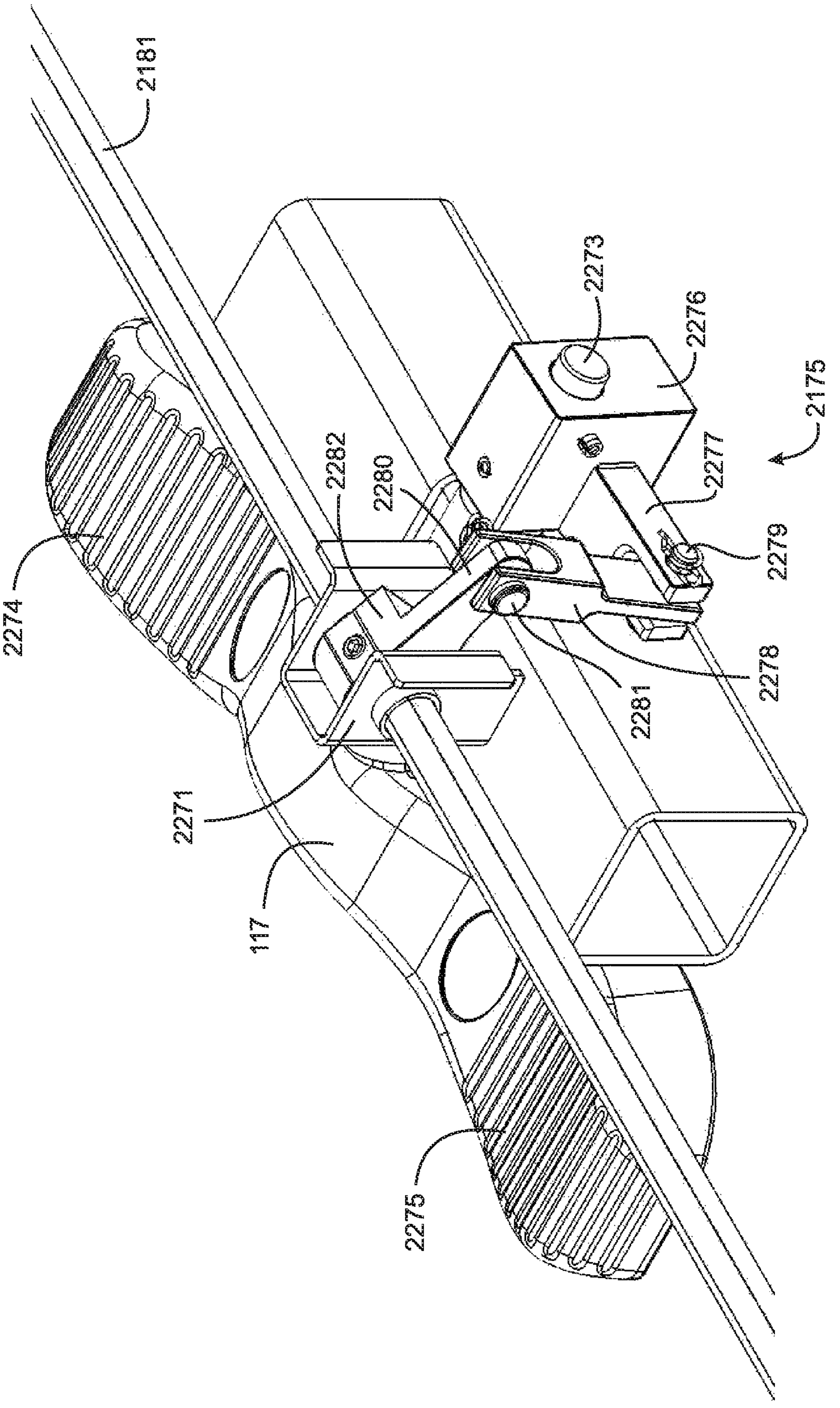
FIG. 49 is a further magnified view of the head end caster assembly shown in FIG. 47.

The function of the brake lever mechanism 2175 is to translate rotational motion of the brake pedal 117 to rotational motion of the brake control rod 2181. The brake lever mechanism 2175 may comprise any suitable combination of linkages to effect this function. In one embodiment, with specific reference to FIG. 48A, FIG. 48B and FIG. 49, the central lock and steer mechanism at the head end of the patient support operates as follows. With the brake pedal 117 in a horizontal position as shown, the casters 119 are set in the neutral condition so the casters are free to rotate and swivel. To set the casters 119 in the locked condition, an operator may apply force on a locking side 2274 of the brake pedal 117. Applying force the locking side 2274 may cause the pedal pin 2273 to rotate. The rotation is clockwise with respect to the arrangements as shown in FIG. 48A, FIG. 48B and FIG. 49. The pedal pin 2273 may be fixedly mounted in pin bearing block 2276 of the brake lever mechanism 2175, therefore clockwise rotation of the pedal pin 2273 may cause clockwise rotation of the pin bearing block 2276. Clockwise rotation of the pin bearing block 2276 may then further create a cascade of movement through various linkages that comprise a remainder of the brake lever mechanism 2175. Thus, clockwise rotation of the pin bearing block 2276 may cause a first brake lever linkage 2277 to translate upwardly through an arcuate path as the first brake lever linkage 2277 is fixedly mounted to the pin bearing block 2276 perpendicular to the pedal pin 2273. Upward translation of the first brake lever linkage 2277 may cause a second brake lever linkage 2278 to translate vertically upward as the second brake lever linkage 2278 is pivotally connected to the first brake lever linkage 2277 by first pivot pin 2279. Upward translation of the second brake lever linkage 2278 may cause upward translation of third brake lever linkage arm 2280 as the third brake lever linkage arm 2280 is pivotally connected to the second brake lever linkage 2278 by second pivot pin 2281. The third brake lever linkage arm 2280 may form part of a third brake lever linkage, the third brake lever linkage further comprising a brake control rod bushing 2282 having a through aperture through which the brake control rod 2181 extends. Upward movement of the third brake lever linkage arm 2280 may cause the brake control rod bushing 2282 to rotate counter-clockwise. The brake control rod 2181 and the through aperture of the brake control rod bushing 2282 have mated shapes (e.g. hexagonal, rectangular, square, triangular, etc.) so that counter-clockwise rotation of the brake control rod bushing 2282 may cause counter-clockwise rotation of the brake control rod 2181. The brake control rod 2181 is mechanically connected to the casters 119 by a similar rod-through-aperture mounting, therefore counter-clockwise rotation of the brake control rod 2181 rotates mechanisms within the casters thereby setting the casters to the locked condition from the neutral condition. The brake pedal 117 may now no longer be horizontal as the locking side 2274 has rotated down.

The casters may be returned to the neutral condition by applying force on a steering side 2275 of the brake pedal 117 until the brake pedal 117 returns to the horizontal position. Counter-clockwise rotation of the brake pedal 117 reverses all of the motions described above thereby setting the casters in the neutral condition from the locked condition. To set the casters 119 in the steer condition from the neutral condition, an operator may apply force on the steering side 2275 of the brake pedal 117. Applying force the steering side 2275 may cause the pedal pin 2273 to rotate. The rotation is counter-clockwise with respect to the arrangements as shown in FIG. 48A, FIG. 48B and FIG. 49. Counter-clockwise rotation of the pedal pin 2273 may cause counter-clockwise rotation of the pin bearing block 2276, causing the first brake lever linkage 2277 to translate downwardly through an arcuate path, causing the second brake lever linkage 2278 to translate vertically downward causing downward translation of third brake lever linkage arm 2280, causing the brake control rod bushing 2282 to rotate clockwise, thereby causing counter-clockwise rotation of the brake control rod 2181. Counter-clockwise rotation of the brake control rod 2181 rotates mechanisms within the casters in a direction opposite to the rotation caused by applying force to the locking side 2274 of the brake pedal 117, thereby setting the casters 119 to the steer condition from the neutral condition. The brake pedal 117 may now no longer be horizontal as the steering side 2275 has rotated down and the locking side 2274 has rotated up. The casters 119 may be returned to the neutral condition by applying force on the locking side 2274 of the brake pedal 117 to return the brake pedal 117 to the horizontal position. As would be evident to one skilled in the art, the central lock and steer mechanism may be configured so that the locking side and steering side of the brake pedal 117 may be reversed if desired.

The central lock and steer mechanism would not be complete unless actuation of the brake pedal 117 at one end of the patient support also caused the casters 119 at the other end of the bed to change setting. As previously stated, this could be accomplished by connecting the brake lever mechanism on opposite of the patient support by a cable so that motion of a linkage in one brake lever mechanism would cause a mirror motion of a corresponding linkage in in the other brake lever mechanism. However, such a cable would need to run longitudinally approximately down a central longitudinal axis of the patient support. Such a cable could potentially interfere with the lift mechanism of the patient support. To mitigate against this potential problem, instead of using a cable to link the brake lever mechanisms, the control rod connector 2272 may be provided connecting the brake control rods 2181 at opposite ends of the patient support. Since the brake control rods 2181 extend laterally across the width of the patient support, the control rod connector 2272 may be placed on any longitudinal axis of the patient support. For convenience, protection and esthetics, the control rod connector 2272 may be mounted within one of the caster frame main rails 2171. In another embodiment, there may be two control rod connectors, one on each side of the patient support, preferably housed in the two caster frame main rails 2171.

Figure 50:
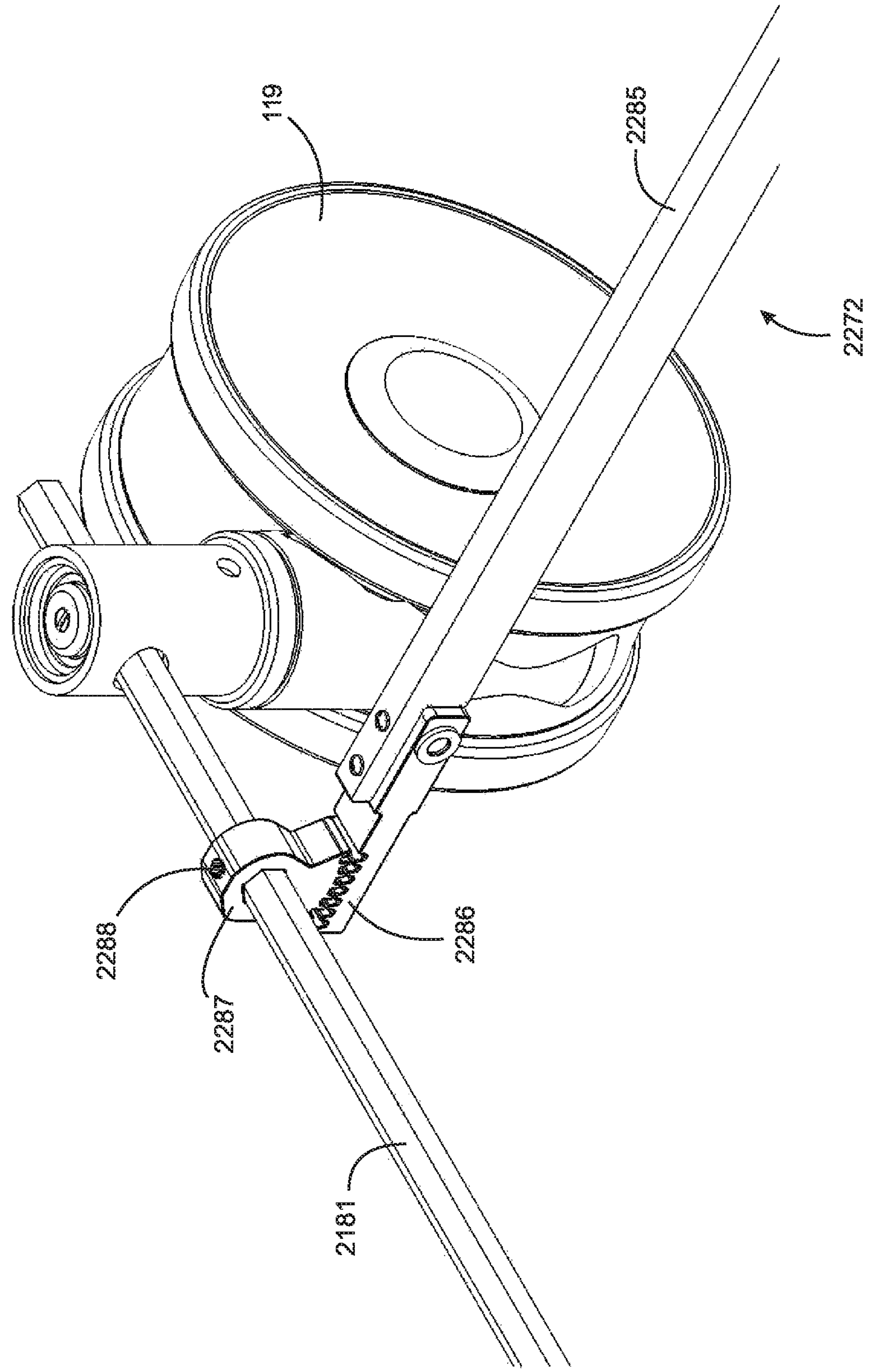
FIG. 50 is a magnified view of a head end of a rack and pinion mechanism connecting head end and foot end caster assemblies.

With reference to FIG. 50, the control rod connector 2272 may comprise an elongated rack 2285. A toothed portion 2286 may be provided on the rack 2285 at least proximate one end of the rack 2285. Teeth of the toothed portion 2286 may be mated with teeth of a pinion gear 2287, the pinion gear 2287 being connected to the brake control rod 2181. When the brake control rod 2181 rotates, the pinion gear 2287 connected to the brake control rod 2181 may also rotate and the rack 2285 may then translate longitudinally by virtue of the toothed connection between the pinion gear 2287 and the toothed portion 2286 of the rack 2285. Relative to FIG. 50, counter-clockwise rotation of the brake control rod 2181 may cause the pinion gear 2287 to rotate counter-clockwise, which may then cause the rack 2285 to translate longitudinally toward the other end of the patient support. Rotation of the brake control rod 2181 clockwise may cause the rack 2285 to translate in the opposite direction. There may be a similar rack and pinion arrangement at the other end of the patient support. Translation of the rack 2285 may cause the pinion gear at the other end to rotate, thereby causing the brake control rod at the other end to rotate, thereby setting the condition of the casters at the other end. Thus, rotation of the brake control rod 2181 at one end of the patient support due to actuation of the brake pedal 117 may also cause rotation of the brake control rod at the other end of the patient support simultaneously setting the caster conditions at both ends of the patient support. Furthermore, since the brake control rod at the other end of the patient support is also linked to a corresponding brake lever mechanism, pedal pin and brake pedal, actuation of the brake pedal 117 may also cause corresponding motions in the brake lever mechanism, pedal pin and brake pedal at the other end.

FIG. 50 shows the pinion gear 2287 fixedly mounted on the brake control rod 2181 whereby the brake control rod 2181 is seated in a complementary shaped aperture in the pinion gear 2287. A set screw 2288 ensures that the brake control rod 2181 and the pinion gear 2287 are secured together. However, it is evident that other arrangements for connecting the pinion gear to the brake control rod may be used and other styles of pinion gears used. Further, while one control rod connector is all that may be required, two or more control rod connectors at various location along the width of the patient support may be provided if desired.

Furthermore, the control rod connector 2272 is shown in the figures in three parts, the elongated rack 2285 with toothed portions 2286 secured to the ends of the rack 2285. However, the control rod connector may be constructed from one, two, three or more pieces as desired. The teeth of the rack may be on a separate piece (as shown) or may be machined directly onto the elongated rack. Only one or more portions of the rack may comprise teeth, or the entire rack may comprise teeth.

Because the movement of the patient support is most likely to be effected by pushing the patient support from one end (e.g. the head end), different types of casters may be used at the head end as opposed to the foot end. For example, the casters at the head end may have three distinct conditions—locked, neutral and steering. The casters at the foot end may have only two distinct conditions—locked and neutral. However, since the central lock and steer mechanism may provide a direct 1:1 correlation between three pedal positions and the three distinct caster conditions, and the pedal at one end of the patient support is directly correlated with the pedal at the other end, the casters at the foot end could also have three conditions where two of the conditions are indistinct, i.e. two of the conditions are the neutral condition. Thus, when the casters at the head end of the patient support are in the steer condition, the casters at the foot end would be in the neutral condition.

Guard structures at the sides of a patient support are useful for reducing the possibility that a patient may fall out of the patient support causing injury to himself or herself. Conversely, when a patient may deliberately enter or exit the patient support, it may be useful for the guard structures to be in positions that do not block ingress and egress of a patient. Therefore, guard structures that are moveable between a guard position and an open position may be useful. In addition, the open position for a guard structure may still obstruct patient ingress and egress from the patient support unless the guard structure may be moved to a position that is completely out of the path of a patient entering or exiting the patient support. Such a completely out of the path position may be under the patient support deck of the patient support.

On patient supports, guard structures may occupy several positions. For example, a raised or guard position may be above the patient support deck blocking entrance to and exit from the patient support. A low position may be alongside the patient support deck. An ultralow position may be below a horizontal plane of the patient support deck but laterally outward of the patient support deck. A tuck position may be below a horizontal plane of the patient support deck and under a lower surface of the patient support deck such that the guard structure has been moved laterally toward a centerline of the patient support relative to the ultralow position. The tuck position is especially useful for permitting the patient to enter and exit the patient support unobstructed and for assisted patient transfers from one patient support to another. The tuck position also reduces the effective width of the patient support to facilitate transport, especially through doors.

In a height and width adjustable patient support, the provision of width expandability together with low patient support deck height and tuckability of the guard structures was a problem. The guard structures ideally have a narrow enough profile to completely tuck under the patient support deck at all patient support deck widths. However, to permit the patient support to achieve a low position and then be raiseable back to a high position while supporting the extreme weight of a bariatric patient, a variety of frames and a robust lift mechanism need to be placed under the patient support deck, thereby limiting the space available for tucking a guard structure. To overcome this problem, the guard structures may be mounted on the deck extension pans with a pin in slide mechanism that is slim enough to fit the guard structure under the deck extension pans when the patient support is at the narrowest width, and a rack and pinion mechanism may be employed to reduce the space required by linkages for pivoting the guard structures from position to position. These features especially coupled with height controls for preventing the guard structures in the tuck position from accidentally being crushed under the patient support in the low position help overcome the limitations imposed by such a height and width adjustable patient support.

In addition, on a width adjustable patient support it may be desirable for the guard structures to be adjustable laterally along with the patient support deck. While guard structures at the head end of the patient support have been mounted on the patient support deck in order to be raised together with the deck when the deck is articulated, guard structures nearer the foot end of the patient support have been typically mounted on the frame supporting the deck. In contradistinction, the present patient support may have the foot end guard structures mounted on the deck itself in order to allow the foot end guard structures to adjust with the deck.

Figure 51:
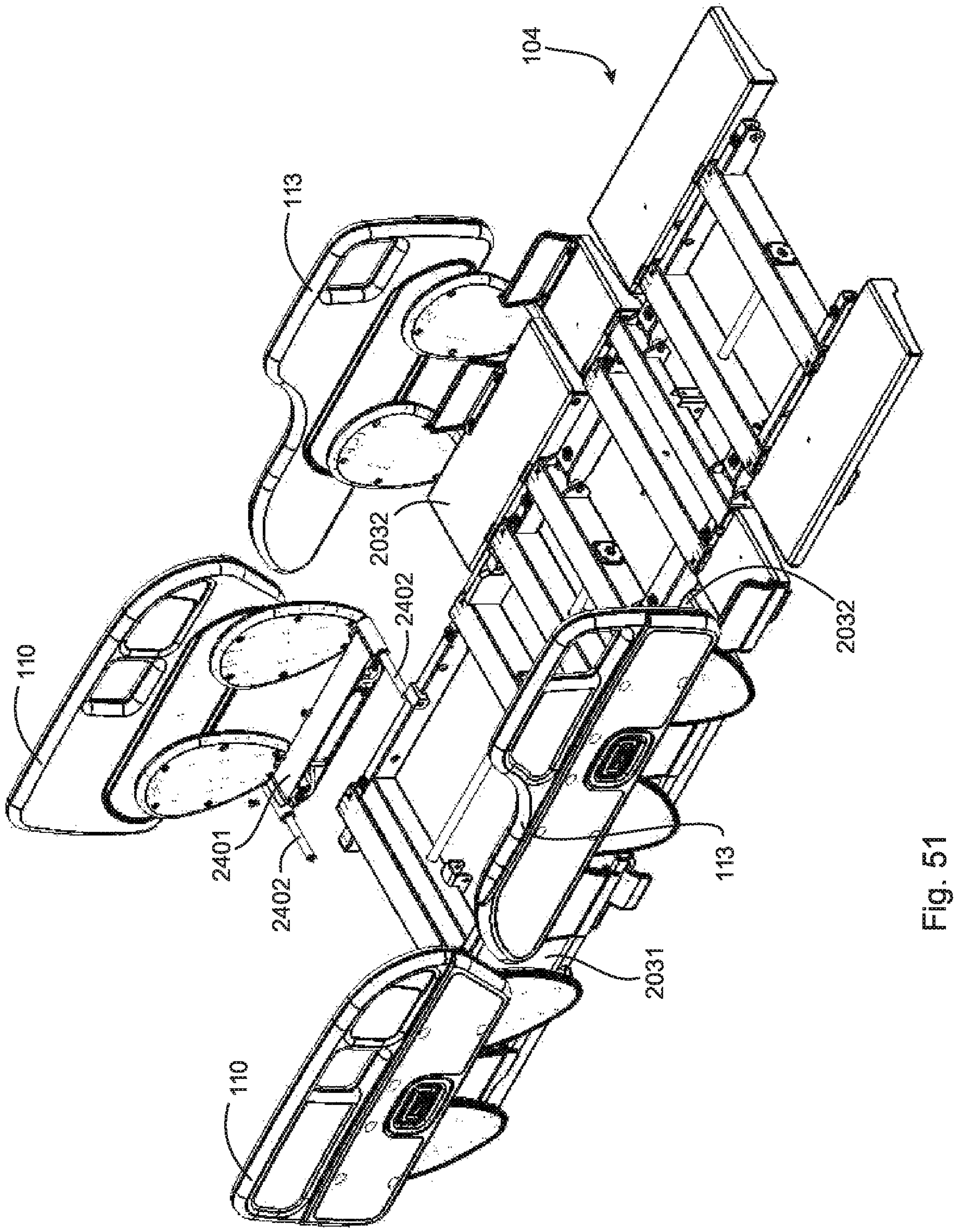
FIG. 51 is a perspective view of a patient support deck having guard structures mounted on deck extension pans thereof.

Referring to FIG. 51 a patient support deck 104 having head rails 110 and foot rails 113 mounted on head deck extension pans 2031 and seat deck extension pans 2032, respectively, is shown, in which one of the head deck extension pans is not shown to illustrate head rail slide bracket 2401 slidably engaged with head rail bracket support pins 2402. The head rail 110 may be rotatably supported on the head rail slide bracket 2401 and the head rail bracket support pins 2402 may be fixedly secured to the head deck extension pan (not shown). All of the head rails 110 and foot rails 113 may be slidably mounted to respective deck extension pans 2031 and 2032 in a similar manner. Further detail is provided below in connection with FIG. 52A, FIG. 52B and FIG. 52C. Mounting the head rails 110 and foot rails 113 to respective deck extension pans 2031 and 2032 may permit the rails 110, 113 to move with the extension pans 2031, 2032 when the width of the patient support deck is adjusted between the various widths. Because the foot rails 113 do not need to be mounted on the frame of the patient support, an independent mechanism for foot rail expansion may not be required.

Figure 52B:
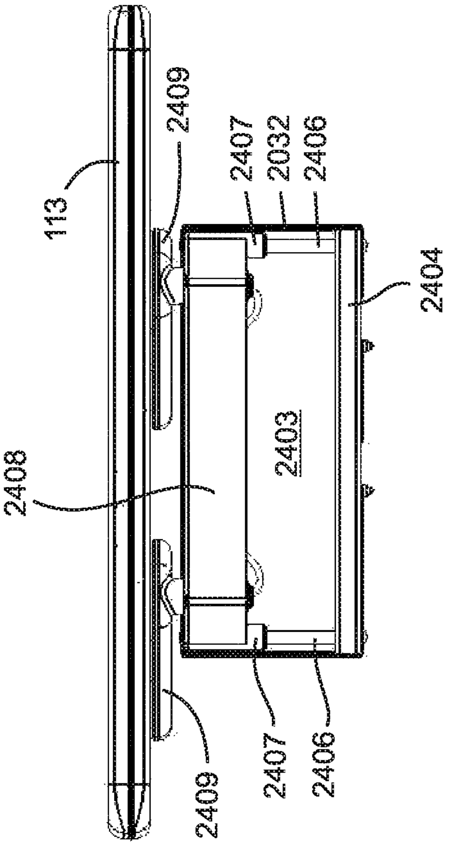
FIG. 52B is a bottom view of FIG. 52A.
Figure 52C:
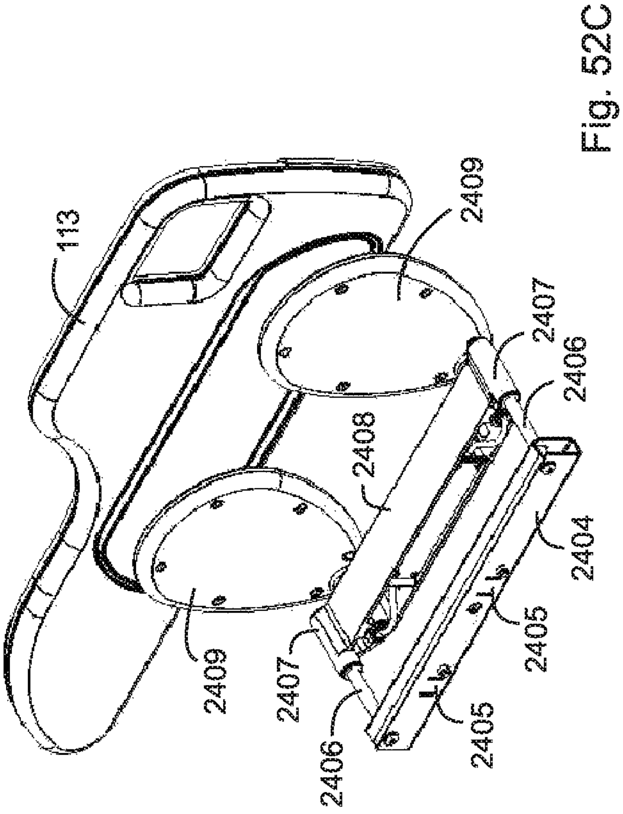
FIG. 52C shows FIG. 52A without an outer shell of the seat deck extension pan illustrating how the foot rail is mounted to the seat deck extension pan.
Figure 52A:
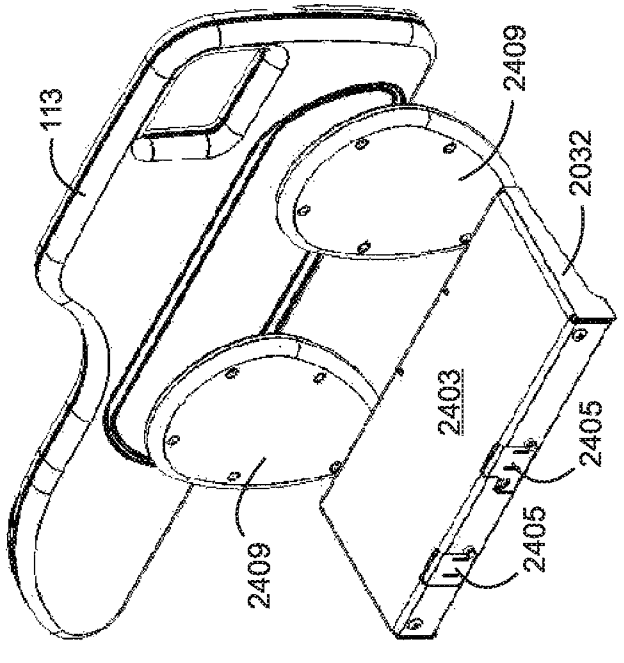
FIG. 52A is a perspective view of a foot rail mounted on a seat deck extension pan.

FIG. 52A, FIG. 52B and FIG. 52C show a foot rail 113 mounted on a seat deck extension pan 2032. The following description of the foot rail 113 analogously applies to all of the guard structures (e.g. head rails and foot rails). The seat deck extension pan 2032 may comprise an outer shell 2403 housing a foot rail mounting bracket 2404. The foot rail mounting bracket 2404 may be fixedly secured to the seat deck (not shown) at seat deck rail mounts 2405, which may be part of the extending deck mechanism described above, as best seen in FIG. 23. The foot rail mounting bracket 2404 may also comprise foot rail bracket support pins 2406 fixedly attached thereto and extending laterally therefrom. The foot rail bracket support pins 2406 may be slidably engaged in through apertures 2407 of foot rail slide bracket 2408. The foot rail slide bracket 2408 may be free to slide laterally on the foot rail bracket support pins 2406. However, when the foot rail 113 is in a raised position or a low position (see FIG. 53A and FIG. 53B), the foot rail slide bracket 2408 may be prevented from sliding the full distance towards the foot rail mounting bracket 2404 because foot rail arms 2409, which may be pivotally attached to the foot rail slide bracket 2408 through foot rail arm weldments in foot rail arms 2409, hit the seat deck extension pan 2032. Only when the foot rail 113 is in an ultralow position (see FIG. 53C) with the foot rail arms 2409 fully beneath the seat deck extension pan 2032 can the foot rail slide bracket 2408 slide the full distance towards the foot rail mounting bracket 2404, thereby tucking the foot rail 113 under the seat deck extension pan 2032. To facilitate smooth tucking no matter where on the foot rail 113 a user pushes, one of the foot rail bracket support pins 2406 may be rigidly fixed to the foot rail mounting bracket 2404, while the other of the foot rail bracket support pins 2406 may have some movement tolerance. Thus, even if the force used to tuck the foot rail 113 is off center, the foot rail 113 may tuck smoothly without binding on the foot rail bracket support pins 2406.

Figure 53A:
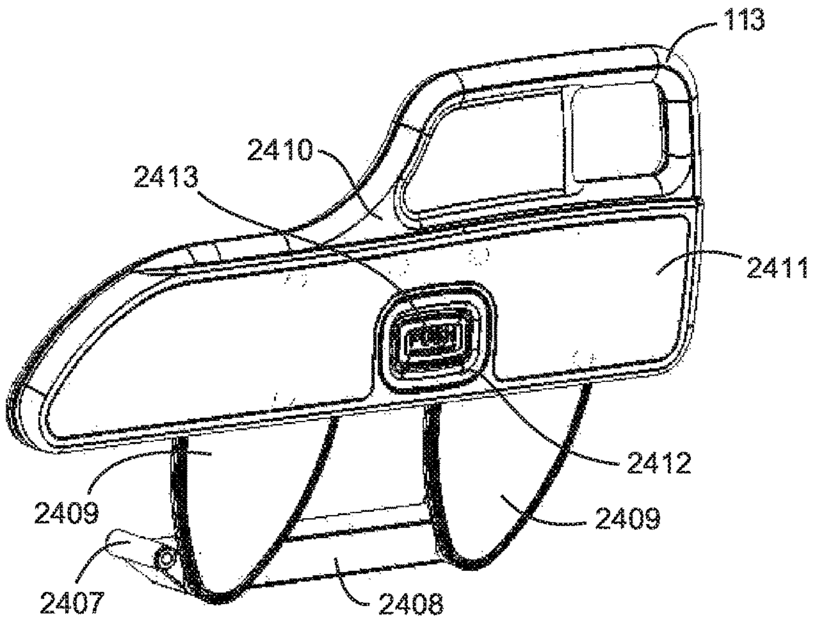
FIG. 53A is a side perspective view of a foot rail in a raised or guard position.
Figure 53B:
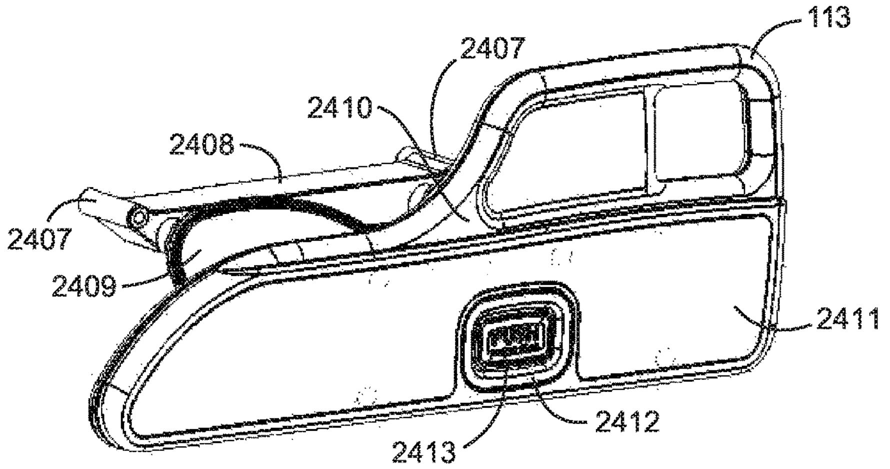
FIG. 53B is a side perspective view of a foot rail in a low position.
Figure 53C:
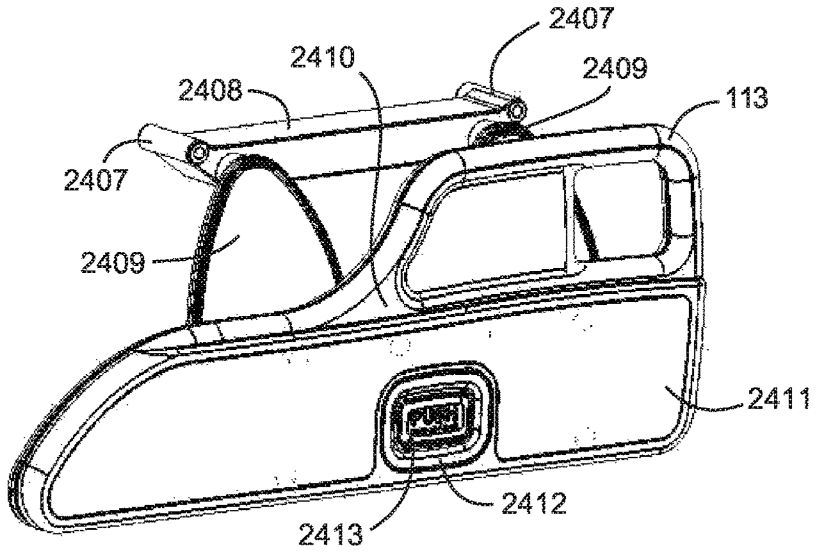
FIG. 53C is a side perspective view of a foot rail in an ultralow position.

FIG. 53A, FIG. 53B and FIG. 53C show the foot rail 113 in the raised or guard position, the low position and the ultralow positions, respectively. The foot rail arms 2409 may be pivotally attached to the foot rail slide bracket 2408 and as the two foot rail arms 2409 pivot on the foot rail slide bracket 2408 the foot rail may travel through an arcuate path with the foot rail arms 2409 pointing vertically in the raised and ultralow positions and horizontally in the low position. Throughout the arcuate path, the foot rail 113 may remain oriented in the same direction. As can be seen in FIG. 53C, the foot rail 113 may be at or below the level of the foot rail slide bracket 2408 in the ultralow position, which may be below the level of the seat deck extension pan. In the ultralow position, the foot rail 113 may be tucked under the seat deck extension pan in a tuck position. The foot rail may further comprise a foot rail panel 2410 and a foot rail panel overlay 2411 to cover internal workings of the foot rail 113. A foot rail release panel 2412 may also house a foot rail release overlay 2413 and cover a foot rail release mechanism inside the foot rail 113.

Figure 54A:
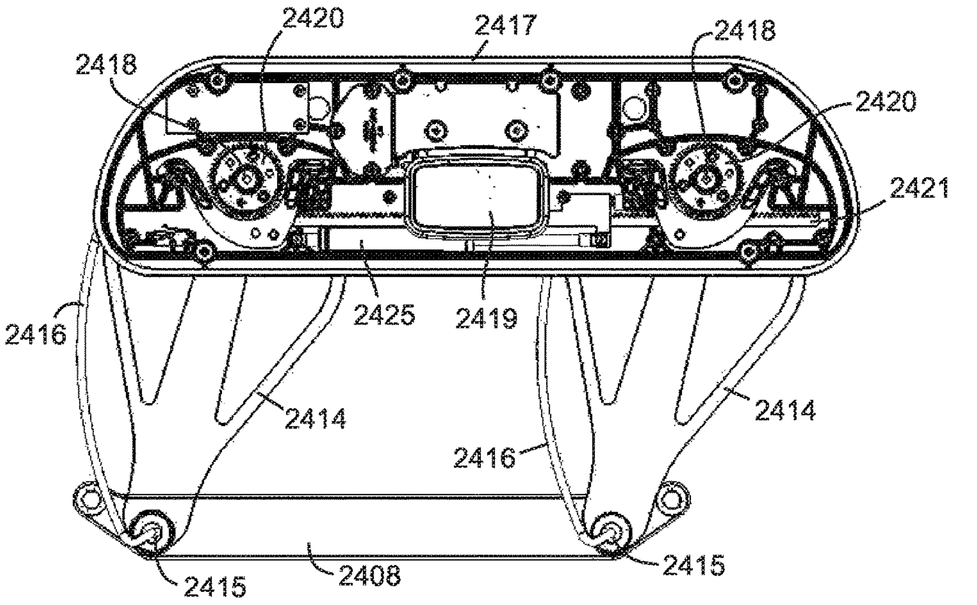
FIG. 54A is a side view of the foot rail shown in FIG. 53A without foot rail panel.
Figure 54B:
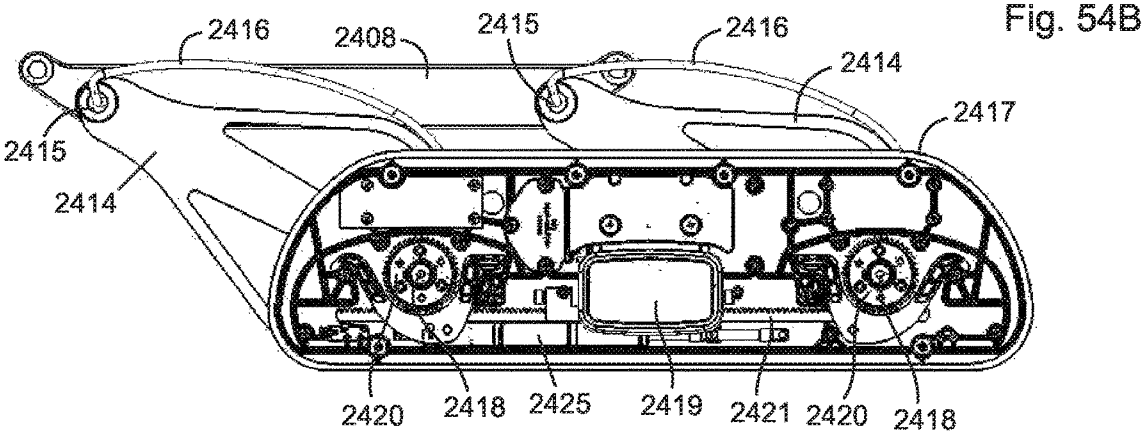
FIG. 54B is a side view of the foot rail shown in FIG. 53B without foot rail panel.
Figure 54C:
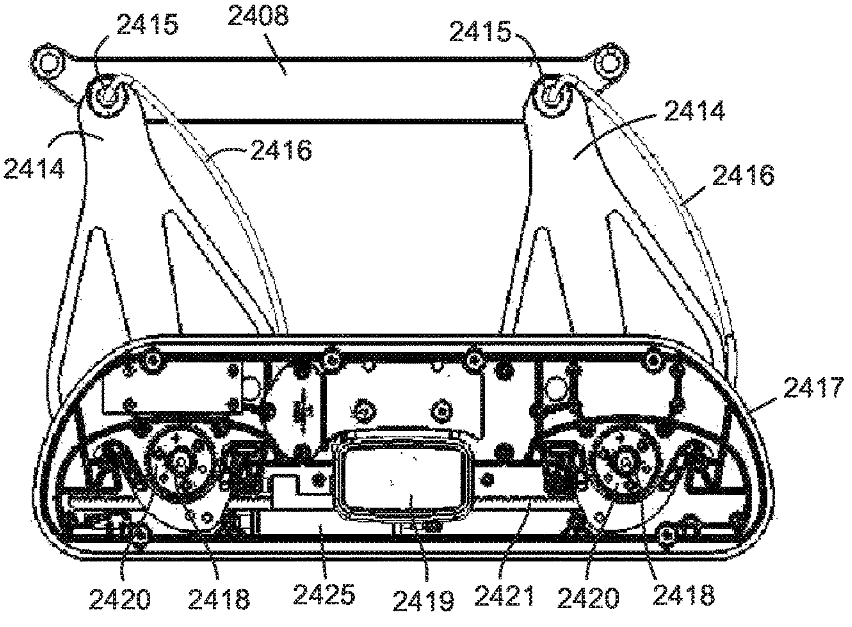
FIG. 54C is a side view of the foot rail shown in FIG. 53C without foot rail panel.

FIG. 54A, FIG. 54B and FIG. 54C show side views of the foot rails shown in FIG. 53A, FIG. 53B and FIG. 53C without covering panels. Foot rail arm weldments 2414 may pivotally connect the foot rail mechanism housing 2417 to the foot rail slide bracket 2408 at pivot pins 2415 between the foot rail arm weldments 2414 and the foot rail slide bracket 2408 and pivot pins 2418 between the foot rail arm weldments 2414 and the foot rail mechanism housing 2417. The two foot rail weldments 2414, the foot rail slide bracket 2408 and the foot rail mechanism housing 2417 may form a pivoting parallelogram linkage with pivot points at the two pivot pins 2415 and the two pivot pins 2418. As the foot rail mechanism housing 2417 pivots, the parallelogram linkage may maintain the foot rail mechanism housing 2417 in the same orientation. The pivot pins 2415 may be hollow in the center to permit passage of a foot rail electronic release wire 2416 that may connect an electronic foot rail release mechanism to the control circuitry of the patient support.

Within the foot rail mechanism housing 2417 there may be a rack and pinion system comprising two pinion gears 2420 and a toothed linear rack 2421. The pinion gears 2420 may be fixedly mounted on the pivot pins 2418 located at pivot points of the foot rail, rotation of the pivot pins 2418 resulting in rotation of the pinion gears 2420. Teeth of the pinion gears 2420 may be meshed with teeth of the toothed linear rack 2421. The toothed linear rack 2421 may be above or below the pinion gears 2420. Clockwise rotation of the pinion gears 2420 as the foot rail is pivoted from a higher position to a lower position moves the rack 2421 toward the left, while counter-clockwise rotation of the pinion gears 2420 as the foot rail is pivoted from a lower position to a higher position moves the rack 2421 toward the right. Because the two pinion gears 2420 are longitudinally aligned along an axis parallel to the linear rack 2421, the rack and pinion system may keep the foot rail arm weldments 2414 parallel throughout the pivoting of the foot rail, even when all of the pivot points (at the pivot pins 2415 and

2418) longitudinally align. The rack and pinion system may require less space permitting construction of a foot rail with a narrower profile. A foot rail damper 2425 (e.g. a gas cylinder) connected to the linear rack 2421 may be used to control fall rate of the foot rail. A foot rail release handle 2419 may actuated to manually release a lock on the foot rail to permit pivoting of the rail.

Figure 55A:
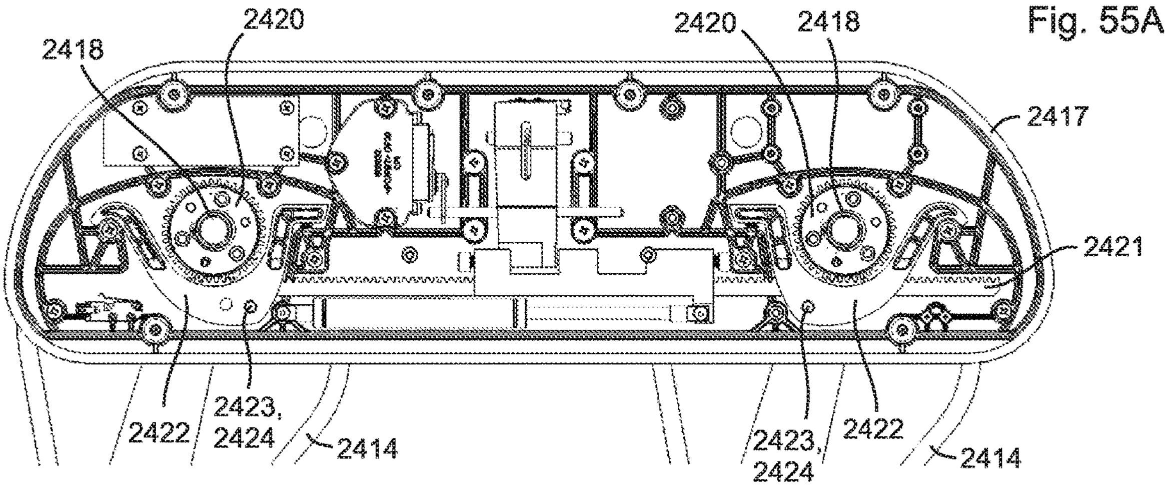
FIG. 55A is a magnified view of FIG. 54A showing details of the foot rail mechanism.
Figure 55B:
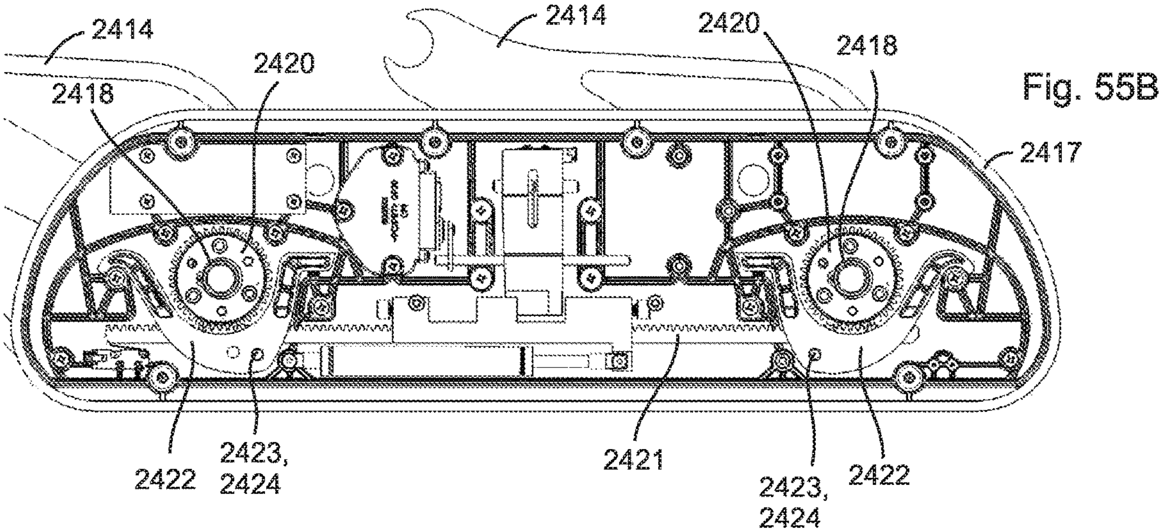
FIG. 55B is a magnified view of FIG. 54B showing details of the foot rail mechanism.
Figure 55C:
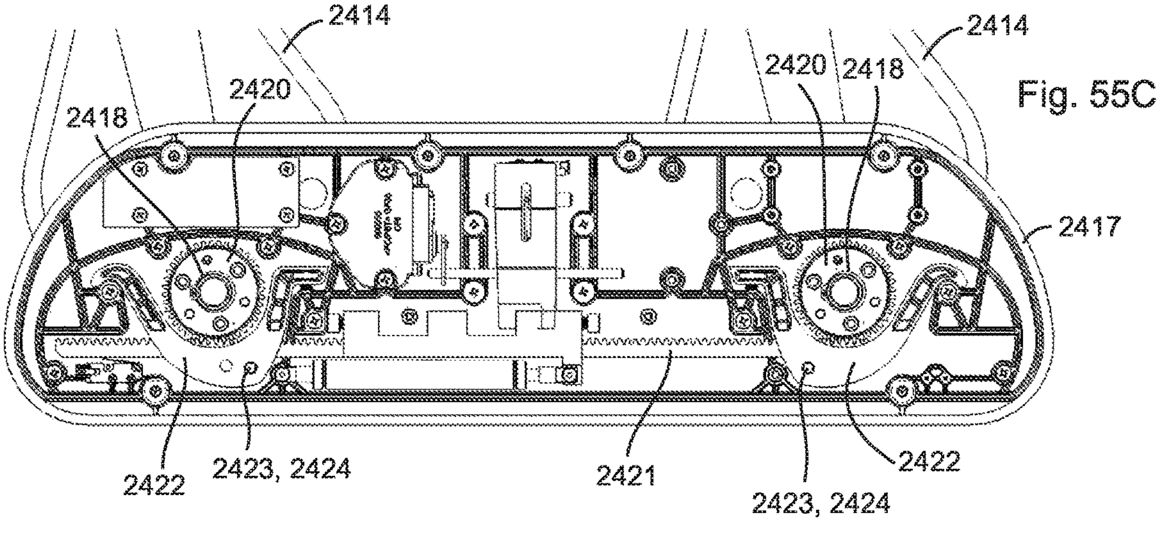
FIG. 55C is a magnified view of FIG. 54C showing details of the foot rail mechanism.

FIG. 55A, FIG. 55B and FIG. 55C show details of the foot rail mechanism. The toothed rack 2421 may be free-floating for unimpeded movement left or right depending on which way the foot rail is being pivoted. When the foot rail is in the raised position (FIG. 55A) with the foot rail arm weldments 2414 pointing downward, the rack 2421 may be as far right as possible in the foot rail mechanism housing 2417. When the foot rail is in the ultralow position (FIG. 55C) with the foot rail arm weldments 2414 pointing upward, the rack 2421 may be as far left as possible in the foot rail mechanism housing 2417.

However, if the rack is completely free, pivoting action of the foot rail becomes labored when the foot rail arm weldments 2414 pass through a longitudinally aligned position. The lack of smooth action is uncomfortable and annoying. To smooth out the pivoting action of the foot rail, the rack 2421 may be pre-loaded with a load to permit flexing of the rack 2421, which controls manufacturing tolerances. Without a load on the rack 2421, the foot rail weldments 2414 may not be able to pivot past the pivot pins 2418 causing the foot rail to bind when the foot rail weldments 2414 are longitudinally aligned. Any suitable means for applying a load to the rack 2421 may be used. For example, as shown in FIG. 55A, FIG. 55B and FIG. 55C, slings 2422 may be bolted over the rack 2421 with bolts 2424 to apply the load. Although the load may be applied in any suitable location close to a vertical axis through the pivot pins 2418, the load may be preferably applied at a location that is not vertically aligned with the pivot pins 2418 in order to provide a slight bow in the rack 2421. For space considerations, the load may be applied just to the inside of the vertical axis through the pivot pins 2418, for example with the bolts 2424 as shown in FIGS. 55A-C. The load should not be applied too far from the vertical axis through the pivot pins 2418, otherwise the pinion gears 2420 may skip a tooth on the rack 2421. In addition, rotational bearings may be placed under the under the rack 2421 to support the rack 2421 and to provide for smooth linear travel of the rack 2421. The rotational bearings may be placed anywhere along the rack 2421, however, for convenience rotational bearings 2423 may be placed around the bolts 2424 and held in place by the sling 2422.

Thus, by pre-loading the rack 2421 at points off the vertical axis through the pivot pins 2418, the foot rail may be pivoted smoothly without binding. By placing all the parts in the foot rail mechanism housing 2417, the lower part of the foot rail arm weldments 2414 may be as short as possible improving tuckability of the foot rail.

Figure 56:
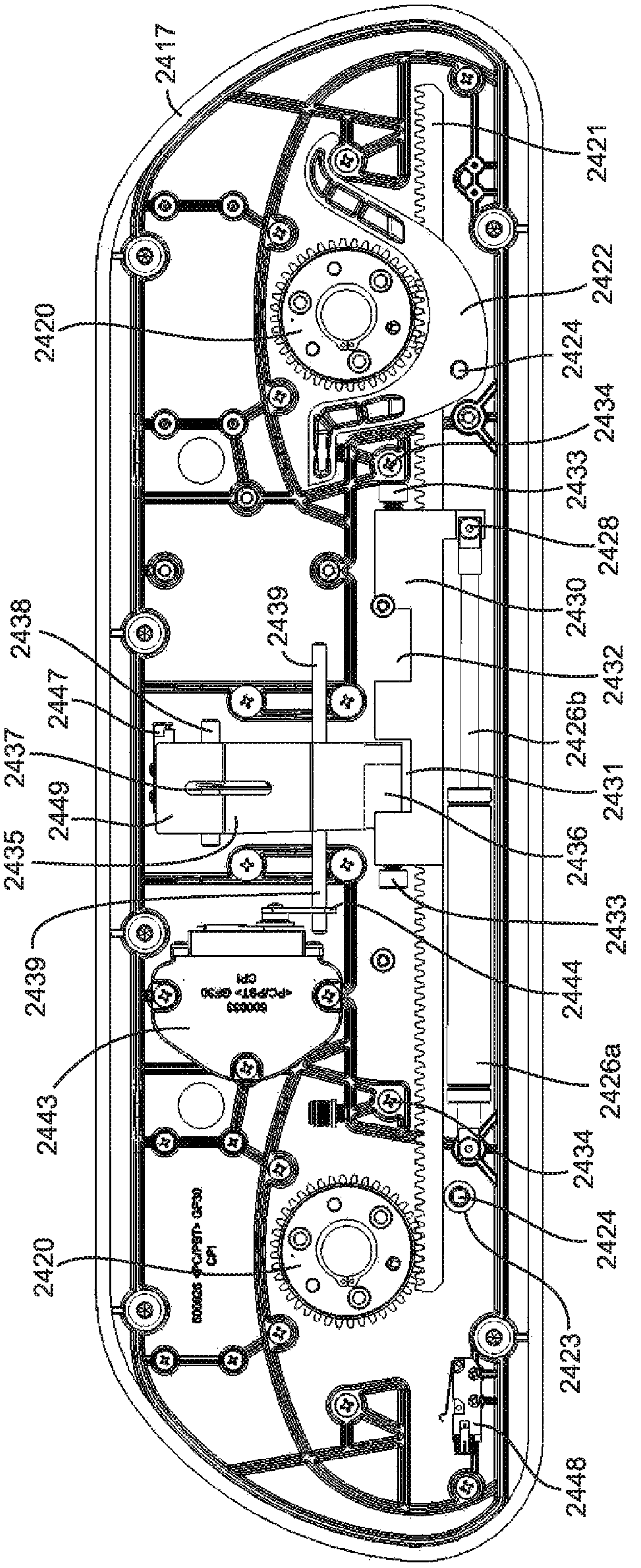
FIG. 56 is a magnified view of FIG. 55A showing more details of the foot rail mechanism.

More details of the foot rail mechanism are shown in FIG. 56, where the foot rail mechanism housing 2417 may house the pinion gears 2420 meshed with the toothed linear rack 2421 loaded by the slings 2422 (only one shown) bolted to the foot rail mechanism housing 2417 over the rack 2421 with the bolt 2424, the rack 2421 free to move longitudinally and riding on rotational bearings 2423. The foot rail mechanism may further comprise a latching mechanism. The latching mechanism may comprise a two-position latch piece 2430 having a raised position catch retainer 2431 and a low position catch retainer 2432. A catch retainer for the ultralow position is unnecessary as the foot rail cannot pivot any lower than the ultralow position. The latch piece 2430 may be secured to the rack 2421 so that the latch piece 2430 moves with the rack 2421 when the foot rail is pivoted. Over travel adjustment screws 2434 may prevent further longitudinal motion of the rack when the adjustment screws 2434 abut travel stops 2433 attached to the housing 2417. The over travel adjustment screws 2434 control play and position of the foot rail in the raised and ultralow positions. The foot rail damper may comprise a gas cylinder having a body **2426*a* and a rod 2426*b*, the body 2426*a* attached to the housing 2417 by bolt 2427 and the rod 2426*b* attached to the latch piece 2430 by bolt 2428**.

The latching mechanism may further comprise spring-loaded latch lever 2435 having a raised catch 2436 proximate one end. When the raised catch 2436 is aligned with one of the catch retainers 2431 or 2432, a pivot spring 2437 on pivot rod 2438 forces the raised catch 2436 into the catch retainer 2431 or 2432, thereby locking further movement of the rack 2421 and hence preventing further movement of the foot rail. Releasing the latching mechanism may be accomplished manually or electronically.

Figure 57A:
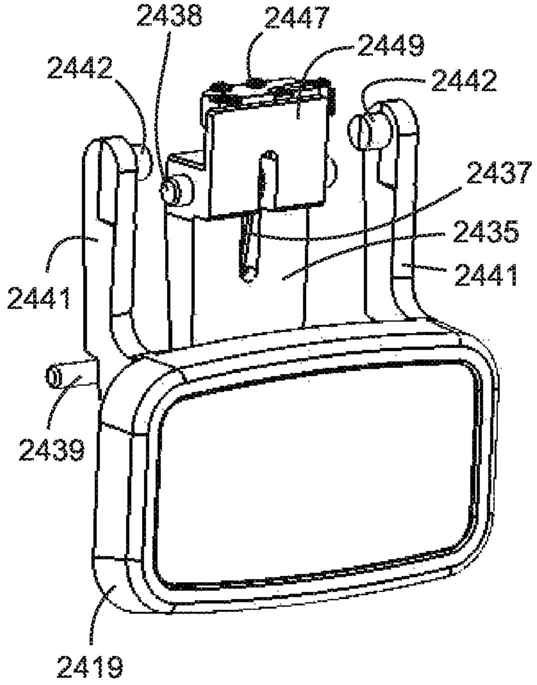
FIG. 57A is a perspective view of a latch lever of the latching mechanism together with a foot rail release handle.
Figure 57B:
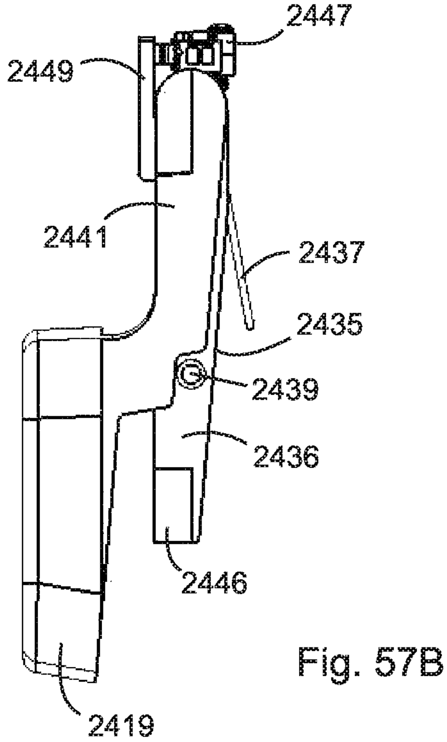
FIG. 57B is a side view of FIG. 57A.

To manually release the catch 2436 from the catch retainer 2431 or 2432, the foot rail release handle 2419 (see FIG. 54A, FIG. 54B and FIG. 54C) may be depressed since the foot rail release handle 2419 is configured to apply force to latch interface pins 2439 rigidly connected to the latch lever 2435 (see FIG. 57A and FIG. 57B). The applied force pushes the catch 2436 out of the catch retainer 2431 or 2432 permitting the rack 2421 to move longitudinally. A small amount of travel by the rack 2421 misaligns the catch 2436 and the catch retainer 2431 or 2432 so that when the foot rail release handle 2419 is no longer depressed, the catch 2436 presses against the latch piece 2430 but is not an impediment to movement of the rack 2421. A coiled spring (not shown) under the foot rail release handle 2419 may be used for tension and to return the release handle 2419 to an undepressed state, but the coiled spring should be configured to not interfere with longitudinal movement of the latch piece 2430 and rack 2421.

Referring to FIG. 57A, FIG. 57B, FIG. 57C and FIG. 57D, details of the latch lever 2435 together with the foot rail release handle 2419 are shown. The latch lever 2435 may comprise the raised catch 2436, the latch interface pins 2439 and the pivot spring 2437 on the pivot rod 2438 as previously described. The foot rail release handle 2419 may comprise release handle pivot arms 2441 and release handle pivot pins 2442, the release handle pivot pins 2442 pivotally mounted to a latch lever cover (not shown) secured to the foot rail mechanism housing. The release handle pivot arms 2441 may contact the latch interface pins 2439, for example at shoulders in the release handle pivot arms 2441. Depressing the foot rail release handle 2419 may cause the release handle pivot arms 2441 to pivot on the release handle pivot pins 2442, the release handle pivot arms 2441 thereby applying a force to the latch interface pins 2439, which may cause the latch lever 2435 to pivot on the pivot rod 2438 against the bias of the pivot spring 2437 resulting in disengagement of the raised catch 2436 from the catch retainer (not shown).

Referring to FIG. 56, FIG. 57A, FIG. 57B, FIG. 57C and FIG. 57D, to electronically release the catch 2436 from the catch retainer 2431 or 2432, a servo 2443 may be employed. A drive shaft of the servo 2443 is connected to a lever arm 2444 that abuts one of the latch interface pins 2439. A signal to the servo 2443 from the control circuit of the patient support rotates the drive arm which rotates the lever arm 2444 thereby applying a force to the latch interface pin 2439, which in turn pushes the catch 2436 out of the catch retainer 2431 or 2432 permitting the rack 2421 to move longitudinally. The servo 2443 may be small as not much power is required to push the catch 2436, although the servo 2443 may be larger if desired or one or more extra servos may be employed if more power is desired. To reduce the need for more power from the servo 2443, the raised catch 2436 may comprise a bevel 2446 that mates with a matching bevel on the catch retainers 2431 or 2432 (FIG. 56). The matching bevels may reduce friction between the raised catch 2436 and the catch retainers 2431, 2432 thereby reducing the power requirement for disengaging the catch 2436 from the catch retainers 2431, 2432. The bevel may be any suitable angle, for example 5°, that reduces friction while not compromising the latching function of the catch 2436 in the catch retainers 2431, 2432.

The foot rail may be equipped with a mechanism for automatically determining rail position. This may be accomplished in any number of ways including, for example, using accelerometers or inclinometers attached to the foot rail, using rotary encoders on the pinion gears or using switches that switch on and off when the foot rail reaches certain positions. The use of switches may be one of the simpler solutions.

Referring to FIG. 56, FIG. 57A, FIG. 57B, FIG. 57C and FIG. 57D, the foot rail mechanism may further comprise first and second foot rail position switches 2447, 2448 to determine electronically whether the latching mechanism is open or closed. The first foot rail position switch 2447 is positioned with the latch lever 2435 under a switch arm 2449 of the latch lever 2435. With the foot rail in the raised position and the raised catch 2436 engaged in the raised position catch retainer 2431, the switch arm 2449 may activate the first foot rail position switch 2447 because the latch lever 2435 is up at the end comprising the catch 2436 and down at the end comprising the switch arm 2449 by virtue of a fulcrum at the spring-loaded pivot rod 2438. The second foot rail position switch 2448 may be inactivated, as seen in FIG. 56. Therefore, a first switch on/second switch off state may indicate that the foot rail is locked in the raised position. When the catch 2436 is released from the raised position catch retainer 2431, the latch lever 2435 may pivot so that the switch arm 2449 moves away from the first switch 2447 thereby switching off the first switch 2447. Therefore, a first switch off/second switch off state may indicate that the foot rail is unlocked and free to pivot away from the raised position.

As the foot rail pivots toward the low position from the raised position, the toothed linear rack 2421 may move longitudinally toward the second foot rail position switch 2448 (see FIG. 55B). When the foot rail reaches the low position, the catch 2436 may engage with the low position catch retainer 2432, which may once again cause the switch arm 2449 to switch on the first switch. In addition, the rack 2421 may pass over the second switch 2448 causing the second switch 2448 to switch on as well (see FIG. 55B for the position of the rack in relation to the second switch in the low position). Therefore, a first switch on/second switch on state may indicate that the foot rail is locked in the low position. When the catch 2436 is released from the low position catch retainer 2432, the latch lever 2435 may pivot so that the switch arm 2449 moves away from the first switch 2447 thereby switching off the first switch 2447. Therefore, a first switch off/second switch on state may indicate that the foot rail is unlocked and free to pivot away from the low position.

As the foot rail pivots toward the ultralow position from the low position, the toothed linear rack 2421 may continue to move longitudinally over the second foot rail position switch 2448 (see FIG. 55C). When the foot rail reaches the ultralow position, there is no catch retainer to engage the catch 2436, therefore the switch arm 2449 does not activate the first switch 2447. However, the rack 2421 is still over the second switch 2448 causing the second switch 2448 to remain on as well (see FIG. 55C for the position of the rack in relation to the second switch in the ultralow position). Therefore, a first switch off/second switch on state may also indicate that the foot rail is in the ultralow position and free to pivot away from the ultralow position. To determine whether the foot rail is in the tuck position may require a further switch or other position sensing device. However, the second switch 2448 may be included in a circuit connected to the height adjustability of the patient support such that when the second switch 2448 is on and the first switch 2447 is off, the patient support cannot be lowered below a fixed height. Such an arrangement reduces the likelihood of crushing the foot rail beneath the patient support deck when the foot rail is in the tuck position.

In addition, permutations of switch states for the first and second switches 2447, 2448 may also be linked to predetermined height adjustability parameters of the patient support. Also, any additional or alternative ways of determining guard structure position may be linked to predetermined height adjustability parameters of the patient support.

Figure 57C:
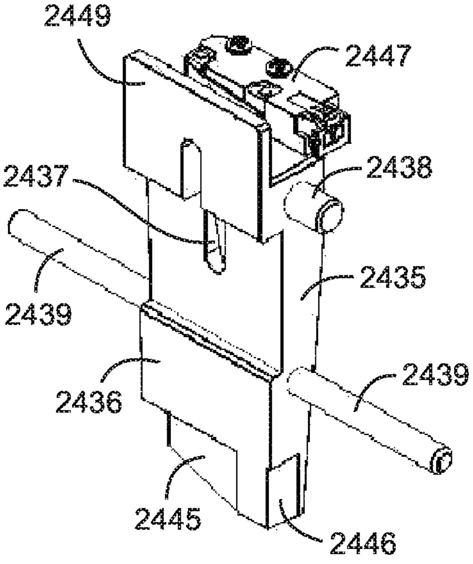
FIG. 57C is a perspective view of the latch lever of FIG. 57A without the foot rail release handle.
Figure 57D:
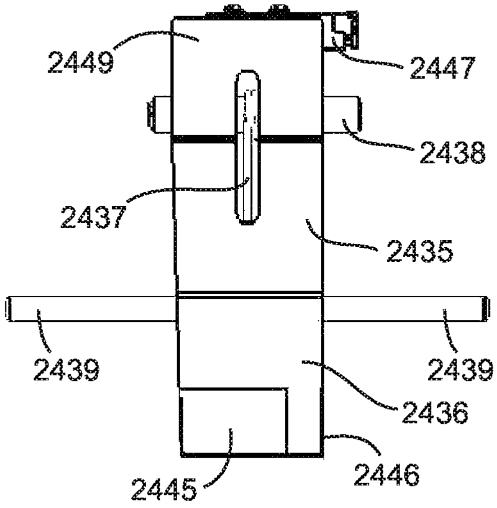
FIG. 57D is a front view of FIG. 57C.

Pivoting of the foot rail back to the raised position from the ultralow position reverses the switching order. Thus, the interaction of the switch arm 2449 with the first foot rail position switch 2447 may be an indicator of whether the rail is locked in the raised or low positions, while the interaction of the toothed linear rack 2421 with the second foot rail position switch 2448 may be an indicator of the position of the foot rail. Information from both switched may provide an indication of both the position and lock state of the foot rail. While the latching mechanism may lock the foot rail in the raised and low positions to prevent further downward pivoting of the foot rail, the latching mechanism, even when engaged, does not prevent the foot rail from being raised. As seen in FIG. 57C and FIG. 57D, the raised catch 2436 may comprise a second bevel 2445 on the opposite side of the catch 2436 as the smaller bevel 2446. Unlike the bevel 2446, the second bevel 2445 may be much larger and affords no abutment surface to catch within the catch retainers 2431, 2432. Thus, upward pivoting of the foot rail may be unrestricted by the latch mechanism. Upward pivoting of the foot rail is halted at the raised position because that is as far as the foot rail can travel. Downwards pivoting may be halted at the raised and low positions by the latch mechanism and at the ultralow position because that is as low as the foot rail can travel. Therefore, in the raised position the foot rail is not free to pivot either up or down, while in the low and ultralow positions the foot rail is free to pivot up but not down.

In addition, the first and second foot rail position switches 2447, 2448 may be slightly asynchronous, with one switch turning on or off, depending on the direction of travel of the foot rail, before the other switch. This affords the opportunity to determine whether the foot rail is pivoting up or down. Other devices, for example accelerometers, may provide the same information and can be used in conjunction with or instead of the asynchronicity of the first and second foot rail position switches 2447, 2448.

In another aspect, instead of a rack and pinion mechanism, an endless member (e.g. a belt of a chain) may connect the two pinion gears 2420 allowing the pinion gears 2420 to rotate synchronously. The pinion gears could be replaced with other rotational elements, for example toothless wheels.

One feature that is useful on patient supports is the ability to remove the footboard. Because the footboard may contain a control panel for electrical and electronic functionalities of the patient support, it may become necessary to electrically connect the footboard to the rest of the patient support in a reversible manner that does not require a great deal of time and labour to connect and disconnect. Ideally, the acts of removing and replacing the footboard automatically result in the disconnection and connection of the electrical components. One problem faced in such an operation is to ensure that electrical connection between the footboard and the rest of the patient support are properly aligned when replacing the footboard. The prior art uses circular plug-in connections and the half of the connection in the foot board is a so-called floating connection that moves into the correct position as the footboard is replaced on the patient support. Such an arrangement suffers from the possibility jamming when the footboard is being replaced and component wear due to the moving parts. An alternate type of connection assembly is therefore desired.

Referring to FIG. 58A, FIG. 58B, FIG. 59A, FIG. 59B, FIG. 59C, FIG. 59D, FIG. 59E, FIG. 60A, FIG. 60B and FIG. 60C, an electrical connection assembly useable in conjunction with a footboard at the foot of a patient support is illustrated. FIG. 58A shows a footboard mounting bracket 2200 on a footboard insert 2217 mountable on the upper frame footboard mount (not shown) at a foot end of a patient support. The footboard mounting bracket 2200 may comprise a pair of post sockets 2202. A first electrical mating half 2204 may be housed in the footboard mounting bracket 2200 and covered by a retractable cover 2213 over gap 2206 to keep dust, fingers and other detritus out of the electrical connection when the footboard is not in place. FIG. 58B shows a corresponding footboard 108 to be mated with the footboard mounting bracket 2200. The footboard may comprise a pair of tubular posts 2205 secured within tubular post engagement elements 2201. A second electrical mating half 2203 may be housed in the footboard and configured to mate electrically with the first electrical mating half 2204 of the footboard mounting bracket 2200. In operation a caregiver may simply lift the footboard 108 out of the post sockets 2202 automatically disengaging the second electrical mating half 2203 from the first electrical mating half 2204. Sliding the tubular posts 2205 of the footboard 108 back into the post sockets 2202 of the footboard mounting bracket 2200 results in automatic re-engagement of the second electrical mating half 2203 with the first electrical mating half 2204.

Figure 59A:
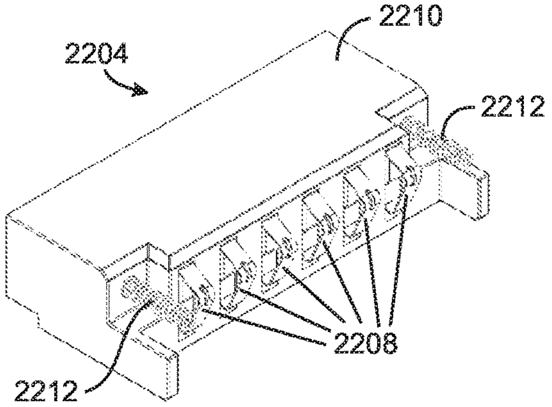
FIG. 59A, FIG. 59B, FIG. 59C, FIG. 59D and FIG. 59E depicts magnified views of electrical connection components in the footboard and footboard mounting bracket of FIGS. 58A-B, where
Figure 59B:
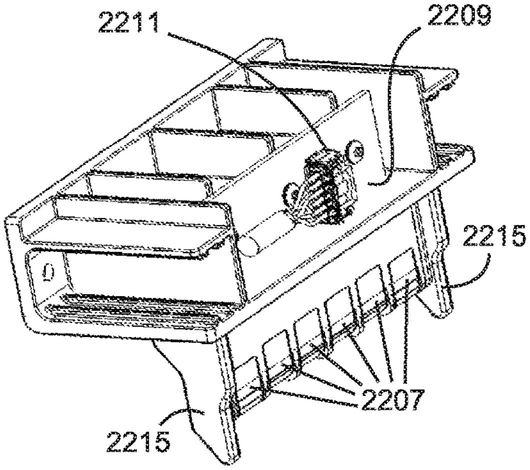
Figure 59C:
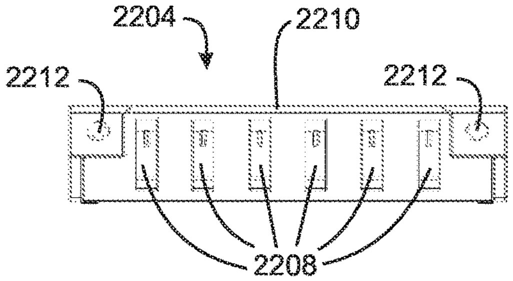
Figure 59D:
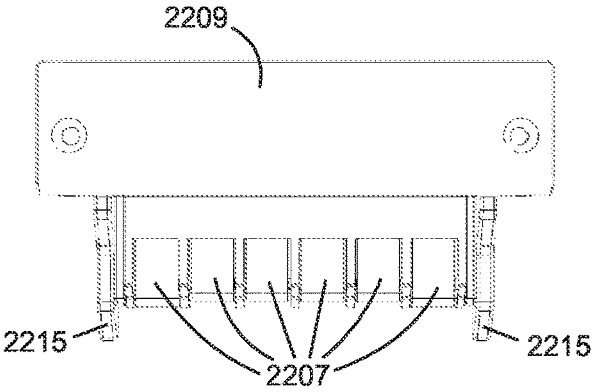

FIG. 59A, FIG. 59B, FIG. 59C, FIG. 59D and FIG. 59E depicts magnified views of the first and second electrical mating halves depicted in FIG. 58A and FIG. 58B. FIG. 59A and FIG. 59B show the first electrical mating half 2204, which may comprise a plurality of leaf spring electrical contacts 2208 (e.g. six leaf springs) extending outwardly from a first connection housing 2210 on which the leaf springs are attached. The housing 2210 may also house other electrical components (not shown) electrically connected to the leaf springs for transmitting electrical signals to other parts of the patient support. The leaf springs 2208 may be arcuately-shaped, flexible and made of an electrically conductive material, for example stainless steel. A pair of coiled compression springs 2212 attached to the housing 2210 and placed proximate the ends of the plurality of leaf springs 2208 may be configured to compress when the retractable cover 2213 is forced to move laterally when the footboard is replaced on the footboard mounting bracket 2200. Details of the cover are provided in FIG. 60 discussed below. FIG. 59C and FIG. 59D show the second electrical mating half 2203, which may comprise a plurality of electrically conducting tabs 2207 (e.g. six tabs) configured to align with the leaf springs when the footboard is in place. The tabs 2207 may be longer and wider than the leaf springs 2208 thereby accommodating movement tolerance of the footboard without the tabs themselves having to move. Electrical contact between the leaf springs 2208 and the tabs 2207 may be maintained by virtue of the springiness of the leaf springs and the size of the tabs, both of which may assist in accommodating misalignments in all three coordinates between the contacts of the first and second electrical mating halves. The tabs 2207 may be attached to a second connection housing 2209 and electrically connected to other electrical components 2211 attached to the housing 2209 for transmitting electrical signals in the footboard.

Figure 59E:
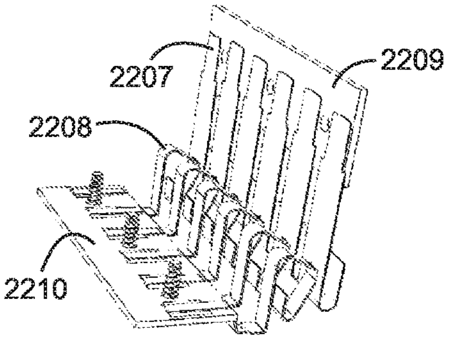

FIG. 59E shows the first and second electrical mating halves mated together with most of the first and second connection housings 2210, 2209 removed for clarity. When the posts 2205 of the footboard are completely slid into the post sockets 2202 of the footboard mounting bracket 2200, the tabs 2207 (only one labeled) may come into mating contact with the leaf springs 2208 (only one labeled) at such close proximity that the torque in the leaf springs maintains electrical contact of the leaf springs with the tabs. The larger length and width of the tabs allows for misalignment with the leaf springs without requiring floating components.

Figure 60A:
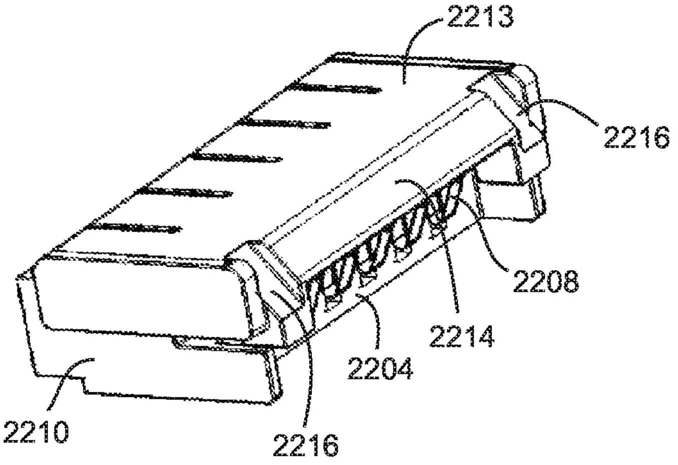
FIG. 60A, FIG. 60B and FIG. 60C depicts magnified views of the electrical mating contacts in the footboard mounting bracket depicted in FIGS. 59A-B in association with a spring-loaded sliding cover, where
Figure 60B:
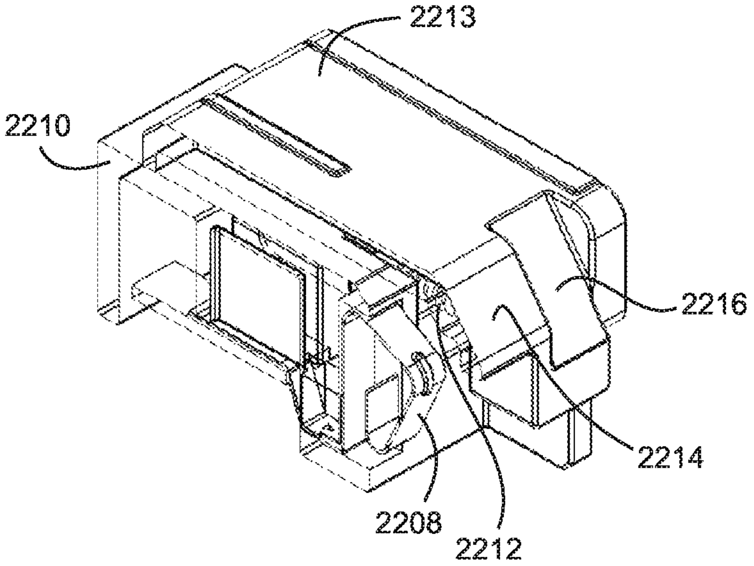
Figure 60C:
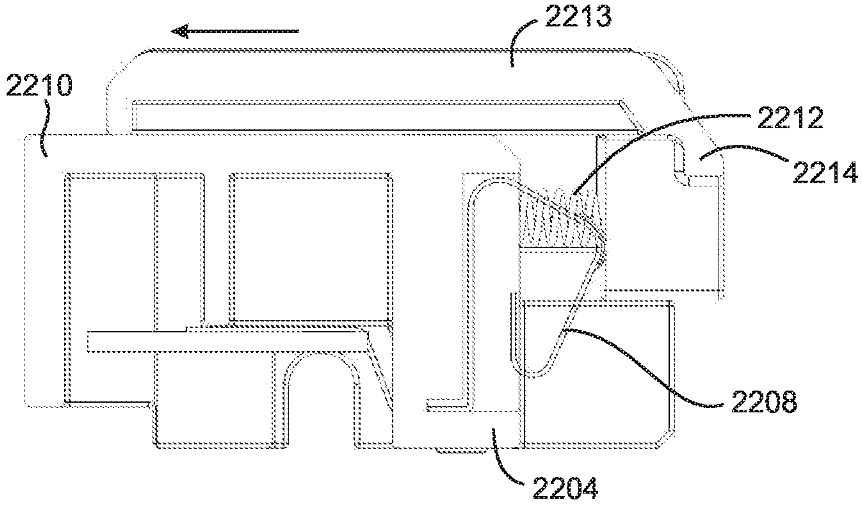

FIG. 60A, FIG. 60B and FIG. 60C depict magnified views of the first electrical mating half 2204 in association with the retractable cover 2213. The retractable cover 2213 may sit slidably atop the housing 2210 of the first electrical mating half 2204 such that downwardly extending portion 2214 of the retractable cover 2213 shelters the leaf springs 2208 (only one labeled) when the footboard 108 is not in place on the footboard mounting bracket 2200. The coiled compression springs 2212 attached to the first connection housing 2210 may be engaged with the under surface of the retractable cover 2213 at the downwardly extending portion 2214. Biasing from the coiled springs prevents the retractable cover 2213 from sliding back along the top of the first connection housing 2210 without applying significant force to the cover. The downwardly extending portion 2214 of the retractable cover 2213 may comprise two cover interface element engagement surfaces 2216, the function of which is described below.

Figure 61B:
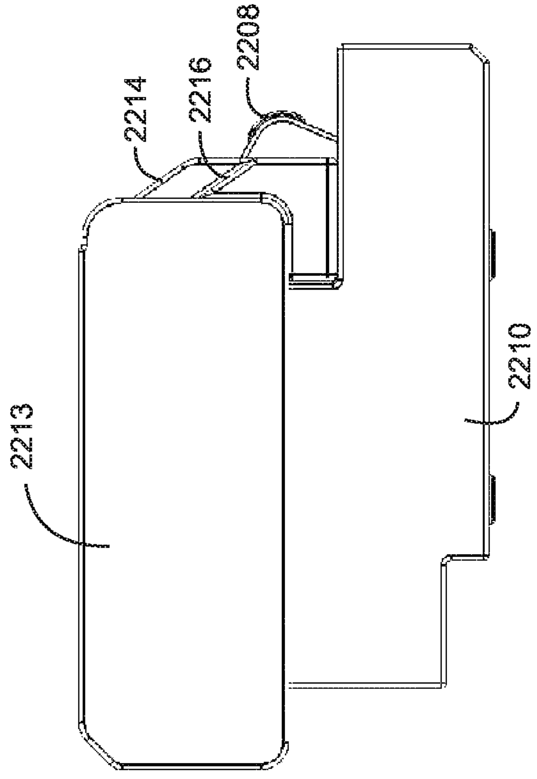
FIGS. 61A and 61B show side views of the electrical mating half in the footboard mounting bracket with a retractable cover in a gap covering position (FIG. 61A) and in a retracted position (FIG. 61B) to expose leaf spring electrical contacts.
Figure 61A:
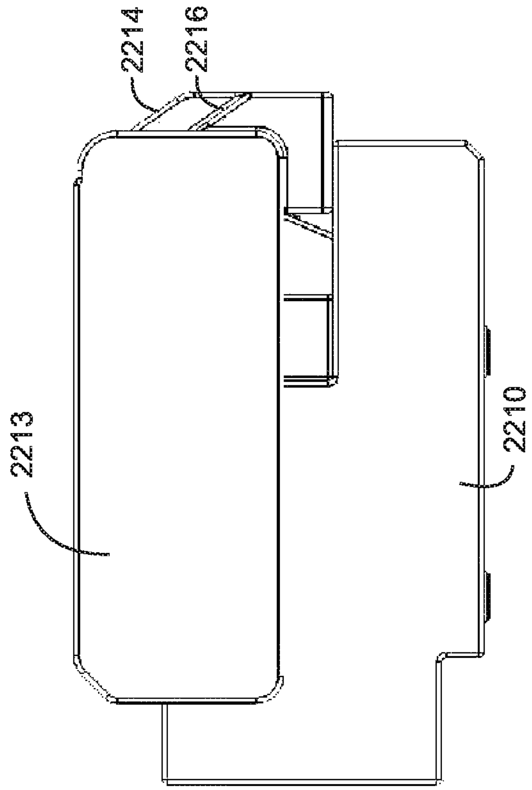

The following description of the operation for putting on and taking off the footboard 108 from the patient support is made with reference to FIG. 58A, FIG. 58B, FIG. 59A, FIG. 59B, FIG. 59C, FIG. 59D, FIG. 59E, FIG. 60A, FIG. 60B, FIG. 60C, FIG. 61A and FIG. 61B. To put the footboard 108 on the end of the patient support, the footboard 108 may be slid into place on the footboard mounting bracket 2200 by first aligning the tubular posts 2205 of the footboard with the post sockets 2202 in the footboard mounting bracket 2200. As the posts slide into the sockets, the second electrical mating half 2203 aligns with the first electrical mating half 2204 and enters the gap 2206 above the first electrical mating half 2204. Since the retractable cover 2213 is covering the gap 2206, the second mating half 2203 first engages the retractable cover 2213 whereby cover interface elements 2215 of the second connection housing 2209 engage the cover interface element engagement surfaces 2216 of the retractable cover 2213 causing the retractable cover 2213 to begin sliding across the top of the first connection housing 2210 of the first mating half 2204 in the direction of the arrow in FIG. 60C with sufficient force to overcome the bias of the compression springs 2212 to expose the leaf springs 2208. The second mating half 2203 continues to push into the gap 2206 until the retractable cover 2213 is pushed entirely out of the way and the electrically conducting tabs 2207 are mated with the leaf spring electrical contacts 2208. When the footboard 108 is removed from the end of the patient support, the tubular posts 2205 begin to slide up and out of the sockets 2202 and the second electrical mating half 2203 begins to slide up and away from the first electrical mating half 2204. As the second electrical mating half 2203 is pulled away, the cover interface elements 2215 begin to disengage from the cover interface element engagement surfaces 2216 of the retractable cover 2213 and the compression springs 2212, having been compressed when the footboard was put in place, bias the retractable cover 2213 back over the gap 2206 when the second electrical mating connection 2203 finally clears the gap 2206. FIGS. 61A-B show side views of the first electrical mating half 2204 with the retractable cover 2213 in the gap covering position (FIG. 61A), and in the retracted position (FIG. 61B) to expose the leaf spring electrical contacts 2208.

The electrical connection assembly for the removable footboard may thus be a blind-mate connector that provides sufficient clearances and electrical contact surface areas to allow for and accommodate: installation of the footboard even during misalignment; manufacturing tolerances; easy installation and removal of the footboard; and, hands-free electrical mating connection. Both halves of the connection assembly are fixed (no floating components) and the retractable cover protects the electrical contacts in the patient support when the footboard is not on the patient support. Removal and replacement of the footboard may be done quickly and easily while minimizing damage to electrical connections between the footboard and patient support.

It will be apparent to one skilled in the art that the first electrical mating half 2204 may comprise electrically conductive tabs instead of leaf spring contacts, while the second electrical mating half 2203 may comprise leaf spring contacts instead of electrically conducting tabs. Equally apparent is that both electrical mating halves 2203, 2204 may comprise leaf spring contacts.

Most nurse call (NC) systems associated with patient supports have the ability to monitor and detect whether the patient support is connected to the NC system. However, the reverse is often not the case as patient supports are often not equipped to determine whether the patient support is connected to the nurse call system. This can be detrimental to patient safety, particularly in connection with exit alarm features of the patient support. In an effort to improve the safety of the exit alarm feature, there is a need to allow the control circuitry of the patient support to detect whether a nurse call interconnect cable (e.g. a DB37 interconnect cable) is connected to the patient support. By doing so, the patient support may auto-adjust to ensure that Bed Exit Priority Call signalling is subsequently enabled. Conversely, if the DB37 cable is disconnected the patient support can auto-adjust and revert the exit alarm to an audible alarm signal and a visual warning message. Further, it would be beneficial if this may be accomplished without the use of embedded 'interlock' circuits, i.e. custom/modified DB37 interconnect cables.

Figure 62A:
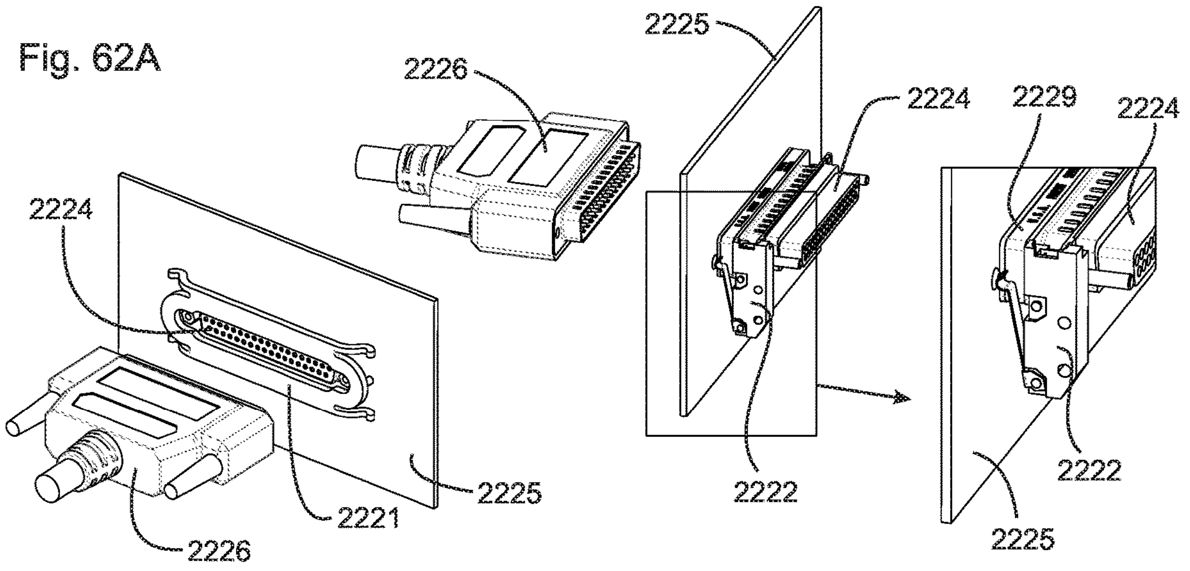
FIGS. 62A, 62B and 62C depict a first embodiment of a device for permitting a patient support to automatically detect whether a nurse call system is connected to the patient support.
Figure 62B:
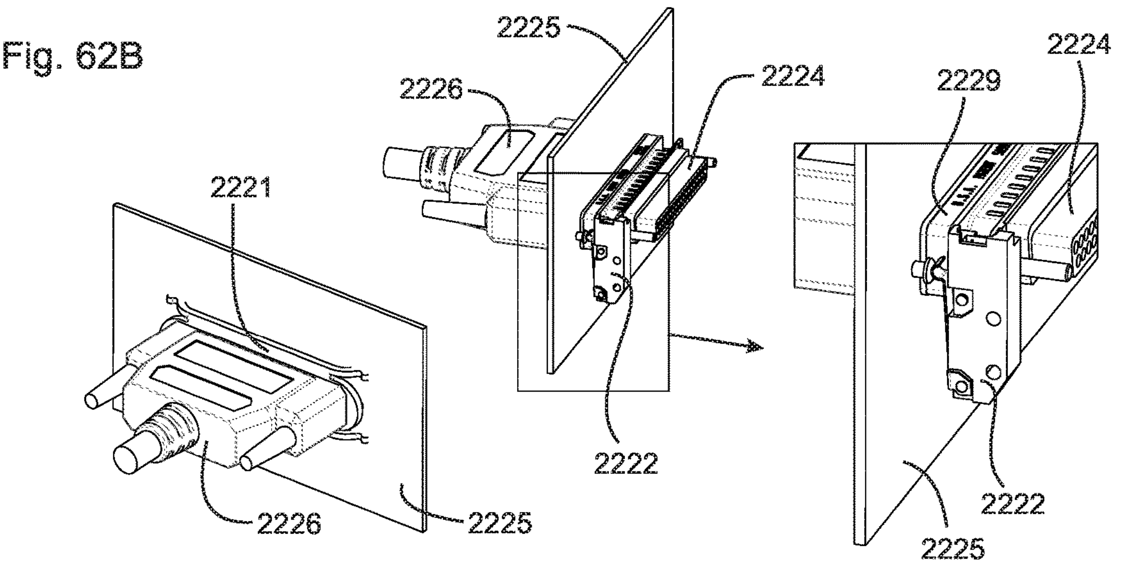
Figure 62C:
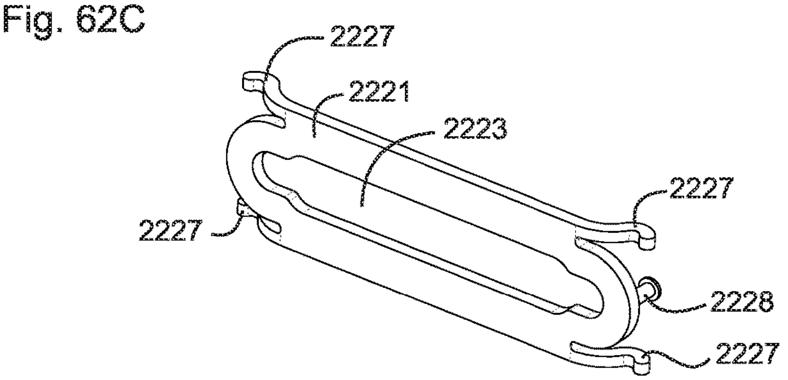

Referring to FIGS. 62A, 62B and 62C, a first embodiment of a device for permitting a patient support to automatically detect whether a nurse call system is connected to the patient support is shown. The device may comprise a floating faceplate 2221 and a switch 2222. The floating faceplate 2221 may be a monolithic molded metal gasket having a central aperture 2223 through which a DB37 port 2224 mounted in a mounting plate 2225 may protrude when the faceplate 2221 is mounted on an outside surface of the mounting plate 2225 around the DB37 port 2224. The faceplate 2221 may further comprise spring tabs 2227, which bias the faceplate 2221 away from the outside surface of the mounting plate 2225 when the faceplate 2221 is mounted thereon. The faceplate 2221 may further comprise a faceplate plunger 2228, which protrudes through an aperture in the mounting plate to extend outwardly from an inner surface of the mounting plate 2225 as best seen in FIG. 62B. The switch 2222 may be mounted proximate the inner surface of the mounting plate 2225 and configured so that a spring-leaf contact 2229 of the switch 2222 is proximate a distal end of the faceplate plunger 2228 protruding through the mounting plate 2225.

As seen in FIG. 62A, when a DB37 cable plug 2226 is not plugged into the DB37 port 2224, the faceplate 2221 is kept away from the outside surface of the mounting plate 2225 and the distal end of the faceplate plunger 2228 is disengaged from the spring-leaf contact 2229 of the switch 2222. Control circuitry connected to the switch 2222 recognizes that the circuit in the switch 2222 is not closed and determines that the DB37 cable plug 2226 is not plugged into the DB37 port 2224. As seen in FIG. 62B, when the DB37 cable plug 2226 is plugged into the DB37 port 2224, the faceplate 2221 is pushed against the outer surface of the mounting plate 2225, which forces the faceplate plunger 2228 into engagement with the spring-leaf contact 2229 of the switch 2222, which closes the circuit in the switch 2222. Control circuitry connected to the switch 2222 recognizes that the circuit in the switch 2222 is closed and determines that the DB37 cable plug 2226 is plugged into the DB37 port 2224. In each case, the control circuitry takes appropriate action in resetting the exit alarm features of the patient support.

Figure 63A:
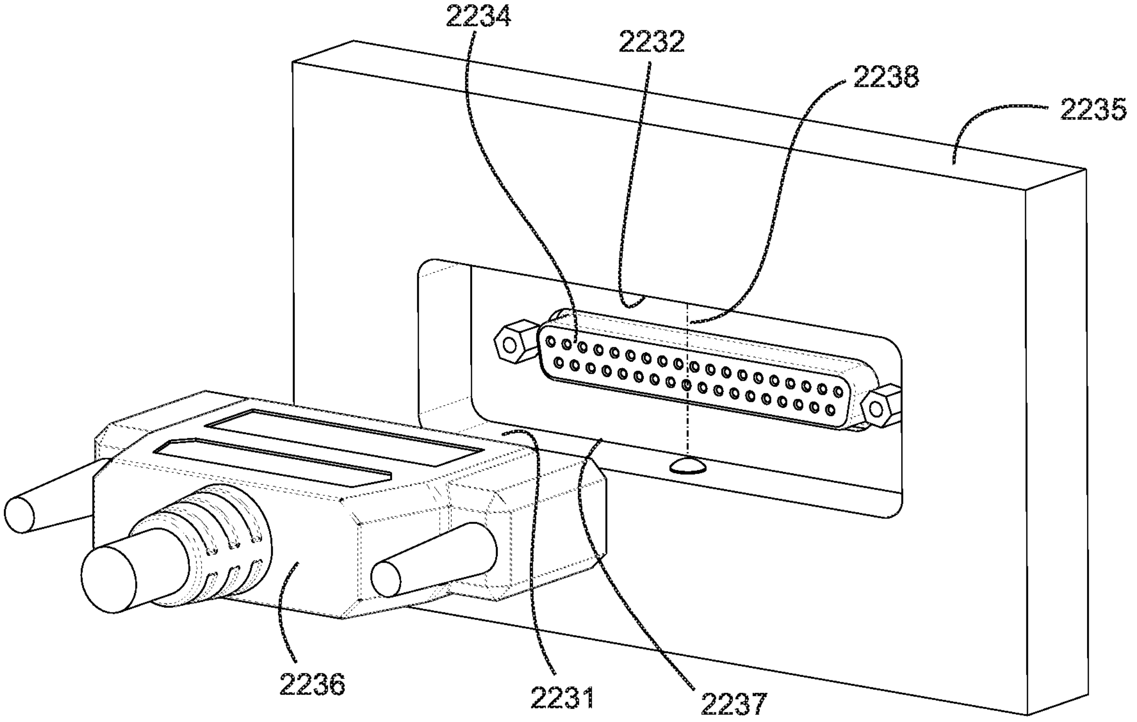
FIGS. 63A and 63B depict a second embodiment of a device for permitting a patient support to automatically detect whether a nurse call system is connected to the patient support.
Figure 63B:
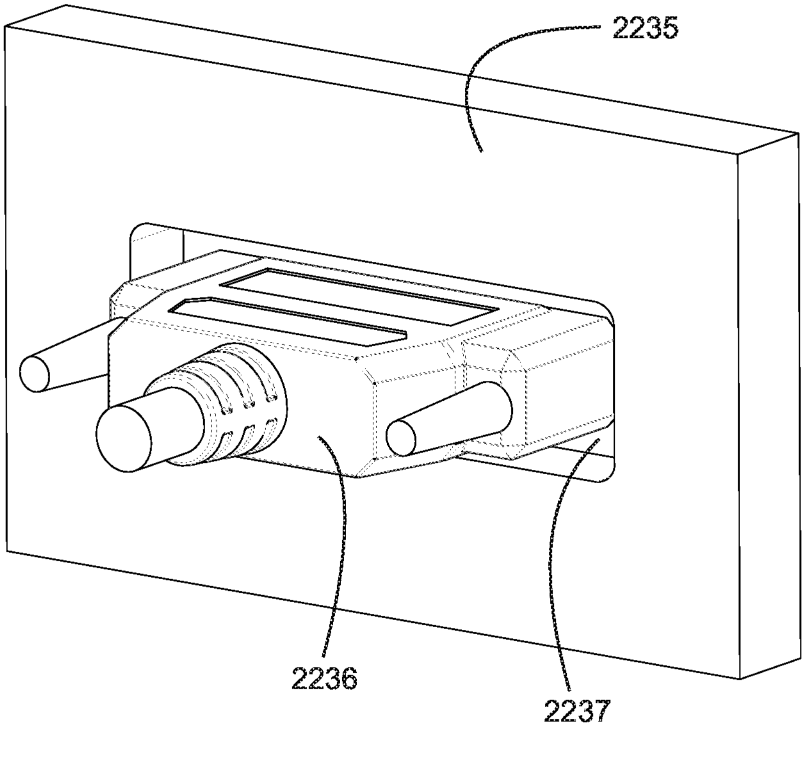
Figure 64:
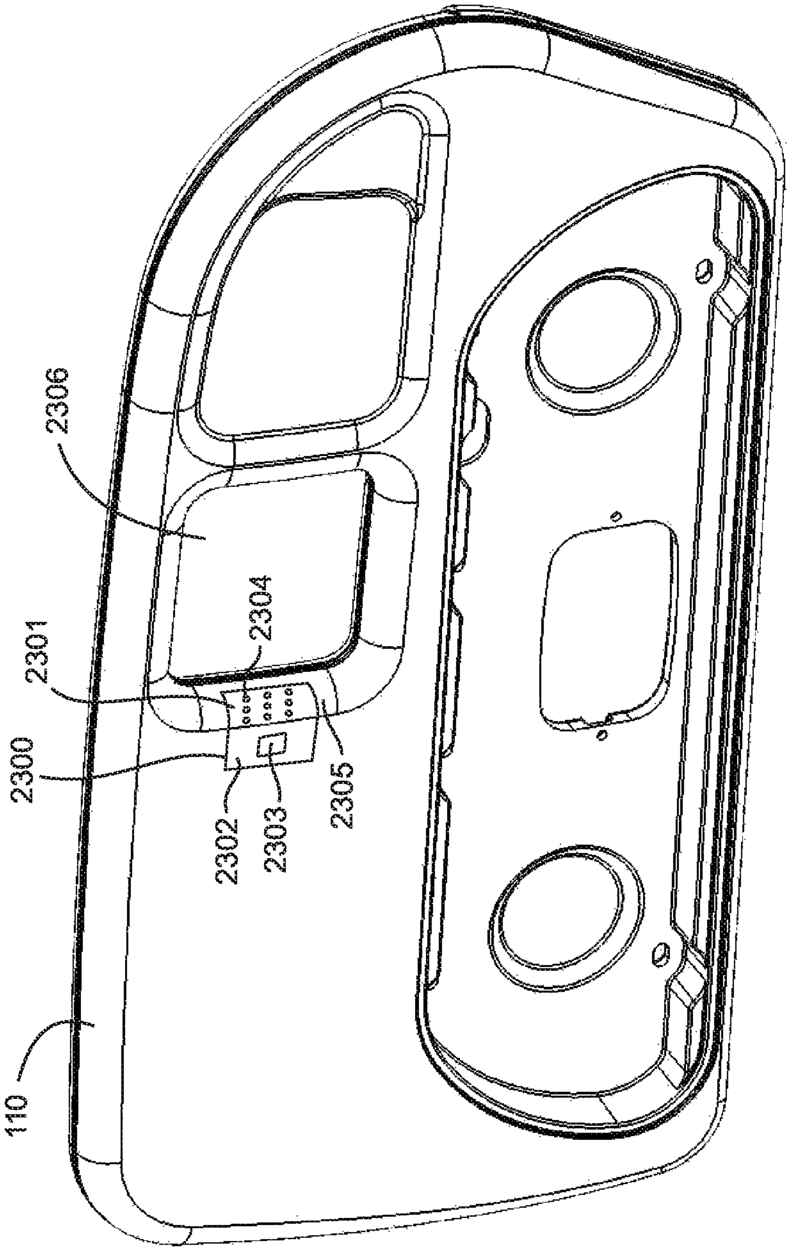
FIG. 64 depicts a multi-angle reading light integrated into a head rail of a patient support.

Referring to FIGS. 63A and 63B, a second embodiment of a device for permitting a patient support to automatically detect whether a nurse call system is connected to the patient support is shown. The device may comprise a proximity sensor transmitter 2231 and a proximity sensor receiver 2232 facing each other and mounted on opposed inner surfaces of a closed aperture 2237 in a mounting plate 2235. The transmitter 2231 and receiver 2232 may be electronically connected to control circuitry of the patient support. A DB37 port 2234 may be mounted on the mounting plate 2235 in the aperture 2237. An invisible electromagnetic beam 2238 may be transmitted from the transmitter 2231 to the receiver 2232. As shown in FIG. 63A, as long as DB37 cable plug 2236 is not plugged into the DB37 port 2234, the invisible electromagnetic beam 2238 remains uninterrupted, which is recognized by the control circuit as a state in which the DB37 cable plug 2236 is not plugged in. As seen in FIG. 63B, when the DB37 cable plug 2236 is plugged into the DB37 port 2234, the invisible electromagnetic beam 2238 is interrupted, which is recognized by the control circuit as a state in which the DB37 cable plug 2236 is plugged in. In each case, the control circuitry takes appropriate action in resetting the exit alarm features of the patient support.

Because patient supports may be occupied for a long time by a patient, keeping a patient entertained to alleviate boredom is important. One activity performed my many patients while occupying the patient support is reading. Therefore, many patient supports are equipped with reading lights. However, the reading light is preferably sufficiently versatile to provide lighting in a number of different directions. In the art, reading lights may be generally mounted on patient supports and configured to swivel or otherwise move to change the angle of incidence of the light. Such reading lights may suffer from drawbacks, for example they may be a safety hazard as they are not integrated into the patient support and/or they may possess moving parts that regularly wear out. An integrated reading light that permits multi-angle directional positioning without moving parts is generally desirable.

Referring to FIG. 64, FIG. 65A, FIG. 65B, FIG. 65C and FIG. 65D, a reading light 2300 integrated into the patient support is disclosed that allows for multi-angle directional positioning without moving parts. The reading light may comprise a lens 2301 covering rows and columns of lights, for example light emitting diode (LED) lights and a bezel 2302 with a control button 2303. Each light may be integrated into the structure of the patient support and fixed in place to provide light at a certain fixed angle. There may be no external mountings protruding from the patient support and no moving parts. The lens, LED lights, bezel and control button may be in a self-contained module, which makes manufacturing and replacement simpler.

There may be any number of lights and rows and columns of lights. For example, there may be a single light and no rows or columns. There may be two or more lights. There may be one or more rows of lights. There may be one or more columns of lights. There may be obliquely oriented rows of lights. Any pattern of lights and rows of lights may be used to achieve the desired lighting effect. Any color or colors of light may be used, although white or yellow light may be preferred for reading. Lights may be integrated into any convenient location on the patient support, for example the head board or one or more side rails, for example head rails or foot rails. Preferably, reading lights may be located in both left and right head rails.

Figure 65B:
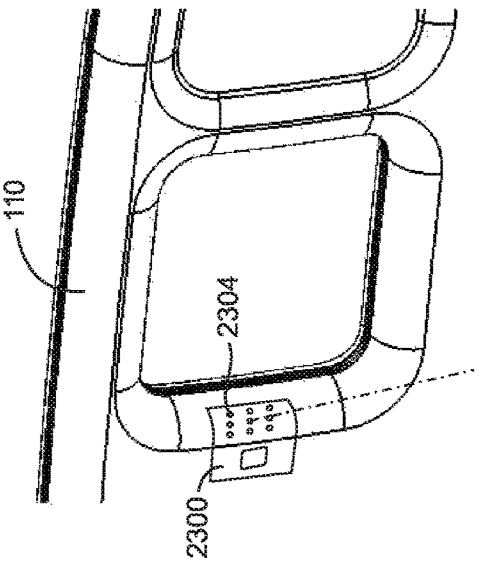
FIG. 65A depicts a magnified view of the multi-angle reading light of FIG. 64 showing a light ray directed forward (toward the foot of the patient support) and inward at a fixed angle between about 15° and 20° in relation to an axis parallel to the length of the patient support.
Figure 65D:
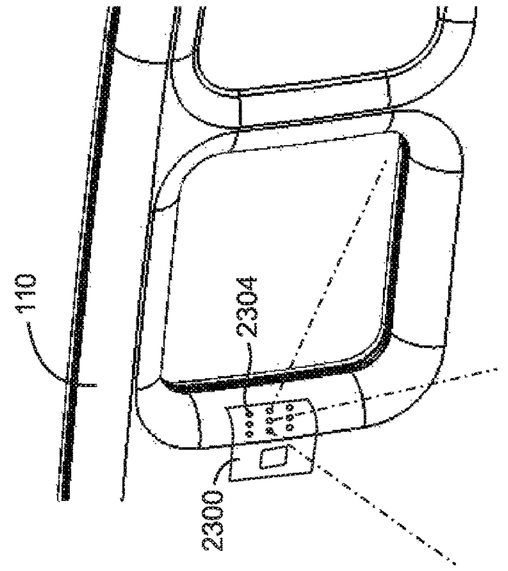
Figure 65A:
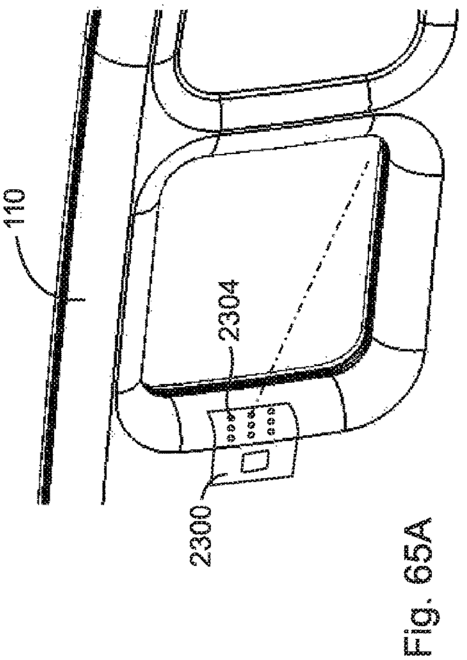
Figure 65C:
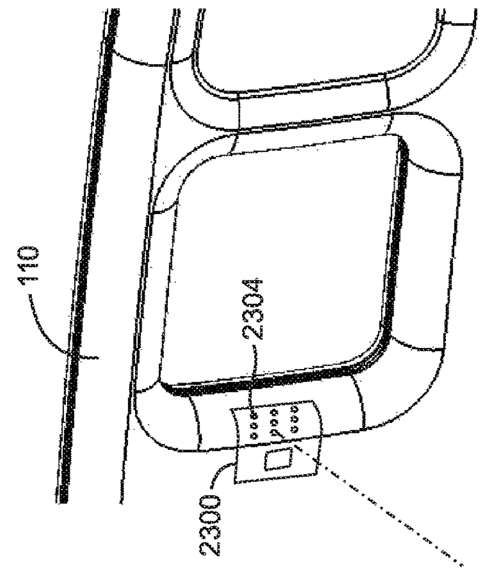

In the embodiment illustrated in FIG. 64, FIG. 65A, FIG. 65B, FIG. 65C and FIG. 65D, the reading light 2300 may be integrated into head rail 110. The reading light 2300 may comprise three rows and three columns of LED lights 2304 for a total of nine lights (only one labeled). The lights may be mounted along a curved surface 2305 of rail opening 2306. Although the reading light is shown mounted on the headward inner surface of the rail opening, the light may be mounted on another of the curved surfaces of the rail opening, for example underneath the top side of the rail opening. The curvature of the mounting surface in conjunction with a selected column of LED lights permits adjustment of reading light angle and hence light direction. Thus, the LED lights in a given column may be fixed to direct light in one direction, for example, the rightmost column of three lights in FIG. 64 may direct light forward (toward the foot of the patient support) and inward at a fixed angle between about 15° and 20° (FIG. 65A) in relation to an axis parallel to the length of the patient support, the middle column of three lights may direct light forward and inward at a fixed angle between about 30° and 40° (FIG. 65B) and the leftmost column of three lights may direct light forward and inward at a fixed angle between about 45° and 60° (FIG. 65C). All three columns of LED lights may be on as shown in FIG. 65D.

The lights may be controlled with any suitable controllers, e.g. buttons, knobs, toggle switches and the like, and any number of suitable controllers. Controllers may be on-off switches and/or may provide variable brightness control. In the embodiment illustrated in FIG. 64, one control button 2303 mounted in the bezel 2302 may be employed to control all the lights. The control may be programmed so that successive pressing of the button selectively switches on different combinations of lights. Any on/off pattern may be employed. For example, in this embodiment, pressing the button once turns on the leftmost column of lights. Pressing the button a second time turns off the leftmost column and turns on the middle column. Pressing the button a third time turns off the center column and turns on the rightmost column. Pressing the button a fourth time turns on all the columns of lights. And, pressing the button a fifth time turns off all the lights. Pressing and holding the button may be used to adjust the brightness of the light until the desired level of brightness is achieved, at which time the button may be released.

It is sometimes necessary or useful in a healthcare setting to display images of such things as patient information (e.g. patient name, attending nurse, allergies, etc.), dynamic information (e.g. scheduled reminders, countdown timers, bed information, etc.), instructional programs or other information of interest to the patient or caregivers (e.g. television signals, videos, JPEG files, etc.). Prior art methods, for example white boards and other static displays, cannot be efficiently updated and are often difficult to see and adjust.

To overcome such problems, a pico-projector may be positioned and installed on the patient support in any convenient location (e.g. the headboard as shown for a pico-protector 2309 in FIG. 1A) and electronically connected to the control circuitry of the patient support or some external control circuitry. The pico-projector may be controlled to swivel and position to any angle allowing for the projection and display of any screen image onto any nearby surface (e.g. a wall (side, back or front), a ceiling, a screen, etc.). Firmware driving the projector image may adjust, skew or otherwise correct the image shape to compensate for the display angle and direction. Pico-projectors and modules for driving them are known in the art, for example the Forever Plus™ pico projector turn-key module. Alternatively or additionally, the attendant's control panel 120 may comprise a graphical display for displaying any images.

Patient supports are often equipped with one or more holders for holding accessories, for example fluid drainage bags, intravenous (I.V.) bags, diagnostic equipment, etc. In some cases, especially for drainage bags, the accessory bags needs to be positioned below the patient and below the mattress surface level of the patient support in order to ensure proper operation of the accessory. Accessories also need to be positioned so as to not be damaged by the articulation and up/down motion of the patient support, and they should generally not be allowed to contact or drag on the floor (for health/hygiene reasons).

Accessories are often held to or supported on the patient support by simple static and mechanical elements, for example hooks, shelves, brackets and the like. Such elements may be generally incapable of detecting the presence or measuring the weight of the accessory. It would be useful to have an accessory holder capable of detecting the installation and presence of an accessory, and subsequently monitoring and/or measuring any 'weight change' of the accessory. This would be particularly useful for fluid drainage bags where monitoring the weight is a direct indication of whether the bag is full, or if the bag has become supported on an object external to the patient support.

Thus, there is provided an accessory holder for a patient support, the accessory holder comprising a sensor configured to measure mechanical load, pressure or weight on the holder. The sensor may include, for example, a load cell, strain gauge or the like. The sensor may be in communication with a signaling device (e.g. a sound alarm, a visual indicator and the like) that simply provides an indication of holder status, i.e. simply detecting if or when an accessory is installed. The sensor may be in communication with a control circuit that is configured to interpret data from the sensor to make a decision based on measured values. The decision may result in any one or more operations being automatically performed, for example giving an alarm, sending information to a nurse's station, restricting height of the patient support, etc.). For example, when a drainage bag hanging from a holder is being measured and monitored and the weight reaches a pre-determined weight, the sensor would send a signal that sounds an alarm, displays a visual message, sends a nurse call or a priority call signal to a nurse's station, or any combination thereof.

On low patient supports, the support platform is often allowed to collapse down so that the patient support can be lowered very close to the floor. This can limit positions and or ability to hang accessories, especially fluid drainage bags, for fear that lowering of the patient support might crush the accessory. Detecting the presence of and monitoring the status of the accessory installed on the patient support in the aforementioned manner permits a control system to automatically limit patient support height accordingly, thereby reducing the risk that the accessory would be crushed and reducing the risk of the accessory contacting the floor.

The height adjustable patient support may be provided with one or more obstruction sensors located at one or more key places on the patient support to increase safety by sensing when an object, for example a part of a person's body, may be obstructing one or more movements of the patient support, particularly the height adjustable movement. Obstruction sensors may reduce the likelihood of something being crushed under the patient support deck when the deck is lowered.

Obstruction sensors may take the form of touch sensitive sensors (e.g. sheet switches) that are very sensitive to pressure. A variety of types of sheet switches are available and the obstruction sensors may be one or more of these types. Types of sheet sensors may include those having printed ink circuits printed on a first sheet of plastic and a second sheet of plastic having a conductive layer laminated thereon laminated on top of the first sheet with the printed ink circuit and the conductive layer between the plastic sheets. Plastic separators may normally keep the printed ink circuit and the conductive layer sufficiently separated to permit no electrical contact between the layers until pressure is applied forcing the conductive layer to contact the printed ink circuit thereby completing the circuit. The printed ink circuit may be electrically connected to the control circuitry so completion of the circuit may send a signal to the controllers to stop motion of the patient support deck. In another type, the printed ink circuit may be replaced by another conductive layer, the two conductive layers each forming half of a circuit. Otherwise, this type of sheet switch works similarly to the printed ink type. Useful obstruction sensors are described in more detail in U.S. Pat. No. 8,134,473 issued Mar. 13, 2012, the entire content of which is herein incorporated by reference.

Figure 66A:
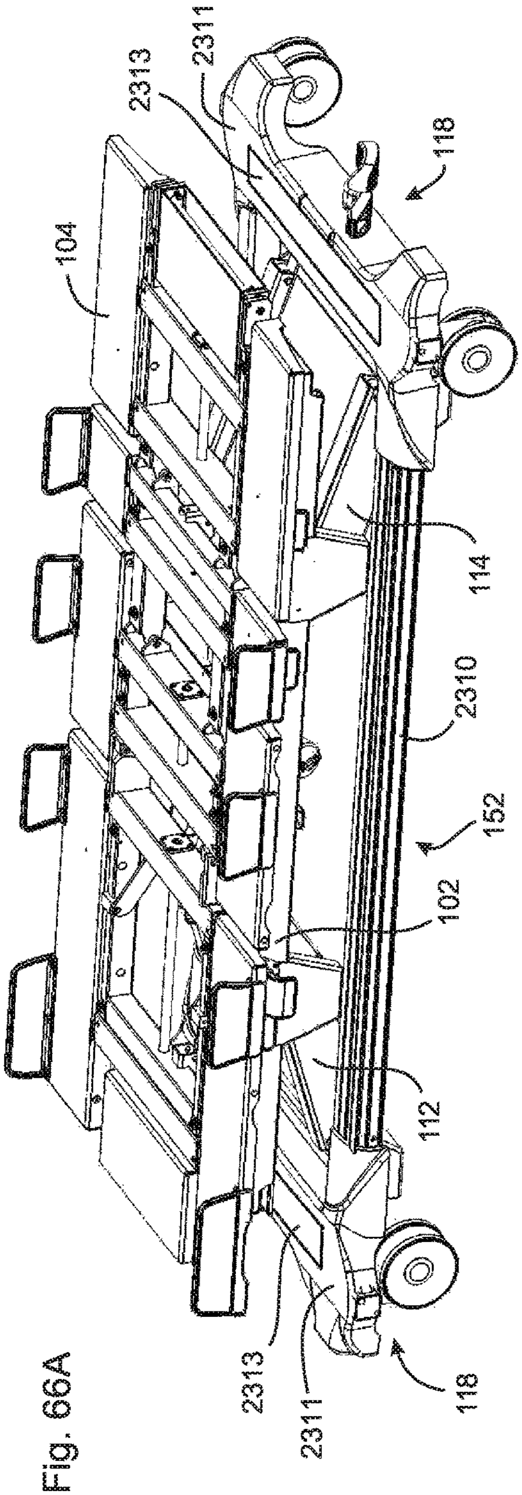
Figure 66B:
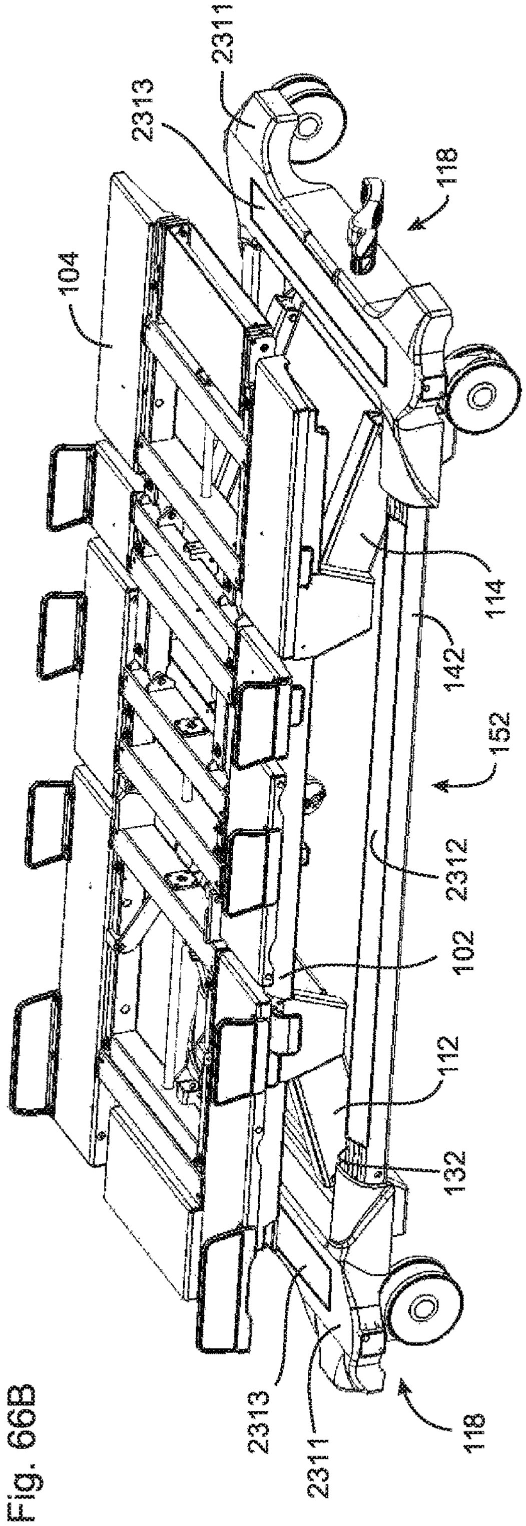

Referring to FIG. 66A and FIG. 66B, a patient support is depicted showing the patient support deck 104 supported on the upper frame 102. The upper frame 102 may be connected to and supported on the head end leg assembly 112 and foot end leg assembly 114, the leg assemblies 112, 114 connected to and supported on the lower frame 132. The leg assemblies 112, 114 may be raised and lowered by actuators in relation to the lower frame 132, thereby raising and lowering the upper frame 102 and patient support deck 104. The lower frame 132 may be suspended from the caster frame 142. The caster frame may comprise caster assemblies 118 at the head end and foot end of the patient support. The caster assemblies may be covered by caster assembly covers 2311. The lower frame 132 and caster frame 142 together may be collectively known as a base frame assembly 152, and longitudinal rails of the base frame assembly 152 may be covered by a base frame assembly cover 2310. Only one side of the base frame assembly 152 is depicted, but there may be another base frame assembly cover on the other side of the base frame assembly.

In lowering the patient support deck 104, an obstruction located between the deck 104 and the base frame assembly cover 2310 or the caster assembly cover 2311 may be crushed unless some warning or control is provided in response to the presence of the obstruction. Caster assembly obstruction sensors 2313 in the form of sheet sensors may be fixed, for example with an adhesive, to an upper surface of the caster assembly covers 2311. Further, as best seen in FIG. 66B, base frame assembly obstruction sensors 2312 in the form of sheet sensors may be fixed to an upper surface of the caster frame 142, for example with an adhesive, and may be wide enough to also cover the lower frame 132 so that the base frame assembly obstruction sensors 2312 cover the width of the base frame assembly 152 along the length of the base frame assembly 152 on both sides of the patient support. The base frame assembly obstruction sensors 2312 are also covered by the base frame assembly covers 2310 on both sides of the base frame assembly 152. If there is an obstruction between the patient support deck 104 and the caster assembly covers 2311 and/or base frame assembly covers 2310, when the obstruction contacts a caster assembly obstruction sensor 2313 or a base frame assembly cover 2310, the weight of the object may trigger the caster assembly obstruction sensor 2313 or may push the base frame assembly cover 2310 into contact with the base frame assembly obstruction sensor 2312 thereby triggering the base frame assembly obstruction sensor 2312. Triggering one of the obstruction sensors 2312, 2313 may send a signal to the control circuitry to stop the lowering of the deck 104. In some embodiments, triggering one of the obstruction sensors 2312, 2313 may also include sending a signal to at least partially raise the deck 104 when the touch sensitive obstruction sensor detects the obstruction. The obstruction may then be removed and lowering of the deck 104 recommenced.

In another aspect, the base frame assembly obstruction sensor may comprise a more conventional switch rather than a sheet switch between the base frame assembly 152 and the base frame assembly cover 2310. Since the base frame assembly cover 2310 is normally fairly rigid, a force applied to one part of the base frame assembly cover 2310 may depress the entire length of the base frame assembly cover 2310 so that the more conventional switch may be located anywhere along a longitudinal rail of the base frame assembly 152.

Figure 66C:
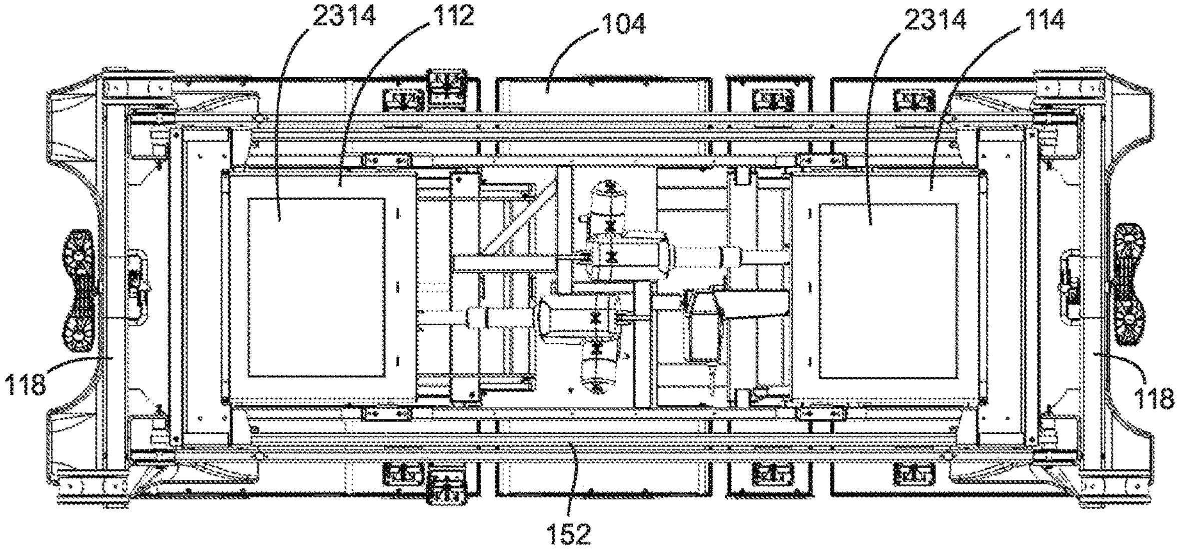
Figure 66D:
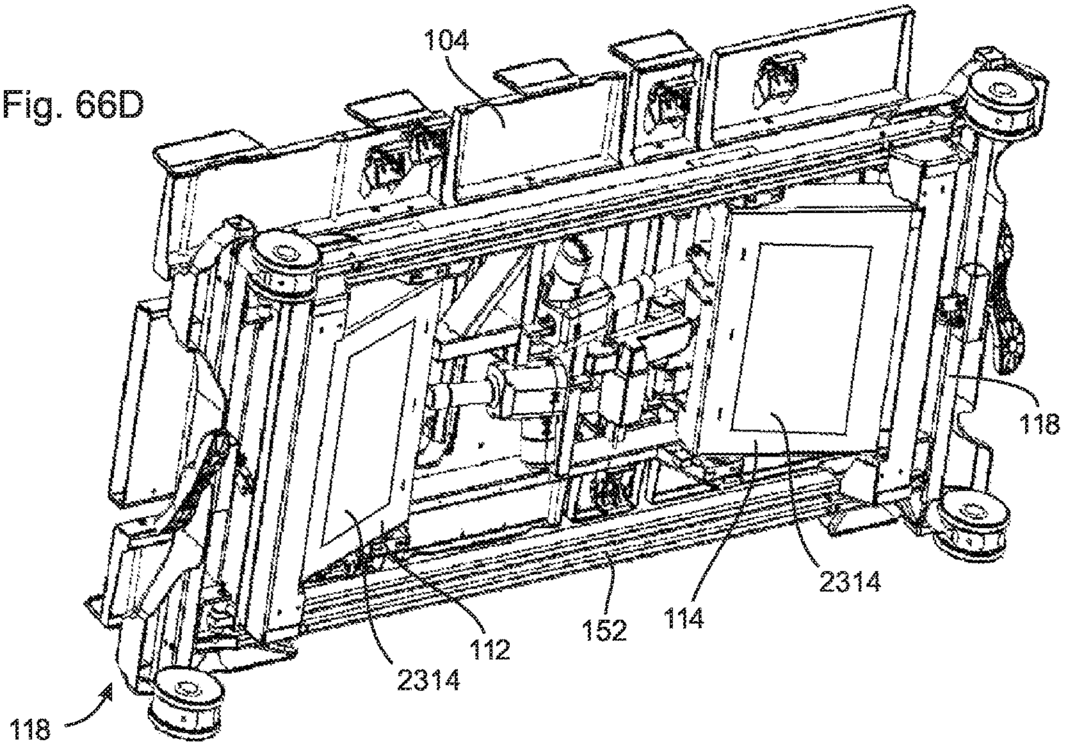

Referring to FIG. 66C and FIG. 66D, an obstruction located beneath the patient support but within the area bounded by the base frame assembly 152 and the caster frame assemblies 118 may not trigger either the base frame assembly obstruction sensors 2312 or the caster assembly obstruction sensors 2313 when the deck 104 is lowered. Therefore, upper leg assembly obstruction sensors 2314 in the form of sheet switches may be fixed, for example by an adhesive, on a lower surface of the upper parts of the head end and foot end leg assemblies 112, 114. Obstructions beneath the upper parts of the head end and foot end leg assemblies 112, 114 may trigger one or both of the upper leg assembly obstruction sensors 2314, thereby sending a signal to the control circuitry to stop the lowering of the deck 104.

In some embodiments, triggering one of the obstruction sensors 2314 may also include sending a signal to at least partially raise the deck 104 when the touch sensitive obstruction sensor detects the obstruction. The obstruction may then be removed and lowering of the deck 104 recommenced.

Figure 67A:
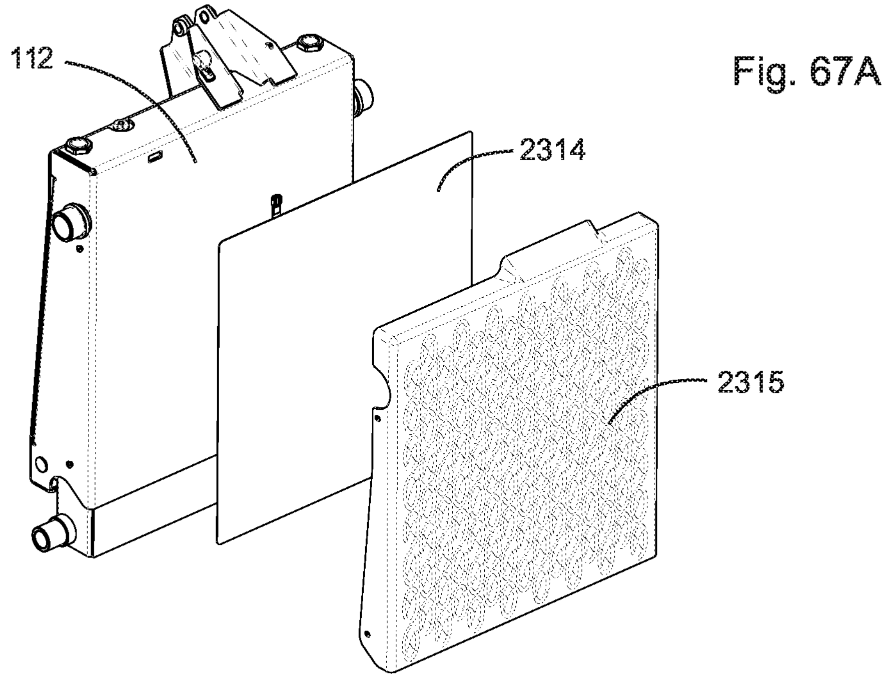

Referring to FIG. 67A, an alternate embodiment is shown in which the leg assembly 112 has the obstruction sensor 2314 in the form of a sheet switch floating between the leg assembly 112 and a leg assembly cover 2315. The cover 2315 form fits over the leg assembly 112 and the obstruction sensor 2314 floats between the leg assembly 112 and the cover 2315.

Figure 67B:
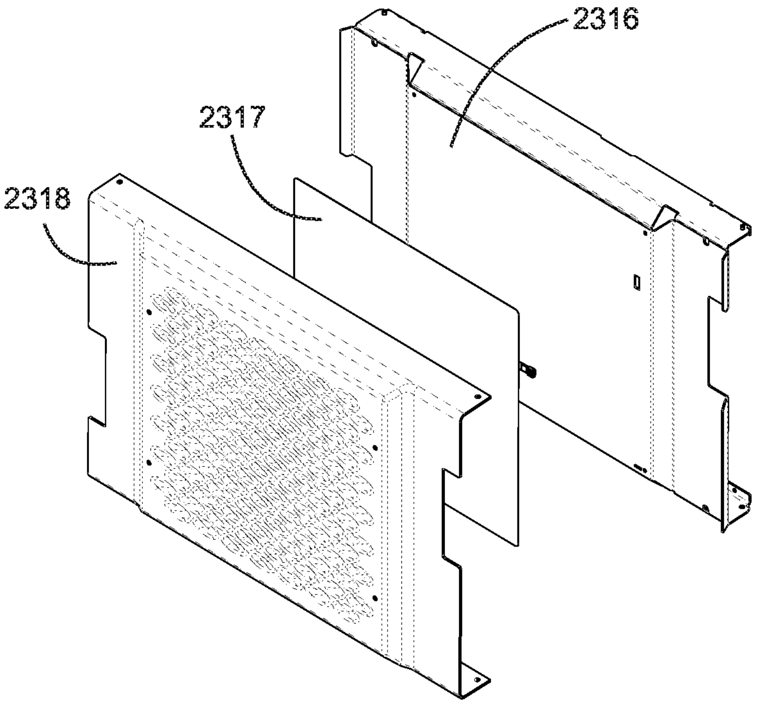

Referring to FIG. 67B, a skid plate 2316 is depicted which is secured to the caster frame of the patient support to protect the actuators on the underside of the patient support in the middle region of the patient support. An obstruction sensor 2317 in the form of a sheet switch floats between a skid plate cover 2318 and the underside of the skid plate 2316. The cover 2318 form fits over the skid plate 2316 and the obstruction sensor 2317 floats between the skid plate 2316 and the cover 2318. In the event an obstruction is directly under the middle of the bed out of range of the obstruction sensors on the leg assemblies, the obstruction sensor 2317 will be activated if the patient support is lowered on to the obstruction. The sensor 2317 would stop the lowering of the patient support and send a signal to raise the patient support a little to free the skid plate from the obstruction.

Superhydrophobic surfaces are highly hydrophobic, i.e., extremely difficult to wet with water or other aqueous-based fluid. The contact angles of a water droplet on the surface exceeds 150° and the roll-off angle/contact angle hysteresis is less than 10°. Likewise, superoleophobic surfaces are highly oleophobic, i.e., extremely difficult to wet with oil or another organic solvent-based fluid. The contact angles of an oil droplet on the surface exceeds 150° and the roll-off angle/contact angle hysteresis is less than 10°. Any one or more, including all, surfaces of the patient support may be coated with a superhydrophobic coating, a superoleophobic coating or a coating that is both superhydrophobic and superoleophobic. Superhydrophobic surfaces would be highly resistant to fluid spills, including beverages, medical fluids and excretions of body fluids. In addition, if the surfaces were superoleophobic, the surfaces would be highly resistant to oily secretions such as those from the hands of patients and/or caregivers. Superhydrophobic and/or superoleophobic surfaces would be more resistant to contamination, reducing the likelihood of spreading diseases. Due to the coating's hydrophobic and self-cleaning properties, it makes it more difficult for a treated surface to harbor bacteria. This allows surfaces to remain sterile, even after contact with contaminating fluids. With bacteria unable to cling to the surface, the surface remains sterile for much longer without needing to constantly be cleaned or replaced. Such coatings are particular useful on textiles, for example on mattresses, but any surface of the patient support may benefit from such coatings.

FIG. 68 shows a block diagram of a system 3300 for controlling the patient support 100. Each of the components of the system 3300 may be attached to the patient support 100 at a suitable location.

The system 3300 includes a control circuit that comprises a controller 3302 that includes a processor 3304 electrically coupled to an input/output interface 3306 and memory 3308. The controller 3302 may be situated in a control box that is attached or otherwise coupled to the patient support 100. The controller 3302 may be physically integrated with another component of the system 3300, such as the attendant's control panel 120.

The processor 3304 may be a microprocessor, such as the kind commercially available from Freescale™ Semiconductor. The processor 3304 may be a single processor or a group of processors that cooperate. The processor 3304 may be a multicore processor. The processor 3304 is capable of executing instructions obtained from the memory 3308 and communicating with an input/output interface 3306.

The memory 3308 may include one or more of flash memory, dynamic random-access memory, read-only memory, and the like. In addition, the memory 3308 may include a hard drive. The memory 3308 is capable of storing data and instructions for the processor 3304. Examples of instructions include compiled program code, such as a binary executable, that is directly executable by the processor 3304 and interpreted program code, such as Java® bytecode, that is compiled by the processor 3304 into directly executable instructions. Instructions may take the form programmatic entities such as programs, routines, subroutines, classes, objects, modules, and the like, and such entities will be referred to herein as programs, for the sake of simplicity. The memory 308 may retain at least some of the instructions stored therein without power.

The memory 3308 stores a program 3310 executable by the processor 3304 to control operations of the patient support 100. The controller 3302 comprising the processor 3304 executing the program 3310, which configures the processor 3304 to perform actions described with reference to the program 3310, may control, for example, the height of the upper frame 102, articulation of the patient support deck 104 (e.g., upper-body tilt and knee height), exit alarm settings, and the like. The controller 3302 may also be configured to obtain operational data from the patient support 100, as will be discussed below. Operational data obtained by the controller 3302 may be used by the processor 3304 and program 3310 to determine control limits for the patient support 100.

The memory 3308 also stores data 3312 accessible by the processor 3304. The data 3312 may include data related to the execution of the program 3310, such as temporary working data. The data 3312 may additionally or alternatively include data related to properties of the patient support 100, such as a patient support serial number, model number, MAC address, IP address, feature set, current configuration, and the like. The data 3312 may additionally or alternatively include operational data obtained from components, such as sensors and actuators, of the patient support 100. Operational data may include the height of the upper frame 102, an articulated state of the patient support deck 104, a status of the side rails 110, 113, an exit alarm setting or status, and an occupant weight. The data 3312 may include historic data, which may be time-stamped. For example, the occupant's weight may be recorded several times a day in association with a timestamp. The data 3312 may be stored in variables, data structures, files, data tables, databases, or the like. Any or all of the data mentioned above may be considered as being related to the patient support 100.

The input/output (I/O) interface 3306 is configured to communicate information between the processor 3304 and components of the system 3300 outside the controller 3302. The communication may be in the form of a discrete signal, an analog signal, a serial communication signal, or the like. The I/O interface 3306 may include a bus, multiplexed port, or similar device. The input/output interface 3306 may include one or more analog-to-digital converters. The I/O interface 3306 allows the processor 3304 to send control signals to the other components of the system 3300 and to receive data signals from these components in what may be known as a master-slave arrangement.

The system 3300 further includes components located on any suitable portion of the patient support 100 to achieve their intended function. The components may be interfaced directly to the controller 3302, or interfaced to sub-controllers that act as slaves to the controller 3302, but as masters to their respective components. For example, the controller 3302 is interfaced with: one or more support actuator sub-controllers 3316 configured to communicate with actuators of the patient support in order to control the articulation of the patient support deck 104; one or more load sensor sub-controllers 3318 configured to communicate with load cells positioned to measure the weight of the occupant of the patient support 100; one or more side-rail lock sub-controllers 3320 and/or side-rail position sub-controllers 3321, configured to communicate with sensors configured to indicate the position and/or lock state of a side rail 110, 113; one or more frame-height actuator sub-controllers 3200 configured to communicate with actuators of the patient support 100 in order to control the height of the patient support 100; an occupant's control panel sub-controller 3122 that includes an interface for the occupant to adjust various features of the patient support 100; and/or an attendant's control panel sub-controller 3120 that includes an interface for an attendant to adjust various features of the patient support 100. Each of the sub-controllers may receive control signals from the controller 3302, send data signals to the controller 3302, or both.

The controller 3302 is interconnected with one or more ports 3322 via the I/O interface 3306 of the controller 3302. The port may be physical, such as a universal serial bus (USB) port, a memory card slot, a serial port, etc., or comprise structure for implementing short-range wireless communications using, for example, Bluetooth™, near field communications (NFC), optical/infra-red, or similar communication protocol. The port 3322 may be provided in any suitable location on the patient support. The I/O interface 3306 is configured to implement an appropriate data transfer protocol to allow transfer of data between a connected external device and the controller 3302, either uni-directionally from the device to the controller 3302 or bi-directionally, via the port 3322. Examples of suitable external devices include a data storage device, such as a flash drive, memory stick, memory card, etc. or a portable computer, such as a laptop, tablet, smartphone, or the like.

When the port 3322 comprises structure for implementing short-range wireless communications, the range may be limited to within, for example, 1-3 m. This is advantageous in that the connected device is constrained to be proximate to the patient support 100 when communicating, thereby increasing the security of such communication. That is, an unauthorized person would first have to gain physical access to the patient support 100 in order to communicate with it via the port 3322, either by physical connection or wireless connection in close proximity to the patient support 100.

The port 3322 may be used to communicate data between the patient support 100 and a connected device in a secure manner. The port 3322 may be used in the encryption of data and/or in the authentication of the connected device as one which has been previously authorized to communicate with the patient support 100 by personnel having physical access to the patient support. An encryption key 3314 may be uploaded via the port 3322 to facilitate the transfer of encrypted data 3332, for example via a portable memory device 3324. FIG. 68 describes an embodiment whereby data communication occurs through the port 3322 itself, whereas FIG. 69 describes an embodiment whereby the port 3322 is used to provide the required information for encryption and/or authentication, but data communication occurs through a separate communication interface 3609 (e.g. via Ethernet). Further details on secure data communication using the port 3322 and/or interface 3609 may be found in co-pending application PCT/CA2013/000495, filed May 22, 2013, which is incorporated herein by reference.

Figure 69:
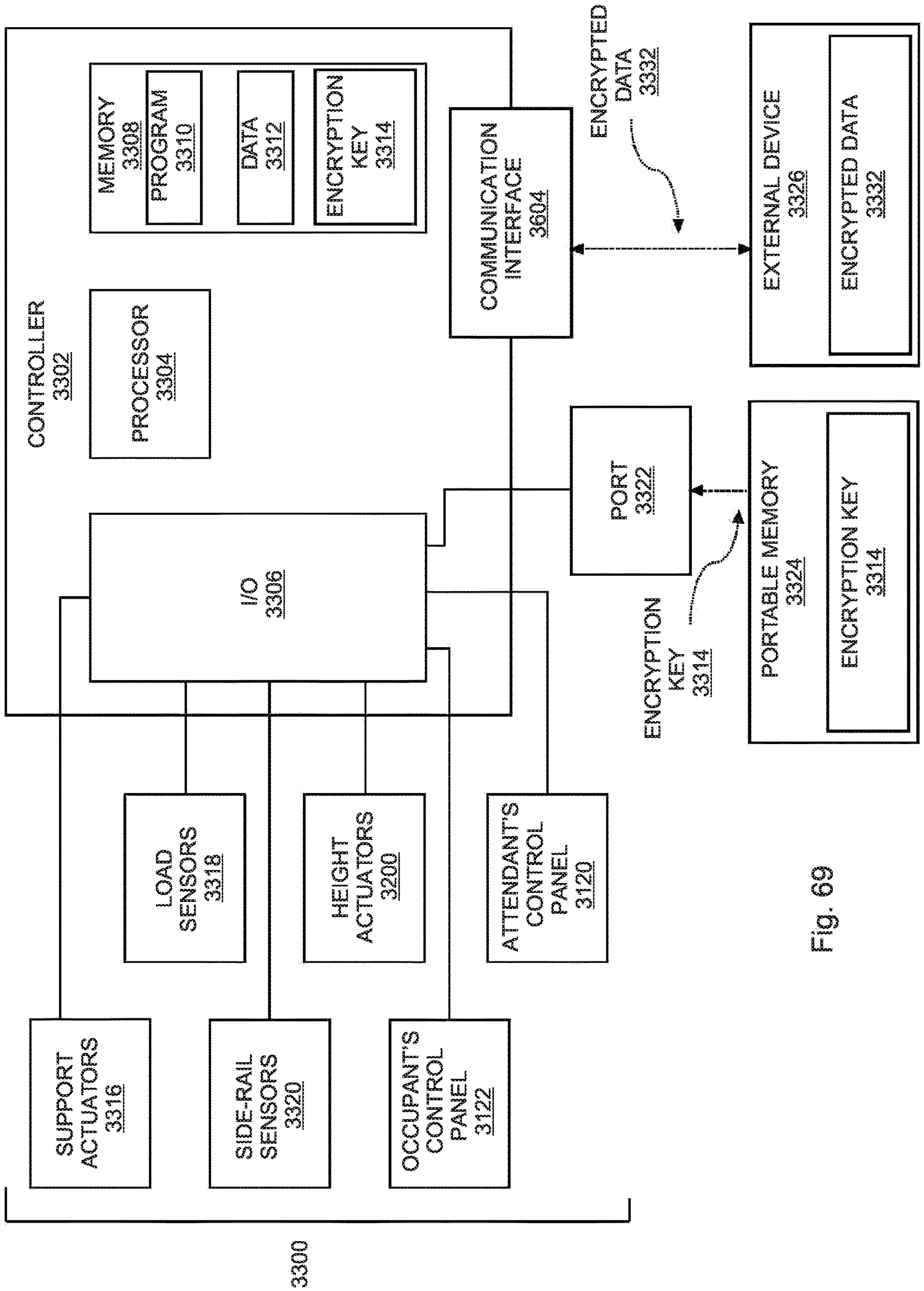

FIG. 69 shows a block diagram of a system 3600 for transferring data between a patient support 100 and an external device 3326, such as a computer. Differences between the system 3600 and the system 3300 will be discussed in detail below. For further description of features and aspects of the system 3600, the description of the system 3300 may be referenced. Features and aspects of the system 3300 may be used with the system 3600.

The system 3600 includes a controller 3602 that is similar to the controller 3302 described above. The controller 3602 further includes a communication interface 3609 coupled to the I/O interface 3306. The communication interface 3609 may include a network adaptor, such as a wired Ethernet adapter or an adapter for radio frequency communication. A radio frequency communication adapter may include a wireless bridge connected to a wired Ethernet jack. The communication interface 3609 uses standard network communication protocols, such as TCP/IP or a similar protocol, and allows the processor 3304 to communicate over a network (signified in this figure by a dashed line).

An external device 3326 connected to the network may then make requests for, and obtain data 3332 from, the patient support 100 via the communication interface 3609. The external device 3326 may be a portable computer, a computer located in a facility, such as a hospital, that houses the patient support 100, or a computer located remote from the facility.

In one embodiment, the external device 3326 may operate as a client in relation to the controller 3602 of the patient support operating as the server. The processor 3304 may execute a server process so that the controller 3602 operates as a server. In another embodiment, the external device 3326 is configured as a server and the controller 3602 of the patient support is configured as a client. In yet another embodiment, the external device 3326 and controller 3602 are peers.

When first connected to the facility network, the communication interface 3609 is assigned a temporary lease with a unique IP address via the facility's DHCP server. Alternatively the DHCP server could be set up to issue a permanent lease of the same IP address for a patient support 100 each time it is connected to the network. For example, a unique MAC address associated with the communication interface 3609 of the patient support 100 might always be provided with the same IP address by the facility's DHCP server. The choice of which method to use depends upon the facility's network configuration.

However, the patient support, once connected to the network, is unaware of the IP address of the external device 3326 with which it needs to communicate. It needs a mechanism to find this address, otherwise it cannot participate in data communications via the communication interface 3609.

In one embodiment, in order to find the IP address of the external device 3326, an entry is made under a specific field in the facility's DNS server. The processor 3304 is configured to check for this field and, if present, retrieves the IP address of the external device 3326. In another embodiment, the external device 3326 periodically sends a message with the device's IP address. For example, the IP address may be encoded along with each data request or sent on a regular schedule so that each patient support is regularly updated with an IP address that is stored in memory 3308. The choice of method depends upon the facility's network configuration and whether there is a desire for communication to only be initiated in response to a request from the remote device 3326 or self-initiated by the patient support 100.

As mentioned above, data stored at the patient support 100 may be time-stamped. This is particularly useful when the patient support 100 is configured to periodically record data, such as patient weight or alarm triggering history. When the patient support 100 is connected to an external device 3326, such as a computer, a program of the patient support 100, such as the program 3310, may synchronize the time stored at the patient support 100 with the time at the external device. The time at the patient support may be tracked by a local clock of the controller 3302, for example. The local clock may be a hardware component of the controller or may be part of the program 3310.

Figure 70:
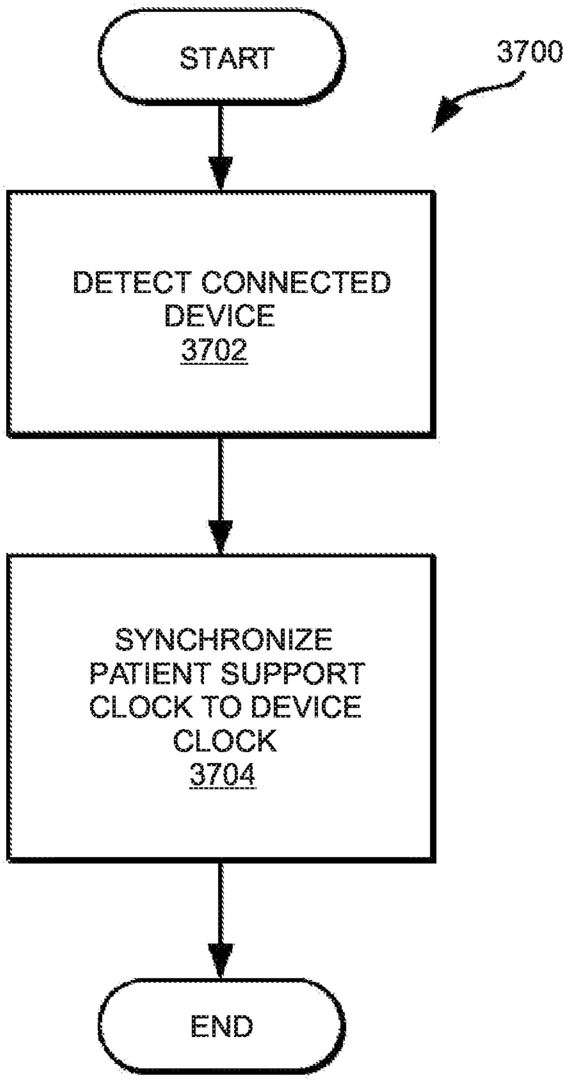

Synchronizing time in this manner is depicted in the flowchart of FIG. 70 as method 3700. At step 3702, the controller of the patient support detects an external device 3326, such as a computer, connected to the patient support 100. The external device may be, for example, a portable computer directly connected to the patient support, a remote client or server computer connected via a network to the patient support, or similar clock-bearing electronic device.

Then, at step 3704, the controller synchronizes the local clock of the patient support 100 to the clock of the external device. This may be achieved by the controller requesting a time from the external device and then setting the time at the patient support upon receiving the time from the external device.

The method 3700 is advantageous in that data output by the patient support 100 is time-stamped by a local clock that is synchronized to a reference clock external to the patient support 100. Drift or error in the local clock of the patient support 100 is corrected each time the external device is connected to the patient support 100.

FIG. 71 shows another block diagram of the system 3300 for controlling the patient support 100. Electrical couplings are shown by solid connecting lines and mechanical couplings are shown by dashed ones. In this embodiment, the system 3300 further includes electromechanical actuators, for example side-rail unlocking servo 2443, for unlocking the side rail 110, 113. Each side rail 110, 113 is generally provided with one servo 2443, and a side-rail release button 3609 for activating the servo 2443 may be provided on the patient support remote from the side rail 110, 113. A single side-rail release button 3609 may be configured to actuate the release mechanism of a plurality of side rails 110, 113.

The servo 2443 and/or side-rail release button 3609 may be electrically coupled to the side rail locking sensor sub-controller 3320, which in turn is interfaced with the controller 3302 via I/O interface 3306. The servo 2443 may be double acting, spring biased in one direction, or of other design. The servo 2443 is configured to electrically actuate and unlock the locking structure 3510 comprising the raised catch 2436 upon activation of a switch via side-rail release button 3609. Alternative embodiments of electromechanical actuators may be used in place of the servo 2443, for example linear actuators, etc.

The side-rail release button 3609 may form part of the occupant's control panel and may be connected to the occupant's control panel sub-controller 3122. In some embodiments, the side-rail release button 3609 is positioned on an inside surface of the side rail 110, 113 at a location that is readily accessible to the occupant of the patient support 100. In other embodiments, a handle, lever, or other device may be used to activate the switch instead of the button 3609. This may be provided in a location that is inaccessible to the occupant of the patient support 100. A side rail release button similar to the button 3609 may be provided in additional or alternative locations, for example on the outside of the side rail, the attendant's control panel 120, etc.

The side-rail locking structure 3510 is configured to unlock upon electrical actuation of the release via button 3609. The side-rail locking structure 3510 is configured to mechanically unlock, as mentioned, upon mechanical actuation of the release via rail release handle 2419. Therefore, the button 3609 is part of an electrical release and the rail release handle 2419 is part of a mechanical release. The electrical and mechanical releases together form a combined release that electrically and mechanically controls the locking structure 3510. That is, in order to lower the side rail 110, 113, an attendant (or sometimes an occupant) may unlock the side rail 110, 113 by pressing rail release handle 2419 or may unlock the side rail 110, 113 by pressing the button 3609. The mechanical release may override the electrical release and permit the rail to be unlocked. It is advantageous that the same side-rail locking structure may be unlocked both mechanically and electrically; for example, in the event of power failure.

Side-rail release buttons 3609 may be provided elsewhere on the patient support 100 to facilitate electrical unlocking of the side rails 110, 113. For example, four side-rail release buttons 3609, one for each side rail 110, 113, may be provided at the attendant's control panel 120 and interfaced with the attendant's control panel sub-controller 3120. A side rail release button 3609 may be accessible to an occupant of the bed to electrically actuate the release and unlock the side rail to permit egress from the bed. This may be in addition to or as an alternative to buttons 3609 provided for use by the caregiver or attendant.

The program 3310 may be configured to control side-rail unlocking as follows.

The program 3310 responds to predetermined input at the side-rail release button 3609 in order to unlock the side rails 110, 113. In one embodiment, three presses of the side-rail release button 3609 by an occupant of the bed in quick succession electrically actuates the release and unlocks the respective side rail 110, 113. If the program 3310 detects fewer than three presses in an allotted time, then the side rail 110, 113 is not unlocked, while detection of three or more presses in the allotted time unlocks the side rail 110, 113. This may advantageously prevent inadvertent unlocking of the side rails 110, 113 by the occupant of the patient support 100.

The program 3310 may be configured to lock out the side-rail release button 3609. That is, the program 3310 may ignore input at the side-rail release button 3609 under certain circumstances. For example, the attendant's control panel sub-controller 3120 may include a control lockout option that configures the program 3310 to ignore commands received from the occupant of the patient support 100. This may be used when the safety of the occupant is a concern. Additional lockout states may include when the bed is in an unacceptable configuration, for example a Trendelenburg or reverse Trendelenburg orientation, when the backrest or knee is raised above an acceptable level, when a height of the bed is above or below an acceptable level, when a patient support surface or mattress is in an unacceptable orientation, when the caster wheels or brakes are unlocked, etc.

The program 3310 may be configured to automatically electrically actuate the release and unlock any or all of the side-rail locking structures 3510 using the respective servos 2443 in the event that the CPR handle 124 is pulled, thereby putting the patient support in an emergency state. Each CPR handle 124 includes a switch 3606 that indicates to the controller 3302 that the CPR handle 124 has been pulled. Among other things, the switch 3606 may provide the controller 3302 with information on the state of the CPR handle 124, which the controller 3302 may use, for example, to reset the emergency CPR mechanism. However, regarding the side rails 110, 113 the program 3310 may reference the state of each CPR handle switch 3606 and accordingly control the servos 2443 to unlock the side-rail locking structures 3510 after one of the CPR handles 124 has been pulled. Which of the side rails 110, 113 are to be so unlocked or the sequence in which they are unlocked may be predetermined. In one embodiment, only the two head-end side rails 110, 113 are unlocked in an emergency state. In another embodiment, all of the side rails 110, 113 are unlocked in this way. Electrically unlocking the side rails 110, 113 during an emergency may advantageously allow the side rails to lower automatically, thereby permitting quicker and less complicated access to the occupant of the patient support 100. That is, emergency personnel do not need to first manually lower the side rails 110, 113 before performing procedures, such as chest compressions, that require unobstructed access to the occupant. Other actions may be taken by the controller 3302 in an emergency state, for example flattening the patient support surface, triggering lights or alarms indicative of an emergency state, etc.

The program 3310 may be configured to automatically electrically actuate the release and unlock any or all of the side-rail locking structures 3510 using the respective servos 2443 in other circumstances. For example, the occupant's control panel may be provided with a switch for unlocking the side-rails. This is particularly useful for mothers breast feeding an infant because the mother does not need to call for an attendant to lower the side rails to return the infant to a bassinet once breast feeding is over. The mother is able to lower the rails easily without needing to disturb the infant and then is able to exit the patient support without assistance of an attendant.

The program 3310 may be configured to generate an alarm signal in response to unlocking of a side rail 110, 113. In one embodiment, the alarm signal is generated when the release is electrically actuated. In another embodiment, a side rail 110, 113 is provided with a side rail locking sensor interfaced with a side-rail locking sensor sub-controller 3320 that senses the locked/unlocked state of the side rail 110, 113. The side-rail locking sensor may comprise a limit switch or similar device. When the program 3310 determines that a side rail 110, 113 has been unlocked, the program 3310 outputs the alarm signal to a device, such as an alarm device 3608 on the patient support 100 or a remote monitoring device located at a nurse call station. The alarm device 3608 may include one or more of an audible device, such as a speaker, and a visible device, such as a light or display. The alarm device 3608 may further indicate which of the side rails 110, 113 has been unlocked. For example, each side rail 110, 113 may include a light-emitting diode (LED) that flashes when the side rail 110, 113 is unlocked.

In another embodiment, still with reference to FIG. 71, the program 3310 may be configured to adjust an allowable height of the upper frame 102 of the patient support 100 with reference to the side rails 110, 113. Adjusting an allowable height based on the side rails 110, 113 may reduce a patient falling hazard and/or may reduce the likelihood of damage to the patient support 100.

The program 3310 constrains the height-adjusting actuator sub-controller 3200 to operate according to at least one actuation limit and provides an alarm signal to the alarm device 3608 when the actuation limit is violated. The program 3310 may establish one or more actuation limits corresponding to one or more of a maximum allowable height of the upper frame 102 and a minimum allowable height of the upper frame 102. An actuation limit corresponds to a position of a height adjusting actuator connected to the sub-controller 3200 and may be stored and compared in terms, such as rotary encoder pulse count, that are different from terms (e.g., cm or inches) in which the corresponding allowable height is expressed. An allowable height is enforced by the program 3310 ignoring commands that would cause the height-adjusting actuator sub-controller 3200 to violate an actuation limit. Default maximum and minimum allowable heights may be used to stop the height-adjusting actuator sub-controller 3200 during normal raising and lowering of the patient support 100.

The system 3300 may additionally or alternatively include side-rail position sensors, for example first and second rail position switches 2447, 2448 (see FIG. 56) that are electrically coupled to a side-rail position sensor sub-controller 3321 that is connected with the input/output interface 2306. The side-rail position sensor sub-controller 3321 is configured to detect a position of the side rail 110, 113 for example whether the respective side rail 110, 113 is in the raised position, the lowered position, or optionally another position. The side-rail position sensors may be limit switches, proximity sensors, optical sensors or similar devices.

The program 3310 may reference one or more of the side-rail locking sensor sub-controller 3320 and side-rail position sensor sub-controller 3321 to determine whether an allowable height of the patient support 100 is to be adjusted. Each sub-controller 3320, 3321 may indicate to the program 3310 that the patient support 100 should not be raised or lowered beyond an allowable height. Other features of the patient support 100, such as configuration, may be controlled based on input from the sub-controllers 3320 and/or 3321; for example the patient support 100 may be prevented from entering a Trendelenburg or reverse Trendelenburg orientation, the backrest or knee may be prevented from being raised above an acceptable level, a height of the patient support 100 may be prevented from being adjusted outside of an acceptable range, the patient support deck 104 may be prevented from entering an unacceptable orientation, the caster wheels or brakes may be prevented from being unlocked, etc.

The program 3310 may be configured to lower the maximum allowable height of the upper frame 102 when a side rail 110, 113 is unlocked, as determined by the side-rail locking sensor sub-controller 3320, or when a side rail 110, 113 is lowered, as determined by the respective side-rail position sensor sub-controller 3321. When a side rail 110, 113 is unlocked or lowered, the program 3310 ignores commands that would cause the upper frame 102 to be raised higher than the maximum allowable height. When the program 3310 determines that the upper frame 102 is higher than the maximum allowable height, as may be the case when a side rail 110, 113 is unlocked or lowered after the upper frame 102 has been raised, then the program 3310 outputs an alarm via the alarm device 3608. This advantageously helps reduce injury caused by the occupant falling from the patient support 100.

In a numerical example, the default maximum allowable height is 91 cm (or 36 inches) and the maximum allowable height with an unlocked or lowered side rail 110, 113 is 61 cm (or 24 inches). The patient support 100 may be raised and lowered below 61 cm irrespective of the side rails 110, 113 being locked/unlocked or raised/lowered. If a side rail 110, 113 is unlocked or lowered and an attempt is made to raise the patient support 100 above 61 cm, then the program 3310 ignores the raise command. If the patient support is already above 61 cm when a side rail 110, 113 is unlocked or lowered, then the program 3310 issues an alarm and also ignores raise commands.

The program 3310 may be configured to raise the minimum allowable height of the upper frame 102 when a side rail 110, 113 is unlocked, as determined by the respective side-rail locking sensor sub-controller 3320, or when a side rail 110, 113 is lowered, as determined by the respective side-rail position sensor sub-controller 3321. When a side rail 110, 113 is unlocked or lowered, the program 3310 ignores commands that would cause the upper frame 102 to be lowered lower than the minimum allowable height. When the program 3310 determines that the upper frame 102 is lower than the minimum allowable height, as may be the case when a side rail 110, 113 is unlocked or lowered after the upper frame 102 has been lowered, then the program 3310 outputs an alarm via the alarm device 3608. This may advantageously help prevent damage to the side rails 110, 113 or objects on the floor underneath the side rails 110, 113.

In a numerical example, the default minimum allowable height is 15 cm (or 6 inches) and the minimum allowable height with an unlocked or lowered side rail 110, 113 is 20 cm (or 8 inches) or other increased amount sufficient to prevent interference between the side rails 110, 113 and the floor. The patient support 100 may be raised and lowered above 20 cm irrespective of the side rails 110, 113 being locked/unlocked or raised/lowered. If a side rail 110, 113 is unlocked or lowered and an attempt is made to lower the patient support 100 below 20 cm, then the program 3310 ignores the lower command. If the patient support is already below 20 cm when a side rail 110, 113 is unlocked or lowered, then the program 3310 issues an alarm and also ignores lower commands.

The features of the program 3310 described in the embodiments above, and specifically the features regarding electrical unlocking of side rails 110, 113, such as control lock out, CPR unlocking, alarms, and allowable height adjustments, may be used independently of each other and may be used together in any suitable combination.

The mechanical release action of the side-rail locking structure 3510 may override the electrical release action of the locking structure 3510. That is, in some situations, such as power failure, the side rail locking servo 2443 may not be used to unlock the side rail 110, 113. However, in such situations, the rail release handle 2419 may always be pushed to unlock the side rail 110, 113. Another example of such a situation is provided when a control lock out is enabled via the attendant control panel sub-controller 3120 that disables the side-rail release button 3609 and thus disables electrical unlocking of the side rail 110, 113. Again, the rail release handle 2419 may be pushed/pulled to unlock the side rail 110, 113. This is advantageous in that the side rails 110, 113 may always be lowered during an emergency, regardless of the state of electrical power at the patient support 100, while still providing convenience via electrical side rail unlocking when power is available.

The bed may be equipped with the bed condition monitoring system, otherwise known as a "watchdog" system, which permits a user to define a number of bed conditions for monitoring, data logging, and/or alarm generation. Data collected in conjunction with the monitored bed conditions may be stored locally, indicated locally with or without storage, output locally to an electronic storage device, and/or transmitted over a TCP/IP network. Transmission of data over a TCP/IP network may be dependent on the presence of an encryption key, as previously described. Examples of bed conditions that may be monitored include one or more of the following: height of the bed frame, angle of bed frame, angle of one or more portions of the mattress support deck (e.g., head portion of mattress support deck), contour of the mattress support deck, with of the mattress support deck or bed frame, position of one or more side rails, lock state of one or more side rails, headboard width, lock state of one or more casters, width between two casters at the head or foot end of the bed, actuation of a CPR release, weight applied to the bed, movement of the bed (especially movement of the bed along the floor), electrical power provided to the bed (especially connection or disconnection of AC power), mattress conditions of the bed (especially inflation status of a mattress), and other bed related conditions. The conditions to be monitored are pre-set or selectable by an attendant or other authorized person using, for example, an attendant control panel on the footboard of the bed. Alternatively, all conditions are monitored by default, with either all conditions or only selected conditions available for storage and/or local indication.

In one embodiment, the conditions are monitored in relation to a setpoint; deviation of the condition from the setpoint (outside of optional tolerance limits) triggers an alarm. The setpoint is obtained by taking a momentary snapshot of the monitored conditions when the bed is in a desired configuration. The momentary snapshot is obtained by an attendant using, for example, a button on the attendant control panel at the footboard of the bed. Alternatively, the snapshot is obtained automatically after expiry of a predetermined reconfiguration time limit (e.g. 30 seconds), following the clearing of an alarm generated by deviation of the monitored condition from the previous setpoint and/or following the cancellation of a monitoring pause initiated by an attendant. The pre-determined time limit may be fixed or may be modified by the attendant within certain limits. The monitoring pause is initiated by the attendant by pressing a button on the attendant control panel at the footboard of the bed. The monitoring pause may have a predetermined or user adjustable monitoring pause time limit, after which the monitoring pause is cancelled. Alternatively, the monitoring pause may be cancelled by the attendant by pressing a button on the attendant control panel. The monitoring pause may suspend monitoring during the monitoring pause time limit. Alternatively, the monitoring pause may simply inhibit visual and audible indications of alarms during the monitoring pause time limit and the reconfiguration time limit.

The alarm is locally indicated by a visual indicator, an audible alert or a combination thereof. The visual indicator may be provided at 1, 2, 3, 4 or more positions about the bed. In one embodiment, the visual indicator is provided as a light at a foot end of the bed, for example, on the footboard. In another embodiment, the visual indicator is provided as two lights at the foot end of the bed, for example, as illuminated bumper lights provided beneath a frame or footboard of the bed. In yet another embodiment, the visual indicator is provided as three lights at the foot end of the bed, for example, a light on the footboard and two illuminated bumper lights provided beneath a frame or footboard of the bed. In still another embodiment, the visual indicators is provided as four lights at four corners of the bed, for example, four illuminated bumper lights provided beneath a frame of the bed and/or with two of the four lights provided beneath a footboard of the bed. In other embodiments, the visual indicators are provided by LCD screen or by non-illuminated indicators, such as mechanical flags. The visual indicator comprises a color that would not be confused by persons of skill in the art with colors designated for other bed functions. For example, a purple light may be chosen rather than green or red lights, which are reserved for other conditions that are not necessarily monitored by the bed condition monitoring system. The visual indicator may be provided in more than one color and/or in more than one pattern, for example, a short flash, a long flash, a combination of short and long flashes, a fade in, a fade out, etc. The visual indicator and/or audible alert may be varied in brightness and/or switched off independently of monitoring of bed conditions, for example at night in order to prevent disturbing sleeping patients nearby, without interrupting the monitoring of bed conditions. In this manner, bed condition data and/or alarms can continue to be logged, or output via TCP/IP or nurse call system, without a local visual or audible indication.

It should be noted that, independently of the bed condition monitoring system, beds are equipped with monitoring for certain critical safety parameters. These parameters include a lock state of the caster wheels, activation of the CPR release and optionally interference between a component of the bed and a person. A different audible alert and/or visual indicator is used for these conditions to allow them to be readily distinguished from alarms generated by the bed condition monitoring system, which may be less critical in nature. For example, in the event that the caster wheels are unlocked, one or more visual indicators is provided in a solid red color. In the event that the CPR release is activated, one or more visual indicators is illuminated in a flashing red color. In the event that there is interference between a component of the bed and a person, one or more visual indicators is illuminated in a different color or a flash pattern, optionally in combination with an audible alert. In this way, violation of critical safety parameters is readily recognizable by attendants.

The bed may be equipped with a patient condition monitoring system, sometimes known as a "bed exit" monitoring system, which permits a user to define a number of patient conditions for monitoring, data logging, and/or alarm generation. Data collected in conjunction with the monitored patient conditions may be stored locally, indicated locally with or without storage, output locally to an electronic storage device, and/or transmitted over a TCP/IP network. Transmission of data over a TCP/IP network may be dependent on the presence of an encryption key, as previously described. Examples of patient conditions that may be monitored include one or more of the following: movement on the bed, movement from one location on the bed to another location, exit from the bed, weight, restlessness, heart rate, blood oxygen level, respiration rate, etc. The conditions to be monitored are pre-set or selectable by an attendant or other authorized person using, for example, an attendant control panel on the footboard of the bed. Alternatively, all conditions are monitored by default, with either all conditions or only selected conditions available for storage and/or local indication.

In one embodiment, the conditions are monitored in relation to a setpoint; deviation of the condition from the setpoint (outside of optional tolerance limits) triggers an alarm. The setpoint is obtained by taking a momentary snapshot of the monitored conditions when the patient is in a desired position, condition or configuration on the bed. The momentary snapshot is obtained by an attendant using, for example, a button on the attendant control panel at the footboard of the bed. Alternatively, the snapshot is obtained automatically after expiry of a predetermined reconfiguration time limit (e.g. 30 seconds), following the clearing of an alarm generated by deviation of the monitored condition from the previous setpoint and/or following the cancellation of a monitoring pause initiated by an attendant. The predetermined time limit may be fixed or may be modified by the attendant within certain limits. The monitoring pause is initiated by the attendant by pressing a button on the attendant control panel at the footboard of the bed. The monitoring pause may have a predetermined or user adjustable monitoring pause time limit, after which the monitoring pause is cancelled. Alternatively, the monitoring pause may be cancelled by the attendant by pressing a button on the attendant control panel. The monitoring pause may suspend monitoring during the monitoring pause time limit. Alternatively, the monitoring pause may simply inhibit visual and audible indications of alarms during the monitoring pause time limit and the reconfiguration time limit.

The alarm is locally indicated by a visual indicator, an audible alert or a combination thereof. The visual indicator may be provided at 1, 2, 3, 4 or more positions about the bed. In one embodiment, the visual indicator is provided as a light at a foot end of the bed, for example, on the footboard. In another embodiment, the visual indicator is provided as two lights at the foot end of the bed, for example, as illuminated bumper lights provided beneath a frame or footboard of the bed. In yet another embodiment, the visual indicator is provided as three lights at the foot end of the bed, for example, a light on the footboard and two illuminated bumper lights provided beneath a frame or footboard of the bed. In still another embodiment, the visual indicators is provided as four lights at four corners of the bed, for example, four illuminated bumper lights provided beneath a frame of the bed and/or with two of the four lights provided beneath a footboard of the bed. In other embodiments, the visual indicators are provided by LCD screen or by non-illuminated indicators, such as mechanical flags. The visual indicator comprises a color that would not be confused by persons of skill in the art with colors designated for other bed functions. For example, a blue light may be chosen rather than green or red lights, which are reserved for other conditions that are not necessarily monitored by the patient condition monitoring system. The visual indicator may be provided in more than one color and/or in more than one pattern, for example, a short flash, a long flash, a combination of short and long flashes, a fade in, a fade out, etc. The visual indicator and/or audible alert may be varied in brightness and/or switched off independently of monitoring of patient conditions, for example at night in order to prevent disturbing sleeping patients nearby, without interrupting the monitoring of bed conditions. In this manner, bed condition data and/or alarms can continue to be logged, or output via TCP/IP or nurse call system.

When the patient condition monitoring system is used to monitor patient movement on the bed, movement from one location on the bed to another location, or exit from the bed, load cells are employed. 1, 2, 3, 4 or more load cells may be used, depending upon the sensitivity of the monitoring desired. Input from the load cells, either calibrated for patient weight or merely indicative of patient wait, may be provided to a controller and used in performing calculations. The results of these calculations may be used to determine whether the monitored condition is outside of allowable parameters, thus generating an alarm.

In one embodiment, in a first mode, the sum of a pair of load cells at the head end of the bed and the sum of a pair of load cells at the foot end of the bed is calculated. When the sum of either pair of load cells differs from the sum obtained when a snapshot of the bed is taken by a predetermined percentage, an alarm is generated. For example, when the sum of load cells at the foot end of the bed increases by more than 10% from the value obtained for the sum when the snapshot is taken, or the value for the sum of load cells at the head end of the bed decreases by more than 10% from the value obtained for the sum when the snapshot is taken, an alarm indicative of the raising of the patient's head (thereby transferring weight from the head end of the bed to the foot end of the bed) is generated. In a second mode, the sum of a pair of load cells on the right side of the bed and the sum of a pair of load cells on the left side of the bed is calculated. When the sum of either pair of load cells differs from the sum obtained when a snapshot of the bed is taken by a predetermined percentage, an alarm is generated. For example, when the sum of load cells at the right side of the bed increases by more than 25% from the value obtained for the sum when the snapshot is taken, or the value for the sum of load cells at the left side of the bed decreases by more than 25% from the value obtained for the sum when the snapshot is taken, an alarm indicative of the patient rolling towards the right side of the bed (thereby transferring weight from the left side of the bed to the right side of the bed) is generated. By increasing the percentage value chosen, for example to more than 35%, this mode may also be used to indicate when a patient is seated on the right edge of the bed and about to exit from the right side of the bed. In a third mode, the sum of at least two load cells (preferably all load cells) is calculated. When the sum differs from the sum obtained when the snapshot is taken by a predetermined percentage, an alarm is generated. For example, when the sum of the load cells decreases by more than 90% from the value obtained for the sum when the snapshot is taken, an alarm indicative of the patient having exited the bed (thereby transferring the majority of his or her weight from the bed to the floor) is generated. Persons of skill in the art will understand that these percentages are provided for illustrative purposes only and may be varied to adjust the sensitivity of each mode. The bed may be provided with any combination of the above modes, including one, two or three modes. The number of modes and the sensitivity of the modes may be preset or may be adjusted by an attendant or other authorized person using the attendant control panel.

In a second embodiment, the location of a center of gravity of the patient on the bed is calculated. This calculation is performed using at least two load cells, preferably three load cells, more preferably four load cells. In a first mode, a first region for the location of the center of gravity on the bed is defined. Movement of the center of gravity outside of the first region generates an alarm indicative of a small amount of patient movement. For example, the first region may be defined such that raising of a patient's head causes the center of gravity to move outside of the first region and generate an alarm. In a second mode, a second region for location of the center of gravity on the bed is defined. The second region is larger than the first region and includes all, or at least a portion of, the first region. Movement of the center of gravity outside of the second region generates an alarm indicative of a larger amount of patient movement. For example, the second region may be defined such that movement of a patient towards the right side or left side of the bed causes the center of gravity to move outside of the second region and generate an alarm. In a third mode, a third region for location of the center of gravity on the bed is defined. The third region is larger than the first and second regions and includes all, or at least a portion of, the first and second regions. Movement of the center of gravity outside of the third region generates an alarm indicative of an even larger amount of patient movement. For example, the third region may be defined such that movement of a patient off of the bed causes the center of gravity to move outside of the third region and generate an alarm. Although a variety of methods may be used, one particular method of calculating a center of gravity of the patient is further described in U.S. Pat. No. 5,276,432, which is hereby incorporated herein by reference.

Independently of the bed or patient condition monitoring systems, the bed may include an attendant information system configurable to generate an audible and/or visual indicator in response to certain attendant specified conditions. In one embodiment, a button on the attendant control panel of the footboard of the bed is used to activate a nurse reminder function that illuminates one or more visual indicators in response to the attendant specified condition. The specified condition may comprise expiry of a certain time limit; this can be advantageous to serve as a timer for blood pressure monitoring, taking a patient's pulse, or simply serving as a reminder to return and perform a certain function at a certain time. Other specified conditions may include patient related conditions, such as patient weight, or bed related conditions, such as position or lock state of one or more side rails.

The alarm is locally indicated by a visual indicator, an audible alert or a combination thereof. The visual indicator may be provided at 1, 2, 3, 4 or more positions about the bed. In one embodiment, the visual indicator is provided as a light at a foot end of the bed, for example, on the footboard. In another embodiment, the visual indicator is provided as two lights at the foot end of the bed, for example, as illuminated bumper lights provided beneath a frame or footboard of the bed. In yet another embodiment, the visual indicator is provided as three lights at the foot end of the bed, for example, a light on the footboard and two illuminated bumper lights provided beneath a frame or footboard of the bed. In still another embodiment, the visual indicators is provided as four lights at four corners of the bed, for example, four illuminated bumper lights provided beneath a frame of the bed and/or with two of the four lights provided beneath a footboard of the bed. In other embodiments, the visual indicators are provided by LCD screen or by non-illuminated indicators, such as mechanical flags. The visual indicator comprises a suitable color (e.g. pink) that would not be confused by a person of skill in the art with colors designated for other bed functions. The visual indicator may be provided in more than one color and/or in more than one pattern, for example, a short flash, a long flash, a combination of short and long flashes, a fade in, a fade out, etc. to further distinguish it from other bed indicators. The visual indicator for the nurse reminder function may be co-located with other visual indicators, for example visual indicators relating to the bed condition monitoring system and/or patient condition monitoring system.

Programs detailed herein are described in terms of software, hardware, or firmware for sake of convenience. Software, hardware, firmware, or various combinations of such may be used to realize any of the programs described herein.

Novel features will become apparent to those of skill in the art upon examination of the detailed description. It should be understood, however, that the scope of the claims should not be limited by the preferred embodiments set forth in the examples, but should be given the broadest interpretation consistent with the specification as a whole.

Directional terms, such as “vertical,” “horizontal,” “top,” “bottom,” “upper,” “lower,” “inner,” “inwardly,” “outer” and “outwardly,” are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles “a,” “an,” “the” or “said,” is not to be construed as limiting the element to the singular. Any reference to claim elements as “at least one of X, Y and Z” is meant to include any one of X, Y or Z individually, and any combination of X, Y and Z, for example, X, Y, Z; X, Y; X, Z; and Y, Z.

We claim:

1. A patient support comprising:

a patient support deck, the patient support deck having a pivotal head deck section;

at least one guard structure mounted relative to the patient support deck, the guard structure movable from a raised position to one or more lowered positions relative to the patient support deck;

a CPR release operable to lower the head deck section to place the patient support in an emergency state;

a latch operable to lock the position of the guard structure in the raised position; and the CPR release further operable to release the latch to allow the guard rail structure to lower or be lowered from the raised position.

2. The patient support according to claim 1, wherein the CP release comprises a manually operable handle.

3. The patient support according to claim 2, wherein the patient support deck includes an actuator to raise the head deck section, and the manually operable handle is operable to release the head deck section to allow the head deck section to lower from the raised position.

4. The patient support according to claim 3, wherein when unlocked the guard rail is configured to lower from the raised position under the force of gravity.

5. The patient support according to claim 1, further comprising a control system, the control system being operable to release the latch in response to input from the CPR release.

6. The patient support according to claim 5, further comprising a servo operable to release the latch to allow the guard rail to lower, and the control system configured to generate a signal to the servo to release the latch.

7. The patient support according to claim 5, further comprising a mechanism indicating the position of the guard rail.

8. The patient support according to claim 7, wherein the mechanism is selected from the group consisting of accelerometers, inclinometers, rotary encoders, and switches.

9. The patient support according to claim 5, further comprising switches to indicate whether the latch is locked or released.

10. The patient support of claim 1 comprising a visual indicator configured to provide information about the status of the guard rail.

11. The patient support according to claim 10, wherein the visual indicator comprises a light.

12. The patient support according to claim 10, wherein the visual indicator indicates an unlocked status of the guard rail.

13. The patient support according to claim 12, further comprising a control system, the control system being operable to detect the unlocked status of the guard rail.

14. The patient support according to claim 13, wherein the control system includes a sensor to detect the unlocked status of the guard rail.

15. The patient support according to claim 14, wherein the control system includes a controller with a program configured to output an alarm signal when guard rail is in an unlocked state.

16. The patient support according to claim 15, wherein the control system includes an alarm device, and the alarm signal is output to said alarm device.

17. The patient support according to claim 16, wherein the alarm device includes the visual indicator.

18. The patient support according to claim 17, wherein the visual indicator comprises a light.

19. The patient support according to claim 15, wherein the program is configured to adjust a function at the patient support when the unlocked status of the guard rail is detected by the control system.

20. The patient support according to claim 19, wherein the program is configured to ignore a lowering command when the control system detects the unlocked status of the guard rail.

* * * * *